US010042603B2

(12) United States Patent
Bae et al.

(10) Patent No.: US 10,042,603 B2
(45) Date of Patent: Aug. 7, 2018

(54) CONTEXT AWARE SERVICE PROVISION METHOD AND APPARATUS OF USER DEVICE

(71) Applicant: Samsung Electronics Co. Ltd., Suwon-si, Gyeonggi-do (KR)

(72) Inventors: Jooyoon Bae, Seoul (KR); Minjeong Ko, Suwon-si (KR); Sungsoo Kim, Bucheon-si (KR); Jinsung Kim, Seoul (KR); Hwakyung Kim, Seoul (KR); Jinha Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 14/028,021

(22) Filed: Sep. 16, 2013

(65) Prior Publication Data

US 2014/0082501 A1  Mar. 20, 2014

(30) Foreign Application Priority Data

Sep. 20, 2012 (KR) .................. 10-2012-0104357
Apr. 30, 2013 (KR) .................. 10-2013-0048755

(51) Int. Cl.
*G06F 3/16* (2006.01)
*H04M 1/725* (2006.01)

(52) U.S. Cl.
CPC ........ *G06F 3/167* (2013.01); *H04M 1/72569* (2013.01); *H04M 2250/74* (2013.01)

(58) Field of Classification Search
CPC ...................................... G06F 3/167
USPC ........................................ 715/728
See application file for complete search history.

(56) References Cited

U.S. PATENT DOCUMENTS

| 6,615,177 | B1 * | 9/2003 | Rapp ................ G10L 15/26 704/270 |
| 6,622,119 | B1 * | 9/2003 | Ramaswamy et al. ........... 704/9 |
| 6,775,658 | B1 * | 8/2004 | Zothner ............... G06Q 10/087 705/28 |
| 2003/0187653 | A1 | 10/2003 | Okubo et al. |
| 2005/0054290 | A1 * | 3/2005 | Logan et al. ............... 455/41.2 |
| 2005/0283532 | A1 | 12/2005 | Kim et al. |
| 2006/0005156 | A1 | 1/2006 | Korpipaa et al. |
| 2006/0208872 | A1 * | 9/2006 | Yu et al. .................... 340/517 |

(Continued)

FOREIGN PATENT DOCUMENTS

| CN | 1270360 A | 10/2000 |
| CN | 101002175 A | 7/2007 |

(Continued)

*Primary Examiner* — Jennifer N To
*Assistant Examiner* — Ashley M Fortino
(74) *Attorney, Agent, or Firm* — Jefferson IP Law, LLP

(57) ABSTRACT

A context aware service provision method and apparatus for recognizing the user context and executing an action corresponding to the user context according to a rule defined by the user and feeding back the execution result to the user interactively are provided. The method for providing a context-aware service includes receiving a user input, the user input being at least one of a text input and a speech input, identifying a rule including a condition and an action corresponding to the condition based on the received user input, activating the rule to detect a context which corresponds to the condition of the rule, and executing, when the context is detected, the action corresponding to the condition.

21 Claims, 93 Drawing Sheets

(56) References Cited

U.S. PATENT DOCUMENTS

| | | |
|---|---|---|
| 2007/0073870 A1 | 3/2007 | Park et al. |
| 2008/0220810 A1 | 9/2008 | Landschaft et al. |
| 2008/0300886 A1 | 12/2008 | Patch |
| 2009/0253463 A1 | 10/2009 | Shin et al. |
| 2011/0038367 A1* | 2/2011 | Landers .............. H04L 12/1827 370/352 |
| 2011/0137960 A1 | 6/2011 | Price et al. |
| 2013/0111348 A1 | 5/2013 | Gruber et al. |

FOREIGN PATENT DOCUMENTS

| | | |
|---|---|---|
| CN | 101267600 A | 9/2008 |
| CN | 101557432 A | 10/2009 |
| CN | 102640480 A | 8/2012 |
| JP | 2002-283259 A | 10/2002 |
| JP | 2008-504779 A | 2/2008 |
| JP | 2014-518409 A | 7/2014 |
| KR | 20090053179 A | 5/2009 |
| WO | 2011/068598 A1 | 6/2011 |
| WO | 2012/167168 A2 | 12/2012 |

* cited by examiner

CONTEXT AWARE SERVICE PROVISION METHOD AND APPARATUS OF USER DEVICE

PRIORITY

This application claims the benefit under 35 U.S.C. 119(a) of a Korean patent application filed on Sep. 20, 2012 in the Korean Intellectual Property Office and assigned Serial No. 10-2012-0104357, and a Korean patent application filed on Apr. 30, 2013 and assigned Serial No. 10-2013-0048755, the entire disclosures of which are hereby incorporated by reference.

BACKGROUND OF THE INVENTION

1. Field of the Invention

The present invention relates to a Context Aware Service provision method and apparatus. More particularly, the present invention relates to a context aware service provision method and apparatus for recognizing user context and executing an action corresponding to the user context according to a rule defined by the user and for interactively feeding back the execution result to the user.

2. Description of the Related Art

With the advance of digital technologies, various types of user devices capable of communicating and processing data (e.g., a cellular communication terminal, a Personal Digital Assistant (PDA), an electronic organizer, a smartphone, and a tablet Personal Computer (PC)) are emerging. Recently, user devices are evolving into multifunctional devices integrating various functions in line with the mobile convergence tendency. For example, a recent user device integrates various functions including a voice and video telephony function, a messaging function including Short Message Service/Multimedia Message Service (SMS/MMS) and email, a navigation function, a picture capturing function, a broadcast playback function, a multimedia (e.g., video and audio) playback function, an Internet access function, a messenger function, a Social Networking Service (SMS) function, and the like.

Meanwhile, there is a growing interest in Context Aware Service (CAS) using various life-log technologies that are developed to record the daily life of an individual in the form of digital information. The CAS is characterized in that determination as to whether to provide the service and determination as to service content to be provided are made according to the change of the context defined by a service object. The term 'Context' means the information for use in determining the service behavior defined by the service object, the information including service provision timing, whether to provide service, target to serve, service provision location, and the like. Such technologies are capable of recording various types of information characterizing the behavior of an individual and providing the CAS based on the recorded information.

However, the CAS method according to the related art is implemented under the assumption of burdensome installation of various sensor devices based on a domain for collecting information on the individual. The CAS system according to the related art consists of user devices for collecting data by means of sensors and a server for analyzing the data acquired from the user devices to build a context and executing the service based on the context. For example, because the user device has to be equipped with various sensors and must interoperate with the server to provide the user context-based service, the high system implementation cost and design complexity are obstacles for implementing the CAS system according to the related art.

The CAS system according to the related art has a drawback associated with the difficulty in providing the context-based service efficiently due to the limit to the information collected via the user device and lack of effective learning process. For example, the CAS system according to the related art can provide the user with the context-based service only with the rule defined by the device manufacturer so as not to satisfy the requirements of all users. The CAS system according to the related art has a drawback of low user accessibility because the user has to execute an extra program and/or carry out complex manipulation to use the context-based service. Furthermore, the CAS system according to the related art is limited to a single context aware scenario so as to provide no flexibility in setting conditions by taking notice of various situations.

Therefore, a need exists for a CAS method and apparatus that is capable of supporting CAS with one or more rules defined by the user.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a Context Aware Service (CAS) method and apparatus that is capable of supporting a CAS with one or more rules defined by the user.

Another aspect of the present invention is to provide a CAS method and apparatus that is capable of feeding back the context information collected based on one or more rules to the user in such a way of being, at the terminal, aware of the situation of the user which is determined according to the rules predefined by the user and executing the action corresponding to the user's situation.

Another aspect of the present invention is to provide a CAS method and apparatus that is capable of allowing the user to define rules (or situations), commands for executing the rules, and actions to be executed based on the rules by inputting natural language-based text and/or voice to the user device.

Another aspect of the present invention is to provide a CAS method and apparatus that is capable of expending CAS supportability in such a way of defining, at the user device, rules, commands, and actions using natural language-based text or voice, recognizing the natural language-based text or voice, and executing the rule selected according to the motion of user device.

Another aspect of the present invention is to provide a CAS method and apparatus that is capable of configuring plural conditions of a rule, being aware of multiple contexts corresponding to the respective conditions, and execution multiple actions corresponding to the respective contexts.

Another aspect of the present invention is to provide a CAS method and apparatus that is capable of configuring one or more conditions according to the user's preference in defining a rule.

Another aspect of the present invention is to provide CAS method and apparatus that is capable of improving user convenience and device usability with the implementation of optimal CAS environment.

In accordance with an aspect of the present invention, a method for providing a context-aware service of a user device is provided. The context-aware service provision method includes receiving a user input, the user input being at least one of a text input and a speech input, identifying a rule including a condition and an action corresponding to the condition based on the received user input, the user input being one of a text input and a speech input, activating the rule to detect a context which corresponds to the condition of the rule, and executing, when the context is detected, the action corresponding to the condition.

In accordance with another aspect of the present invention, a method for providing a context-aware service of a user device is provided. The context-aware service provision method includes providing a user interface for configuring a rule, receiving at least one of a natural language-based speech input and a natural language-based text input through the user interface, configuring the rule with a condition and an action identified from the user input, activating the rule to detect an event which corresponds to the condition of the rule, and executing, when the event is detected, the action corresponding to the condition.

In accordance with another aspect of the present invention, a method for providing a context-aware service of a user device is provided. The method includes receiving a user input for configuring a rule with natural language-based voice or text, configuring the rule according to the user input, receiving a command for activating the rule, the command being one of a natural language-based speech, a natural language-based text, a motion detection event of the user device, a receipt of inbound sound, and a receipt of inbound message, executing the rule corresponding to the command, checking at least one condition occurring inside and outside as specified in the rule, and executing, when at least one condition specified in the rule is fulfilled, at least one action corresponding to at least one of the at least one fulfilled condition.

In accordance with another aspect of the present invention, a method for providing a context-aware service of a user device is provided. The context-aware service provision method includes defining a rule, receiving a command input for executing the rule, executing the rule in response to the command, checking a condition corresponding to the rule, executing at least one action when the condition corresponding to the rule is detected.

In accordance with another aspect of the present invention, a context-aware service provision method of a user device is provided. The context-aware service provision method includes monitoring to detect whether an event occurs in the state in which a rule is executed, extracting, when an event is detected, a function specified to execute an action, executing the action according to the function, feeding back information related to the execution of the action, determining, when no event is detected, whether a current situation fulfills a rule release condition, and releasing, when the current situation fulfills a rule release condition, the rule.

In accordance with another aspect of the present invention, a non-transient computer-readable storage medium stores a program of executing the above method by means of a processor.

In accordance with another aspect of the present invention, a user device is provided. The user device includes a storage unit which stores a rule including a condition and an action corresponding to the condition, a display unit which displays a user interface for receiving a user input and execution information in a state in which the rule is activated and an execution result of the action, and a control unit which controls identifying the rule including the condition and the action based on the user input, the user input being at least one of a text input and a speech input, activating the rule to detect a context which corresponds to the condition of the rule, and executing, when context is detected, the a action corresponding to the condition.

In accordance with another aspect of the present invention, a user device is provided. The user device includes a rule configuration module which is computer-implemented for receiving a user input and for identifying a rule including a condition and an action corresponding to the condition based on the user input, the user input being at least one of a natural language-based speech input and a natural language-based text input, a rule execution module which is computer-implemented for receiving a command for activating the rule, the command being one of a natural language-based speech, a natural language-based text, a motion detection event of the user device, a receipt of inbound sound, and a receipt of an inbound message, and for executing the rule corresponding to the command, a condition check module which is computer-implemented for detecting a context which corresponds to the condition as specified in the rule, and an action execution module which is computer-implemented for executing, when the context is detected, the action corresponding to the condition.

In accordance with another aspect of the present invention, a non-transient computer-readable storage medium is provided. The non-transient computer-readable storage medium includes a program that, when executed, causes at least one processor to perform a method including defining a rule for context-aware service according to user input, executing, when a command for executing the rule is received, the rule corresponding to the command, and executing, when a condition specified in the rule is fulfilled, an action corresponding to the condition.

In accordance with still another aspect of the present invention, a non-transient computer-readable storage medium is provided. The computer-readable storage medium includes a program that, when executed, causes at least one processor to perform a method including receiving a user input, the user input being at least one of a text input and a speech input, identifying a rule including a condition and an action corresponding to the condition based on the received user input, activating the rule to detect a context which corresponds to the condition of the rule, and executing, when the context is detected, the action corresponding to the condition.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

Figure 1:
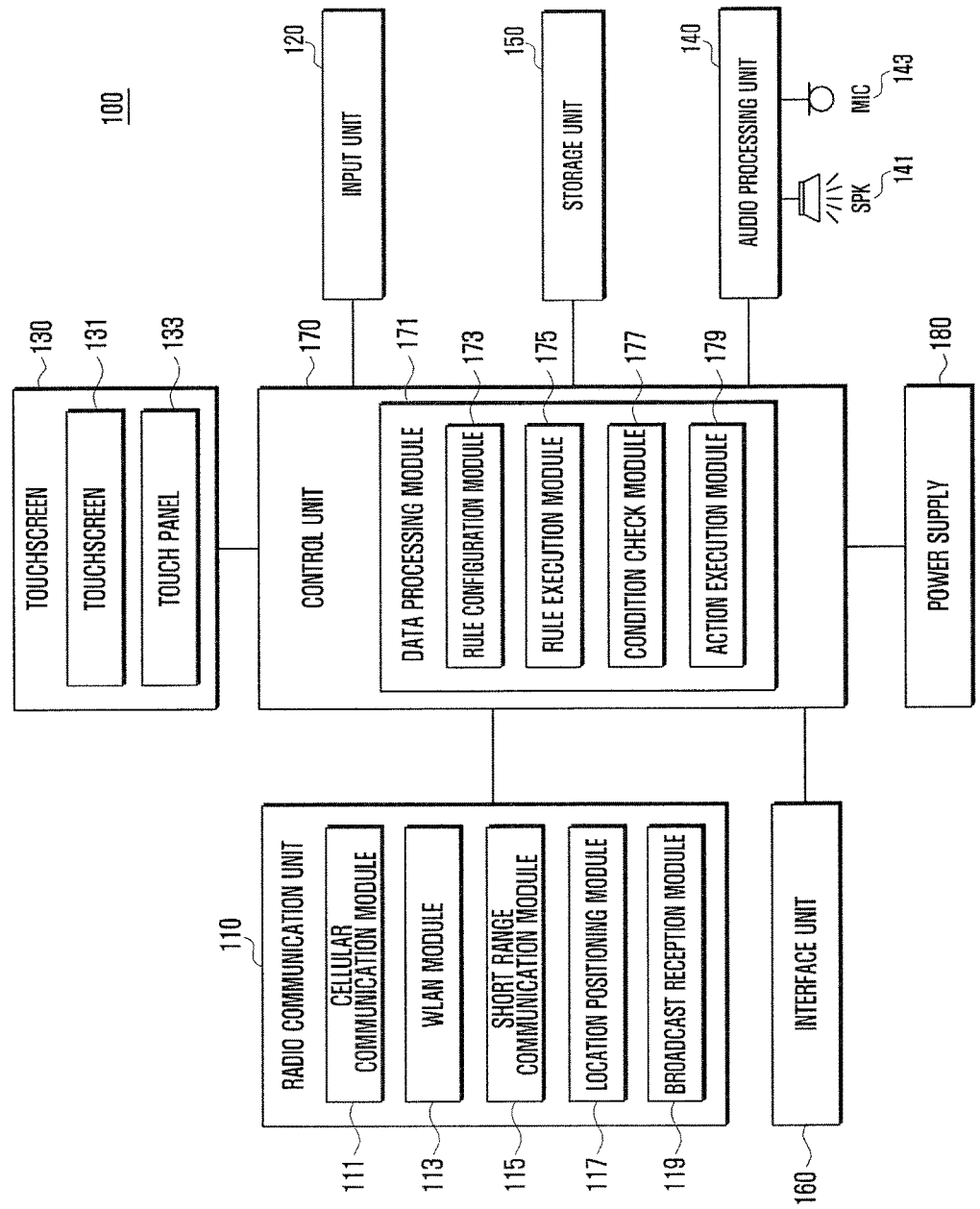
FIG. 1 is a block diagram illustrating a configuration of a user device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a Context Aware Service (CAS) provision method and apparatus of a user device.

According to an exemplary embodiment of the present invention, the user device is capable of being aware of distinct contexts of the user according to one or more rules defined by the user.

According to an exemplary embodiment of the present invention, the user device is capable of executing one or more actions according to the context awareness and, as a consequence of the executed action, feeding back the context information to the user or a predetermined person.

According to an exemplary embodiment of the present invention, the CAS provision method and apparatus is capable of feeding back the context information to the user by means of an external device (e.g., a television, an electric lamp, and the like) and/or transmitting the context information to another user through a message.

In various exemplary embodiments of the present invention, a rule can be defined through text (e.g., hand writing) or voice input using a natural language. In various exemplary embodiments of the present invention, the natural language corresponds to the language used by humans as compared to an artificial language (or machine language) invented for a certain purpose.

In various embodiments of the present invention, a rule may be activated in response to input (or receipt of) a command associated with the rule.

In various embodiments of the present invention, a rule may be identified or selected based on a received user input. The identified rule may be activated to detect a context which corresponds to the condition of the rule. When the context is detected, the action corresponding to the condition may be executed.

In various exemplary embodiments of the present invention, when a rule is activated, the user device may monitor or detect the context within which the user device operates. Based on the monitored or detected context within which the user device operates, the user device may determine or identify that the user device operates in a context corresponding to an activated rule.

In various exemplary embodiments of the present invention, the rule can be composed of at least one condition and at least one action, and a method or process for generating the rule is described hereafter.

In various exemplary embodiments of the present invention, a predetermined rule can be executed in response to the receipt of an instruction corresponding to the rule.

In various exemplary embodiments of the present invention, the instruction may include a natural language-based text or voice command or command sentence input by means of various input means (e.g., a touchscreen, a keypad, a microphone, and the like). The instruction also may include a change in the user device (e.g. a change in posture, orientation, or the like) which is detected by various sensors of the user device (e.g., a proximity sensor, a luminance sensor, an acceleration sensor, a gyro sensor, a voice sensor, and the like) according to a predetermined rule. The instruction also may include a receipt of an inbound message or inbound sound corresponding to a predetermined rule. The instruction also may include the change in geographical location of the user (or user device) in correspondence to a predetermined rule.

In various exemplary embodiments of the present invention, the instruction (e.g., a definition on command, a command sentence, a sensible behavior of user device, a sensor for sensing the behavior, and the like) for executing the rule can be configured in such a way of entering natural language-based voice or text.

In various exemplary embodiments of the present invention, the command or command sentence as one type of the instruction executing the rule can be entered in the form of a part (e.g., word), partial sentence or complete sentence of the natural language that is included in defining the rule.

In various exemplary embodiments of the present invention, the sentence can be a minimum expression unit for a complete content in expressing a thought or emotion and, although it may be essential to include a subject and a predicate, any of the subject and predicate may be omitted.

In the various exemplary embodiment of the present invention, the detection of user device's behavior as one type of the instruction can be input by the operation of one or more sensors configured in defining the rule.

In various exemplary embodiments of the present invention, the action is capable of including the operation executed by the user device upon awareness of the situation specified in the currently running rule.

In various exemplary embodiments of the present invention, the action is capable of including the operation control (e.g., internal operation control) for feedback of the information on the situation specified in the corresponding rule by controlling the internal components (e.g., display unit, communication module, speaker), the operation control (e.g., external operation control) for feedback the information on the situation specified in the corresponding rule by controlling an external components (e.g., television, electric lamp, external speaker), and the operation control for controlling both the internal and external components of the user device.

In various exemplary embodiments of the present invention, CAS denotes the service in which the user device is aware of the situation specified in the rule defined by the user, executes an action corresponding to the situation, and provides the user (or predetermined person) with the information on the situation as a consequence of the execution of the action. The situation information includes all information available at the time of user interaction such as user (or user device) location, identifier, activity, state, and application of the user device.

The configuration and operation control method of the user device according to exemplary embodiments of the present invention is described hereinafter with reference to the accompanying drawings. It is noted that exemplary embodiments of the present invention are not limited to the configuration and operation control method of the user device according to the following description but can be implemented with various changes and modifications without departing from the scope of the present invention.

FIG. 1 is a block diagram illustrating the configuration of a user device according to an exemplary embodiment of the present invention.

Referring to FIG. 1, the user device 100 includes a radio communication unit 110, an input unit 120, a touchscreen 130, an audio processing unit 140, a storage unit 150, an interface unit 160, a control unit 170, and a power supply 180. The user device 100 according to an exemplary embodiment of the present invention can be implemented with or without at least one of the components depicted and non-depicted in FIG. 1. For example, if the user device 100 according to an exemplary embodiment of the present invention supports a picture capture function, then a camera module (not shown) can be included. Similarly, if the user device 100 has no broadcast reception and playback function, some function modules (e.g., broadcast reception module 119 of the radio communication unit 110) may be omitted.

The radio communication unit 110 may include at least one module capable of radio communication of the user device 100 with a radio communication or another device. For example, the radio communication unit 110 may include a cellular communication module 111, a Wireless Local Area Network (WLAN) module 113, a short range communication module 115, a location positioning module 117, and a broadcast reception module 119.

The cellular communication module 111 is capable of communicating radio signals with at least one of a base station of a cellular communication network, an external device, and various servers (e.g., an integration server, a provider server, a content server, an Internet server, a cloud server). The radio signals may carry the voice telephony data, video telephony data, text/multimedia message data, and the like. The cellular communication module 111 is capable of connecting to a provider server or a content server to download various rules for CAS under the control of the control unit 170. The cellular communication module 111 is capable of transmitting the action execution result (e.g., situation information) to at least one target user device 100 under the control of the control unit 170. The cellular communication module 111 is also capable of receiving the message generated when the condition defined in or otherwise associated with a currently running rule is fulfilled (e.g., satisfied) under the control of the control unit 170.

The WLAN module 113 is responsible of establishing a WLAN link with an Access Point (AP) or another user device 100 and capable of being embedded in the user device 100 or implemented as an external device. There are various radio Internet access technologies available such as Wi-Fi, Wireless Broadband (WiBro), World Interoperability for Microwave Access (WiMAX), and High Speed Downlink Packet Access (HSDPA), and the like. The WLAN module 113 is capable of receiving various types of data (e.g., including rules) for CAS in the state connected to a server. The WLAN module 113 is capable of transmitting and receiving various data (e.g., including rules) to and from another user device according to the user's intention in the state in which a WLAN link has been established with another user device. The WLAN module 113 is also capable of transmitting and receiving various data (e.g., including rules) for CAS to and from a cloud server through a WLAN link. The WLAN module 113 is also capable of transmitting the action execution result (e.g., situation information) to at least one target user device under the control of the control unit 170. The WLAN module 113 is also capable of receiving a message generated when a condition specified in the currently running rule is fulfilled under the control of the control unit 170.

The short range communication module 115 is responsible for the short range communication of the user device 100. There are various short range communication technologies available such as Bluetooth, Bluetooth Low Energy (BLE), Radio Frequency Identification (RFID), Infrared Data Association (IrDA), Ultra Wideband (UWB), ZigBee, and Near Field Communication (NFC), and the like. The short range communication module 115 is capable of transmitting and receiving various data (including rules) for CAS to and from another user device according to the user's intention when the user device 100 is connected to the another user device.

The location positioning module 117 is responsible for positioning the location of the user device 100. The location positioning module 117 may include a Global Positioning System (GPS) module, and/or the like. The location positioning module 117 collects accurate distance information and time information from at least three base stations and performs triangulation based on the acquired information to acquire 3-Dimensional (3D) location information with latitude, longitude, and altitude. The location positioning module 117 is also capable of calculating the location information based on the signals from three or more satellites in real time. The location information of the user device 100 can be acquired using various methods.

The broadcast reception module 119 receives broadcast signals (e.g., TV broadcast signal, radio broadcast signal, and data broadcast signal) and/or information on the broadcast (e.g., broadcast channel information, broadcast program information, and broadcast service provider information) from an external broadcast management server through a broadcast channel (e.g., satellite broadcast channel and terrestrial broadcast channel).

The input unit 120 generates an input signal for controlling the operation of the user device 100 in response to the user input. The input unit 120 may include a key pad, a dome switch, a touch pad (e.g., using a capacitive technology, a resistive technology, and the like), a jog wheel, a jog switch, a sensor (e.g., voice sensor, proximity sensor, luminance sensor, acceleration sensor, and gyro sensor), and the like. The input unit 120 can be implemented with external buttons and/or virtual button on the touch panel. The input unit 120 is capable of generating an input signal in response to the user input (e.g., a text input, a voice input, a user device motion input, and the like) for defining or executing the rule (e.g. an instruction).

The touchscreen 130 is an input/output means responsible for input and output functions simultaneously and includes a display panel 131 and a touch panel 133. According to an exemplary embodiment of the present invention, if a user's touch gesture (e.g., one or more touches, a tap, a drag, a sweep, a flick, and the like) is detected by the touch panel in the state in which an execution screen of the user device 100 (e.g., a rule (condition and action) configuration screen, an outbound call-placing screen, a messenger screen, a game screen, a gallery screen, and the like) is displayed on the display panel 131, the touchscreen 130 generates an input signal corresponding to the touch gesture to the control unit 170. The control unit 170 identifies the touch gesture and executes an operation according to the touch gesture. For example, if a touch gesture of natural language-based text writing is detected on the touch panel 133 in the state in which the rule configuration screen is displayed on the display panel 131, the control unit 170 generates a rule in response to the touch gesture.

The display panel 131 displays (outputs) the information processed by the user device 100. For example, if the user device is operating in a telephony mode, the display unit 131 displays a telephony User Interface (UI) or Graphic UI (GUI). If the user device 100 is operating in a video telephony mode or a picture capture mode, the display unit 131 displays a UI or GUI displaying the picture captured by the camera or received through the communication channel. According to exemplary embodiments of the present invention, the display panel 131 is capable of displaying a UI or a GUI related to the CAS operation. For example, the display panel 131 is capable of providing the various UIs or GUIs displaying the rule configuration and rule execution states in response to a user input, an action execution state, and an action execution result (e.g., situation information). The display panel 131 is also capable of supporting display mode switching function for switching between portrait mode and landscape mode according to the rotation direction (or orientation) of the user device 100. The operation of the display panel 131 is described later with reference to exemplary screens.

The display panel 131 can be implemented any of a Liquid Crystal Display (LCD), a Thin Film Transistor LCD (TFT LCD), a Light Emitting Diode (LED), an Organic LED (OLED), an Active Matrix OLED (AMOLED), a flexible display, a bended display, a 3-Dimensional (3D) display, and the like. The display panel 131 can be implemented as a transparent or semitransparent display panel through which the light penetrates.

The touch panel 133 is capable of being placed on the display panel 131 to detect the user's touch gesture made on the surface of the touch screen 130 (e.g., a single touch gesture, and a multi-touch gesture). If the user's touch gesture is detected on the surface of the touchscreen 130, the touch panel 133 extracts the coordinates at the position of the touch gesture and transfers the coordinates to the control unit 170. The touch panel 133 detects the touch gesture made by the user and generates a signal corresponding to the touch gesture to the control unit 170. The control unit 170 is capable of executing a function according to the signal transmitted by the touch panel 133 in association with the position at which the touch gesture is detected.

The tough panel 133 can be configured to convert the pressure applied at a specific position of the display panel 131 or the change of capacitance at a specific position of the display panel 131 to an electrical input signal. The touch panel 133 is capable of measuring the pressure of the touch input as well as the position and size of the touch. If a touch input is detected, the touch panel 133 generates corresponding signal(s) to a touch controller (not shown). The touch controller (not shown) is capable of processing the signal(s) and transferring the corresponding data to the control unit 170. In this way, the control unit 170 is capable of determining the touched area on the display panel 131.

The audio processing unit 140 sends the audio signal received from the control unit 170 to the speaker (SPK) 141 and sends the audio signal such as voice input through the microphone (MIC) 143 to the control unit 170. The audio processing unit 140 is capable of processing the voice/sound data to output an audible sound wave through the speaker 141 and capable of processing the audio signal including voice to generate a digital signal to the control unit 170.

The speaker 141 is capable of outputting audio received by the radio communication unit 110 or stored in the storage unit 150 in the telephony mode, audio (video) recording mode, speech recognition mode, broadcast reception mode, photo shooting mode, and CAS mode The speaker 141 is also capable of outputting sound effects associated with the function executed in the user device 100 (e.g., rule execution, action execution, context information feedback, inbound call reception, outbound call placing, photo shooting, and media content (e.g., audio and video) playback).

The microphone 143 is capable of processing the input acoustic signal to generate voice data in the telephony mode, audio (video) recording mode, speech recognition mode, broadcast reception mode, photo shooting mode, CAS mode, and the like. The processed voice data can be processed into the signal to be transmitted to the base station by means of the cellular communication module 111 in the telephony mode. The microphone 143 can be implemented with various noise cancellation algorithms to cancel the noise occurring in the audio signal input process. The microphone 143 is capable of processing the user input (e.g., natural language-based text or voice input) for rule definition and execution (instruction) to generate the corresponding input signal to the control unit 170.

The storage unit 150 is capable of storing the programs associated with the processing and control operations of the control unit 170 and temporarily saving the input/output data (e.g., rule information, instruction information, action information, context information, contact information, message, media content (e.g. audio, video, and e-book), and the like). The storage unit 150 is also capable of storing use frequencies of user device functions (e.g., rule use frequency, instruction use frequency, application use frequency, data (e.g. phone number, message, and media content), importance rate, priority, and the like). The storage unit 150 is also capable of storing the data related to the vibration patterns and sound effects output in response to the user input made by means of the input unit 120 and/or the touchscreen 130. According to exemplary embodiments of the present invention, the storage unit 150 is capable of storing a mapping table including the mappings among the instructions per the user-defined rule and actions (e.g., functions and applications) per rule, and rule termination conditions.

The storage unit 150 stores Operating System (OS) of the user device 100; programs associated with input and display control operations of the touchscreen 130, CAS control operations (e.g., rule including conditions and actions) of context awareness depending on the rule (e.g., condition), action execution according to the rule, and context information feedback; and data generated by the programs semi-persistently or temporarily. According to exemplary embodiments of the present invention, the storage unit 150 is also capable of storing setting information for supporting CAS. The setting information is capable of including the information on whether to support voice-based CAS or text-based CAS. The setting information is also capable of including at least one condition per rule and the rules specifying the actions corresponding to the conditions.

The storage unit 150 can be implemented with a storage medium of at least one of a flash memory type, a hard disk type, a micro type, a card type (e.g., a Secure Digital (SD) type and an eXtreme Digital (XD) card type) memories, Random Access Memory (RAM), Dynamic RAM (DRAM), Static RAM (SRAM), Read-Only Memory (ROM), Programmable ROM (PROM), Electrically Erasable PROM (EEPROM), Magnetic RAM (MRAM), a magnetic disk, an optical disk type memories, and the like. The user device 100 can interoperate with a web storage working as the storage unit 150 on the Internet.

The interface unit 160 provides the interface for the external devices connectable to the user device 100. The interface unit 160 is capable of transferring the data or power from the external devices to the internal components of the user device 100 and transferring the internal data to the external devices. For example, the interface unit 160 can be provided with wired/wireless headset port, external charging port, wired/wireless data port, memory card slot, identity module slot, audio input/output port, video input/output port, earphone jack, and the like.

The control unit 170 controls overall operations of the user device 100. For example, the control unit 170 is capable of controlling the voice telephony, data telephony, and video telephony functions. In various exemplary embodiments of the present invention, the control unit 170 is also capable of controlling the operations associated with CAS. In various exemplary embodiments of the present invention, the control unit 170 may include a data processing module 171 having a rule configuration module 173, a rule execution module 175, a condition check module 177, and an action execution module 179. The operations of the rule configuration module 173, rule execution module 175, condition check module 177, action execution module 179 are described later with reference to the accompanying drawings. The control unit 170 may include a CAS framework (not shown) for supporting CAS and a multimedia module (not shown) for multimedia playback. In an exemplary embodiment of the present invention, the CAS framework (not shown) and the multimedia module (not shown) can be embedded in the control unit 170 or implemented as an independent module.

According to an exemplary embodiment of the present invention, the control unit 170 is capable of controlling CAS-related operations such as user-defined rule configuration, rule-based context awareness, rule-based action execution, and context information feedback as a consequence of the action execution. The control unit 170 (e.g., the rule configuration module 173) is capable of defining the rule for providing CAS according to the user input (e.g. natural language-based speech or text input). The control unit 170 is capable of operatively receiving a user input, and identifying a rule including a condition and an action corresponding to the condition based on the received user input. The control unit 170 is capable of activating the rule to detect a context which corresponds to the condition of the rule. If an instruction for executing the rule which is specified in the configured rule is detected, the control unit 170 (e.g., the rule execution module 175) is capable of executing one or more rules. The control unit 170 (e.g., the condition check module 177) is capable of checking (e.g., determining) and recognizing the condition (or context) as a consequence of the rule execution. If the condition specified in the corresponding rule is recognized, the control unit 170 (e.g., the action execution module 179) executes the action triggered when the condition is fulfilled. For example, the control unit 170 executes the action corresponding to the condition when the context is detected. The control unit 170 (e.g., the action execution module 179) executes at least one function (application) to perform the operation corresponding to the function (or application).

If an event (action fulfilling the condition specified in the rule) is detected by the condition check module 177 in the state in which at least one rule is executed by the rule execution module 175 in response to the user request, the control unit 170 extracts the function defined for executing an action corresponding to the event in the currently running rule by means of the action execution module 179. The control unit 170 is capable of controlling the execution of the action corresponding to the function extracted by the action execution module 179. If no user request event is detected, the control unit 170 determines whether the current situation fulfills the condition for terminating at least one currently running rules. If the current situation fulfills the condition, the control unit 170 controls the rule execution module 175 to terminate the currently running rules.

The control unit 170 is also capable of controlling the operation of feedback of the context information as a consequence of the action execution by the action execution module 179 when the action corresponding to the condition checked (e.g., determined) by the condition check module 177 is executed in the state in which at least one rule is executed by the rule execution module 175. The control unit is also capable of controlling the feedback operation in correspondence to the action termination by the action execution module 179 when the rule executed according to the condition checked (e.g., determined) by the condition check module 177 is terminated in the state in which at least one rule is executed by the rule execution module 175.

In various exemplary embodiments of the present invention, the feedback operation according to the action execution may include presenting the action execution result (e.g., context information) to the user through the display panel 131 and transmitting the action execution result (e.g., context information) to another user by means of the radio communication unit 110. The feedback operation according to the action execution may include transmitting to the corresponding external device a control signal for controlling the operation (e.g., turn-on/off) of the external device (e.g., a light lamp, a television, and the like) in correspondence to the action execution.

In various exemplary embodiments of the present invention, the feedback operation may include providing the device user with at least one of an audio effect (e.g., predetermined sound effect through the speaker 141), a visual effect (e.g., predetermined screen through the display panel 131), and a haptic effect (e.g., predetermined vibration pattern through a vibration module (not shown)).

The detailed control operations of the control unit 170 will be more clarified in the description on the operation and control method of the user device 100 which is made later with reference to the accompanying drawings.

In various exemplary embodiments of the present invention, the control unit 170 is capable of controlling the operations related to the normal functions of the user device 100 as well as the above described operations. For example, the control unit 170 is capable of controlling the execution of an application and the display of the execution screen. The control unit 170 is also capable of controlling the operations of receiving the input signal generated by the touch-based input interface (e.g., touchscreen 130) in response to a touch gesture and executing the function according to the input signal. The control unit 170 is also capable of communicating various data through wired or wireless channels.

The power supply 180 supplies the power from an external power source or an internal power source to the internal components of the user device 100.

As described above, according to exemplary embodiments of the present invention, the user device 100 includes a rule configuration module 173 for configuring a computer-executable rule in response to a natural language-based user's voice or text input for configuring a rule, a rule execution module 175 for executing the computer-executable rule in response to the instruction for executing the rule in the form of a natural language-based voice or text instruction or user device's motion-responsive instruction or a message instruction from outside, a condition check module 177 for checking (e.g., recognizing and/or determining) whether at least one condition (e.g., situation) specified in the rule is fulfilled, and an action execution module 179 for executing at least one action depending on whether the condition specified in the rule is fulfilled.

In various exemplary embodiments of the present invention, the rule configuration module 175 is capable of operating to be aware of the natural language-based voice or text input made by the user in the rule configuration mode. In various exemplary embodiments of the present invention, the rule configuration module 175 is capable of configuring plural conditions per rule and mapping plural actions to the conditions. In various exemplary embodiments of the present invention, the condition check module 177 is capable of performing multi-context awareness function for checking the plural contexts corresponding to the conditions configured per rule. In various exemplary embodiments of the present invention, the action execution module 179 is capable of performing the plural actions simultaneously or sequentially in response to the awareness of multiple contexts of a rule.

The CAS provision method according to one of various exemplary embodiments of the present invention can be implemented in software, hardware, or a combination of both and stored in a non-transient computer-readable storage medium. In the case of the hardware implementation, the CAS provision method according to exemplary embodiments of the present invention can be implemented with at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and other electrical units which perform certain tasks.

Exemplary embodiments of the present invention can be implemented by the control unit 170 itself. In the case of being implemented in software, the procedures and functions described in the exemplary embodiments of the present invention can be implemented with the software modules (e.g., rule configuration module 173, rule execution module 175, condition check module 177, and action execution module 179, and the like). The software modules are capable of performing at least one of above-described functions and operations described.

The storage medium can be any of a non-transient computer-readable storage media storing the program commands of defining a rule for CAS in response to the user input, executing at least one rule in response to a rule execution instruction, and executing at least one action corresponding to a condition specified in the execution rule when a condition (situation) specified in the rule is fulfilled. The storage medium also can be a non-transient computer-readable storage medium storing the program commands of configuring a rule including conditions and actions corresponding to the conditions in response to the natural language-based voice or text input made by the user, activating the rule in response to an instruction indicating the rule, determining whether the condition specified in the executed rule is fulfilled, and executing the action corresponding to the condition fulfilled.

In various exemplary embodiments of the present invention, the user device 100 can be any type of information communication devices, multimedia devices, and their equivalents having any of Application Processor (AP), Graphic Processing Unit (GPU), and Central Processing Unit (CPU). For example, the user device 100 can be any of a cellular communication terminal operating with various communication protocols corresponding to the communication systems, a tablet Personal Computer (PC), a smartphone, a digital camera, a Portable Multimedia Player (PMP), a Media Player (e.g., an MP3 player), a portable game console, a Personal Digital Assistant (PDA), and the like. The CAS provision method according to any of various exemplary embodiments of the present invention also can be applied to various display devices such as a digital television (TV), a Digital Signage (DS), a Large Format Display (LFD), a laptop computer, a desktop computer, and the like.

Figure 2:
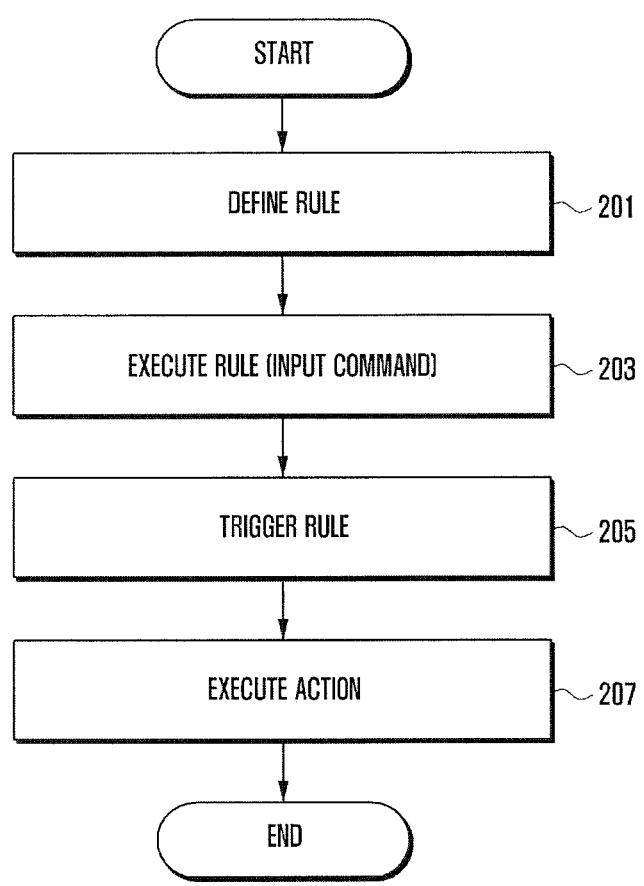
FIG. 2 is a flowchart illustrating a Context Aware Service (CAS) provision method of a user device according to an exemplary embodiment of the present invention.

FIG. 2 is a flowchart illustrating a CAS provision method of a user device according to an exemplary embodiment of the present invention.

Referring to FIG. 2, the control unit 170 (e.g., rule configuration module 173) defines (e.g., configures and generates) a rule at step 201 in response to a user input for defining the rule for CAS by means of one of the input unit 120, the microphone 143, and touchscreen 130.

For example, the user is capable of inputting a natural language-based speech for configuring the rule by means of the microphone 143 in the rule configuration mode. The user is also capable of inputting a natural language-based text for configuring the rule by means of the touchscreen 130 in the rule configuration mode. The control unit 170 (e.g., the rule configuration module 173) recognizes and parses the user input (e.g., speech recognition and text recognition) to define (e.g., identify) the rule to be executed. The control unit 170 (e.g., the rule execution module 175) may control the user device 100 to enter the activation state and waits for the execution of the rule configured in response to the user input (e.g., instruction for executing the rule). The rule configuration and generation operations according to various exemplary embodiments of the present invention are described with reference to the accompany drawings (e.g., FIGS. 3A to 3K and 31A to 31N).

If an instruction for executing a specific rule is received in the state in which at least one rule is defined in response to the user input, the control unit 170 (e.g., the rule execution module 175) controls to execute the corresponding rule at step 203.

For example, the user is capable of inputting a natural language-based command or command sentence for executing the predefined rule by means of one of the input unit 120, the microphone 143, and the touchscreen 130. The user is capable of executing the corresponding rule by entering a specific instruction targeting at least one rule for activating CAS using a function key input, a voice input, a touch input (e.g., text writing and selecting widget), and a gesture-based input (e.g., changing the posture of the user device 100 such as tilting and acceleration movement). According to exemplary embodiments of the present invention, the instruction for executing the rule can be generated in various user's input behaviors fulfilling the conditions specified in the corresponding rule. According to exemplary embodiments of the present invention, the instruction for executing the rule can be generated in the form of receiving a specific message or sound fulfilling a condition specified in the rule. The control unit 170 (e.g., the rule execution module 175) is capable of recognizing the instruction fulfilling the condition for executing the rule and executing the corresponding rule to activate the CAS in response to the recognized instruction.

The control unit 170 (e.g., the condition check module 177) triggers the condition (situation) corresponding to the currently running rule at step 205.

If the condition corresponding to the currently running rule is triggered, the control unit 170 (e.g., action execution module 179) is capable of controlling execution of at least one action corresponding to the condition at step 207.

For example, if at least one rule is executed, the control unit 170 (e.g., the condition check module 179) is capable of monitoring to detect whether the condition specified in the rule for triggering the action is fulfilled. If the condition or situation triggering the action is fulfilled, the control unit 170 (e.g., the action execution module 179) is capable of controlling the internal and/or external operations for executing the corresponding action. The action execution is capable of including the operations of executing the function (or application according to the predefined rule (e.g., condition and action), generating the execution result (e.g., context information), and feeding back the execution result to the user or others.

According to exemplary embodiments of the present invention, the operation of defining the rule at step 201 may have been performed already or may be performed by the user additionally before executing the target rule. In the former case, the user is capable of inputting the instruction for executing the rule at step 203 immediately and, in the latter case, the user is capable of performing steps 201 and 203 for both defining the rue and inputting the instruction for executing the rule.

FIGS. 3A to 3K are diagrams illustrating exemplary screens for explaining an operation of generating a rule in a user device according to an exemplary embodiment of the present invention.

Referring to FIGS. 3A to 3K, exemplary operations of the control unit 170 (e.g., the rule configuration module 173) for receiving the natural language-based speech input made by the user and for defining and/or identifying the rule (e.g., conditions and actions) according to the speech input are illustrated.

Figure 3A:
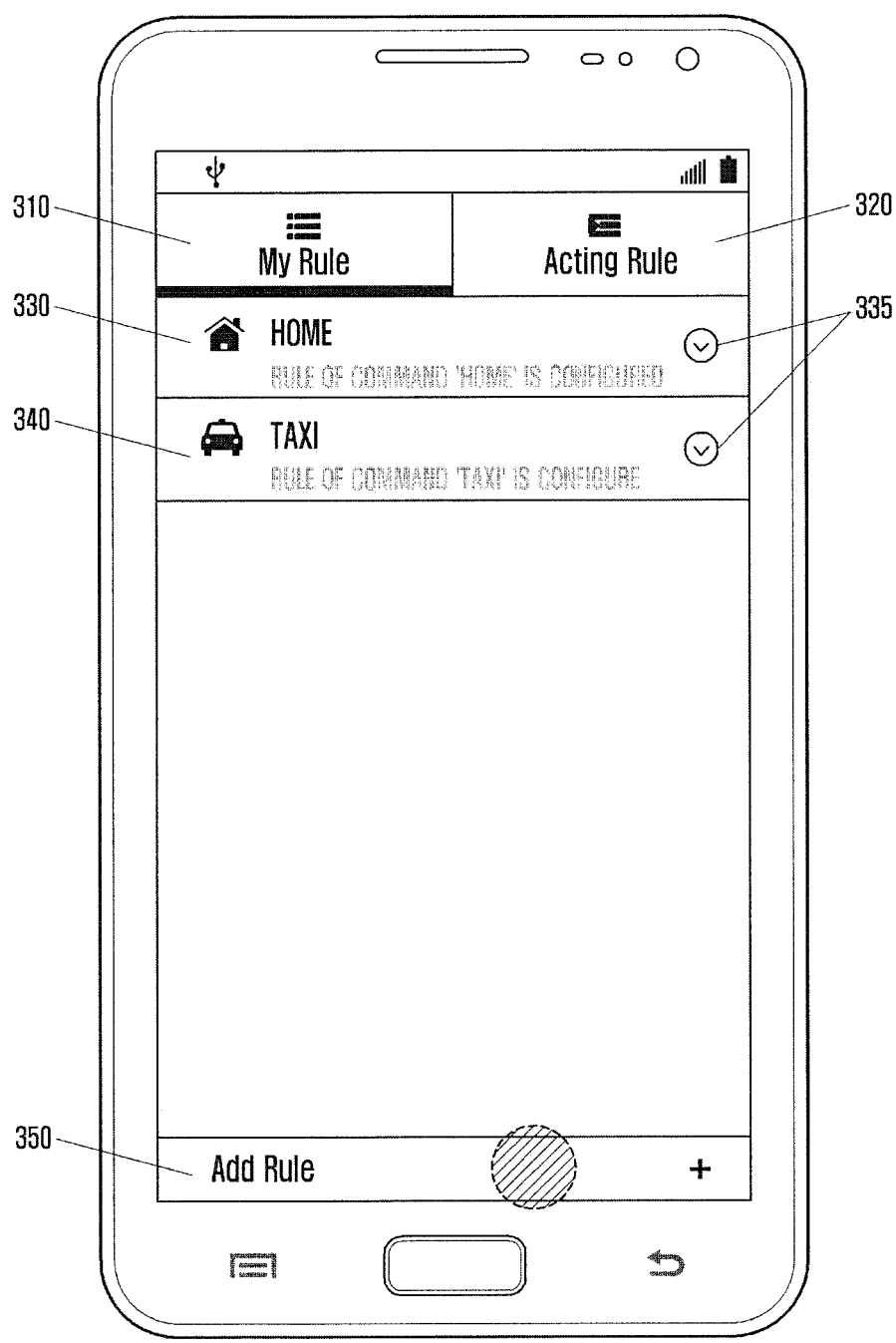
FIGS. 3A to 3K are diagrams illustrating exemplary screens for explaining an operation of generating a rule in a user device according to an exemplary embodiment of the present invention.

FIG. 3A shows an exemplary screen of the user device 100 when the device user executes the application for CAS according to an exemplary embodiment of the present invention.

Referring to FIG. 3A, the CAS application provides a User Interface (UI) or Graphical User Interface (GUI) (hereinafter, referred to as a 'screen interface') including a first menu 310 (e.g., my menu or 'My Rule' in FIG. 3A) for displaying a list of the rules defined by the user, a second menu 320 (e.g., acting menu, 'Acting Rule' in FIG. 3A) for displaying a list of currently running rules among the defined rules, and a third menu 350 (e.g., add menu or 'Add Rule' in FIG. 3A) for defining new rules additionally.

The screen interface is capable of providing a list corresponding to the menu item selected in the first menu 310 and the second menu 320. As shown in FIG. 3A, if the first menu 310 is selected, a list of items (e.g., "home" item 330 and "Taxi" item 340) corresponding to the rules defined by the user.

The items 330 and 340 may be provided with a full-down menu item 335 for displaying the detailed information configured with the corresponding item. For example, if the user selects the full-down (e.g., drop down) menu item 335, a full-full down window appears below the corresponding item.

Figure 3B:
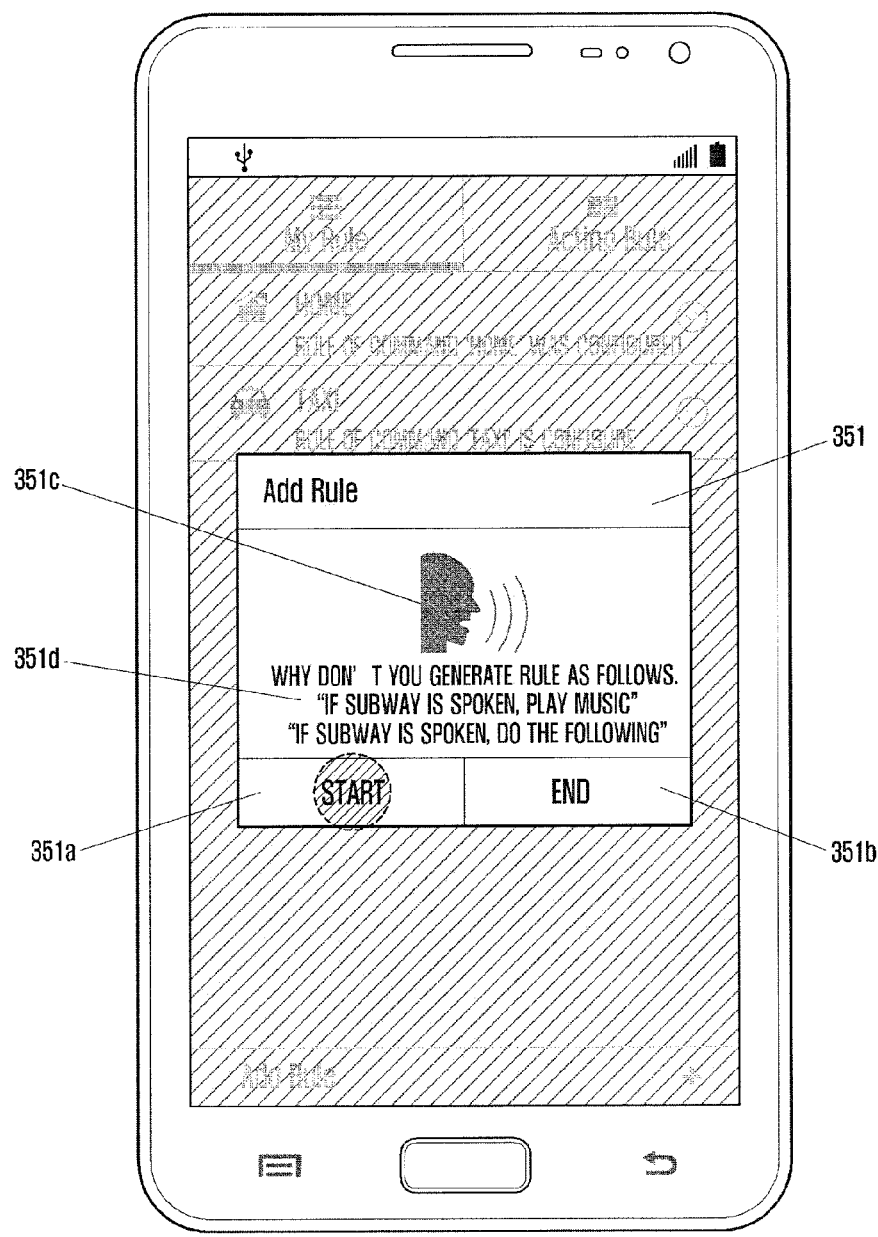

In the state of FIG. 3A, the user is capable of selecting (tapping) the third menu (Add Rule) 350 for defining a new rule. Then the control unit 170 of the user device 100 (e.g., the rule configuration module 173) determines whether to initiate the operation for defining the rule and switches to the rule configuration mode along with displaying a corresponding screen interface. FIG. 3B shows an exemplary screen interface displayed in such a case.

FIG. 3B shows an exemplary screen of the user device 100 when the device user executes the rule configuration mode for defining the rule. In an exemplary embodiment of the present invention, the operation depicted in FIG. 3B is of providing the user with a tutorial on the method for defining a rule, and this tutorial provision step may be omitted according to the user's intention.

Referring to FIG. 3B, the tutorial can be provided in the form of a popup window 351. The control unit 170 is capable of controlling to display the tutorial in the form of the popup window 351 presenting the guidance (e.g., picture and text) for guiding how to define a rule. For example, the guidance may be provided with an image 351c indicating activation of speech recognition mode and a text 351d guiding how to define a rule (e.g., how about to make a rule like "play music if 'subway' is spoken", "do the following if 'subway' is spoken").

The popup window 351 providing the tutorial may include a menu item 351a to confirm defining the rule (e.g., 'start' button) and a menu item 351b to cancel defining the rule (e.g., 'cancel' button). The user is capable of continuing or cancelling the defining of the new rule by selecting one of the menu items 351a and 351b of the popup window 351 providing the tutorial as shown in FIG. 3B.

Figure 3C:
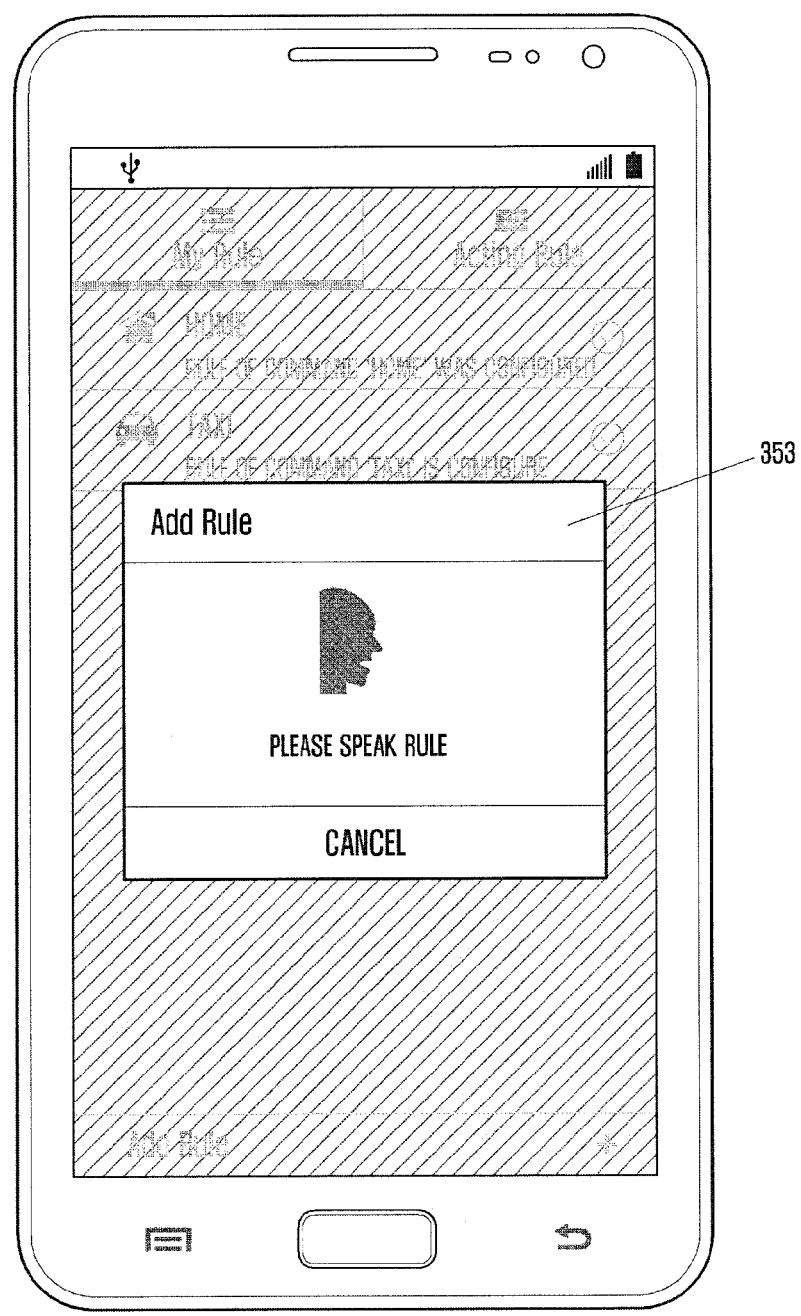

FIGS. 3C to 3K show the operations of defining a new rule in the rule configuration mode according to an exemplary embodiment of the present invention. FIGS. 3C to 3K show exemplary screens displayed in receiving the user's natural language-based speech and configuring conditions and actions of the corresponding rule in response to the user's natural language-based speech As depicted in FIGS. 3C to 3K, the control unit 170 displays the popup window 353 prompting the user to make a speech input (e.g., "speak a rule") in the rule configuration mode and waits for user speech input. In the state of FIG. 3C, the user is capable of making a natural language-based speech input for at least one condition and at least one action corresponding to the condition based on the type of rule to be defined (e.g., singular or plural structure).

Figure 3D:
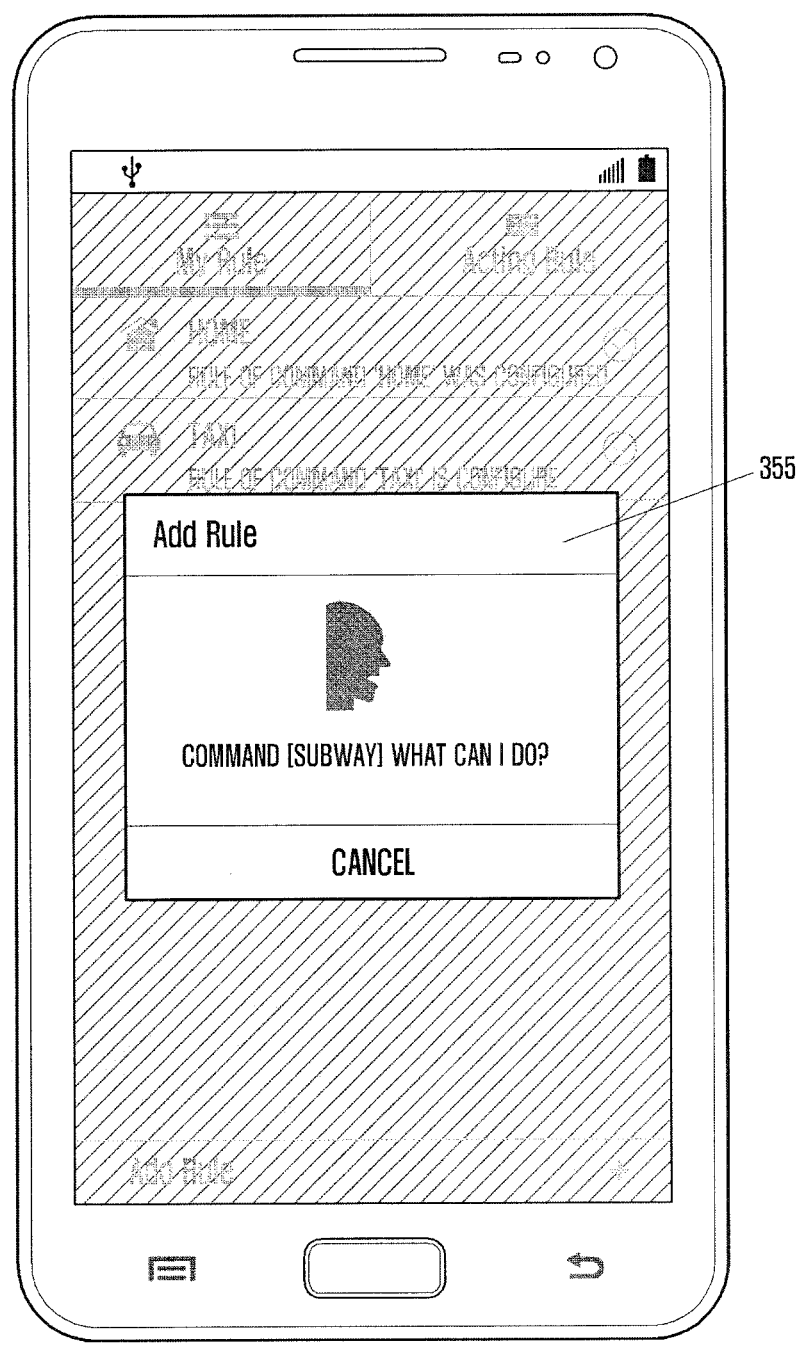

For example, the user may make a speech input of "do following if 'subway' is spoken" in the state of FIG. 3D. Then the control unit 170 recognizes the user's speech input and displays the popup window 355 as a result of the speech recognition. According to an exemplary embodiment of the present invention, the control unit 170 may display the popup window 355 prompting the user to make a speech input with a notification message (e.g., "what can I do") for action to be performed when the condition "subway" is fulfilled with the speech recognition result "command [subway] what can I help you?" and then wait for user's speech input.

Figure 3E:
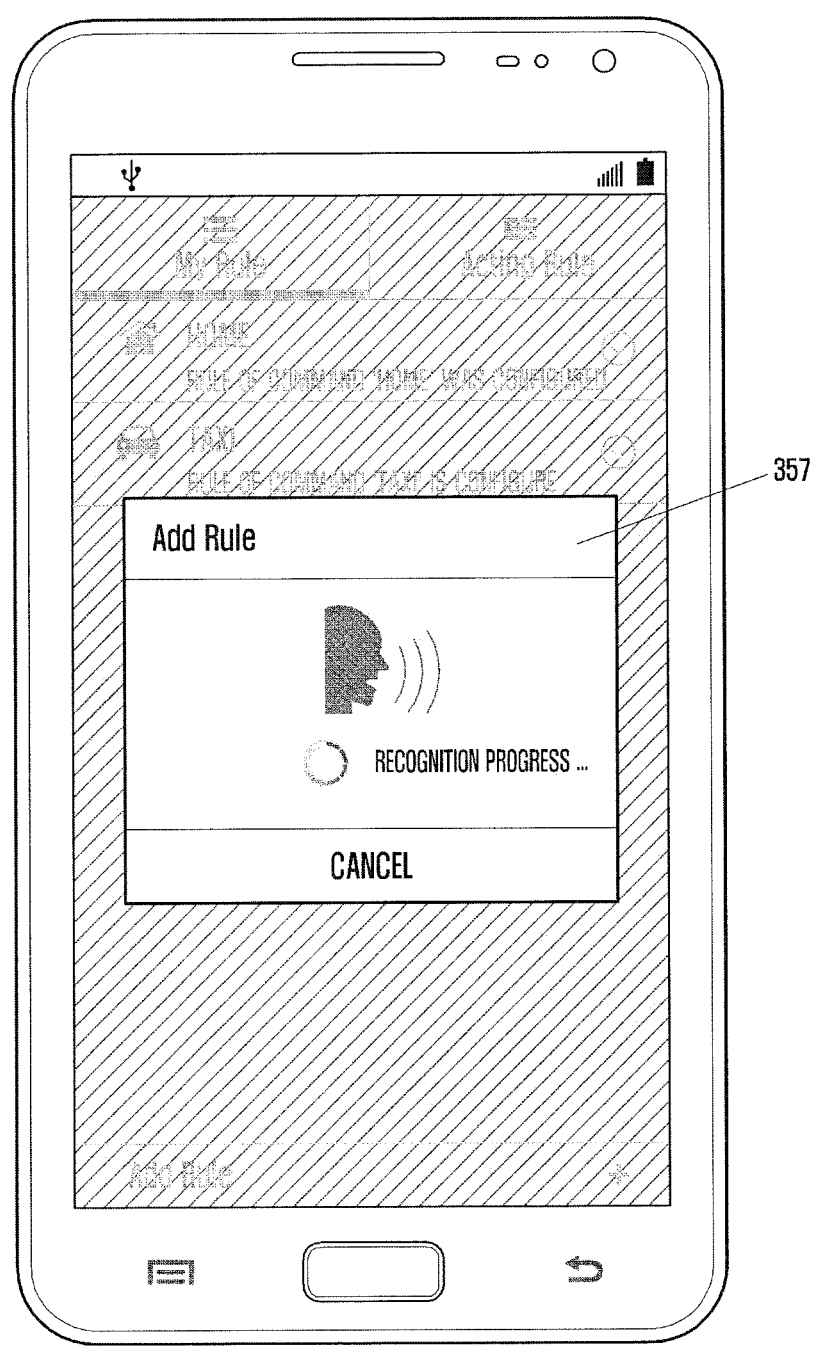

In the state of FIG. 3D, the user can make a speech of "turn on Wi-Fi". As illustrated in FIG. 3E, the control unit 170 recognizes the user's speech input and displays the popup window 357 notifying of speech recognition mode and the progress (e.g., "recognition is in progress") of the operation mapping the condition (e.g., subway) and action (e.g., Wi-Fi turn-on). In various exemplary embodiments of the present invention, the recognition operation-related screen display may be omitted.

Figure 3F:
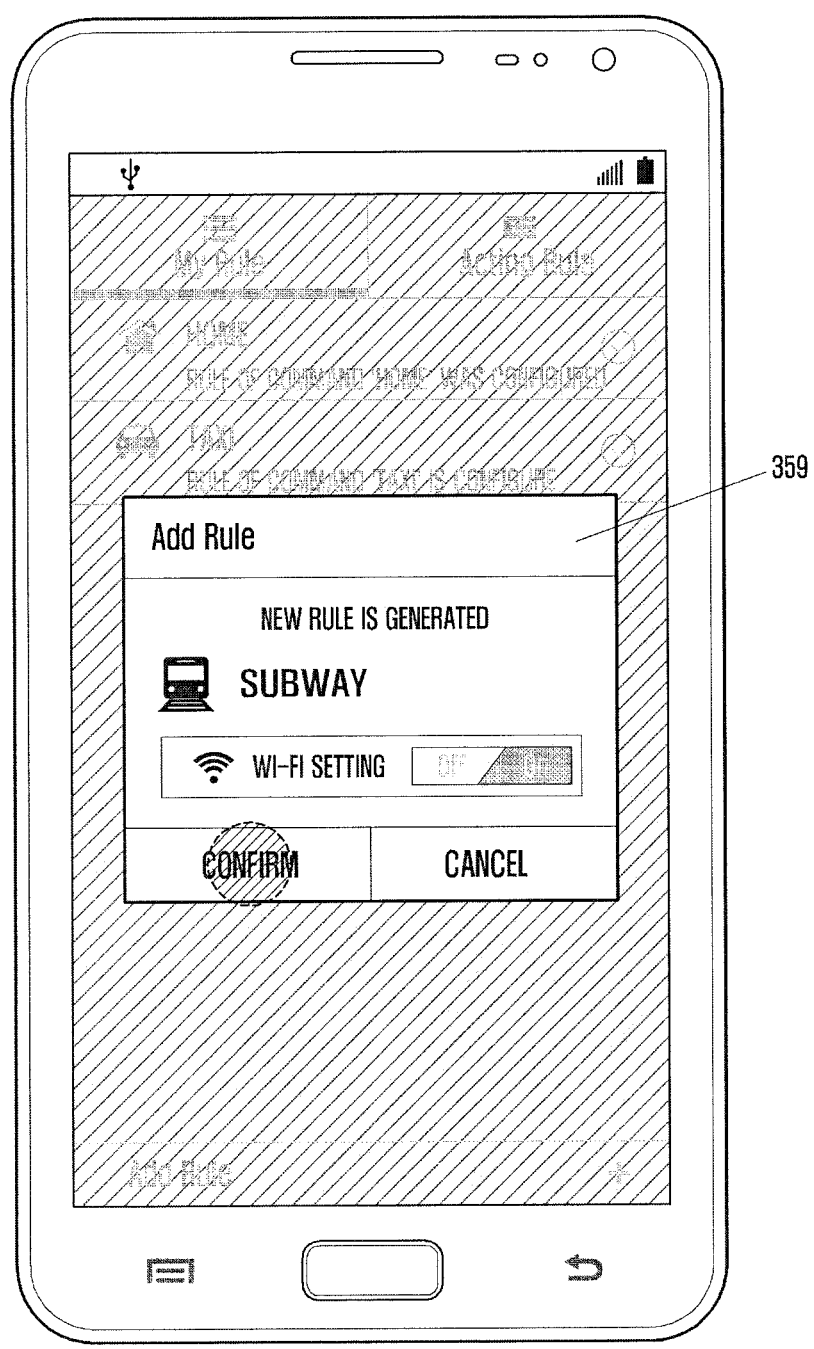

Once the recognition and mapping operations have completed, the control unit 170 may provide the recognition and mapping result in the form of a popup window 359 as shown in FIG. 3F. For example, the control unit 170 is capable of displaying a popup window 359 notifying of the information on the newly defined rule and the action specified in association with the rule. According to an exemplary embodiment of the present invention, the control unit 170 may notify that the new rule has been generated with the condition of the subway for configuring Wi-Fi turn-on when the condition is fulfilled along with menu items prompting the user to progress the operation (e.g., 'confirm' and 'cancel'). In the state of FIG. 3F, the user may select the 'confirm' menu item to apply the configured rule or the 'cancel' menu item to cancel the configured rule.

Figure 3G:
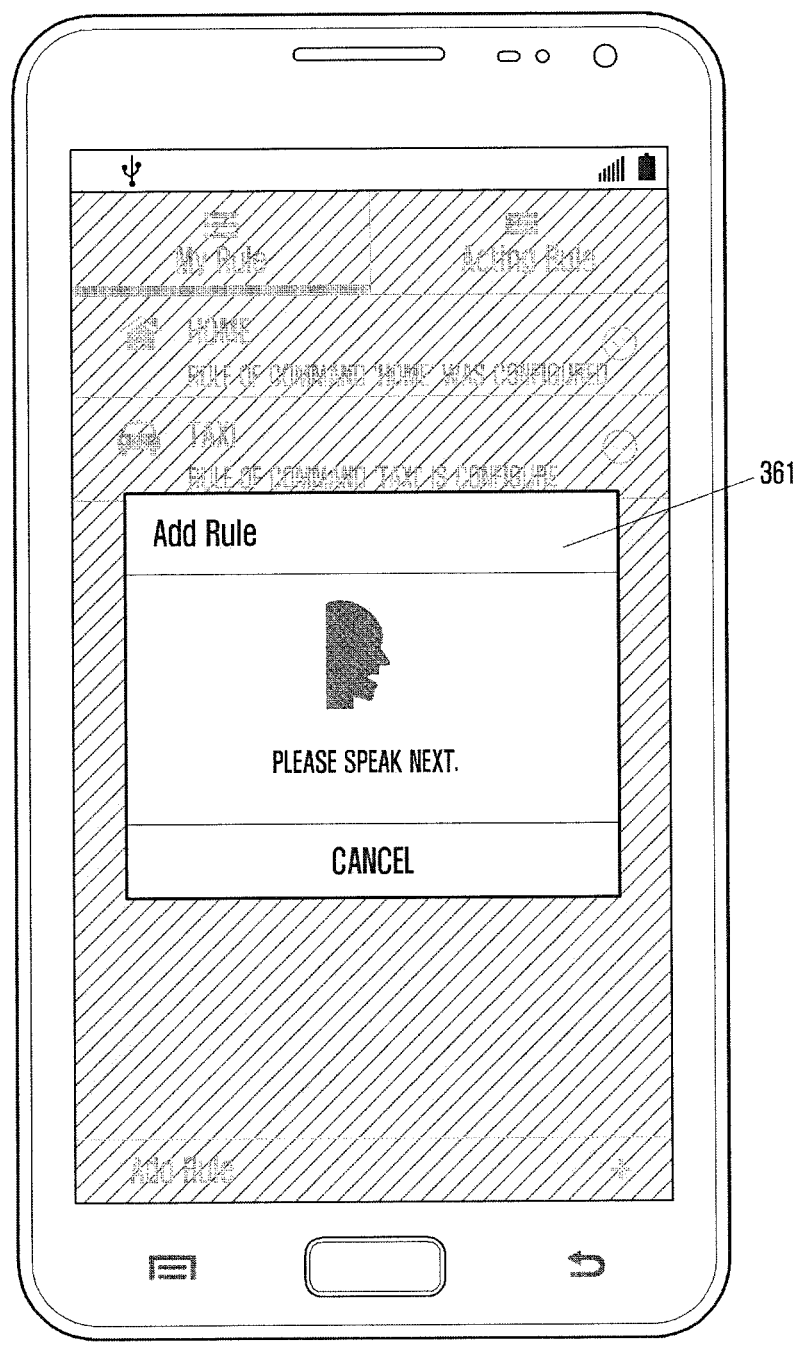
Figure 3H:
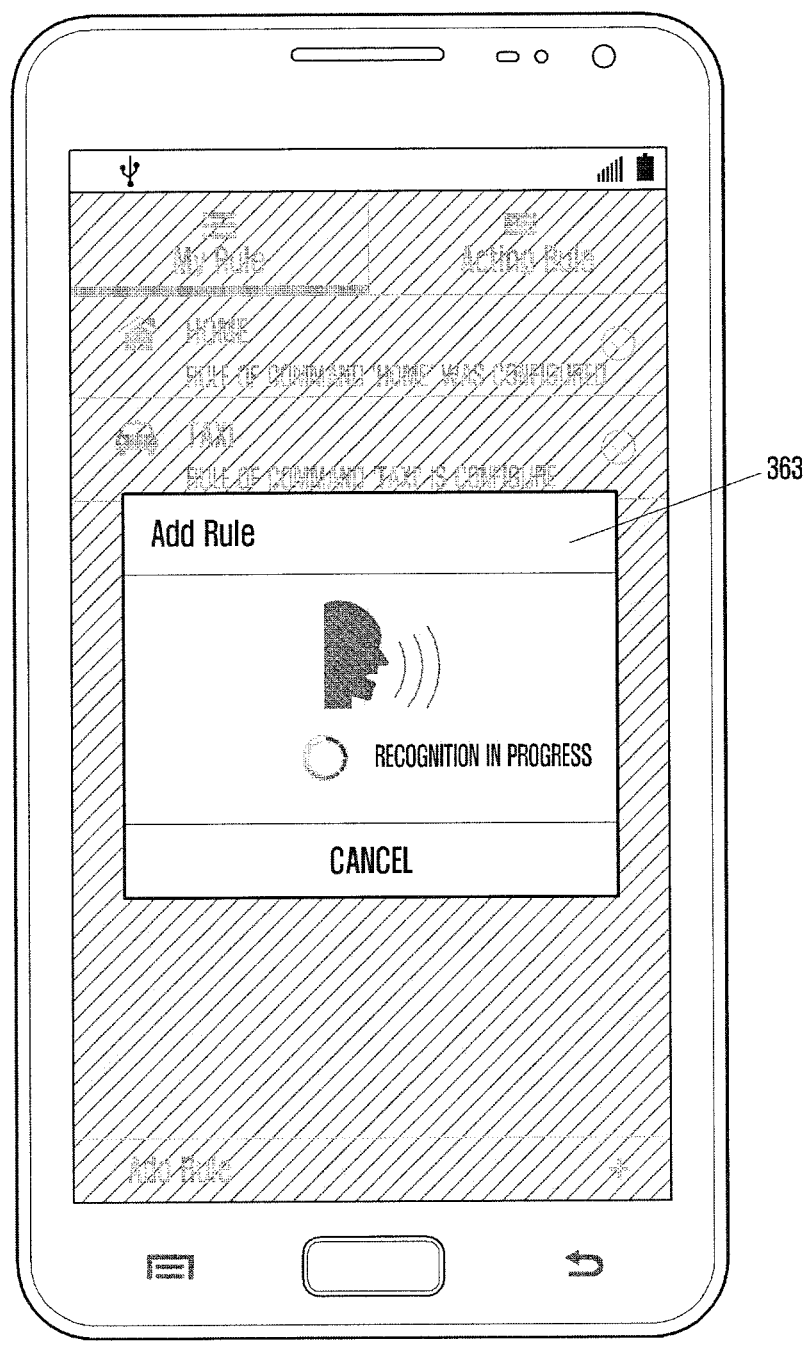
Figure 3I:
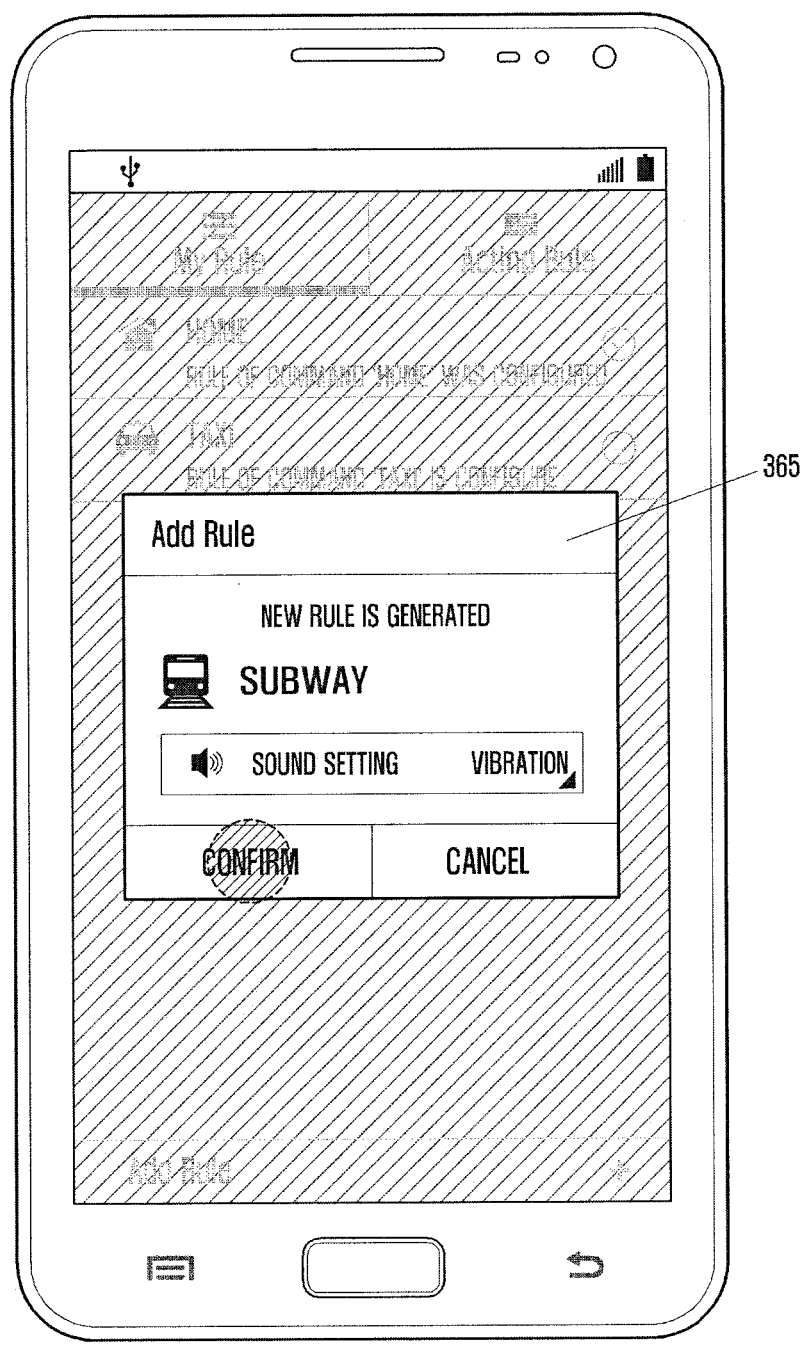

In the state of FIG. 3F, if the user selects the 'confirm' menu item (or makes a speech input), then as illustrated in FIG. 3G, the control unit 170 may display the popup window 361 prompting the user to make the next speech input (e.g., "speak the next command") and wait for user's speech input. The user may make a speech input of "change to vibration" in the state of FIG. 3G. As illustrated in FIG. 3H, the control unit 170 may then recognize the speech input and display the popup window 363 notifying of speech recognition mode and the progress (e.g., "recognition is in progress") of the operation mapping the condition (e.g., subway) and additional action (e.g., configuration of vibration). If the recognition and mapping operations have completed, the control unit 170 may provide the operation result in the form of a popup window 365 as shown in FIG. 3I. For example, the control unit 170 is capable of displaying the popup window 365 notifying of the rule being configured in response to the user's speech input and the action corresponding to the rule. According to an exemplary embodiment of the present invention, the control unit 170 is capable of notifying that a new rule has been generated with the condition of subway for switching to the vibration mode when the condition is fulfilled along with the menu items (e.g., 'confirm' and 'cancel') by means of the popup window 365. In the state of FIG. 3I, the user may select the 'confirm' menu item to apply the configured rule or the 'cancel' menu item to cancel the configured rule.

Figure 3J:
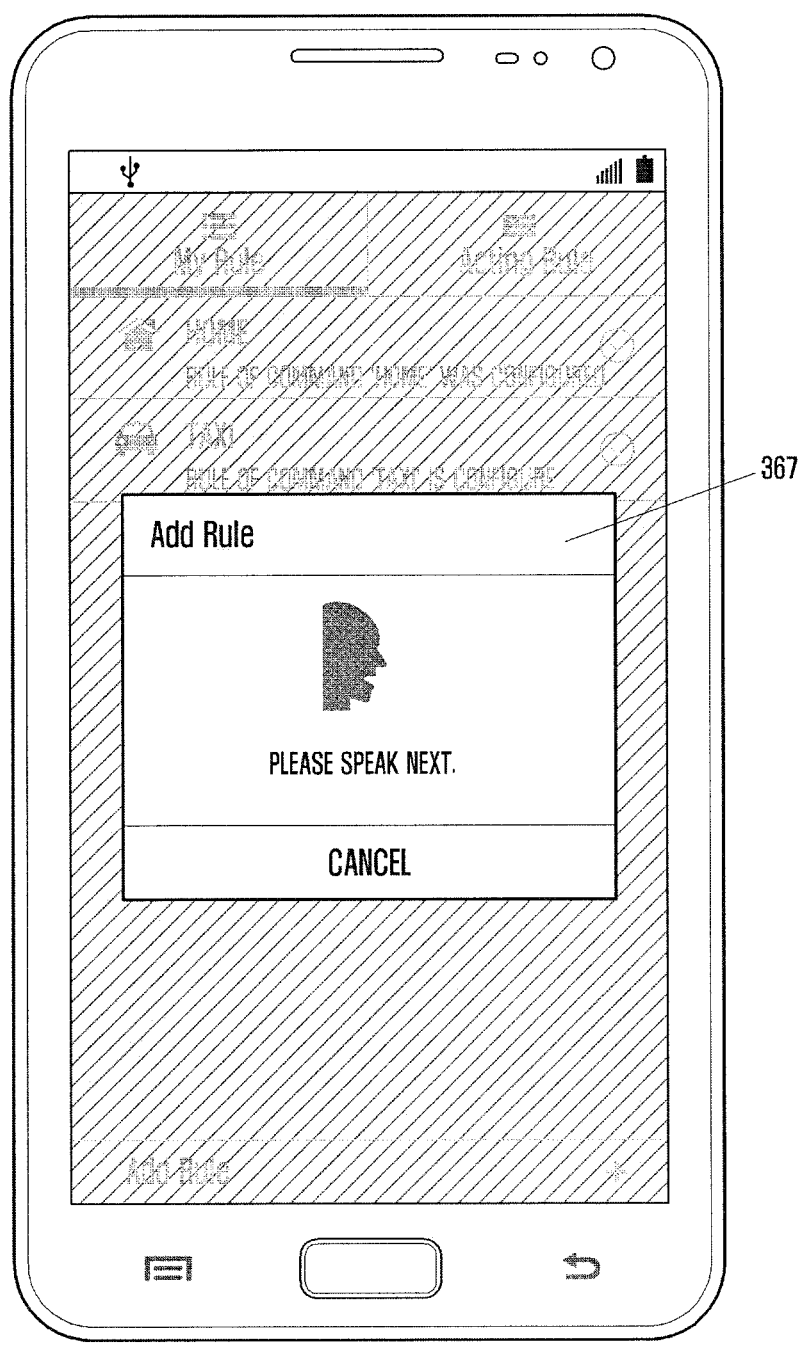

In the state of FIG. 3I, if the user selects the 'confirm' menu item, then, as illustrated in FIG. 3J, the control unit 170 may display a popup window 367 prompting the user to make a speech input (e.g., "speak next command") and waits for speech input. In the state of FIG. 3I, the user may makes a speech input of "end (or stop)". Then the control unit 170 recognizes the speech input and provides the information on the condition specified in the rule defined through steps 3B to 3J and at least one action corresponding to the condition as shown in FIG. 3K.

Figure 3K:
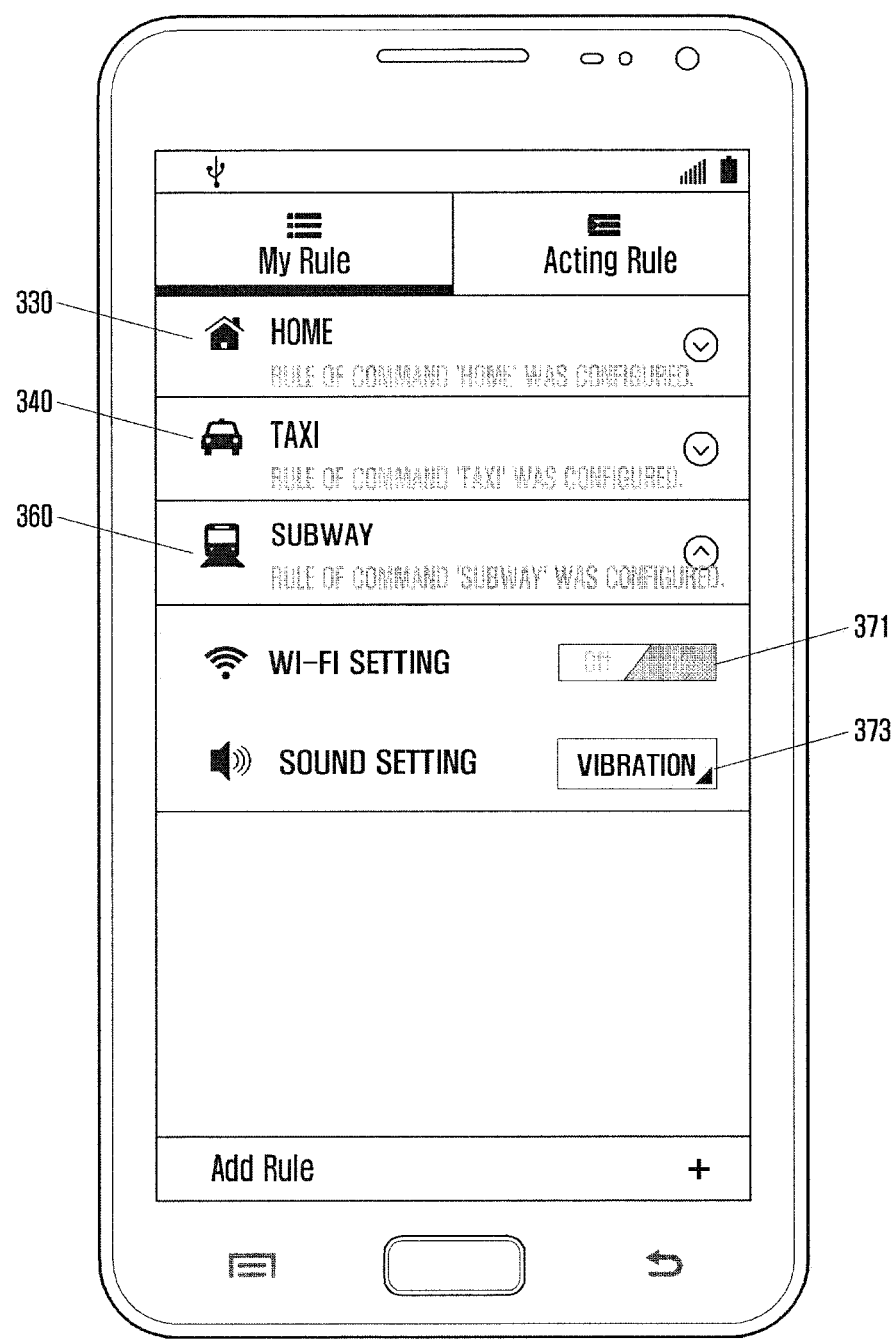

For example, the control unit 170 may display the condition 'subway' of the rule defined through the above described operations along with the actions 'Wi-Fi turn-on configuration' and 'vibration mode switching configuration' mapped to the condition as shown in FIG. 3K. In this way, the newly defined rule can be added to the rule list as shown in FIG. 3A. For example, the newly added rule may be displayed as 'subway' item 360 in the list along with the previously defined items (e.g., 'home' item 330 and 'taxi' item 340, and the 'subway' item 360 may be provided with detailed information (e.g., conditions and actions). The screen interface may also display various settings of the device. For example, the screen interface may display a Wi-Fi setting 371, a sound setting 373, and the like. The settings of the device may be associated with an item (e.g., item 330, item 340, and/or item 360).

As described above with reference to FIGS. 3A to 3K, at least one action can be mapped to one condition according to various exemplary embodiments of the present invention. In an exemplary embodiment of the present invention, the CAS method is capable of supporting singular rule definition operation and plural rules definition operation. This can be summarized as follows.

The singular structure rule definition operation can be summarized as shown in Table 1.

TABLE 1

Rule: If condition (instruction), then action.
Example: "Home" is spoken, turn on Wi-Fi. Mail is received, send text message and the like.

The plural structure rule definition operation can be summarized as shown in Table 2.

TABLE 2

Rule: If condition 1(instruction1), then do following.
- Then action1.
- If condition2(command2), then action2.
- ...
- If conditionN(instructionN), then actionN.
- end(stop).
Example: "home" is spoken, do following.
- Turn on Wi-Fi.
- If inbound call is received, mute TV sound,
- If inbound call is received, blink LED lamp,
- Switch to sound mode,
- stop.

As shown in Tables 1 and 2, a simple if statement such as <"home" is spoken, then switch to ring.> or a complex if statement such as <"home" is spoken, then mute TV sound upon receiving inbound call> can be used. According to an exemplary embodiment of the present invention, plural actions (e.g., terminal function, situation-adaptive multi-appcessory (App+Accessory) interoperation, and use of the cloud service) corresponding to at least one condition based on the simple or complex if statement can be configured. Among the plural actions, the terminal function may include Wi-Fi mode configuration, ring/vibration/mute mode switch, text messaging (recipient and content speech configuration), camera flash blinking, and the like; and the use of the cloud service may include checking (e.g., determining) user location (using GPS) and then sending a text message, and the like.

The types of the conditions (or instructions) that may be specified in the rule and the types of the actions that may be configured per condition can be summarized as shown in Table 3.

TABLE 3

| Type of condition | Type of action |
| --- | --- |
| Location: home, office, and the like. | internal function of device |
| Event condition inside of device: if call/text/mail is received, if 00 o'clock arrives, and the like. | call (answer in absence, place a call), send text, send mail ring/vibration setting, flash (camera), music playback, auto-screen rotation |
| outside of device: if it rains, and the like. | WiFi setting, Bluetooth setting, |
| activity: going to work, leaving the office, driving, exercise, sleeping | GPS, data network, AllShare Cast Sleep mode, block mode, synchronization |
| abstract condition (command) if "I love you" is spoken, | in Appcessory interoperation TV control (power-off, volume |

TABLE 3-continued

| Type of condition | Type of action |
|---|---|
| if "abracadabra" is spoken, | control (mute, etc.) and the like) |
| if "be quite" is spoken, | Lamp control (on/off, blinking, and the like) |
| | Cloud service |
| | GPS service, Meteorological Administration (weather) service |

According to various exemplary embodiments of the present invention, the user device 100 is capable of performing interaction (e.g., query and answer) by providing voice or text feedback to the user about the information necessary depending on the action the user intends to execute when a specific condition is fulfilled. According to an exemplary embodiment of the present invention, the information to be received from the user for all the actions supportable by the user device 100 may be provided in the form of a DataBase (DB). According to an exemplary embodiment of the present invention, in the case of the text message transmission function, the user device 100 may recognize the necessity of additional information about the recipient and text message and may prompt the user to input the additional information in the form of speech or text, alarms erroneous input, and asks for receiving re-input. Such an operation is described hereinafter exemplarily with reference to FIGS. 4A to 4J.

FIGS. 4A to 4J are diagrams illustrating exemplary screens for explaining an operation of generating a rule in a user device according to an exemplary embodiment of the present invention.

Figure 4A:
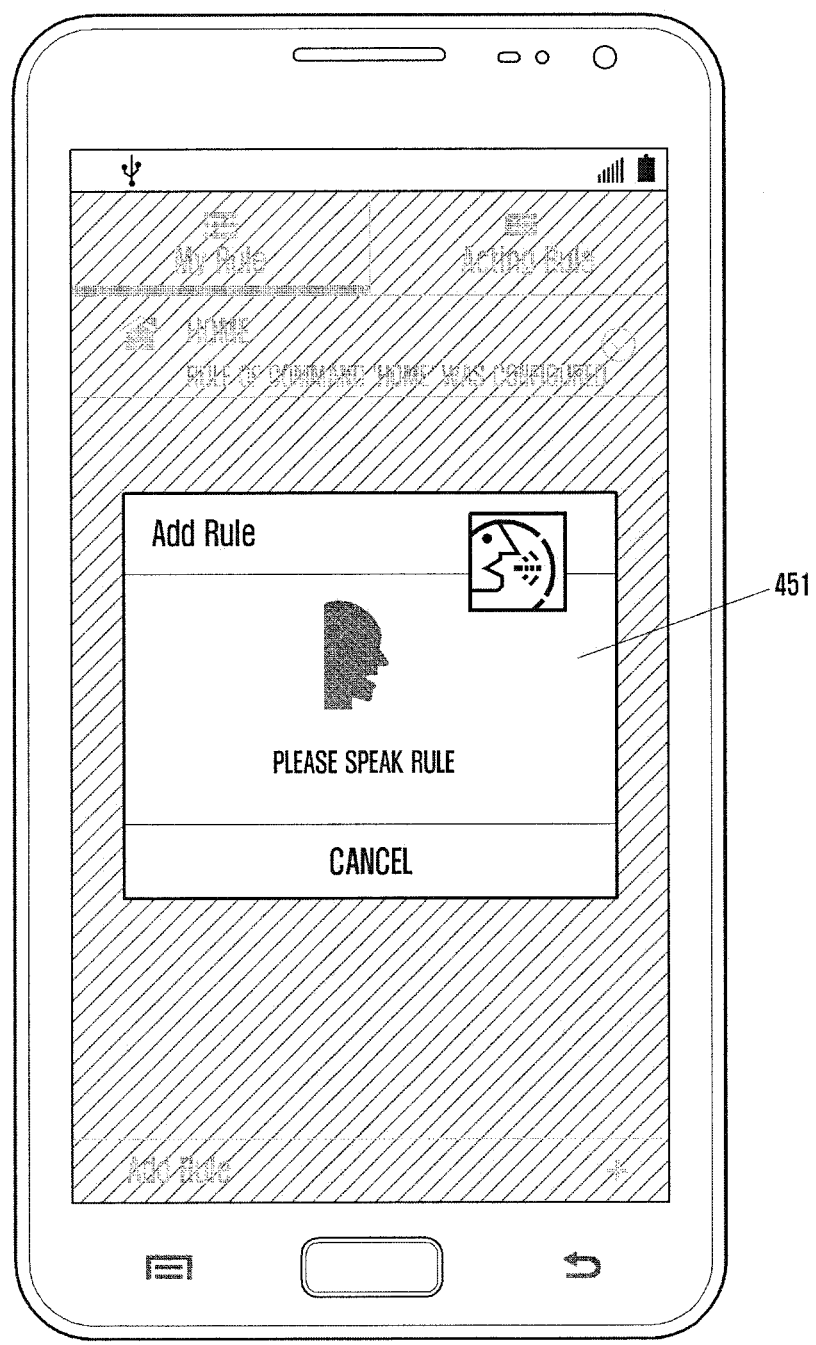
FIGS. 4A to 4J are diagrams illustrating exemplary screens for explaining an operation of generating a rule in a user device according to an exemplary embodiment of the present invention.

Referring to FIGS. 4A to 4J, the control unit 170 is capable of displaying a popup window 451 prompting the user to make a speech input in response to the rule configuration mode entry in the state of FIG. 3A (or FIG. 3B) and waiting for speech input. In the state of FIG. 4A, the user may make a natural language-based speech input for configuring at least one condition and at least one action per condition according to the type (e.g., singular structure and plural structure) of the rule to be defined.

Figure 4B:
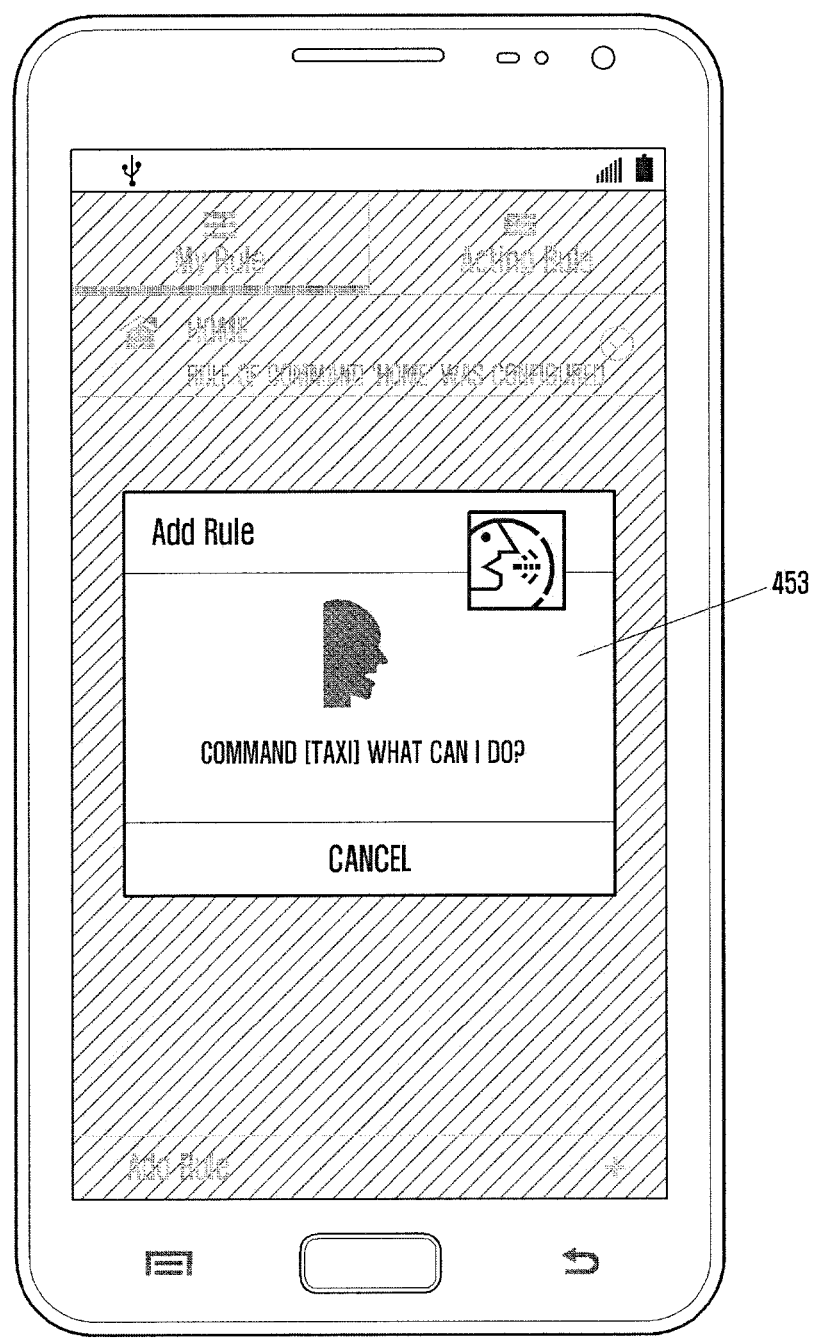

For example, in the state of FIG. 4A, the user may make a speech input of "if taxi is spoken then do the following." Then the control unit 170 may recognize the user's speech input and provide the recognition result in the form of a popup window 453 as shown in FIG. 4B. According to an exemplary embodiment of the present invention, the control unit 170 may display the popup window 453 prompting the user to make a speech input for an action to be performed with the fulfillment of the condition "taxi" along with the speech recognition result such as "command [taxi] what can I do?" and wait for speech input.

Figure 4C:
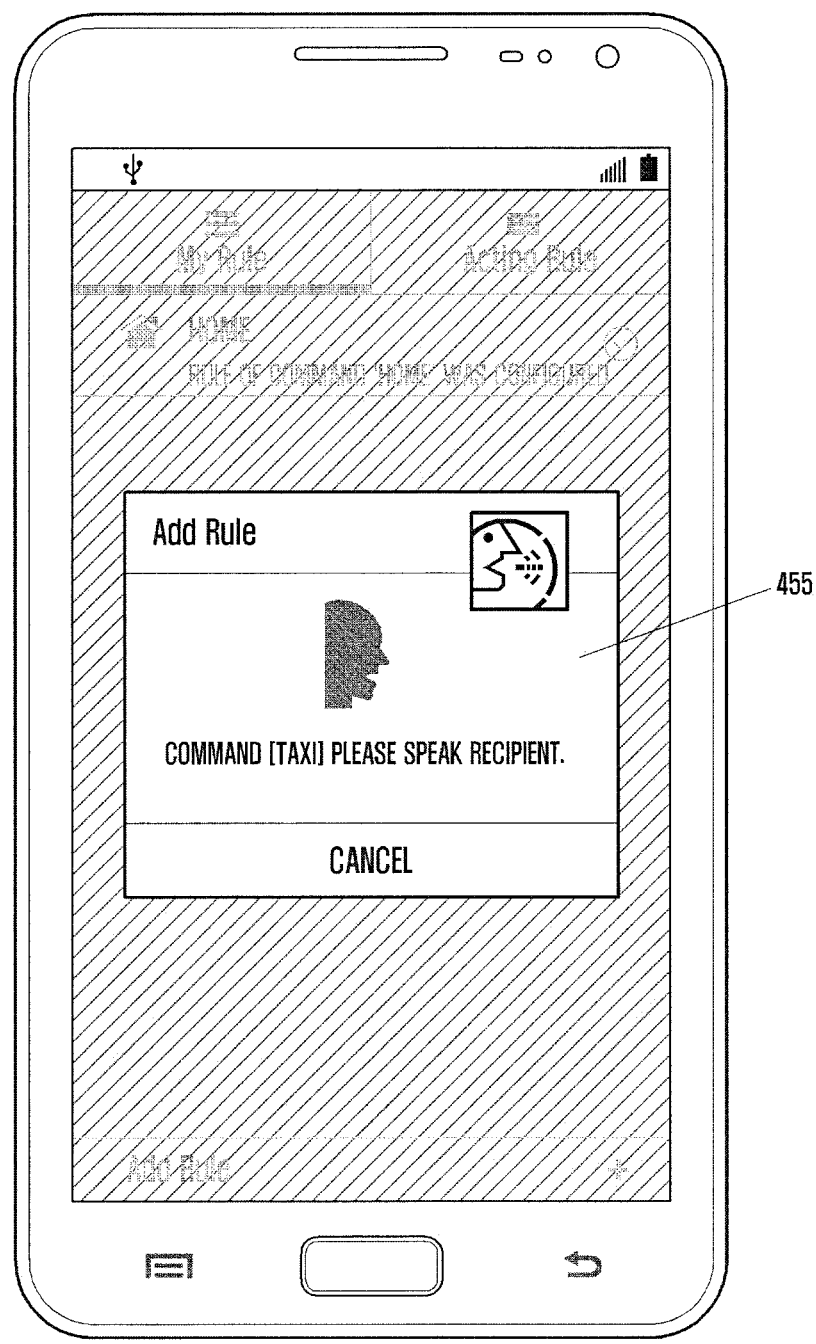
Figure 4D:
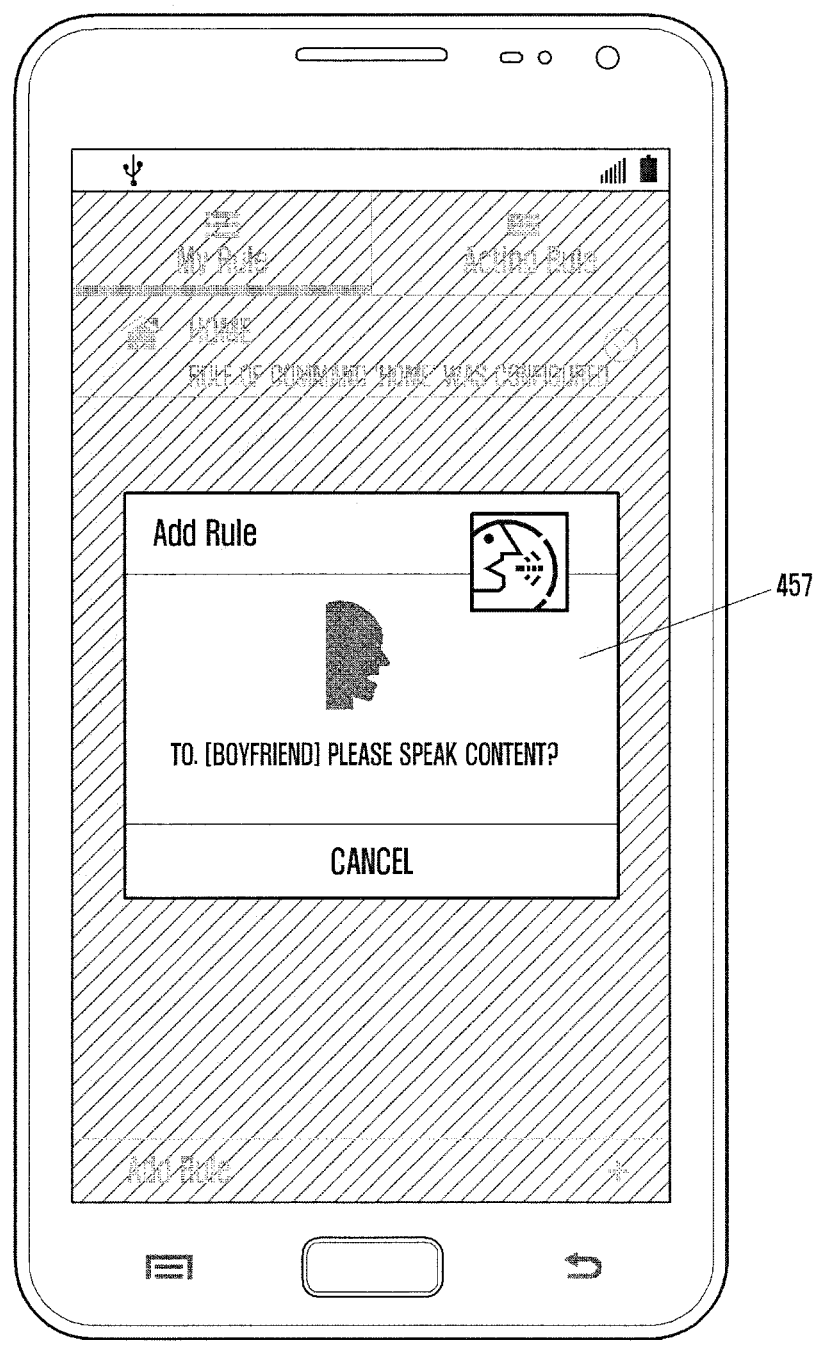
Figure 4E:
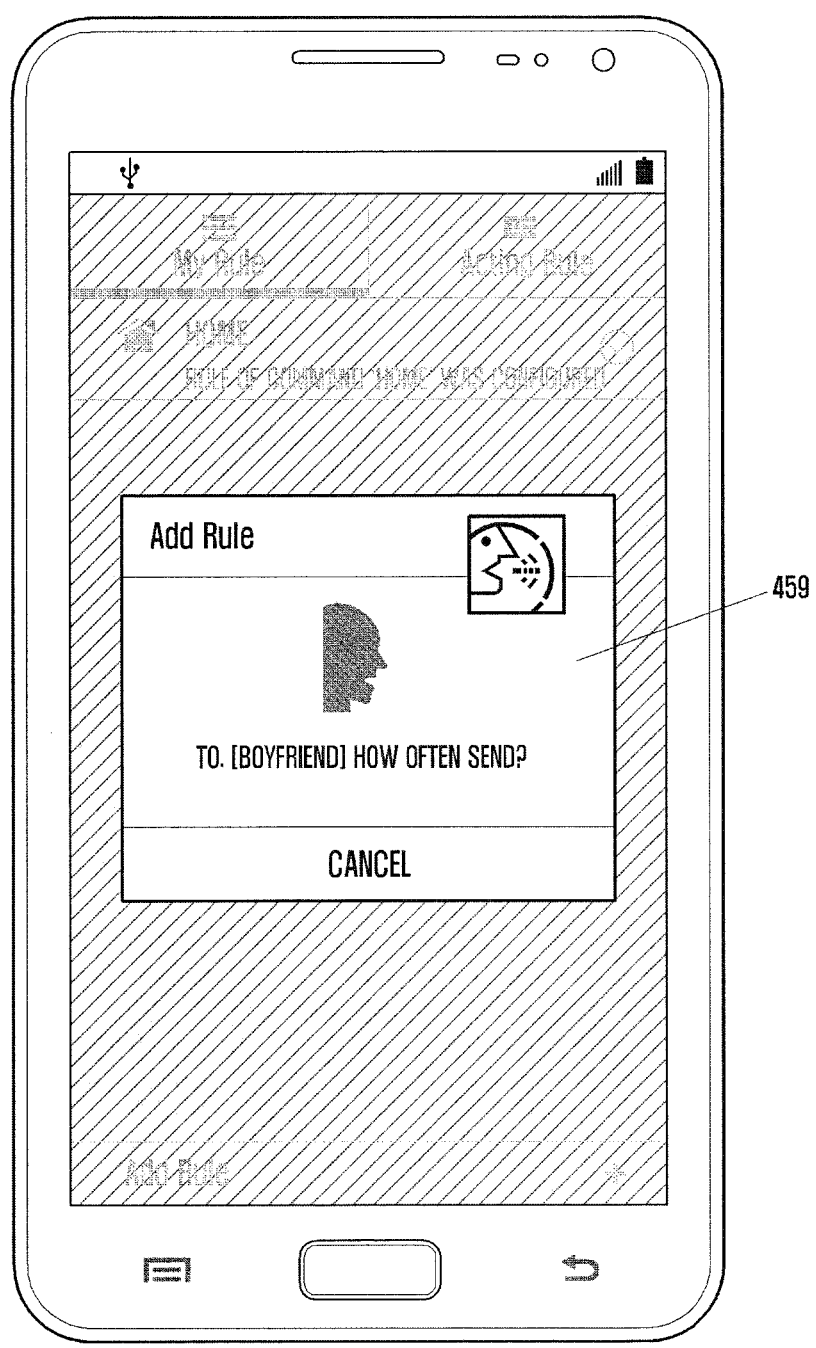
Figure 4F:
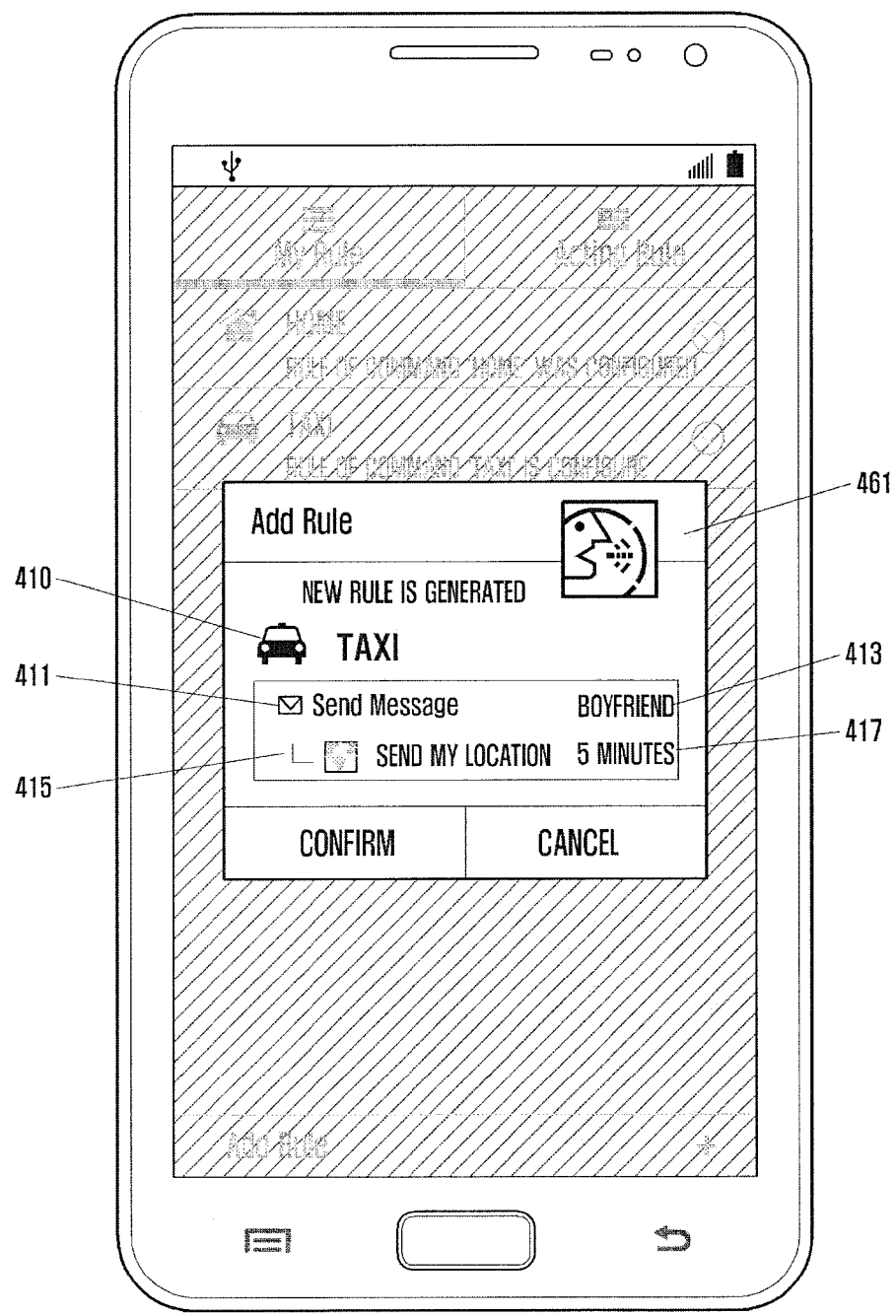

In the state of FIG. 4B, the user may make a speech input of "send message." Then the control unit 170 may recognize the speech input and check the information required to be received from the user for the action (e.g., "send message") so as to perform feedback as shown in FIG. 4F.

For example, as shown in FIG. 4C, the control unit 170 may display a popup window 455 prompting the user to input "recipient" as the information required for the action of "send message" (e.g., "command [taxi] speak recipient") and waits for speech input of the user. In the state of FIG. 4C, the user may make a speech input of a specific recipient (e.g., "boyfriend") to which the message is sent. The control unit 170 may recognize the speech input by the user, prompt the user to input "message content" as the information for the action "send message" as shown in FIG. 4D (e.g., "To. [boyfriend] speak content") in the form of a popup window 457, and wait for speech input of the user.

In the state of FIG. 4D, the user may input the message content to be sent to the recipient (e.g. "boyfriend"). According to an exemplary embodiment of the present invention, the user may make a speech input of "send my location" as the message content to be sent to the "boyfriend." Then the control unit 170 may recognize the user's speech input, check the necessity of additional information for executing the action of "send location", display a popup window 459 prompting the user to enter the time interval for executing the action of "send location" (e.g. "To. [boyfriend] send how often?"), and wait for receiving speech input.

In the state of FIG. 4E, the user may input a transmission interval for executing the action of "send my location." According to an exemplary embodiment of the present invention, the user may make a speech input of "every 5 minutes" as transmission interval for executing the action of "send my location." Then the control unit 170 may recognize the speech input and display the recognition result as shown in FIG. 4F.

For example, as shown in FIG. 4F, the condition information 410 configured for the rule to be defined by the user and the action information 411, 413, 415, and 417 corresponding to the condition may be provided in the form of the popup window 461. Particularly in the case of the action information 411, 413, 415, and 417, auxiliary actions configured according to the initially configured action may be provided. According to an exemplary embodiment of the present invention, the first action may be set to "send message" as denoted by reference number 411, the second action as the target to which the message is transmitted according to the first action to "boyfriend" as denoted by reference number 413, the third action as the content of the message to be transmitted to the boyfriend according to the first action and/or second action to "send my location" as denoted by reference number 415, and the fourth action as the transmission interval of the message including my location to be transmitted the boyfriend according to the first action, second action, and/or third action to "5 minutes" as denoted by reference number 417. For example, according to an exemplary embodiment of the present invention, the control unit 170 may ask the user for the information necessary to execute the previous action in voice or text interaction. At this time, the control unit 170 may recognize the action requiring additional information no longer and may provide the information on the requested actions (e.g., "send message" 411, "boyfriend" 413, "send my location" 415, and "5 minutes" 417 configured for the condition (e.g. "taxi" 410)) in the form of the popup window 461 as shown in FIG. 4F. In this way, the user is capable of defining the rule for action of transmitting a message including my location to the boyfriend at every 5 minutes when the condition "taxi" is fulfilled.

Meanwhile, in the state of FIG. 4F, the user may select the "confirm" menu item to apply the definition on the actions (e.g., boyfriend, sending my location, and 5 minutes) corresponding to the condition (e.g. taxi) of the rule configured through the above procedure or the "cancel" menu item for cancel or reconfigure the rule.

Figure 4G:
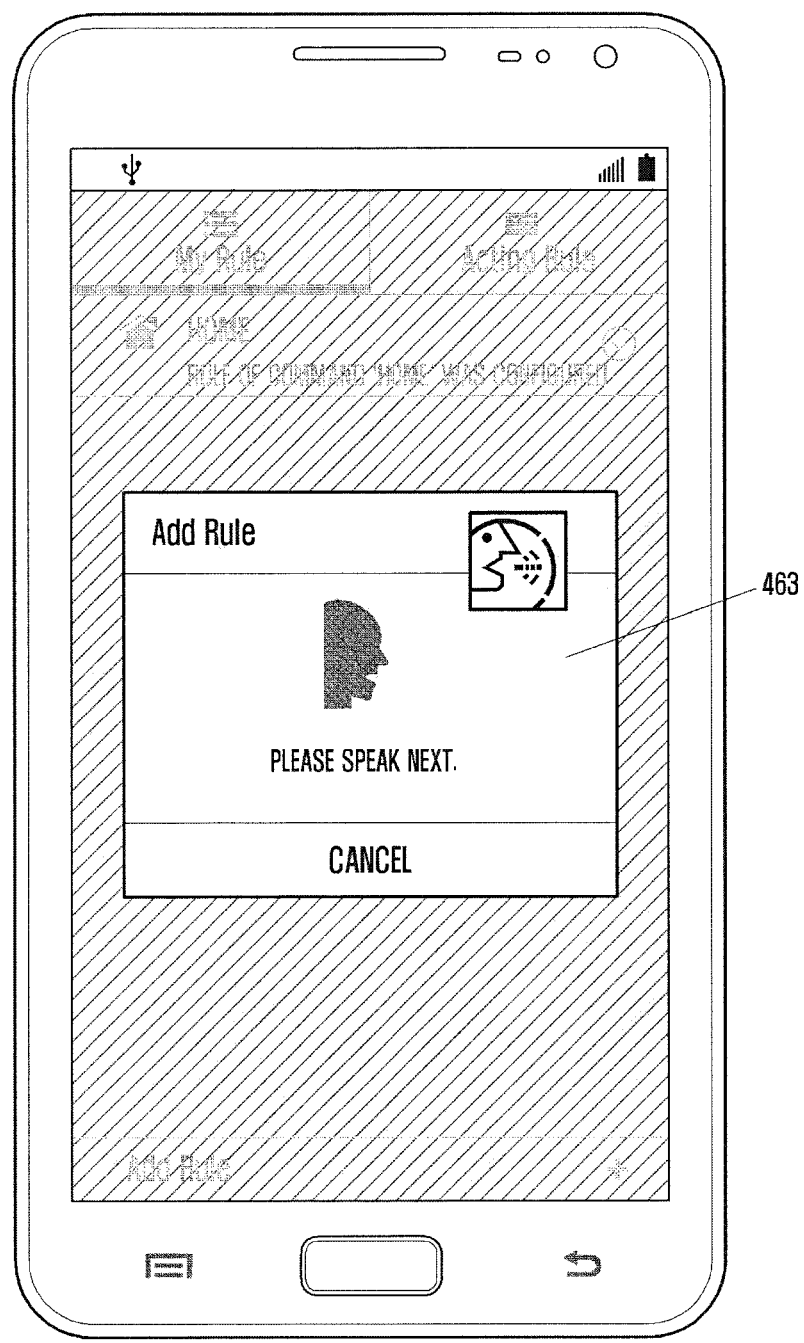
Figure 4H:
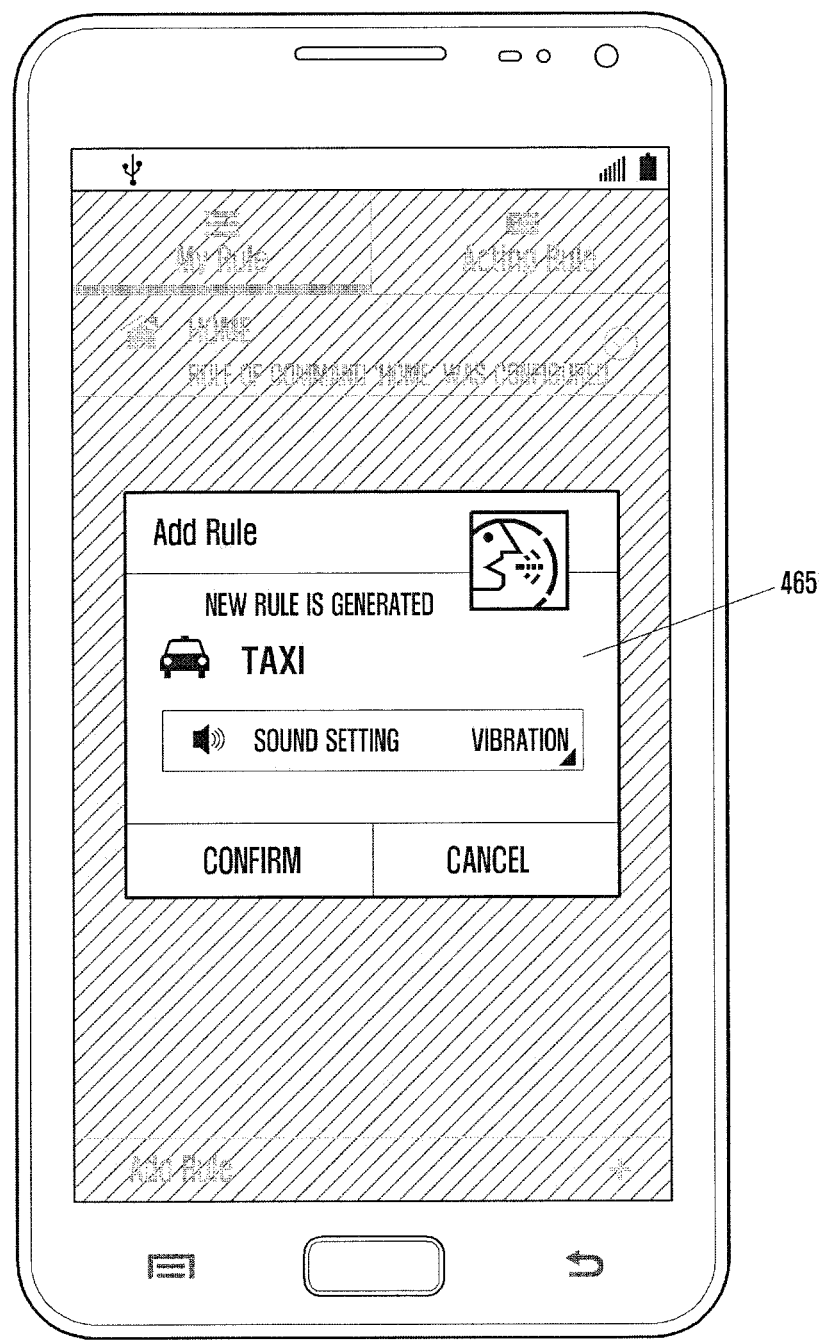

In the state of FIG. 4F, if the user selects a confirm menus item (or make a speech input by speaking "confirm", then, as illustrated in FIG. 4G, the control unit 170 may display a popup window 463 prompting the user to make a speech input (e.g., "please speak next command") and wait for speech input. In the state of FIG. 4G, the user may make a speech input of "switch to vibration" for switching to the vibration mode as additional action corresponding to the condition (e.g., taxi). Then the control unit 170 may recognize the user's speech input and display the speech recognition mode indicator, the condition (e.g., taxi) input previously, and the additional action prompt in the form of a popup window 465 as shown in FIG. 4H. According to an exemplary embodiment of the present invention, as shown in the popup window 465, the control unit 170 may notify of the generation of a new rule with the condition "taxi" for switching to the vibration mode when the condition is fulfilled along with menu items (e.g., "confirm" and "cancel").

Figure 4I:
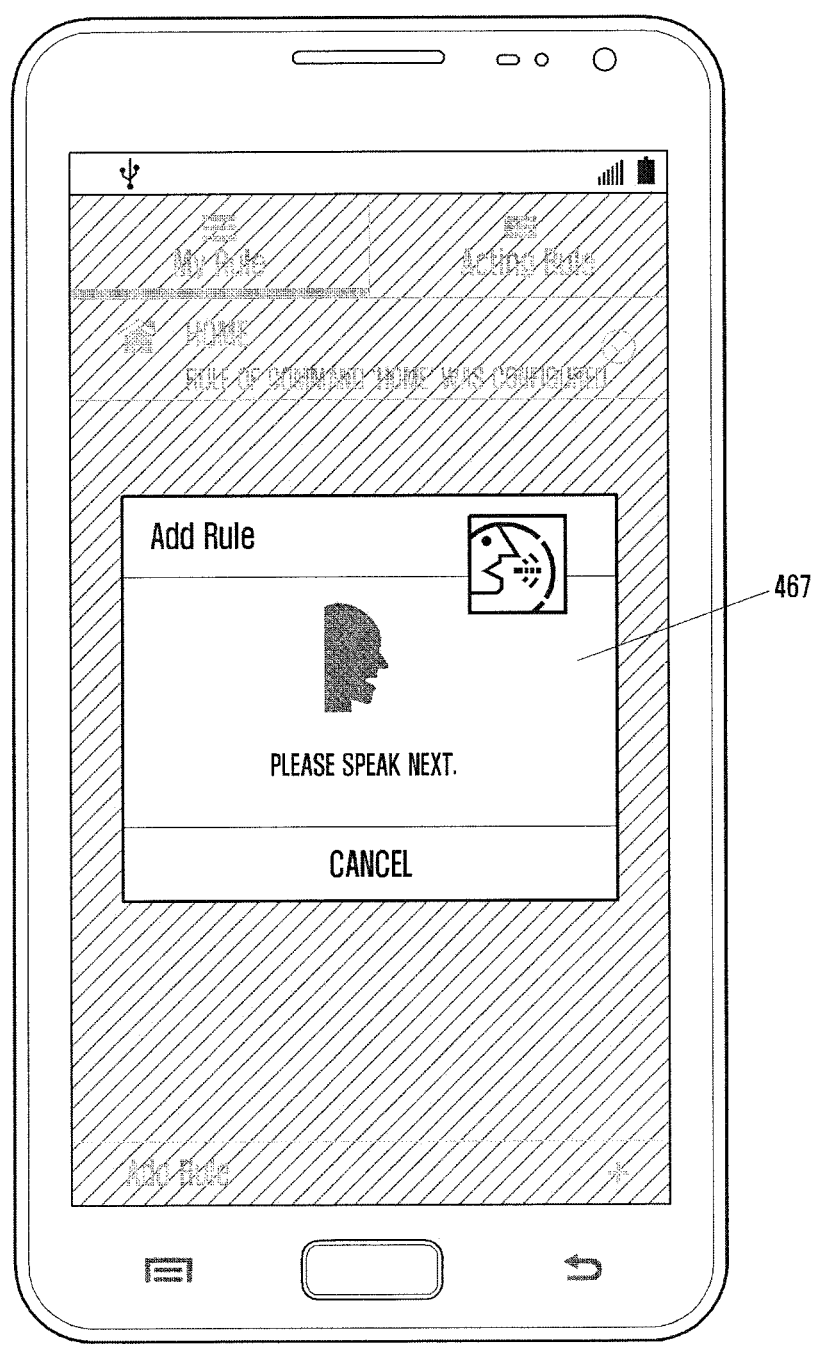

In the state of FIG. 4H, if the user selects the 'confirm' menu item, then as illustrated in FIG. 4I, the control unit 170 may display a popup window 467 prompting the user to make the next speech input (e.g., "please speak next command") and wait for user's speech input. The user may make a speech input of "end (or "stop") to end addition configuration of the rule in the state of FIG. 4I. Then the control unit 170 may recognize the user's speech input and provide the information on the condition specified in the rule configured through steps of FIGS. 4A to 4I and at least one action corresponding to the condition as shown in FIG. 4J.

Figure 4J:
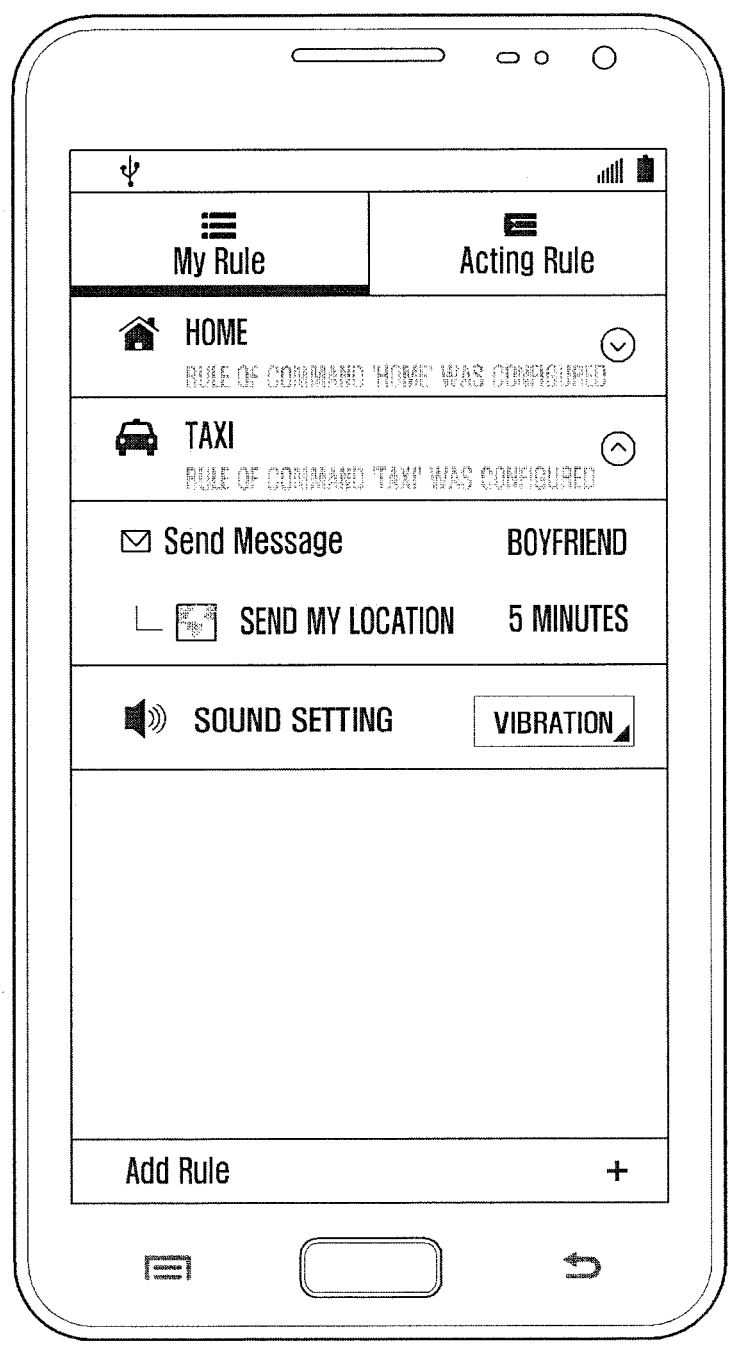

For example, as shown in FIG. 4J, the control unit 170 may provide a screen notifying that the rule has the condition "taxi" for the actions "send message" and "sound setting" along with the detailed information "send message including my location to boyfriend at every 5 minutes" and "sound is set to vibration."

Meanwhile, according to various exemplary embodiments of the present invention, as shown in FIGS. 4A to 4F, the control unit 170 may ask the user for the information required additionally in voice or text depending on the action input by the user. According to various exemplary embodiments of the present invention, as shown in FIGS. 4G to 4I, the control unit 170 may recognize the action requiring no additional action (e.g., sound setting) and skip requesting the user for additional information to jump to the next step.

Hereinabove, the descriptions have been made of the operations of defining the rule according to the various exemplary embodiments of the present invention. A description has been made of the exemplary operation of executing the above-defined rule hereinafter. According to various exemplary embodiments of the present invention, the predefined rules may be executed immediately in response to the user's speech or text input as described above. Also, the predefined rule may generate a widget according to the user's definition in the user devices and execute the corresponding rule by means of the widget as to be described herein below. For example, according to various exemplary embodiments of the present invention, the instruction for the rule may be executed by means of the widget.

In various exemplary embodiments of the present invention, if a certain operation such as receiving an inbound call interrupts generating a rule, the rule generation operation progressed until then is saved (or temporarily stored) to process the operation caused the interrupt.

FIGS. 5A to 5E are diagrams illustrating exemplary screens for explaining an operation of executing a predefined rule in a user device according to an exemplary embodiment of the present invention.

FIGS. 5A to 5E show exemplary operations of receiving, at the rule execution module 175 of the control unit 170, the natural language-based speech input made by the user and executed the rule in response to the speech input, checking, at the condition check module 177 of the control unit 170, the condition specified in the rule, and executing, at the action execution module 179 of the control unit 170, at least one action corresponding to the condition when the condition is fulfilled (e.g., when the context is detected).

Referring to FIGS. 5A to 5E, FIG. 5A shows an exemplary screen of the user device 100 when a widget for CAS is provided according to an exemplary embodiment of the present invention.

Figure 5A:
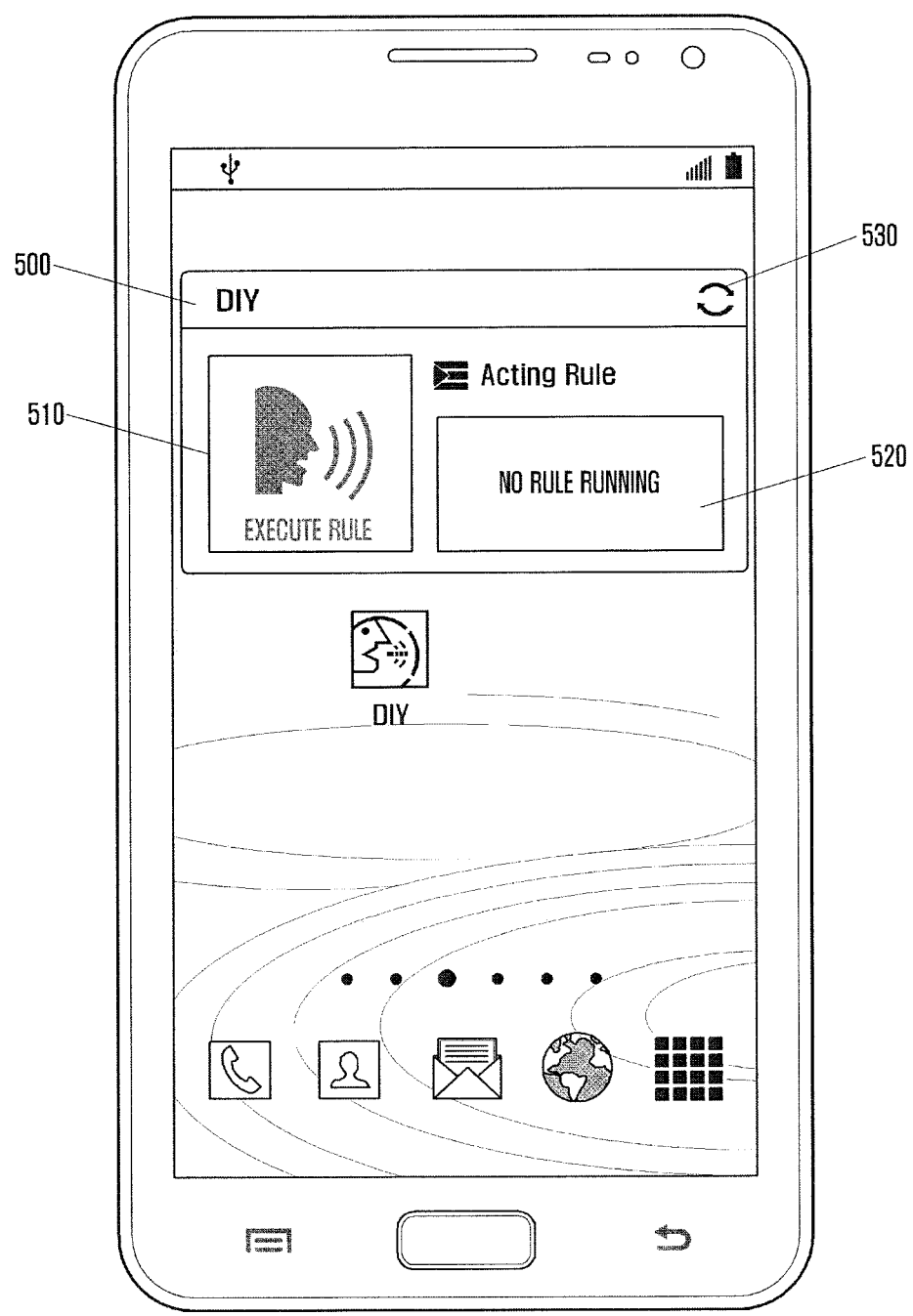
FIGS. 5A to 5E are diagrams illustrating exemplary screens for explaining an operation of executing a pre-defined rule in a user device according to an exemplary embodiment of the present invention.

As shown in FIG. 5A, the CAS widget 500 may be displayed on the home screen (or menu screen) of the user device 100. The widget 500 may be provided with an instruction input region (or rule execution button) 510 for the user to make an input (e.g., tap and touch) for executing the rule and an execution information region showing information on the currently running rules among the user-defined rules. The widget 500 also may be provided with a refresh function item 530 for updating the information on the currently running rules. According to an exemplary embodiment of the present invention, the instruction input region 510 may be provided with an image or text in consideration of intuitiveness for the user. FIG. 5A is directed to an exemplary case in which the execution information region 520 indicates that no rule is currently running.

Figure 5B:
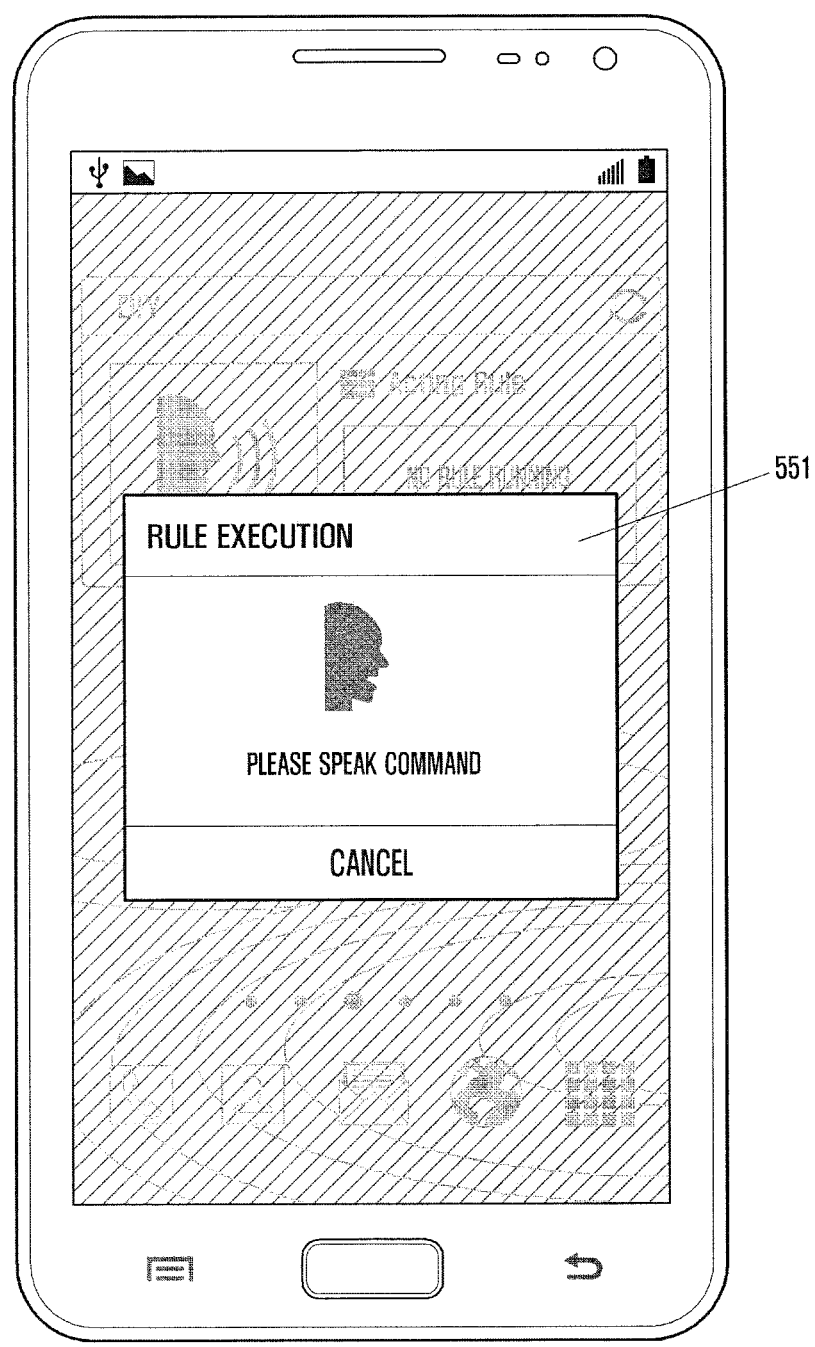

In the state of FIG. 5A, the user may select (e.g., touch gesture or tap) the instruction input region 510 for executing the rule. As illustrated in FIG. 5B, the control unit 170 (e.g., the rule execution module 175) may then execute the rule with the display of the popup window 551 prompting the user to input (or speak) the information on the rule to be executed (e.g. "speak command") and wait for user's speech input.

Figure 5C:
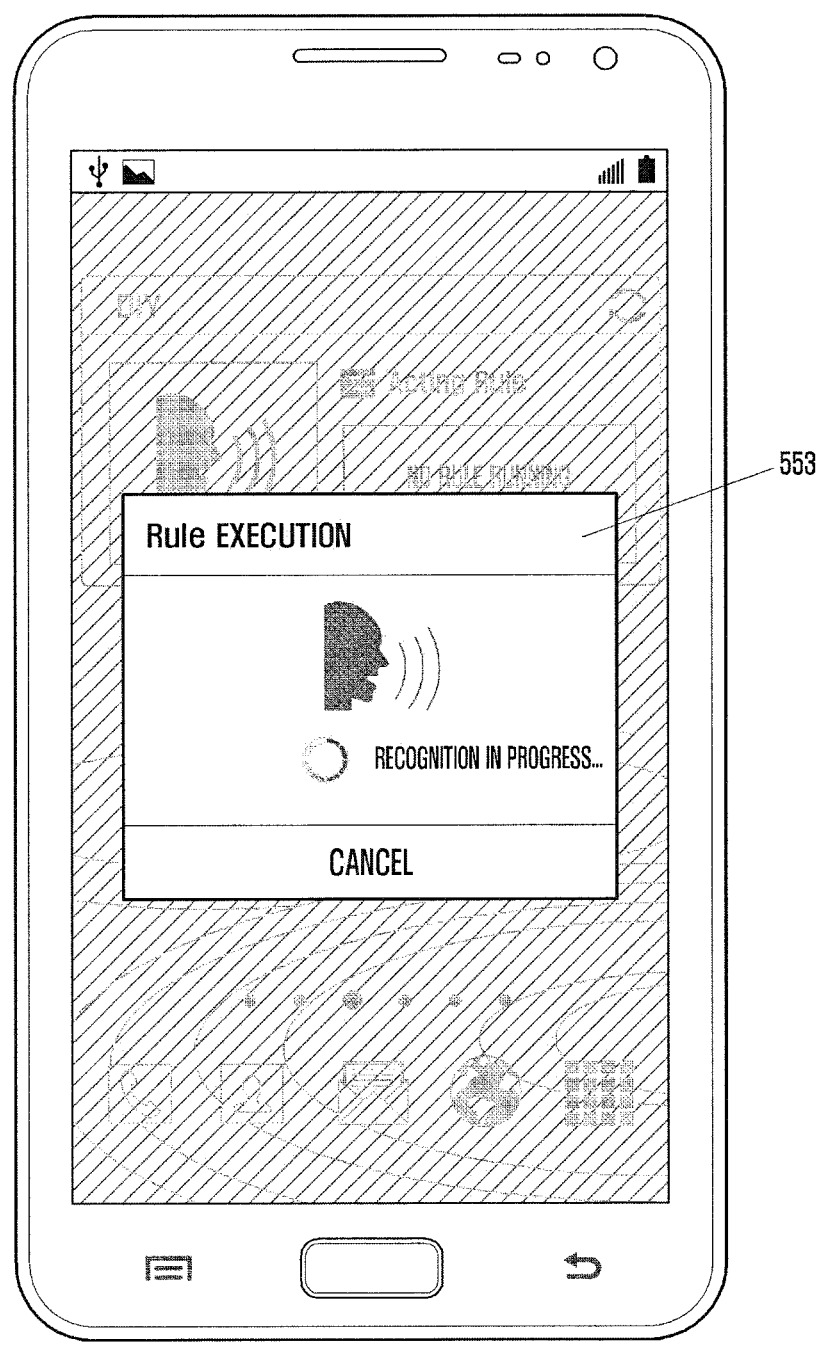

In the state of FIG. 5B, the user may make a speech input (e.g., "subway") for the rule to be executed. As illustrated in FIG. 5C, the control unit 170 may then recognize the user's speech input and provide a popup window 553 notifying that the rule corresponding to "subway" is being loaded (or recognized). In various exemplary embodiments of the present invention, the recognition progress screen display may be omitted.

If the recognition and loading operation has completed, the control unit 170 may provide a recognition and a loading result in the form of a popup window 555. For example, the control unit 170 may provide the information on the rule to be executed according to the user's speech input and condition specified in the rules and actions corresponding to the condition by means of the popup window 555. According to an exemplary embodiment of the present invention, the control unit 170 may provide notification that the rule to be executed is "subway" configured with the condition of "subway" (e.g. execute [subway]) having the actions of "Wi-Fi turn-on" and "switch to vibration" (e.g. 'Wi-Fi' is on, 'vibration' is configured). In various exemplary embodiments of the present invention, the rule information screen display may be skipped and the procedure may jump to the operation to the operation corresponding to FIG. 5E. The screen of FIG. 5E may be displayed for a predetermined duration and then followed by the corresponding operation.

Figure 5D:
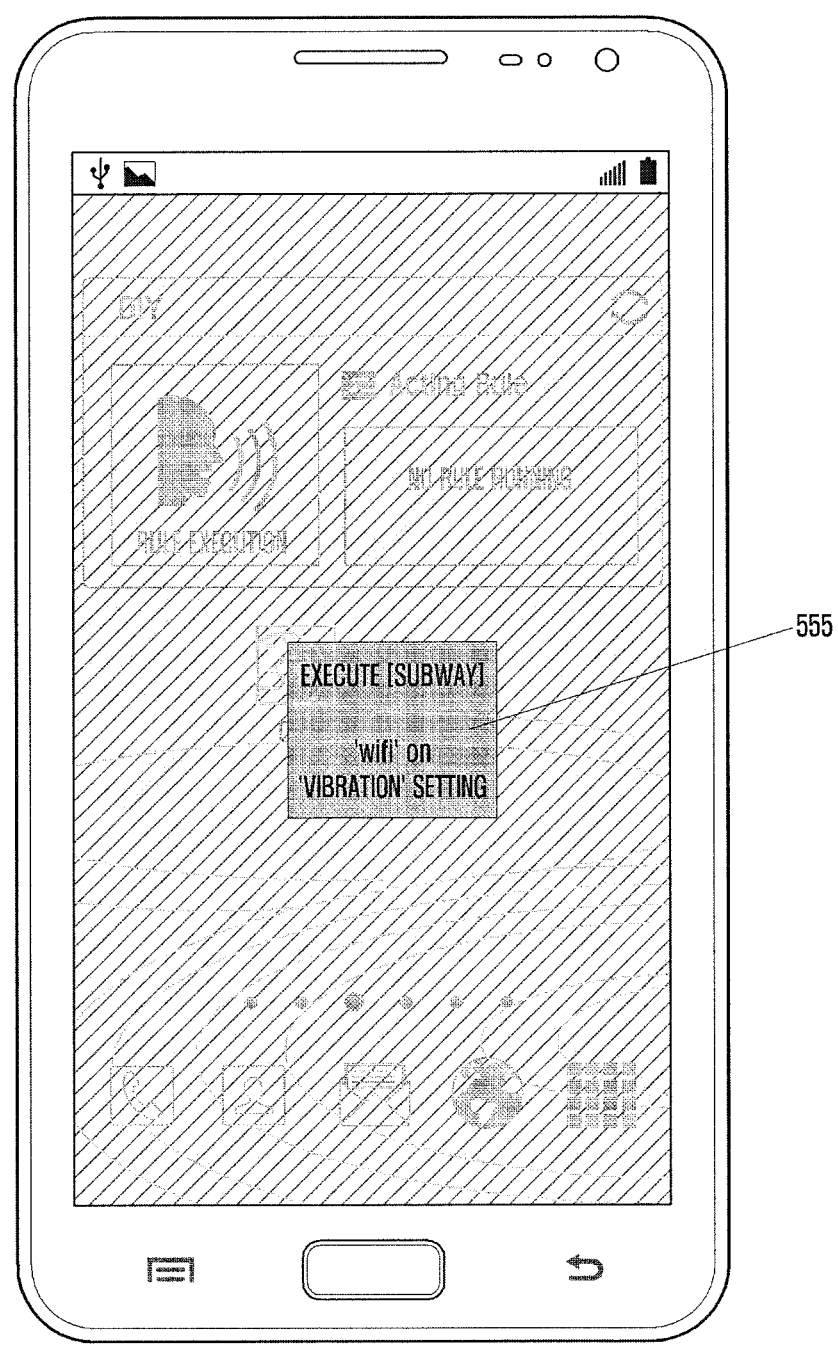
Figure 5E:
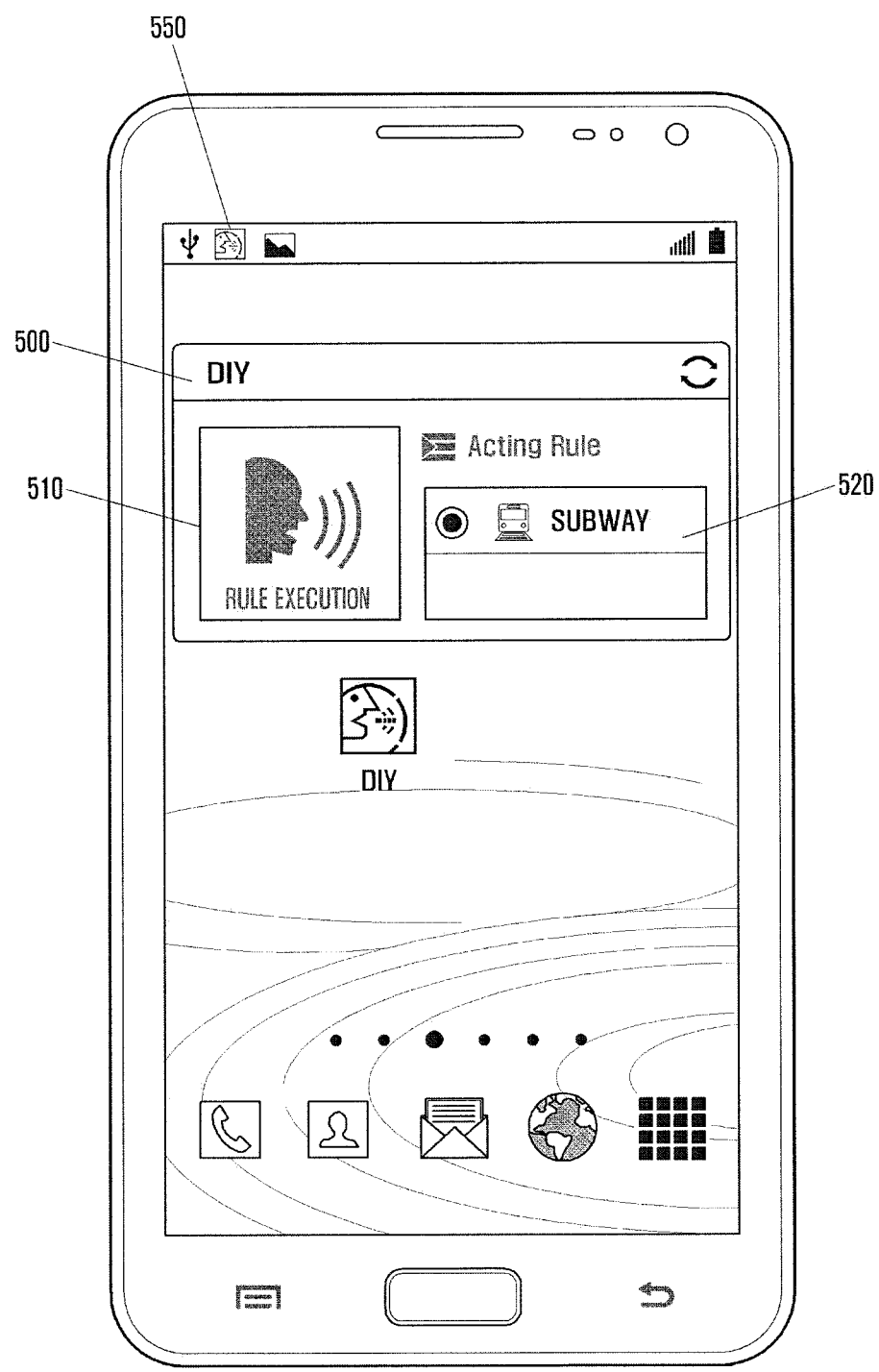

When a predetermined time duration elapses in the state of FIG. 5D, the control unit 170 may provide the information (e.g. subway) on the rule executed by the user (or current running rule) in the execution information region 520 of the widget in the form an image or text. For example, the execution information region 520 of the widget 500 may present an icon or text indicating "subway" instead of the message of "there is no rule running currently" as shown in FIG. 5E. Also, the control unit 170 may provide a notification item 550 to notify of the currently running rules in the indicator area providing various operation state of the user device 100 in response to the execution of the rule as shown in FIG. 5E. A description is made of the notification item later.

Although FIG. 5E is directed to the exemplary case in which only one rule is running, a plurality of rules may be running and, in this case, the execution information region 520 may provide the information on the plurality of currently running rules. Although the description is directed to an exemplary case of prompting the user to make a speech input in selection of the instruction input region 510, it may be possible to provide a list of the rules defined by the user in selection of the instruction input region 510 in order for the user to select at lease on rule.

The control unit 170 (e.g., the condition check module 177) also may operate to determine whether the condition specified in the currently running rule, among the various rules defined through the above procedure, is fulfilled. The control unit 170 (e.g., the action execution module 179) may operate to execute at least one action mapped to the condition of the rule which is fulfilled (e.g., at least one action mapped to the context corresponding to the condition of the rule).

As described above, according to the various exemplary embodiment of the present invention, the rule may be executed by means of the widget 500. According to an exemplary embodiment of the present invention, the user may select the instruction input region (or rule execution button) 510 and speak the configure rule (or command). Then the control unit 170 may perform popup text or voice feedback to the user to provide the information on the rule start time and actions to be executed. The control unit 170 also may add the corresponding rule to the execution information region 520 and display the notification item 550 indicating that there is a currently running rule in the indicator region. A description is made of the notification item 550 later.

Hereinafter, the detailed operations of the CAS control methods according to various exemplary embodiments of the present invention are described with reference to accompanying drawings (e.g., FIGS. 6 to 13).

Figure 6:
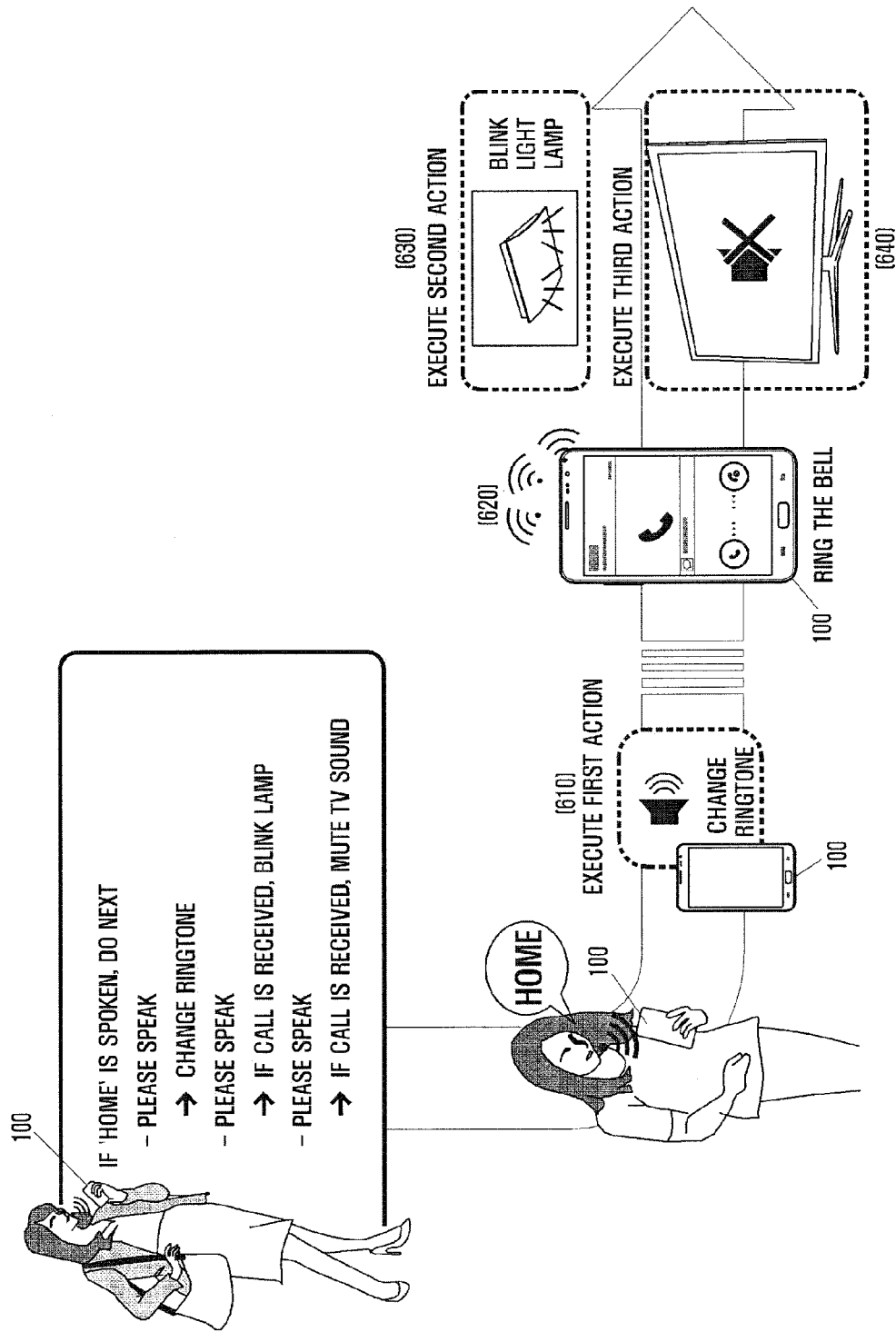
FIG. 6 is a diagram illustrating an exemplary situation of providing CAS using a user device according to an exemplary embodiment of the present invention.

FIG. 6 is a diagram illustrating an exemplary situation of providing CAS using a user device according to an exemplary embodiment of the present invention.

FIG. 6 shows an exemplary situation in which the user configures and executes a rule through speech interaction, and the user device 100 detects fulfillment of the condition specified in the rule and executes the action triggered when the condition is fulfilled. Particularly in FIG. 6, the user executes action1 (e.g., sound setting) corresponding to condition1 (e.g., home) and performs action2 (e.g., blink lamp) and action3 (e.g., mute TV sound) under a sub-condition (condition2) (e.g., when receiving call).

Referring to FIG. 6, the user may define a rule using the user device 100. For example, the user may activate the function of generating a rule and define the rule for the user device 100 to change the ringtone at a specific location and blink the lamp and mute TV sound upon detection of incoming call at the specific location, by manipulating the user device 100. According to an exemplary embodiment of the present invention, the user may define the rule of "switching the indication mode to the ring mode at home and blinking the lamp and mute TV sound in receiving inbound call at home" in the stepwise interaction with the user device 100. The operation of defining the rule may be performed through the rule generation procedure described with reference to FIGS. 3A to 3K and 4A to 4K. The operation of defining the rule may be progressed through natural language-based interaction.

The user may instruct execution of the rule defined through natural language-based speech or text interaction. The situation to be detected (e.g., condition) may be "[home] is spoken or a call is received from home", and the action to be taken in fulfillment of the condition may be "setting sound blinking, mute TV sound". Although not defined separately in the case of FIG. 6, the user device 100 may control execution of extra action depending on the executed action. For example, in subsequence to blinking lamp and muting TV sound, another action of "recovering the previous state of the lamp upon receipt of the call and playing TV sound upon end of the call session" may be performed.

In the state in which a rule has been defined, the user may execute, if necessary, the defined rule. For example, the user may make a speech input by speaking "home" through the process as described in FIGS. 5A to 5E when entering the home from outdoor. Then the user device 100 may check (e.g., determine) whether a there is a rule corresponding to "home" among the currently running rules. If the rule corresponding to "home" is running, the device 100 may check (e.g., determine) at least one condition specified in the rule "home" and actions corresponding to the condition.

The user device 100 recognizes "home" as the first condition defined in the rule "home" and "ring mode switching" as the first action corresponding thereto. Accordingly, the user device 100 switches the indication mode of the user device 100 to the ring mode in reaction to the user's speech input of "home" as denoted by reference number 610.

The user device 100 also may recognize the second condition "when receiving a call" specified in the rule "home" and check the interrupt to the condition (e.g., receipt of inbound call). Afterward, if an inbound call is received as denoted by reference number 620, the user device 100 recognizes the second condition "when receiving a call" specified in the rule "home" in reaction to the interrupt. The user device 100 may operate to control the second action "blinking lamp" as denoted by reference number 630 and the third action "muting TV sound" as denoted by reference number 640.

If the user accepts the receipt of the inbound call (e.g., call session is established) in the state the ringtone (e.g., a phone bell sound) indicating receipt of voice call is played, the user device 100 may recover the lamp to the previous state and, if the call session is released, releases the mute of the TV sound.

Figure 7:
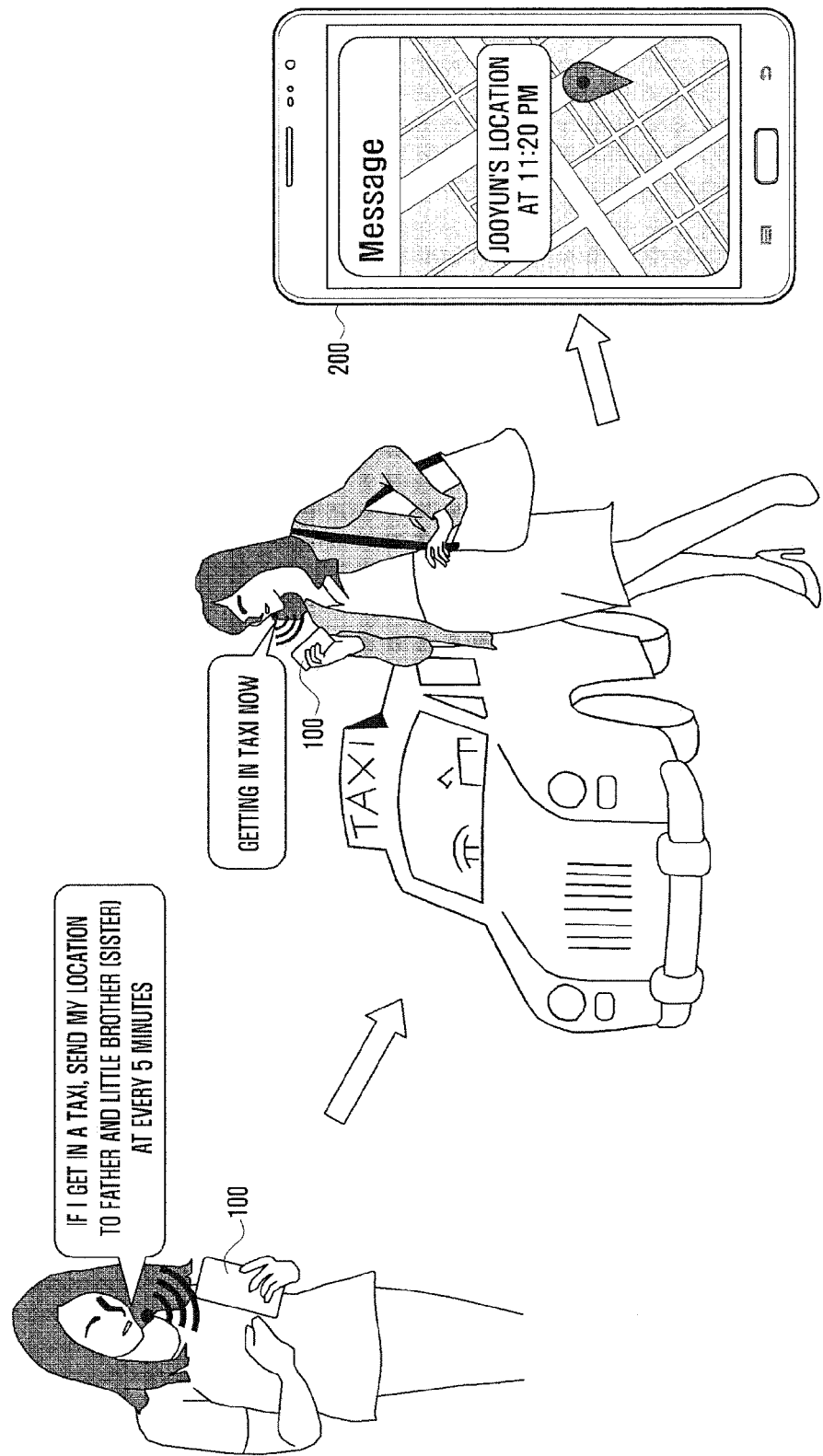
FIG. 7 is a diagram illustrating an exemplary situation of providing CAS using a user device according to an exemplary embodiment of the present invention.

FIG. 7 is a diagram illustrating an exemplary situation of providing CAS using a user device according to an exemplary embodiment of the present invention.

FIG. 7 shows an exemplary situation in which a user configures and executed a rule through speech interaction, and the user device 100 recognizes the condition specified in the rule and executes the action triggered when the condition is fulfilled. Particularly in FIG. 7, the user may define a rule of transmitting the user location (or location of the user device 100) to at least one target user device automatically at a predetermined interval. The user device 100 may execute the rule in response to a user input and perform the action of transmitting the location information to the at least one target user device at an interval specified in the execution rule.

Referring to FIG. 7, the user may define the rule using the user device 100. For example, the user may activate the rule generation function (or application) by manipulating the user device 100 and define a rule of transmitting the location information to at least one target user device 200 at a predetermined interval. According to an exemplary embodiment of the present invention, the user may generate a rule of "if I take a taxi, then send my location information to my father and little brother (or sister) at every 5 minutes." At this time, the rule may be generated through speech interaction with the microphone 143 or text interaction with the input unit 120 or touchscreen 130 as to be described later. It is preferred that the speech and text interaction is based on a natural language as described above. The situation to be detected (e.g., condition), specified in the defined rule may be "when movement occurs", and the action to be taken in fulfillment of the condition may be "send location information to father and little brother (sister) at every 5 minutes."

The user device 100 may provide an interface for designating at least one target user device 200 for transmitting the location information and mapping the information on at least one target device 200 (e.g., phone number, name, and nickname) to the rule. The rule may be predefined and redefined by the user if necessary anytime anywhere.

The user may input an instruction for executing the rule in the form of speech, text, or gesture through an interface given in defining the rule. Then the user device 100 may map the instruction to the defined rule and store the mapping information. In the case of using the speech input, the user device 100 may store the waveform of the speech instruction, convert the speech to a text and store the text, or store both the waveform of the speech and converted text.

In the state in which the rule has been defined, the user may identify, activate, and/or execute the rule with the predefined instruction (e.g. speech, text, and gesture), if necessary. For example, the user may input the corresponding instruction as a speech input (e.g., "taxi", "taxi mode", and "take taxi now") right before or upon getting in a taxi as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. The speech and text instructions may be the natural language-based instructions as described above.

When the user intends to make a speech input for executing the rule (or condition or situation recognition), the user may take a preliminary action for notifying the user device 100 of the use of speech input for executing the rule in advance. In an exemplary case of executing the rule (or condition or situation recognition) through speech, it may be necessary to activate the microphone 143. This is because if the microphone 143 is always on an unintended sound input may cause unnecessary operation or error. Accordingly, it is preferred to define a specific action (e.g. widget, gesture, and function key manipulations) for activating the microphone 143 in the speech input mode such that the user to take that action to turn on the microphone 143 before speech input. According to an exemplary embodiment of the present invention, the user may speak the instruction after a predetermined gesture, pushing a predetermined function key, or selecting a rule execution button of a widget.

The user device 100 may recognize and parse the speech input to execute the rule indicated by the speech input. For example, the user device 100 may search the predefined rules (e.g., speech waveforms mapped to the respected rules) for the speech waveform corresponding to the speech input. The user device 100 also may convert the input speech to a text to retrieve the text among the predetermined rules (e.g., texts mapped to the respective rules). The user device 100 may search for both the speech waveform and text among the predetermined rules (e.g., waveforms and texts mapped to the respective rules).

The user device 100 may perform condition (situation) recognition according to the rule execution. For example, the user device 100 may detect the fulfillment of condition1 such as "take taxi now" based on the predefined rule and check condition2 such as predetermined time (e.g., 5 minutes) upon fulfillment of condition1. In this case, the user device 100 may operate to perform action1 for checking location of the user device 100 at every time specified in condition2. The user device 100 also may operate to perform action2 for sending the location information to at least one target user device 200 according to action1.

Meanwhile, the at least one target user device 200 may perform feedback of the location information on the user device 100 through a predetermined interface upon receipt of the location information from the user device 100. For example, the target user device 200 may display the location information on the user device 100 on a map image as shown in FIG. 7. At this time, the map image and location information may be transmitted as processed by the user device 100, or the location information transmitted by the user device 100 is presented on a map image provided by the target user device 200.

As described above, the user may notify at least one other designated user of the user's location at a predetermined time interval according to the exemplary embodiment of FIG. 7. The at least one other user may acquire the location and moving path of the user without extra action.

Figure 8:
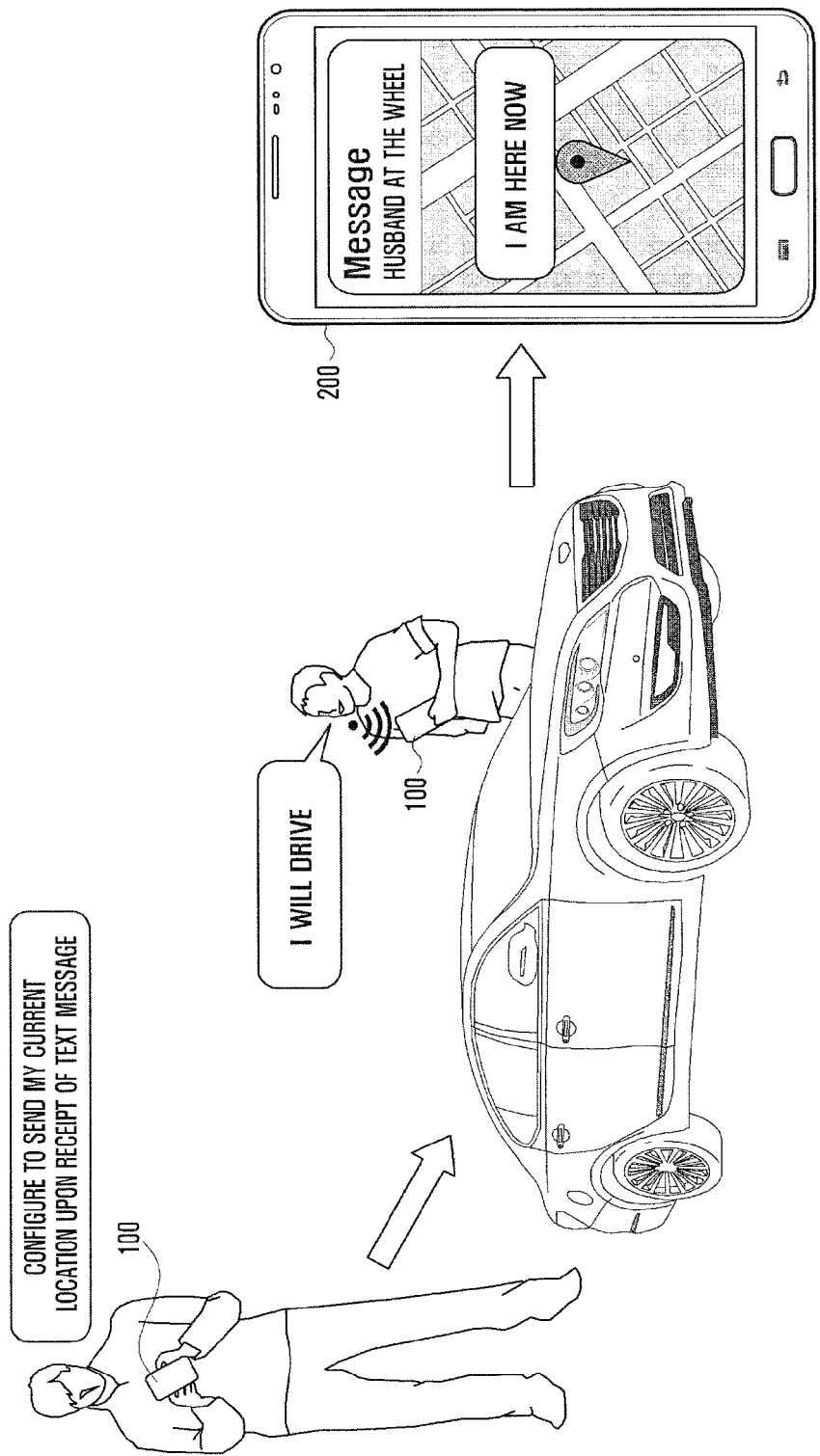
FIG. 8 is a diagram illustrating an exemplary situation of providing CAS using a user device according to an exemplary embodiment of the present invention.

FIG. 8 is a diagram illustrating an exemplary situation of providing CAS using a user device according to an exemplary embodiment of the present invention.

FIG. 8 shows an exemplary situation in which the user configures and executes a rule using a composite application, and the user device 100 recognizes the condition specified in the rule and executes an action trigged when the condition is fulfilled. Particularly in FIG. 8, the user may define a rule of transmitting the user location (or location of the user device 100) to at least one target user device in response to an external event. The user device 100 executes the rule according to the user input and executes the action of transmitting the location information to the target user device 200 upon receipt (e.g., or occurrence) of the event from the target user device 200 specified in the execution rule. FIG. 8 shows an exemplary case in which the user device 100 detects an input (event) from the external device (e.g., target user device 200) and executes the predetermined action.

In various exemplary embodiments of the present invention, the composite application may be the application of modularizing the screen for providing the end user with diverse information received from various resources in most preferred way (e.g., as required by user), and designing the screen configuration and screen mode switching depending on the user's right and role so as to optimize the user's experience.

Referring to FIG. 8, the user may define the rule using the user device 100. For example, the user may activate the rule generation function (or application) and define a rule of transmitting the location information to at least one target user device 200 whenever an event (e.g., receipt of message) occurs. According to an exemplary embodiment of the present invention, the user may generate a rule of "if a call is received at the wheel from wife, send my current location information." At this time, the rule may be generated through speech interaction with the microphone 143 or text interaction with the input unit 120 or touchscreen 130 as to be described later. It is preferred that the voice and text interaction is based on a natural language as described above. The situation to be detected (e.g., condition), specified in the rule specified as shown in FIG. 8 may be "if a call is received at the wheel from wife," and the action to be taken in fulfillment of the condition may be "send my current location information." Also, an additional condition such as "if a message including a phrase asking for location such as 'where' at the wheel from wife" can be further configured.

The user device 100 may provide an interface for designating at least one target user device 200 generating event and mapping the information on at least one target device 200 (e.g., phone number, name, and nickname) to the rule. The rule may be predefined and input or redefined by the user if necessary anytime anywhere, and the instruction for executing the rule may be input through a given interface in the form of speech, text, or gesture. Then the user device 100 may map the instruction to the defined rule and store the mapping information.

In the state in which the rule has been defined, the user may execute the rule with the predefined instruction (e.g., speech, text, and gesture), whenever necessary. For example, the user may input the corresponding instruction as a speech input (e.g., "drive", "drive mode", and "I will drive") right before or upon getting in a car as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. It is preferred that the speech and text instructions are the natural language-based instructions as described above. When it is intended to make a speech input, the user may take a preliminary action (e.g., turning on the microphone 143) for notifying the user device 100 of the use of speech input for executing the rule in advance.

The user device 100 may recognize and parse the speech input to execute the rule indicated by the speech input. The user device 100 may also detect the fulfillment of the condition (situation). For example, the user device 100 may detect the fulfillment of condition1 such as "I will drive" specified in the defined rule and check condition3 such as receipt of text message (text message including specific condition such as "where") from condition2 such as designated target device 200 according to condition1. For example, if a text message fulfilling condition3 is received according to the fulfillment of condition2, e.g., from the target user device 200, the user device 100 may perform action1 for acquiring the location information on the user device 100. The user device 100 also may perform action2 of transmitting the location information acquired according to action1 to the target user device 200.

If the location information transmitted by the user device 100 is received, the target user device 200 may perform feedback of the location information on the user device through a predetermined interface. For example, the target user device 200 may display the user device location on a map image as shown in FIG. 8.

As described above, according to the exemplary embodiment of FIG. 8, if an event is received from a designated target user, the user may notify the target user of the user location through a text message without taking extra action.

Figure 9:
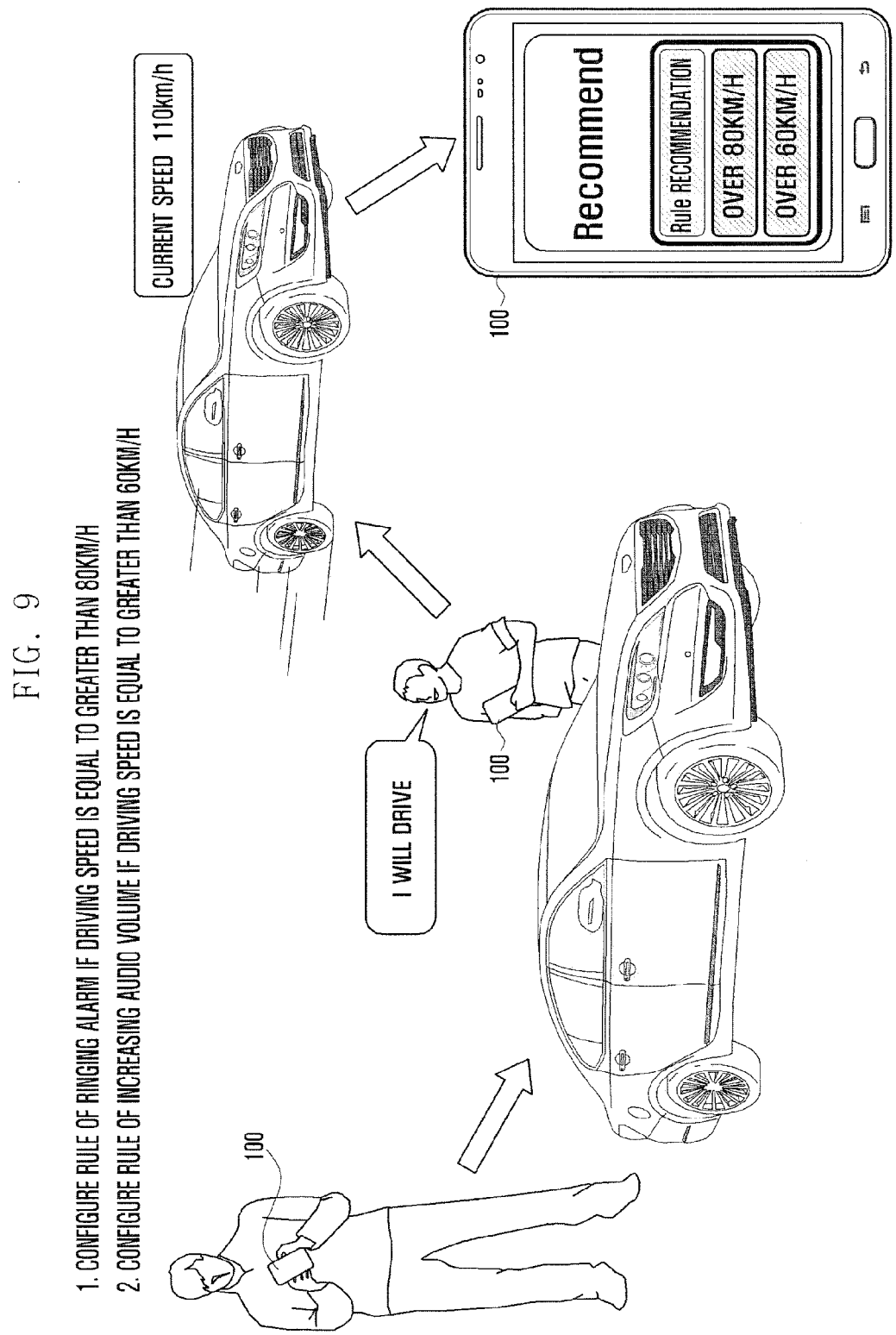
FIG. 9 is a diagram illustrating an exemplary situation of providing CAS using a user device according to an exemplary embodiment of the present invention.

FIG. 9 is a diagram illustrating an exemplary situation of providing CAS using a user device according to an exemplary embodiment of the present invention.

FIG. 9 shows an exemplary situation in which one of the similar rules is selected by the user or recommended programmatically or executing similar rules simultaneously. Particularly in the exemplary situation of FIG. 9, the user may define a rule for the user device 100 to perform feedback of alarm or control a specific function. The user device 100 may execute the rule in response to the user input and control a specific function of the user device 100 or execute an alarming action upon detection of change in the situation as specified in the rule.

Referring to FIG. 9, the user may define a rule using the user device 100. For example, the user may generate a rule of outputting an alarm upon detection of an event caused by change in environment (hereinafter, first rule) and a rule of controlling a function of the user device 100 upon detection of an event caused by change in environment (hereinafter, second rule) with the activation of the function (or application) capable of generating the rules by manipulating the user device 100. According to an exemplary embodiment, it is possible to generate the first rule such as "output alarm when driving speed is equal to or greater than 80 Km/h" and the second rule such as "increase audio volume of the car or the user device 100 when the driving speed is equal to or greater than 60 Km/h." At this time, as described above, the rule may be defined by speech input through the microphone 143 or text input through the input unit 120 or touchscreen 130. The speech and text input may be made with a natural language. The situation to be detected (e.g., condition), may be "when change in environment (e.g., driving speed) is equal to or greater than a predetermined threshold," and the action to be taken in fulfillment of the condition may be "output alarm or control audio volume."

As described above, the first and second rules may be predefined or generated and redefined by the user in real time, whenever necessary, anytime anywhere; and the instruction for executing the rule may be input in the form of speech, text, or gesture through a given interface. Then the user device 100 may map the defined rule and the instruction and store the mapping as described above. FIG. 9 shows an exemplary case in which plural rules such as first and second rules are mapped to the same instruction.

In the state in which the rules (the first and second rules) have been defined, the user may execute the rules using the defined instructions (e.g., speech, text, and gesture) whenever necessary. For example, the user may make an instruction (e.g., speech input such as "drive", "drive mode", and "I will drive") before or upon getting in a car as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. As described above, when the user intends to make a speech input, the user may take a preliminary action (e.g., turning on the microphone 143) for notifying the user device 100 of the use of speech input for executing the rule in advance.

The user device 100 may recognize and parse the speech input to execute the rule indicated by the speech input. The user device 100 also may detect the fulfillment of the condition (situation). For example, the user device 100 detects the fulfillment of condition 1 such as "I will drive" specified in the defined rule and then check whether the conditions are fulfilled (e.g., whether driving speed is equal to or greater than 60 Km/n or 80 Km/n). If the second condition is fulfilled, the user device 100 may take action1. For example, if the driving speed is equal to or greater than 60 Km/h, the user device 100 may take an action of increasing the audio volume thereof or the car). Also, if the driving speed is equal to or greater than 80 Km/h, the user device 100 may take an action of outputting the alarm sound according to the first rule.

Meanwhile, in the case in which there are multiple conditions (e.g., the first and second rules) matching the instruction, the user device 100 may recommend one of the conditions for user's selection. As shown in the exemplary situation of FIG. 9, the user device 100 may display a popup window presenting the first condition (≥80 Km/h) and the second condition (≥60 Km/h) to prompt user selection.

The previous exemplary embodiment has been directed to an exemplary situation of executing the rule before start of driving. Accordingly, when the predetermined rule with multiple conditions is running, the user device 100 may monitor the driving speed to determine whether the first and second conditions are fulfilled and execute the actions corresponding to the conditions to both the fulfilled conditions sequentially or the action corresponding to the lastly fulfilled condition.

Meanwhile, the user may execute the predefined rule at the wheel (e.g., in the state of driving at 110 Km/h as shown in FIG. 9).

In this case, the user device 100 may recognize and parse the speech input to execute the rule indicated by the speech input. The user device 100 may also detect the fulfillment of the condition (situation). For example, the user device 100 detects the fulfillment of condition 1 such as "I will drive" specified in the defined rule and then check (e.g., determine) whether the second condition is fulfilled (e.g., whether driving speed is equal to or greater than 60 Km/n or 80 Km/n). Because the current driving speed of 110 Km/h fulfills both the first and second conditions, the user device 100 may execute the actions corresponding to the first and second conditions simultaneously. According to an exemplary embodiment of the present invention, when the first and second conditions are fulfilled (e.g., the current driving speed of 110 Km/h is equal to or faster than 60 Km/h and 80 Km/h), the user device 100 may increase the audio volume thereof or the car and output alarm sound simultaneously.

In the case that the instruction matches a rule specifying multiple conditions, the user device 100 may recommend one of the conditions for user's selection. As shown in the exemplary situation of FIG. 9, the user device 100 may display a popup window presenting the first condition (≥80 Km/h) and the second condition (≥60 Km/h) to prompt user selection when the current situation (100 Km/) fulfills both the first and second conditions. By taking notice that the user is at the wheel, it is preferred that the condition selection is made through speech input. According to the user setting, the condition selection may be performed in the form of text input and gesture input as well as speech input.

Figure 10:
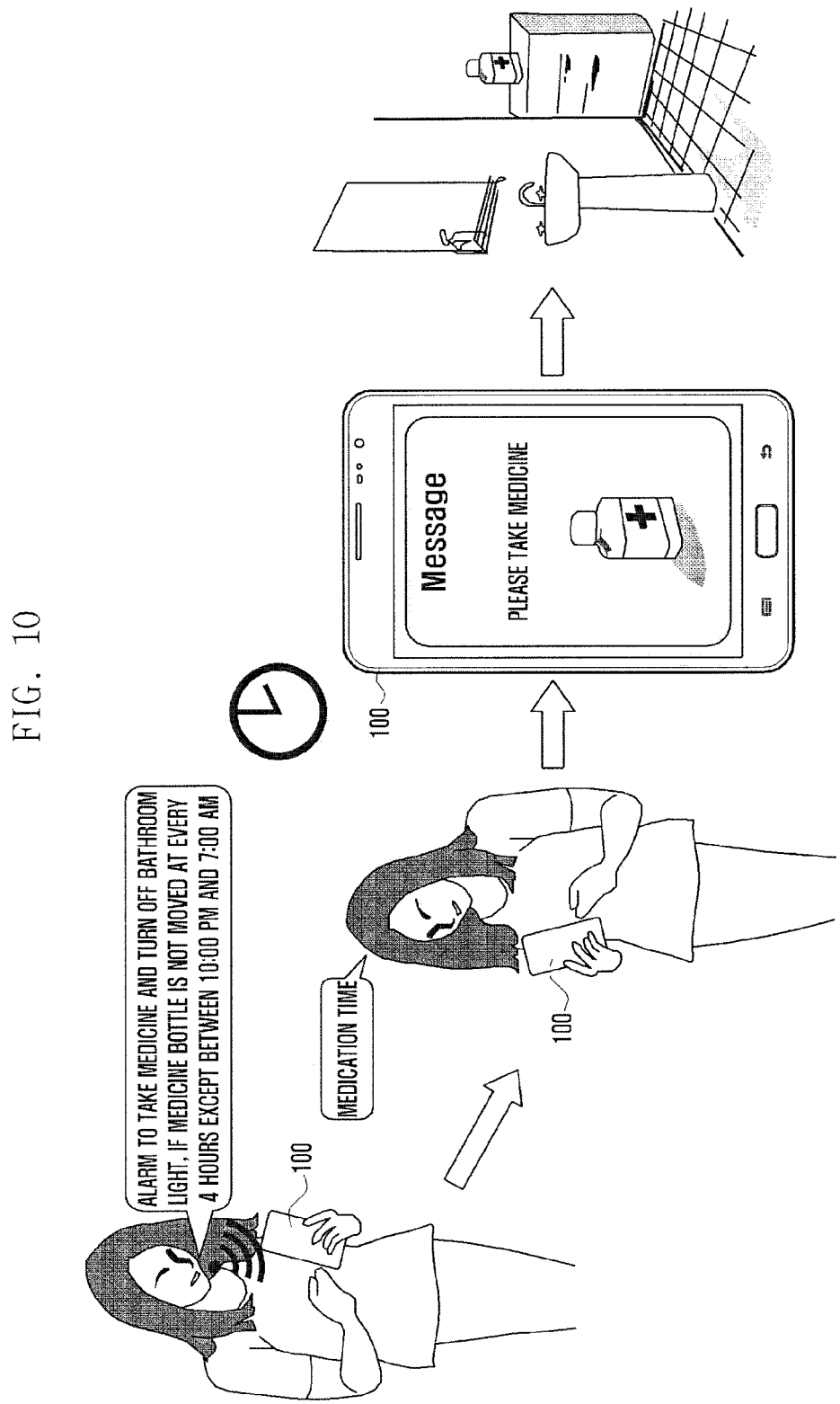
FIG. 10 is a diagram illustrating an exemplary situation of providing CAS using a user device according to an exemplary embodiment of the present invention.

FIG. 10 is a diagram illustrating an exemplary situation of providing CAS using a user device according to an exemplary embodiment of the present invention.

FIG. 10 shows an exemplary situation of providing CAS using the user device 100 and an external device (or an object capable of communication with the user device 100 or to which a device capable of communicating the user device 100 is attached). In the exemplary case of FIG. 10, a rule may be defined to check (e.g., determine) change of the external environment at a predetermined interval set by the user and feeds back an alarm depending on the check result. The user device 100 may execute the predefined rule in response to the user instruction and take an action of alarming when the environmental change specified in the rule is detected.

Referring to FIG. 10, the user may define the rule using the user device 100. For example, the user may activate the function (or application) capable of generating a rule by manipulating the user device 100 and define the rule for checking the event occurring depending on the external environmental change at a predetermined interval and output an alarm triggered by the event. According to an exemplary embodiment of the present invention, the user may generate a rule such as "show remind message and turn on the bathroom light if not take medicine at every 4 hours except between 10:00 PM and 7:00 AM." The rule may be generated by speech input through the microphone 143 or text input through the input unit 120 or touchscreen 130. The speech and text input may be made with a natural language. In the case of FIG. 10, the situation to be detected (e.g., condition), may be "if not take medicine at every 4 hours" and "except between 10:00 PM and 7:00 AM" and the action to be taken in fulfillment of the condition may be "show remind message and turn on the bathroom light."

As described above, the rule may be predefined or generated and redefined by the user in real time, whenever necessary, anytime anywhere; and the instruction for executing the rule may be input in the form of speech, text, or gesture through a given interface. Then the user device 100 may map the defined rule and the instruction and store the mapping as described above.

In the state in which the rule has been defined, the user may execute the rule using the defined instruction (e.g., speech, text, and gesture) whenever necessary. For example, the user may make an instruction (e.g., speech input such as "medicine", "check medicine bottle", and "medication time") to execute the predefined rule as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. As described above, when the user intends to make a speech input, the user may take a preliminary action (e.g., turning on the microphone 143) for notifying the user device 100 of the use of speech input for executing the rule in advance.

The user device 100 may recognize and parse the speech input to execute the rule indicated by the speech input. The user device 100 also may monitor to detect the fulfillment of a condition (situation) specified in the executed rule. For example, the user device 100 may monitor to detect the context corresponding to the activated rule. As another example, the user device 100 may detect the fulfillment of condition1 such as "medication time" specified in the defined rule and then check the condition2 (e.g., 4 hours) which is followed by condition3 such as whether an external device (e.g., medicine bottle) is moved (shaken). In various exemplary embodiments of the present invention, the user device 100 may check (e.g., determine) the movement of the external device through radio communication. In order to accomplish this, the external device (e.g., medicine bottle) may have a communication module (e.g., Bluetooth Lower Energy (BLE) tag, RF tag, NFC tag, and the like) capable of communication with the user device 100.

If no movement of the external device (e.g., medicine bottle) is detected for predetermined time duration (e.g., 4 hours), the user device 100 may operate to execute action1 such as outputting a remind message of "take medicine!" The user device 100 may execute action2 of controlling a target device (e.g., lamp, refrigerator, electric pot, and the like) as well as the output of the remind message as action1.

In an exemplary embodiment of the present invention, the target device may be any of objects used in everyday life such as lamp, refrigerator, and electric pot, as well as smart devices, requiring any action at a specific situation. If the target device is of being capable of communicating with the user device 100 as in FIG. 10, controlling the target device directly and, otherwise, indirectly via an auxiliary module (e.g., communication-enabled power control device) may be possible. According to an exemplary embodiment of the present invention, the user device 100 may communicate with the power control device having communication function to supply power to the bathroom lamp as a target device.

Figure 11:
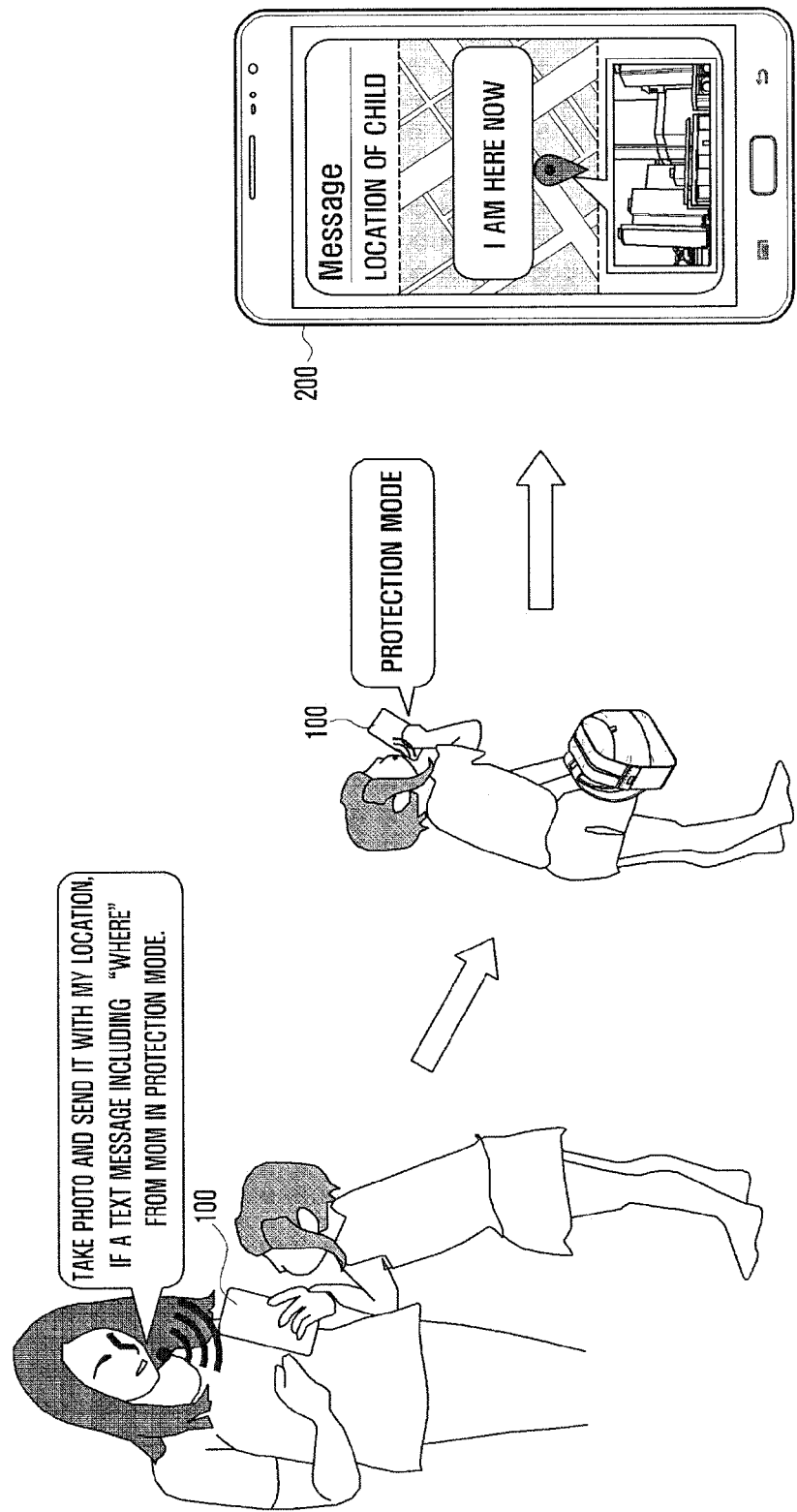
FIG. 11 is a diagram illustrating an exemplary situation of providing CAS using a user device according to an exemplary embodiment of the present invention.

FIG. 11 is a diagram illustrating an exemplary situation of providing CAS using a user device according to an exemplary embodiment of the present invention.

FIG. 11 shows an exemplary case in which an owner of a user device inputs an instruction for executing a rule, and in which a child user may not execute the rule as a result of a lack of dexterity according to an exemplary embodiment of the present invention.

FIG. 11 shows an exemplary situation of providing CAS in which the rule is configured and executed using a composite application, and the user device 100 detects the fulfillment of a condition specified in the rule and executes the action corresponding to the condition. Particularly in the exemplary case of FIG. 11, the user may define the rule of sending a specific target user device 200 the location (e.g., location of the user device) in detection of an external event. The user device 100 may execute the rule according to a user input and, when an event is received from the target user device 200 specified in the executed rule, executes the action of transmitting photo information and location information. In FIG. 11, the user device 100 detects the input (event) from the external device (e.g., target user device 200) and executes a designated action.

Referring to FIG. 11, the user may define a rule using the user device 100. For example, the user (or parent of the user) may activate the rule generation function (or application) by manipulating the user device 100 and define a rule of transmitting photo information and location information upon receipt of an event (e.g., message) from at least one target user device 200. According to an exemplary embodiment of the present invention, the user (or parent of the user may generate a rule such as "take a photo and send the photo with my location if a text is received from mom in protection mode." The rule may be generated through speech interaction with the microphone 143 or text interaction with the input unit 120 or touchscreen 130 as to be described later. It is preferred that the voice and text interaction is based on a natural language as described above. In the rule defined as shown in FIG. 11, the situation to be detected, e.g., condition, specified in the defined rule may be "if a text is received from mom in protection mode," and the action to be taken in fulfillment of the condition may be "take a photo and send it with my location." Also, an additional condition such as "if a message including a phrase asking for location such as 'where' from mom" can be further configured.

The user device 100 may provide an interface for designating at least one target user device 200 generating event and mapping the information on at least one target device 200 (e.g., phone number, name, and nickname) to the rule. The rule may be predefined and input or redefined by the user if necessary anytime anywhere, and the instruction for executing the rule may be input through a given interface in the form of speech, text, or gesture. Then the user device 100 may map the instruction to the defined rule and store the mapping information.

In the state in which the rule has been defined, the user may execute the rule with the predefined instruction (e.g., speech, text, and gesture), whenever necessary. For example, the user may input the corresponding instruction as a speech input (e.g., "protection mode", "after school", and "I will come home from school") on the way home from school (institute) in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. It is preferred that the speech and text instructions are the natural language-based instructions as described above. When the user intends to make a speech input, the user may take a preliminary action (e.g., turning on the microphone 143) for notifying the user device 100 of the use of speech input for executing the rule in advance.

The user device 100 may recognize and parse the speech input to execute the rule indicated by the speech input. The user device 100 may also detect the fulfillment of the condition (situation).

For example, the user device 100 may detect the fulfillment of condition1 such as "protection mode" specified in the defined rule and check condition3 such as receipt of text message (text message including specific condition such as "where") from condition2 such as a designated target device 200 according to condition1. The user device 100 also may perform action2 of acquiring the photo information through auto-shooting according to action1. The user device 100 also may perform action3 of activating the location positioning module 117. The user device 100 also may perform action4 of acquiring the location information on the user device 100. The user device 100 also may perform actions of transmitting the photo information and location information acquired through action1 to action4 to the target user device 200.

If the location information transmitted by the user device 100 is received, the target user device 200 may perform feedback of ambient photo information and location information on the user device through a predetermined interface. For example, the target user device 200 may display the user device location on a map image as shown in FIG. 11.

Although not shown in FIG. 11, the photo information around the location of the user device 100 may be acquired from an external server. For example, if the user device 100 captures a photo in the pocket of the user, the photo may be blackout one other than an intended scene photo (e.g., ambient photo). Accordingly, the user device 100 has to analyze the capture photo and check (e.g., determine) whether the user device 100 is in a pocket based on the ambient condition of the user device 100 (e.g., using a luminance sensor) to determine whether the photo is taken in the normal state. The user device 100 may be configured with the conditions and action to operate in such a way of acquiring the ambient photos around the user device's current location from an external server if the photo has been taken in an abnormal state.

FIG. 11 shows an exemplary case in which the owner of the user device 100 inputs the instruction for executing the rule. However, a child user may not execute the rule in dexterity. By taking notice such a situation, it is preferred to allow a parent to execute the rule remotely to monitor the location of the child continuously. For example, configuring a rule such as "execute protection mode and inform of my location upon receipt of text message such as 'where' from mom" may be possible. If a message including 'where' from a target user device 200, then the user device 100 checks (e.g., determines) whether the user device 100 operates in the protection mode and, if so, performs the above-described operation. Otherwise, if the user device 100 is not in the protection mode, the user device 100 executes the protection mode and performs the above-described operation.

As described above, the CAS service according to the exemplary embodiment of FIG. 11 makes notifying one user (parent) of an event triggered by location and ambient environment of the other user (child) efficiently and quickly possible. The user (parent) may also acquire the information on the location, moving path, and ambient environment of the other user (child).

Figure 12:
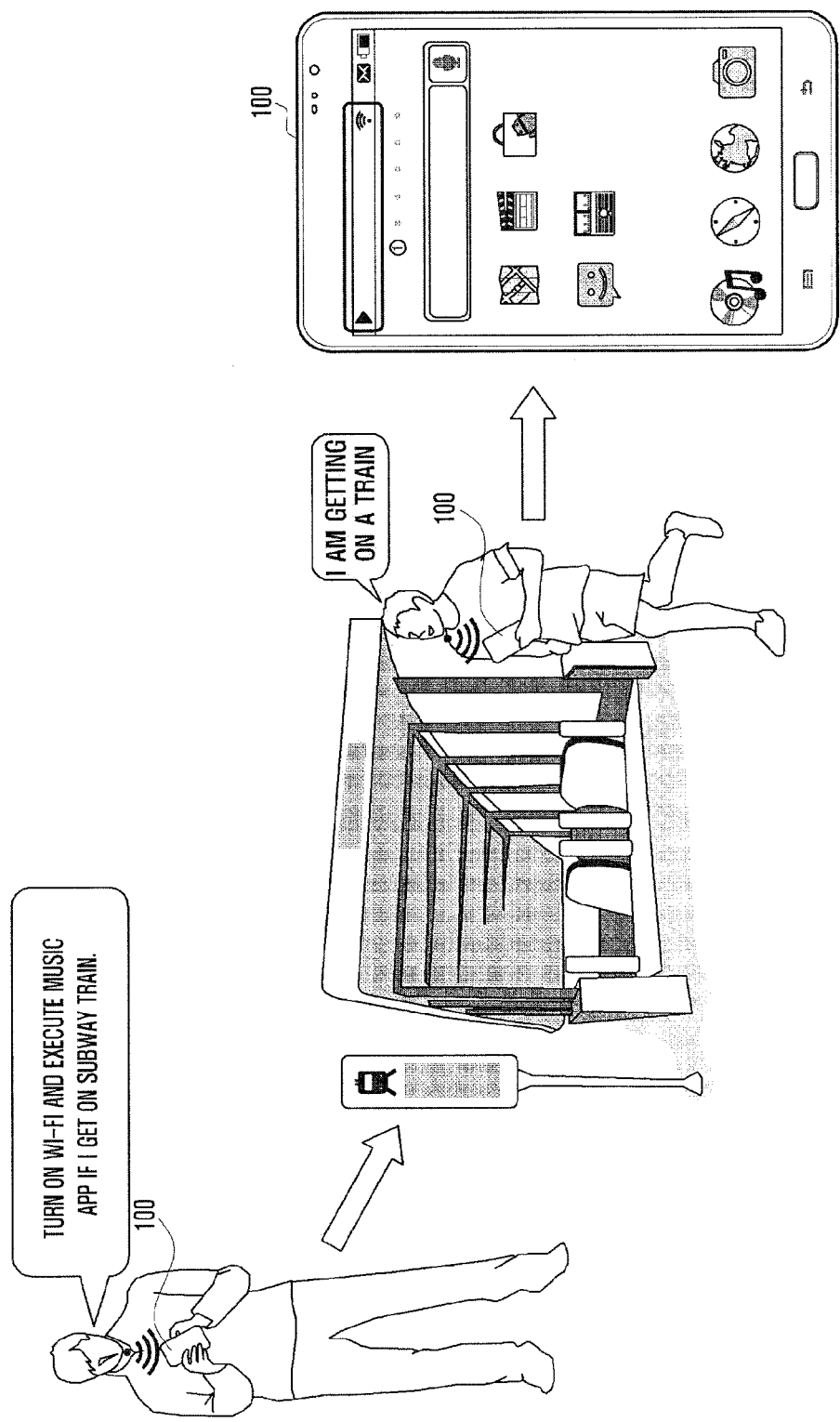
FIG. 12 is a diagram illustrating an exemplary situation of providing CAS using a user device according to an exemplary embodiment of the present invention.

FIG. 12 is a diagram illustrating an exemplary situation of providing CAS using a user device according to an exemplary embodiment of the present invention.

FIG. 12 shows an exemplary situation in which the user configures and executes a rule through speech input such that the user device 100 monitors to detect fulfillment of the condition specified in the rule and executes a the corresponding action when the condition is fulfilled. As illustrated in FIG. 12, the user may define the rule of controlling a specific function of the user device 100 in a specific environment. The user device 100 executes the rule according to the user input and executes the action of processing a specific function of the sure device as defined in the execution rule.

Referring to FIG. 12, the user may define a rule using the user device 100. For example, the user may activate the function (or application) capable of generating a rule by manipulating the user device 100 and define the rule for executing plural functions (applications) in a specific environment. According to an exemplary embodiment of the present invention, the user may generate a rule such as "turn on Wi-Fi and execute music APP if getting on a subway train." The rule may be generated by speech input through the microphone 143 or text input through the input unit 120 or touchscreen 130. The speech and text input may be made with a natural language. In the case of FIG. 12, the situation to be detected (e.g., condition), may be "if getting on a subway train" specified by the user explicitly, and the action to be taken in fulfillment of the condition may be "turn on Wi-Fi and execute music APP."

The user device 100 may provide the interface for selecting plural actions (e.g., functions and applications) in fulfillment of the corresponding function such that the user may select plural actions in defining the rule. For example, if the user enters "subway" as a condition of the rule, the user device 100 may display a list (action list) of actions (e.g., functions and applications) capable of being executed in association with condition "subway" to receive a user input for selecting an action (e.g., Wi-Fi turn-on and music application execution) to be executed from the action list. As described above, the rule may be predefined or generated and redefined by the user in real time, whenever necessary, anytime anywhere.

In the state in which the rule has been defined, the user may activate and/or execute the rule using the defined instruction (e.g., speech, text, and gesture) whenever necessary. For example, the user may make an instruction (e.g., speech input such as "get on a subway train", "subway", and "subway mode") before or upon getting on the subway train to execute the predefined rule as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. It is preferred that the speech and text instructions are the natural language-based instructions as described above. As described above, when the user intends to make a speech input, the user may take a preliminary action (e.g., turning on the microphone 143) for notifying the user device 100 of the use of speech input for executing the rule in advance.

The user device 100 may recognize and parse the speech input to execute the rule indicated by the speech input. The user device 100 may also detect the fulfillment of the condition (situation). For example, the user device 100 may detect the fulfillment of condition1 such as "get on a subway train" specified in the defined rule and execute action1 of turning on the Wi-Fi and action2 executing the music application. The user device 100 may process signals exchanged for establishing Wi-Fi connection and playback of a music file as action1 and action2.

If the rule is executed and the condition specified in the rule is fulfilled (e.g., getting on a subway train), the user device 100 turns of the Wi-Fi function and executes the music application with the feedback of the execution result. For example, as shown in FIG. 12, the user device 100 may display indication of Wi-Fi turn-on state and output sound as a consequence of music playback.

According to the exemplary embodiment of FIG. 12, the user may make a speech input or behavior input when the condition specified in the currently running rule is fulfilled to execute plural actions associated with the condition.

Figure 13:
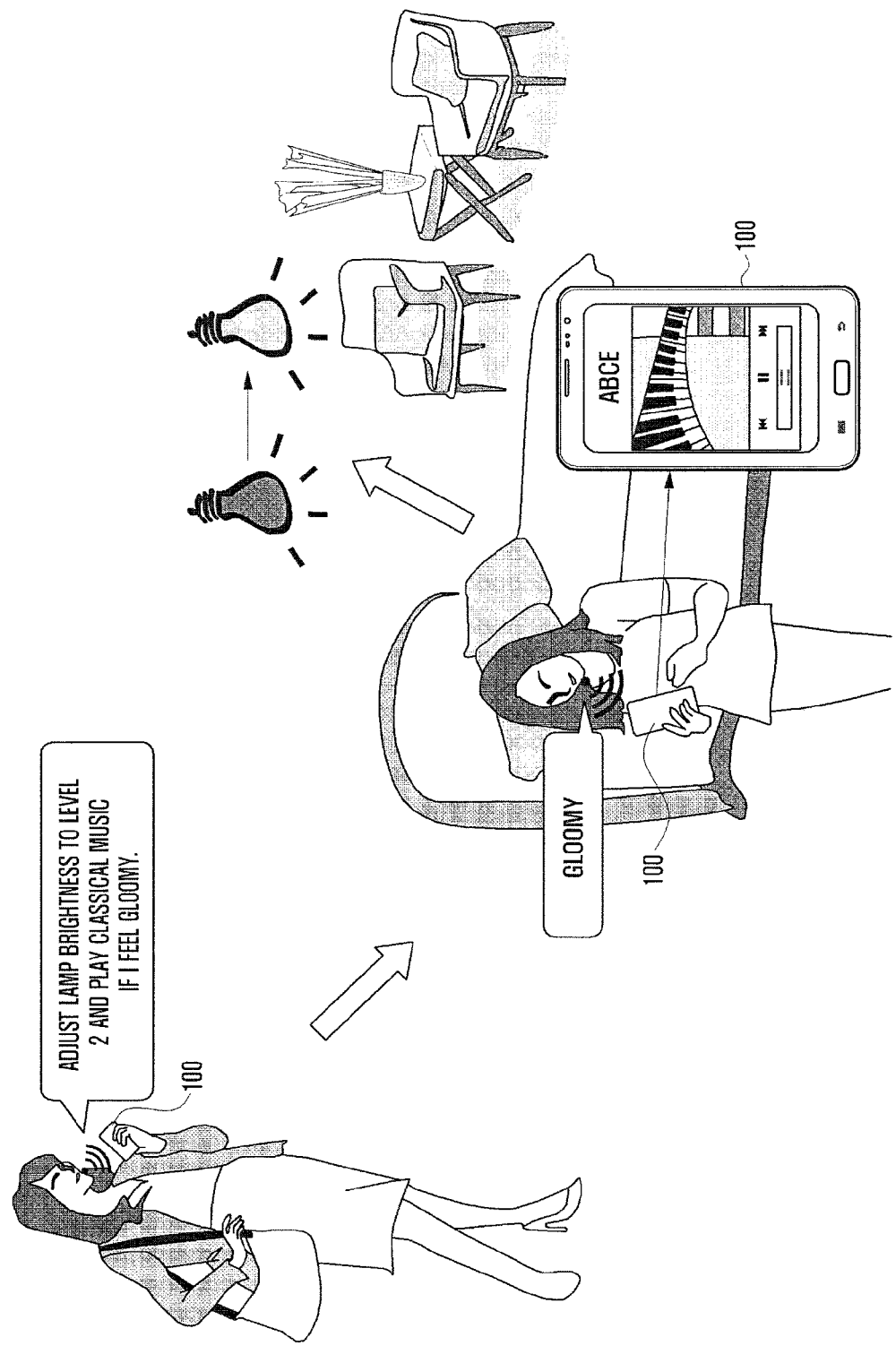
FIG. 13 is a diagram illustrating an exemplary situation of providing CAS using a user device according to an exemplary embodiment of the present invention.

FIG. 13 is a diagram illustrating an exemplary situation of providing CAS using a user device according to an exemplary embodiment of the present invention.

FIG. 13 shows an exemplary situation in which the user configures and executes a rule through natural language-based speech or text input such that the user device 100 monitors to detect fulfillment of the condition specified in the rule and execute the corresponding action when the condition is fulfilled. For example, when a rule is activated, the user device 100 monitors to detect a context corresponding to a condition of the activated rule. If the context is detected, the user device executes the action corresponding to the condition of the rule. As illustrated in FIG. 13, the user may define an abstract condition such that the sure device 100 executes the rule according to the user input and controls processing specific function specified in the rule and communication with an external device (or an object capable of communication with the user device 100 or to which a device capable of communicating the user device 100 is attached).

Referring to FIG. 13, the user may define the rule using the user device 100. For example, the user may activate the function (or application) capable of generating a rule by manipulating the user device 100 and define the rule for executing plural functions (user device's functions and external device's function) specified to be executed in a specific environment.

According to an exemplary embodiment of the present invention, the user may generate a rule such as "adjust lamp brightness to level 2 and play classical music if gloomy." At this time, the rule may be generated by speech input through the microphone 143 or text input through the input unit 120 or touchscreen 130. The speech and text input may be made with a natural language. In the case of FIG. 13, the situation to be detected (e.g., condition), may be "if gloomy" and the action to be taken in fulfillment of the condition may be "adjust lamp brightness to level 2 and play classical music if gloomy."

At this time, the user device 100 may provide an interface for the user to select plural actions (e.g., user device's function control and external device function control) for execution in determining the rule according to the sure request. For example, if the user inputs "gloomy" as the condition specified in the rule, the user device 100 may display a list of actions executable in association with the condition "gloomy" to prompt the user to select an action (e.g., lamp brightness control, music application execution, and classic music playback) from the action list. The rule may be predefined or generated and redefined by the user in real time, whenever necessary, anytime, anywhere.

In the state in which the rule has been defined, the user may execute the rule using the defined instruction (e.g., speech, text, and gesture) whenever necessary. For example, the user may make an instruction (e.g., speech input such as "gloomy", "tired", and "gloomy mode") to execute the predefined rule as in the exemplary case of FIGS. 5A to 5E. Although the description is directed to the case in which the instruction is the speech instruction input through the microphone 143, the instruction may be input in the form of text by means of the input unit 120 or touchscreen 130 or in the form of gesture. It is preferred that the speech and text instructions are the natural language-based instructions as described above. As described above, when the user intends to make a speech input, the user may take a preliminary action (e.g., turning on the microphone 143 with function key or execution button of a widget) for notifying the user device 100 of the use of speech for executing the rule in advance.

The user device 100 may recognize and parse the speech input to execute the rule indicated by the speech input. The user device 100 may also detect the fulfillment of the condition (situation). For example, the user device 100 may detect the fulfillment of condition such as "gloomy" specified in the defined rule and execute action1 of adjusting the lamp brightness to level 2 by controlling an external device and action2 executing the music application to perform complete action3 of playing classical music.

In the exemplary case of FIG. 13, if the external device (e.g., the living room lamp or other external device to which the user device 100 has permission to communicate and/or control) is capable of communicating with the user device 100, the external device may communicate with the user device 100 and the external device may be controlled directly by the user device 100 and, otherwise, indirectly using an auxiliary device (e.g., power control device having communication). According to an exemplary embodiment of the present invention, the user device 100 may communicate with the power control device capable of communication to adjust the brightness of the living room lamp.

If an instruction for executing the rule, the user device 100 may adjust the external lamp brightness and execute the music application simultaneously and feeds back the execution result. For example, as shown in FIG. 13, the user device 100 may adjust the brightness of the light lamp to level 2 and output the sound as a consequence of classical music playback and corresponding execution screen.

As described above, according to the exemplary embodiment of FIG. 13, the user may define an abstract condition and configure a rule to execute an action depending on the situation. According to an exemplary embodiment of the present invention, the user may define the user's condition such as "gloomy (or tired)" based on a natural language and provide feedback with the execution of an action in fulfillment of the condition.

Hereinabove, FIGS. 6 to 13 have been directed to the case in which the rule and instruction are defined and configured separately. However, according to various exemplary embodiments of the present invention, the instruction for executing the rule may be extracted from the predefined rule without extra definition.

Suppose that a rule such as "if I get in a taxi, send my location to father and little brother (sister) at every 5 minutes" is defined as in the exemplary case of FIG. 7. If the user device 100 recognizes "if I get in a taxi" in the rule, the user device 100 may extract associative instructions (or associative word or command having high relationship with the words in the rule defined as commands for execution of the rule) such as "take taxi now," "taxi," and "taxi mode." For example, the user may execute the rule just by inputting an associative command such as "take taxi now," "taxi," and "taxi mode" in the state in which the rule has been defined without designation of a certain command.

Suppose that a rule such as "if a text is received from wife at the wheel, send my current location information" is defined as in the exemplary case of FIG. 8. The user device 100 recognizes "at the wheel" in the rule and extracts associative commands of "I will drive," "drive," and "driving move" to execute the rule. For example, the user may execute the rule with the input of any of the associative commands "I will drive," "drive," and "driving move" in the state in which the rule has been defined without designation of a certain command.

If any associative command is input, the user device 100 may search the predefined rules for anyone matching the command to execute the corresponding rule.

The operations described with reference to FIGS. 7 and 8 may be applied to the exemplary cases of FIGS. 6 and 9 to 13. For example, an associative command such as "I will drive," "drive," and "driving move" may be input in association with the rule defined in the situation of FIG. 9; an associative command such as "medicine," "check medicine bottle whereabouts," and "medication time" may be input in association with the rule defined in the situation of FIG. 10; an associative command such as "protection mode," "after school," and "I will go home" may be input in association with the rule defined in the situation of FIG. 11; an associative command such as "get on subway train," "subway," or "subway mode" may be input in association with the rule defined in the situation of FIG. 12; and an associative command such as "gloomy" and "tired" may be input in association with the rule defined in the situation of FIG. 13. Accordingly, the user device 100 may execute the corresponding rule based on the associative command corresponding to the predefined rule without defining ay extra command.

Figure 14A:
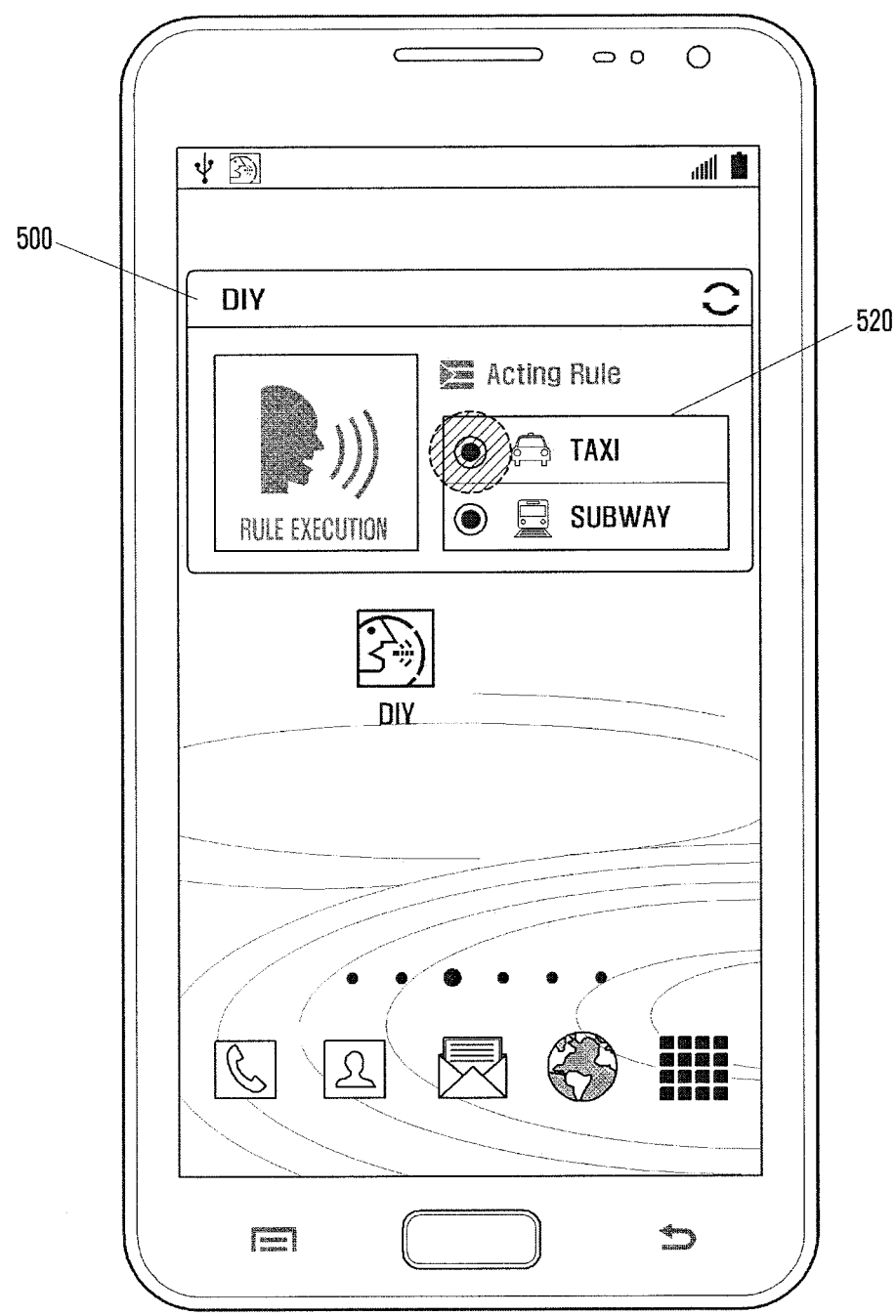
FIGS. 14A and 14B are diagrams illustrating exemplary screens for explaining operations of stopping a currently running rule temporarily in a user device according to an exemplary embodiment of the present invention.
Figure 14B:
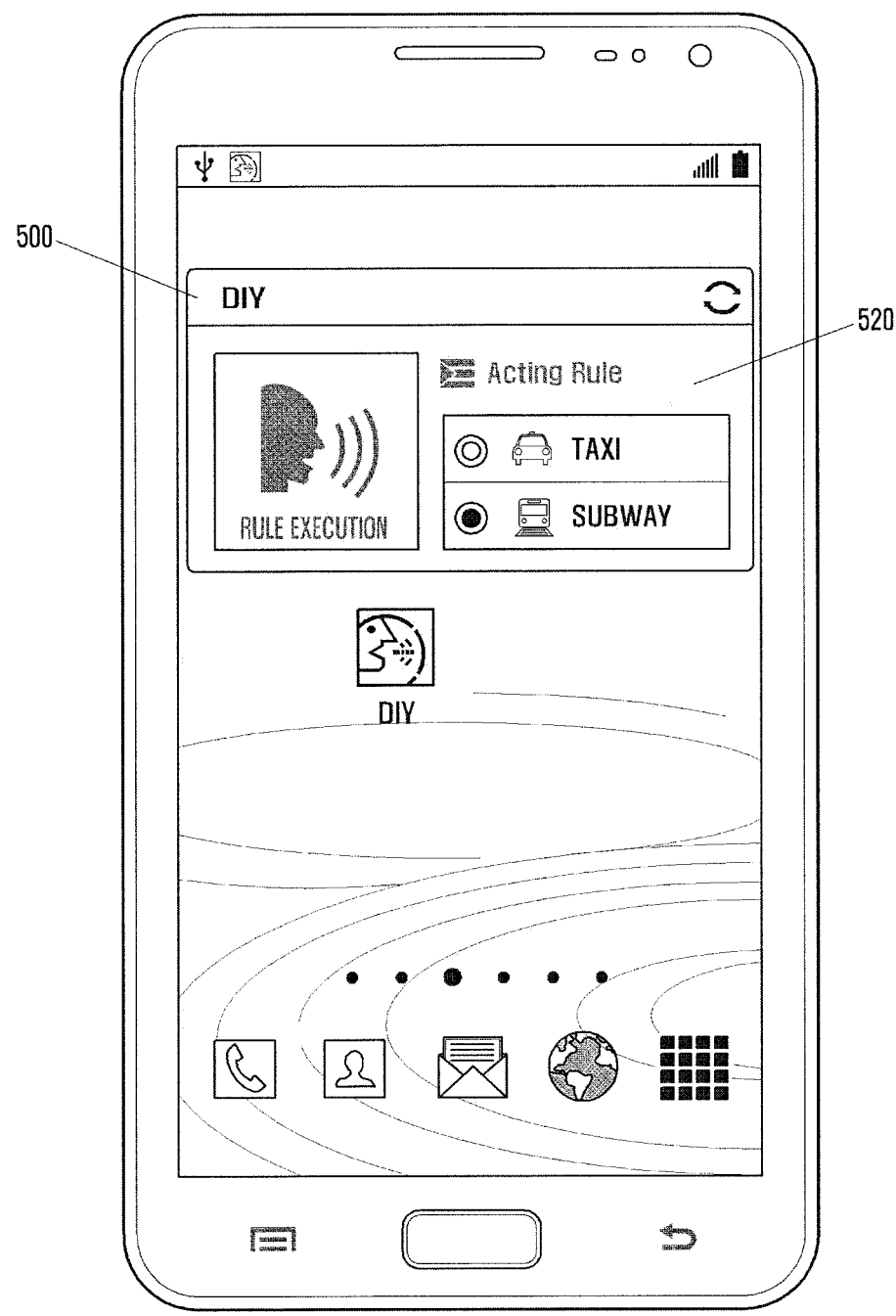

FIGS. 14A and 14B are diagrams illustrating exemplary screens for explaining operations of stopping a currently running rule temporarily in a user device according to an exemplary embodiment of the present invention.

FIG. 14A shows an exemplary screen of the user device 100 in which a CAS widget 500 is provided with an execution information region 520 listing the currently running rules.

FIG. 14A is directed to an exemplary case in which "taxi" and "subway" rules are running currently. The user may stop a certain rule by selecting the rule from the execution information region 520 of the widget 500. For example, in the state of FIG. 14a, the user may select (e.g., make touch gesture of tap) the "taxi" rule. Then the user device 100 stops the rule (e.g., taxi) temporarily in response to the user's selection among the currently running rules (e.g., taxi and subway) as shown in FIG. 14B.

In this case, the user device 100 may change a marking to the rule stopped temporarily. According to an exemplary embodiment of the present invention, the user device 100 may change the state indication mark of the rule of "taxi" from the enabled state mark to the disabled state mark as shown in FIG. 14B. For example, each of the rules listed in the execution information region 520 of the widget 500 is provide with a state indication button indicating whether the corresponding rule is enabled or disabled.

According to an exemplary embodiment of the present invention, the widget 500 may indicate the currently running rules and may stop each rule temporarily according to the user input. Accordingly, stopping the operation of a rule taking a repetitive action (e.g., action checking a condition or sending a text message periodically) whenever necessary according to the user's intention so as to improve usability is possible.

Figure 15A:
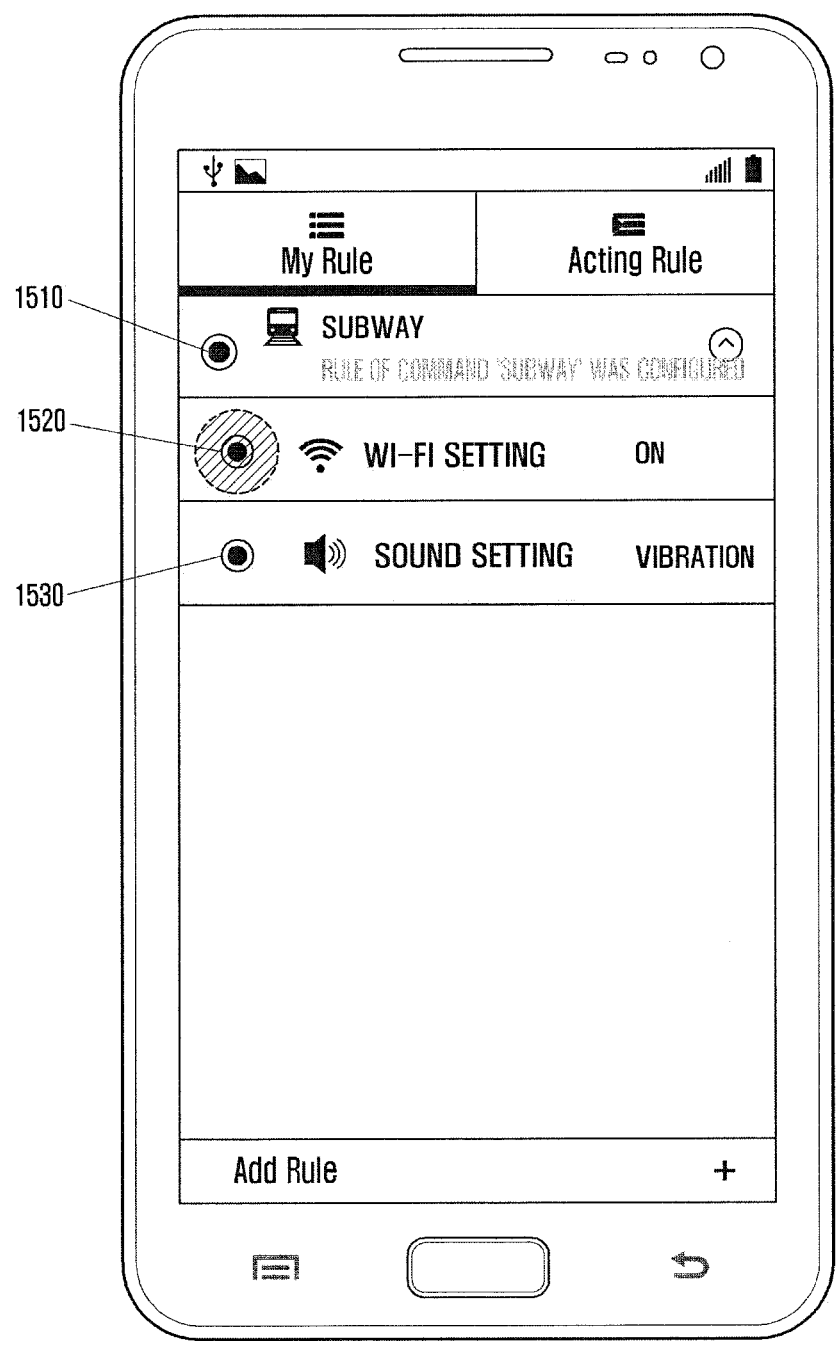
FIGS. 15A and 15B are diagrams illustrating exemplary screens for explaining operations of stopping a currently running rule temporarily in a user device according to an exemplary embodiment of the present invention.
Figure 15B:
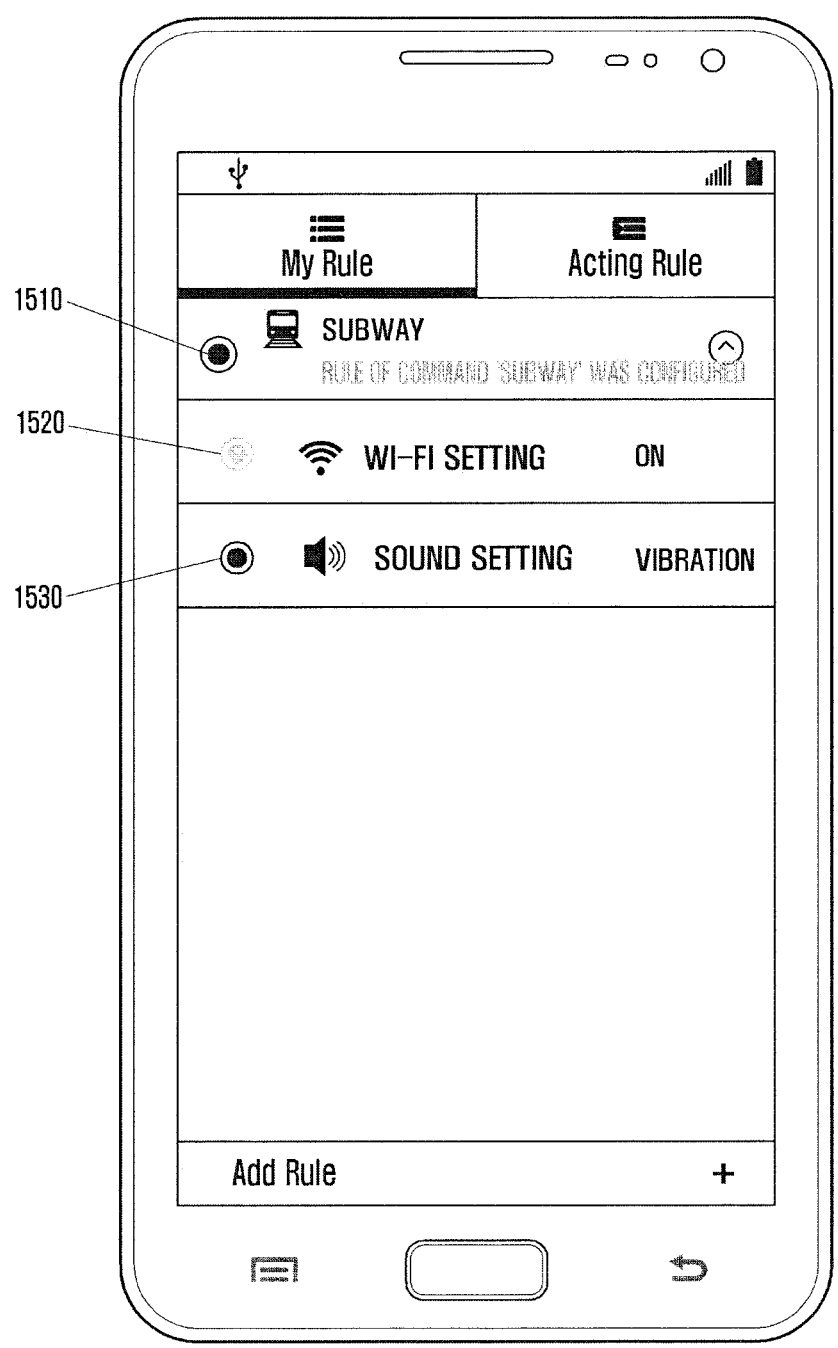

FIGS. 15A and 15B are diagrams illustrating exemplary screens for explaining operations of stopping a currently running rule temporarily in a user device according to an exemplary embodiment of the present invention.

FIGS. 15A and 15B shows the screens of the user device 100 when the CAS application (e.g., rule list) is executed according to an exemplary embodiment of the present invention.

Referring to FIGS. 15A and 15B, the rule "subway" is currently running, the detailed information specified in association with the selected rule presented in a full-down window. For example, the user may select the rule item 1510 to check the detailed information of the corresponding rule (e.g., conditions and actions) 1520 and 1530, e.g., "Wi-Fi setting: On" and "sound setting: vibration"

In the state of FIG. 15A, the user may select one of the plural action items 1520 and 1530 specified in one rule to stop running temporarily. For example, the user may select the "Wi-Fi setting" item 1520 among the actions, e.g., Wi-Fi setting item 1520 and sound setting item 1530, of the rule "subway" 1510. Then the user device 100 stops the action (e.g., the Wi-Fi setting) corresponding to the item selected by the user among the actions of the currently running rule (e.g., "subway") 1510.

The user device 100 may change the state indication mark of the stopped action. For example, the user device 100 may change the state indication mark of the action of "Wi-Fi setting" from the enabled state mark to the disabled state mark as shown in FIG. 15B. For example, each of the actions 1520 and 1530 of the rule is provide with a state indication button indicating whether the corresponding action is enabled or disabled.

According to an exemplary embodiment of the present invention, when plural actions are running in association with one rule, stopping the respective actions listed in the current running action list selectively is possible.

Figure 16A:
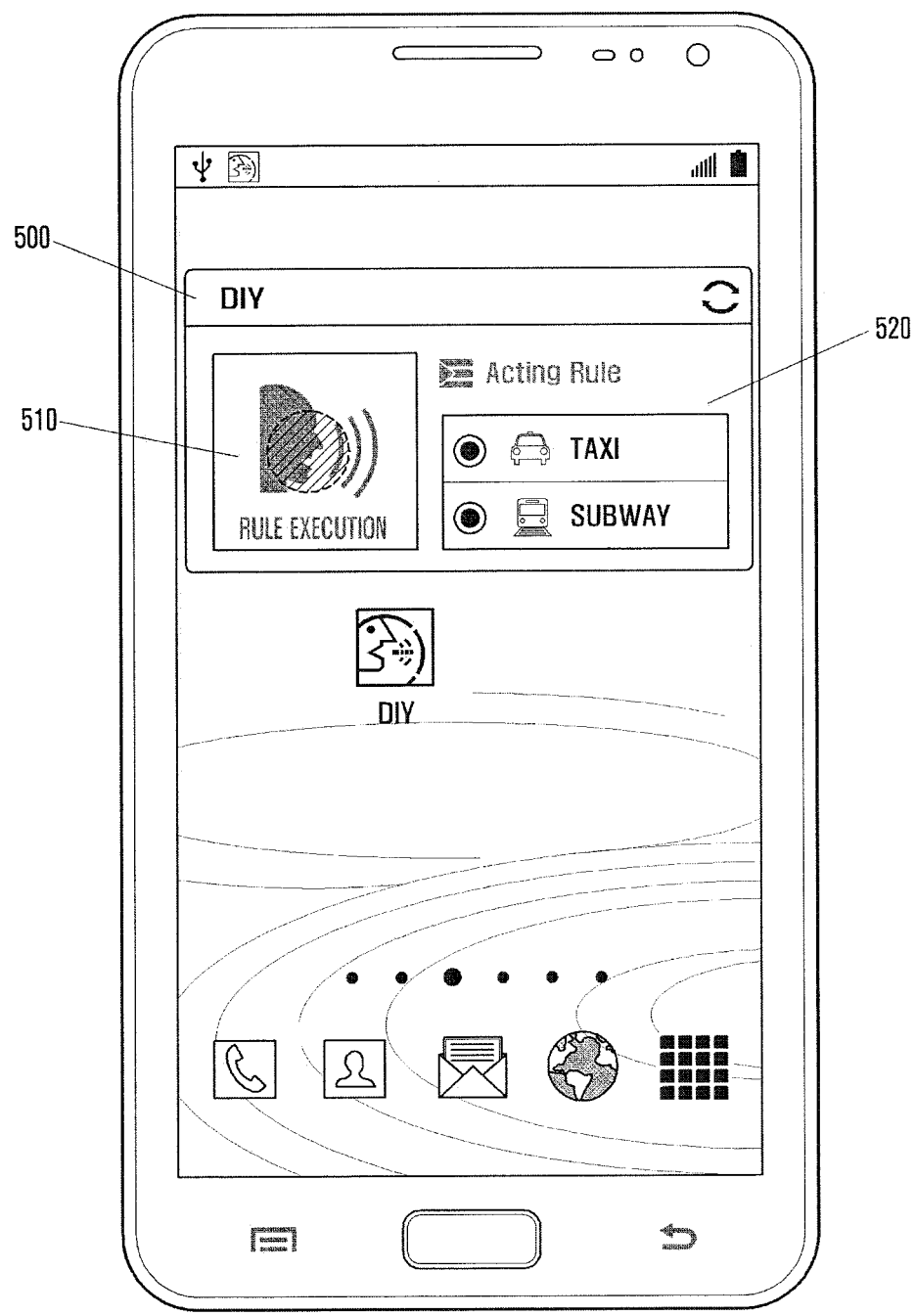
FIGS. 16A to 16C are diagrams illustrating exemplary screens for explaining operations of stopping currently running rule in a user device according to an exemplary embodiment of the present invention.
Figure 16B:
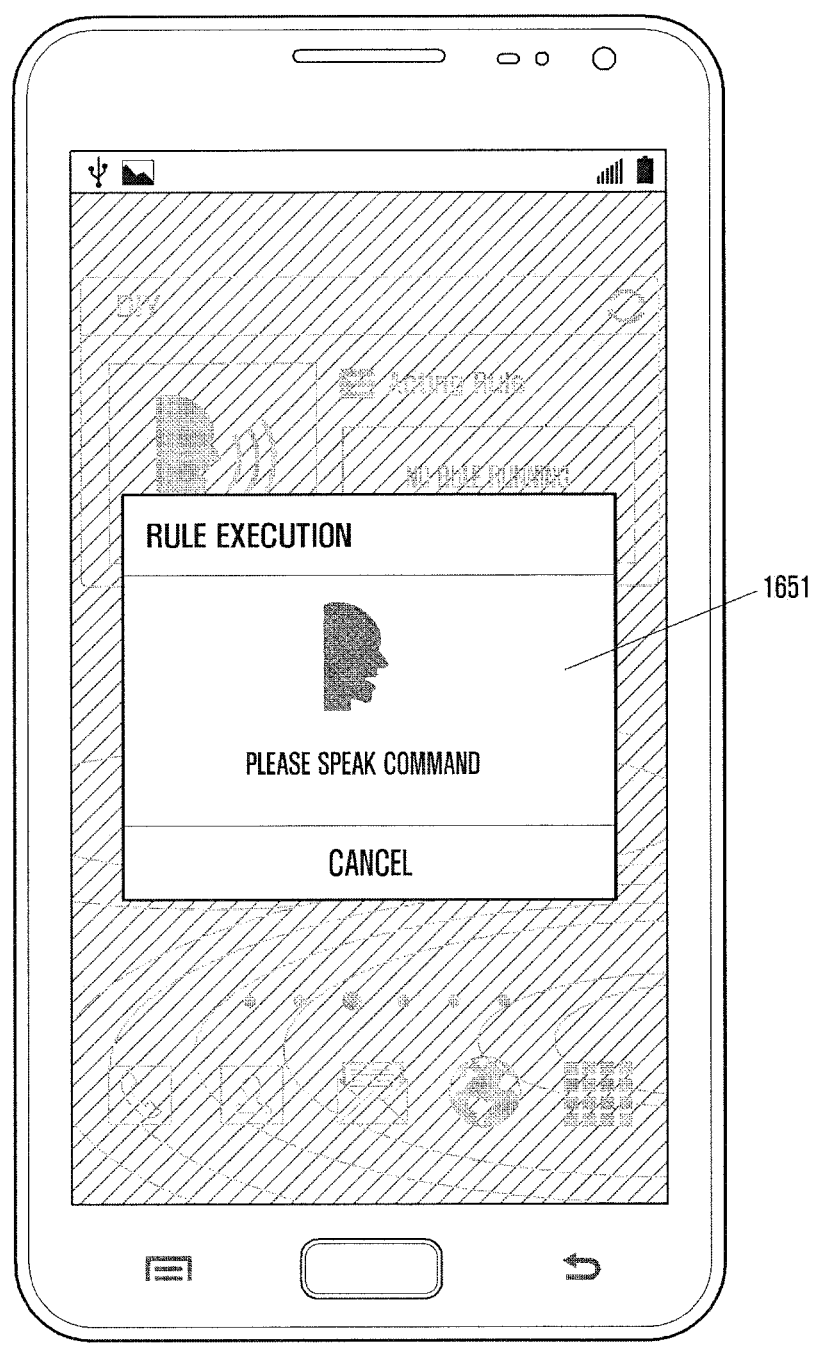
Figure 16C:
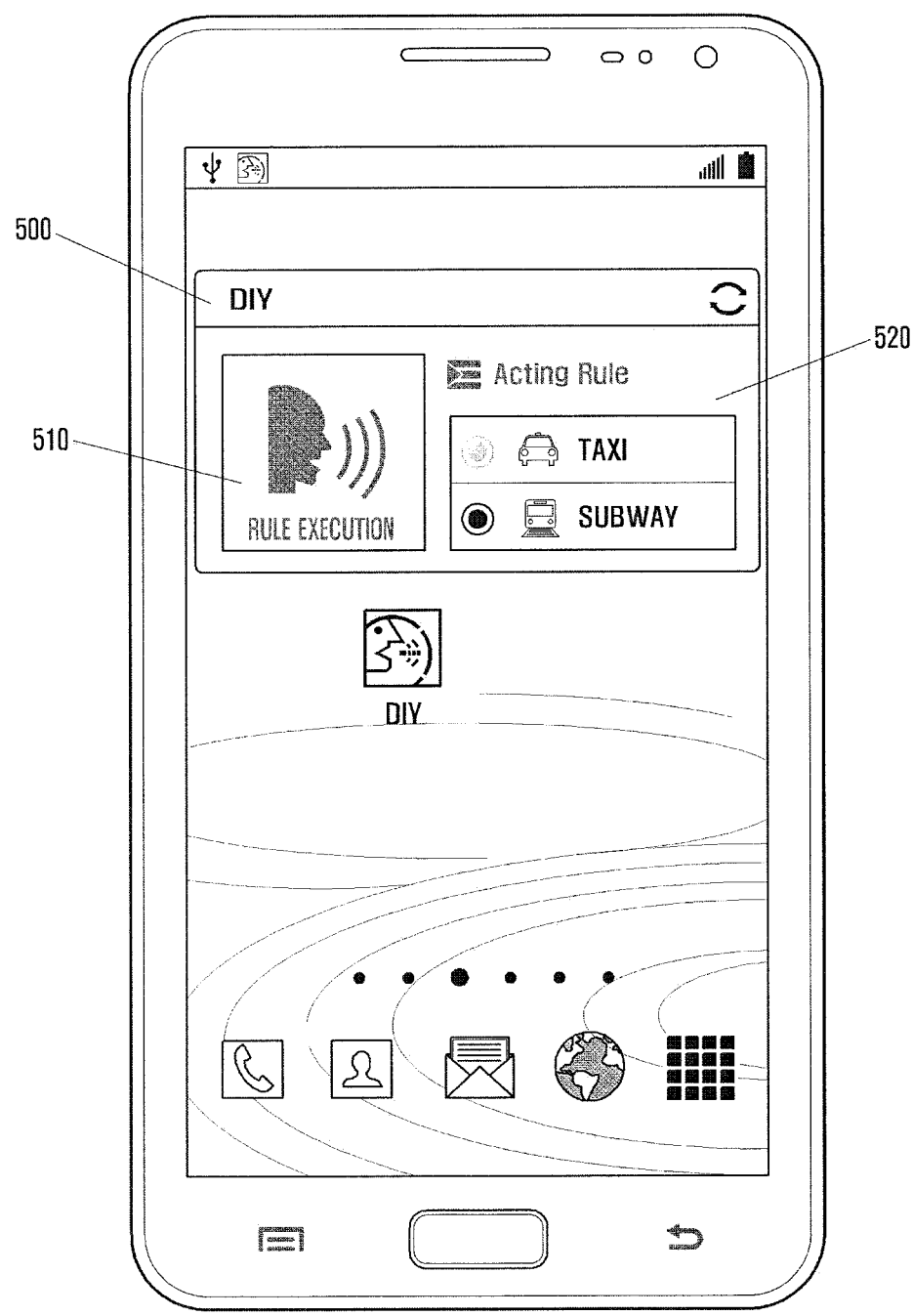

FIGS. 16A to 16C are diagrams illustrating exemplary screens for explaining operations of stopping currently running rule in a user device according to an exemplary embodiment of the present invention.

FIG. 16A shows an exemplary screen of the user device 100 which is displayed in the state where the CAS widget 500 is executed with the execution information region 520 presenting information on the currently running rules.

FIG. 16A is directed to an exemplary case in which the "taxi" and "subway" rules are currently running. The user may select (e.g. make a touch gesture of tap) an instruction input region (or rule execution button) 510 of the widget 500. Then the control unit 170 determines selection of the instruction input region 510 as the initiation of one of rule execution, temporary stop of the currently running rule, and termination of the currently running rule. FIGS. 16A to 16C are directed to an exemplary case of stopping the currently running rule temporarily. As shown in FIG. 16B, the user device 100 may displays a popup window 1651 prompting the user to input an instruction (e.g., speech input) for stopping a rule temporarily with a message (e.g., "please speak command"), and waits for user's speech.

In the state of FIG. 16B, the user may make a speech input (e.g., "stop taxi temporarily" for stopping a target rule (e.g., taxi). Then the control unit 170 may recognize the user's speech input and stop the rule (e.g., "taxi") corresponding to the speech among the currently running rules (e.g., "taxi" and "subway"). As shown in FIG. 16C, the control unit 170 may change the state indication mark of the rule (e.g., "taxi") selected in the execution information region 520 of the widget 500 by the speech input so as to be stopped temporarily.

According to an exemplary embodiment of the present invention, the control unit 170 may change the state indication mark of the "taxi" rule from the enabled state mark to the disable state mark in the execution information region 520 as shown in FIG. 16C. For example, FIG. 16C shows an exemplary screen of the user device 100 in the state in which a specific rule (e.g., taxi) is stopped temporarily in the execution information region 520 of the widget 500.

According to an exemplary embodiment of the present invention, the currently running rules are presented by means of the widget 500 and stopped temporarily according to the user's speech input (e.g. "stop OOO temporarily" where OOO may be a rule or a condition).

Figure 17:
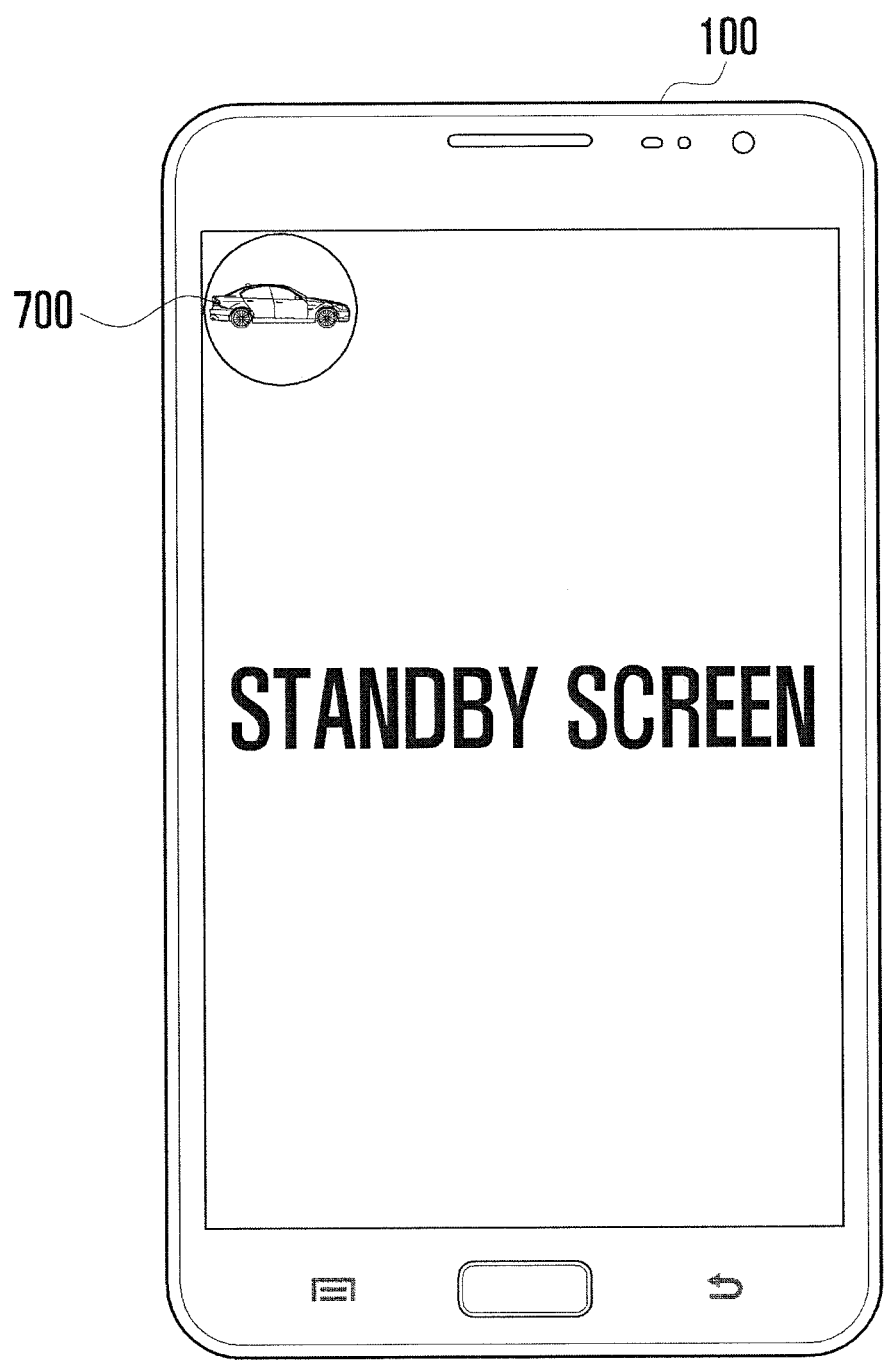
FIG. 17 is a diagram illustrating an exemplary screen with an indication of an execution rule in a user device according to an exemplary embodiment of the present invention.

FIG. 17 is a diagram illustrating an exemplary screen with an indication of an execution rule in a user device according to an exemplary embodiment of the present invention.

Referring to FIG. 17, when a rule is executed in response to the user request, the user device 100 may display a notification item 700 on the screen of the display panel 131. The notification item 700 may be provided in the form of an icon or text representing the executed rule. For example, if a driving-related rule is executed, the notification item 700 in the form of a car image (or text) may be provided at a part of the screen. Also, if a medicine-related rule is executed, the notification item 700 in the form of a medicine or medicine bottle image (or text) is provided at a part of the screen. According to various exemplary embodiments of the present invention, the currently running rule is notified to the user by means of the notification item 700 such that the user is aware of the currently running rule intuitively.

FIG. 17 is directed to an exemplary case in which the notification item 700 is provided at a part on the display panel 131. However, exemplary embodiments of the present invention are not limited thereto. The notification may be presented in the indicator region for providing various operation state information of the user device 100 as described with reference to FIG. 5E.

Figure 18A:
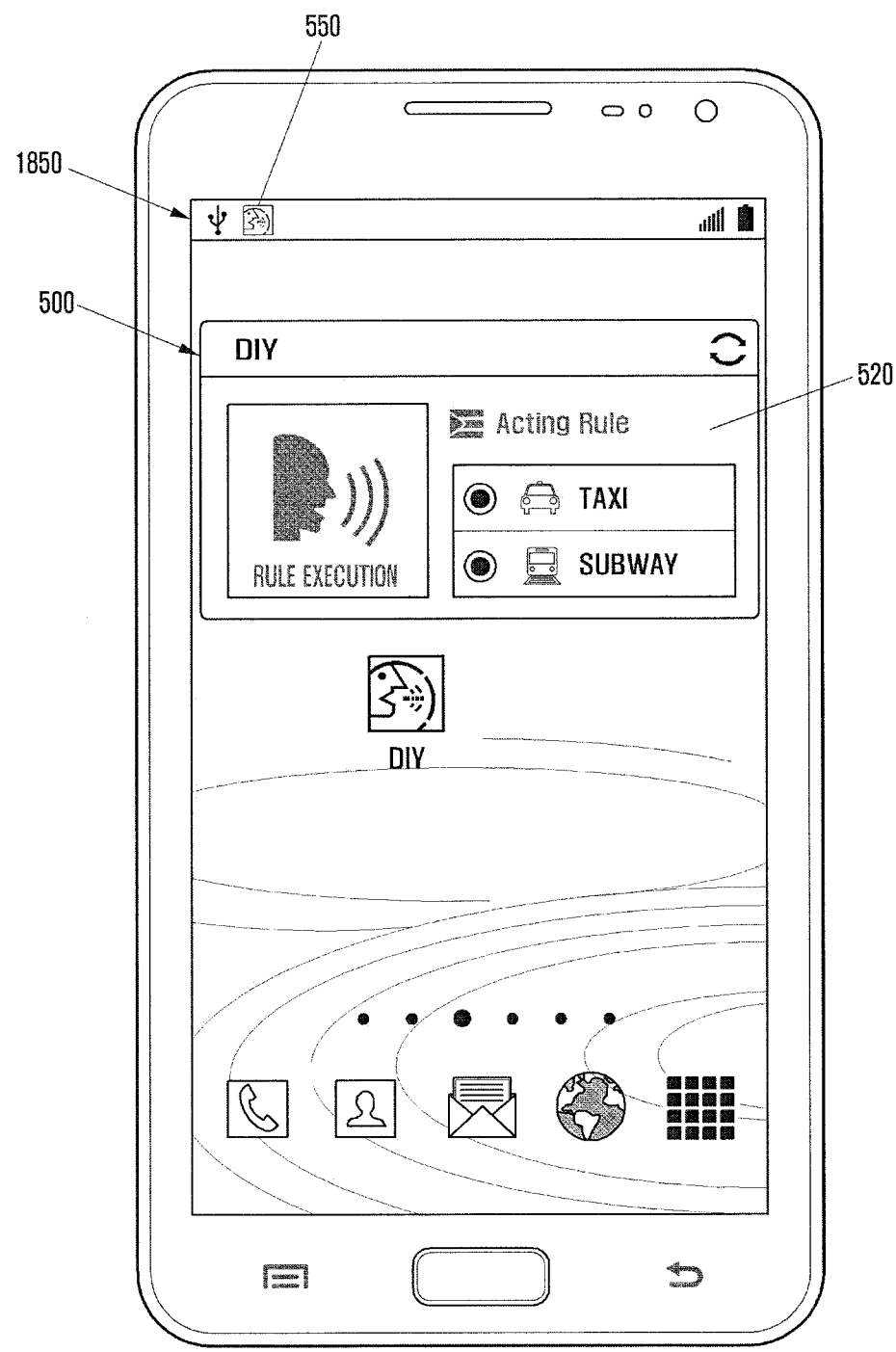
FIGS. 18A and 18B are diagrams illustrating exemplary screens with an item notifying of the rule(s) executed in a user device according to an exemplary embodiment of the present invention.
Figure 18B:
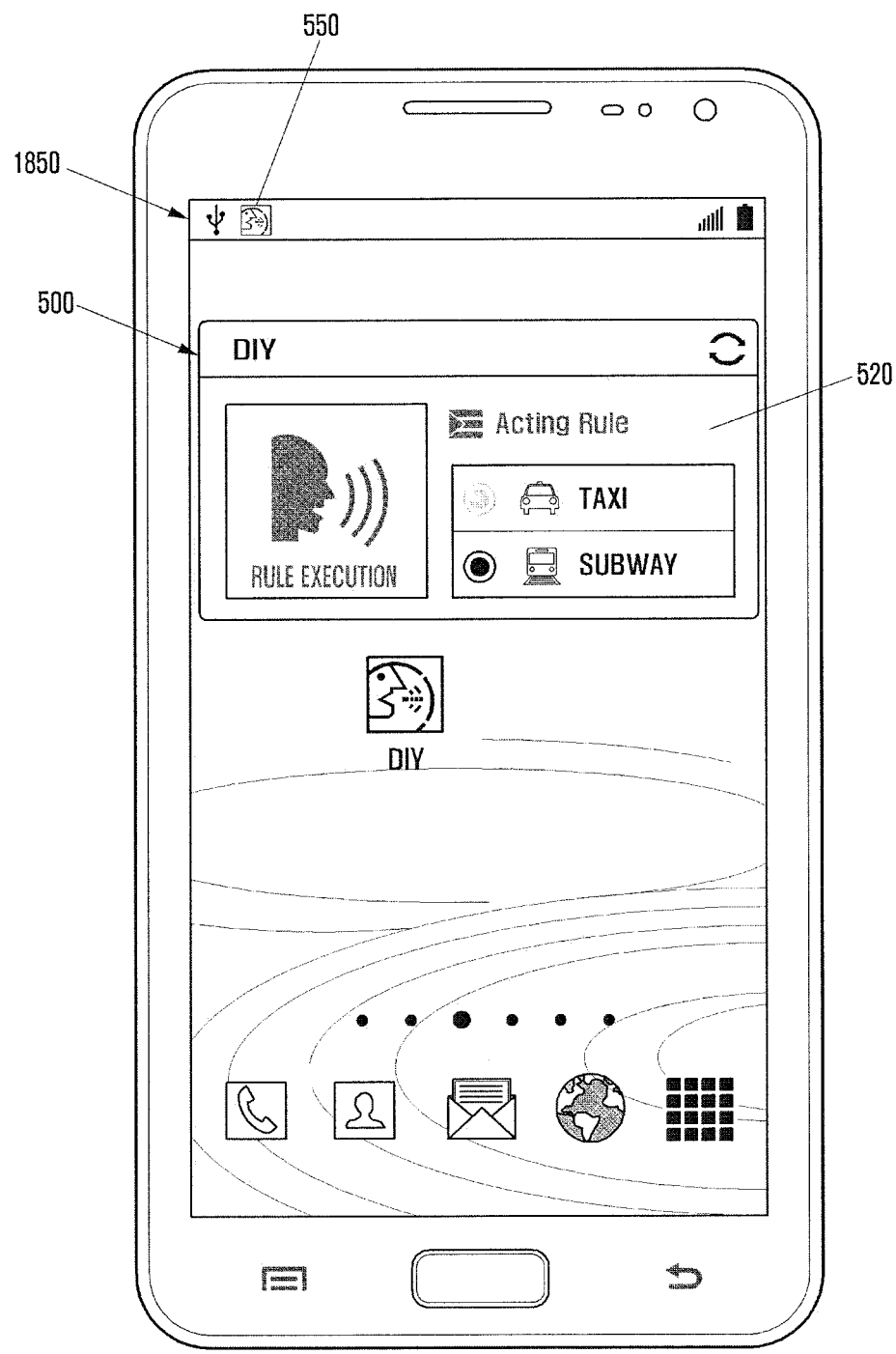

FIGS. 18A and 18B are diagrams illustrating exemplary screens with an item notifying of the rule(s) executed in a user device according to an exemplary embodiment of the present invention.

Referring to FIGS. 18A and 18B, the user device 100 may provide a notification item 550 at a part of the indicator region 1850 on the screen of the display panel 131. According to an exemplary embodiment of the present invention, the notification item 550 is presented at a left part of the indicator region 1850 to inform of the currently running rule.

Referring to FIGS. 18A and 18B, in various exemplary embodiments of the present invention, the notification item 550 may be presented when at least one rule is running currently.

Referring to the exemplary case of FIG. 18A, multiple rules (e.g., two rules of "taxi" and "subway") are running as shown in the execution information region 520 of the widget 500. Referring to FIG. 18B, one (e.g., "subway") of the rules (e.g., "taxi" and "subway" rules) listed in the execution information region 520 is enabled while the other rule (e.g., "taxi") is disabled (e.g., stopped temporarily as described in the exemplary embodiments).

According to various exemplary embodiments of the present invention, the device 100 may notify the user of the existence of at least on currently running rule using the notification item 550. However, exemplary embodiments of the present invention are not limited thereto. The notification item may be provided per rule. This means that multiple notification items may be presented in the indicator region 1850 in match with the number of the currently running items.

Figure 19A:
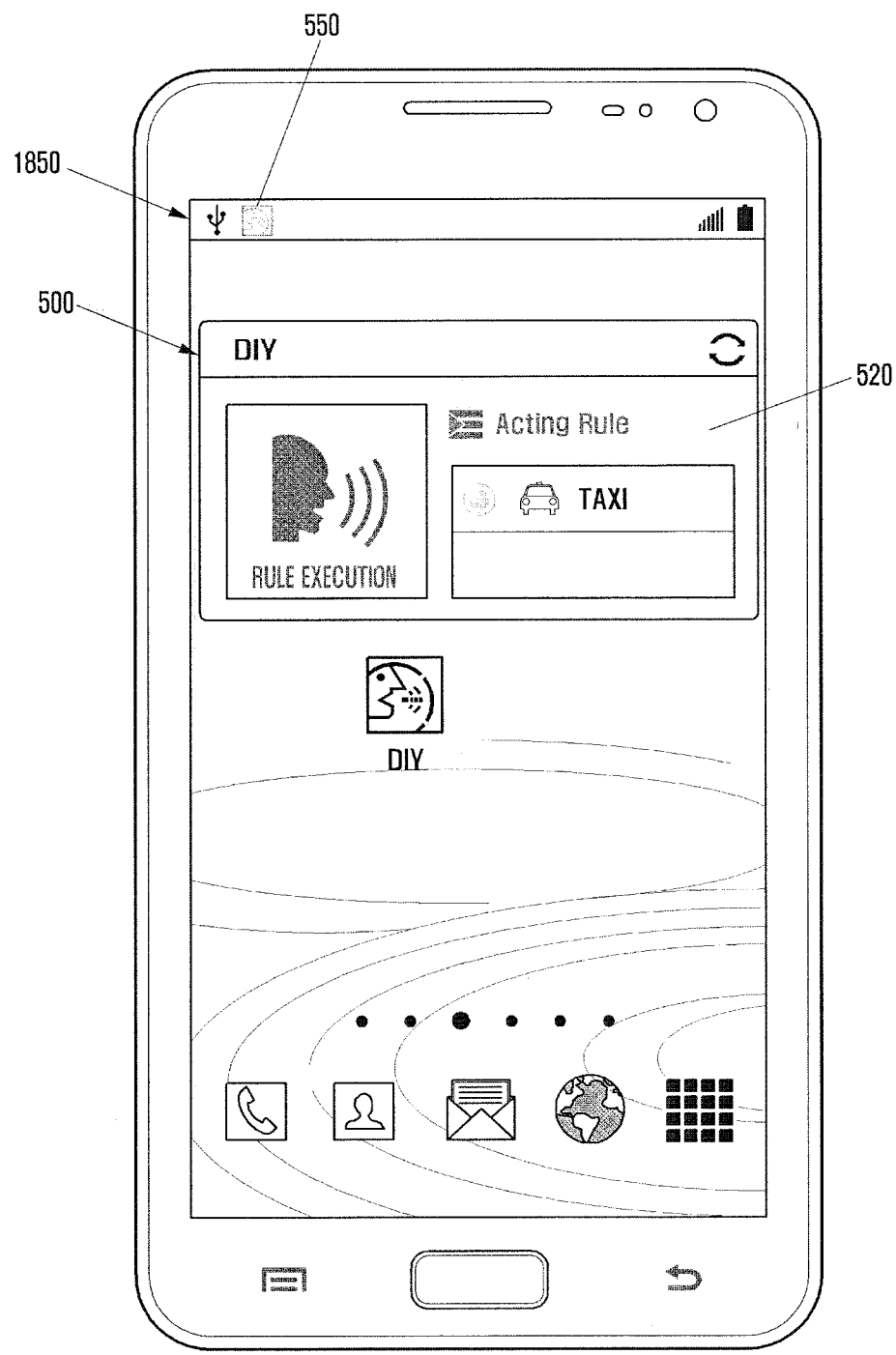
FIGS. 19A and 19B are diagrams illustrating exemplary screens with an item notifying of the rule(s) executed in a user device according to an exemplary embodiment of the present invention.
Figure 19B:
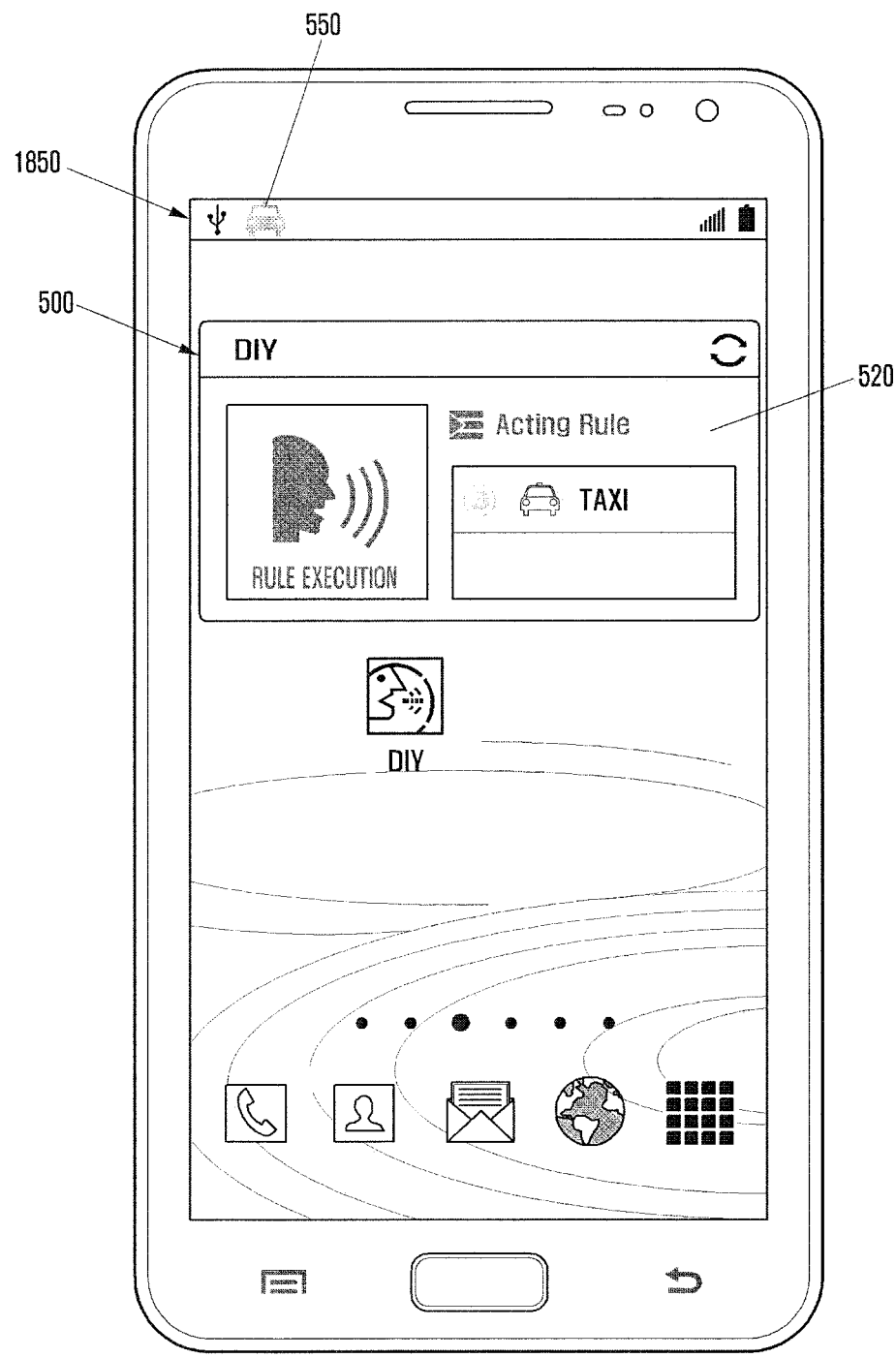

FIGS. 19A and 19B are diagrams illustrating exemplary screens with an item notifying of the rule(s) executed in a user device according to an exemplary embodiment of the present invention.

Referring to FIGS. 19A and 19B, when a rule is executed in response to the user request, the user device 100 may display a notification item 550 informing of the existence of current running rule(s) at the indicator region 1850 on the screen of the display panel 131. According to an exemplary embodiment of the present invention, if the currently running rule stops temporarily, the user device 100 may notifying of the existence of temporarily stopped rule using the corresponding notification item 550 of the indicator region 1850.

As shown in the exemplary case of FIG. 19A, if the currently running rule (e.g., taxi) is stopped temporarily by the user selection, the user device 100 switching the state of the notification item 550 to disabled state. The execution information region 520 of the widget 500 indicates that the tax rule is not currently running.

According to an exemplary embodiment of the present invention, as shown in FIG. 19B, the notification item 550 may be provided in the form of an icon representing the corresponding rule or an application execution icon. The icon may be presented in one of the enabled state icon and disabled state icon for intuitive indication.

Figure 20A:
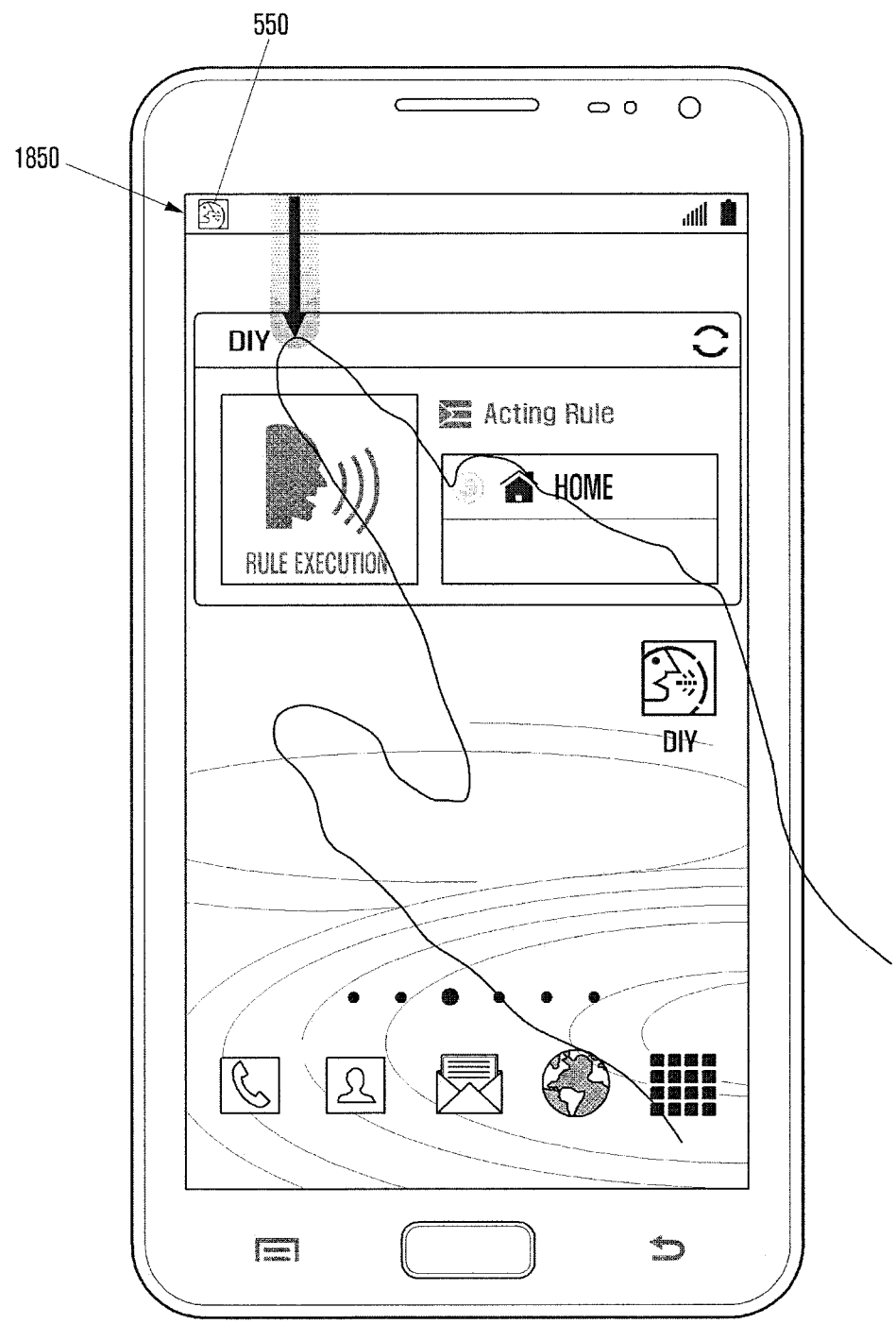
FIGS. 20A to 20C are diagrams illustrating exemplary screens with an item notifying of the rule(s) executed in a user device according to an exemplary embodiment of the present invention.
Figure 20B:
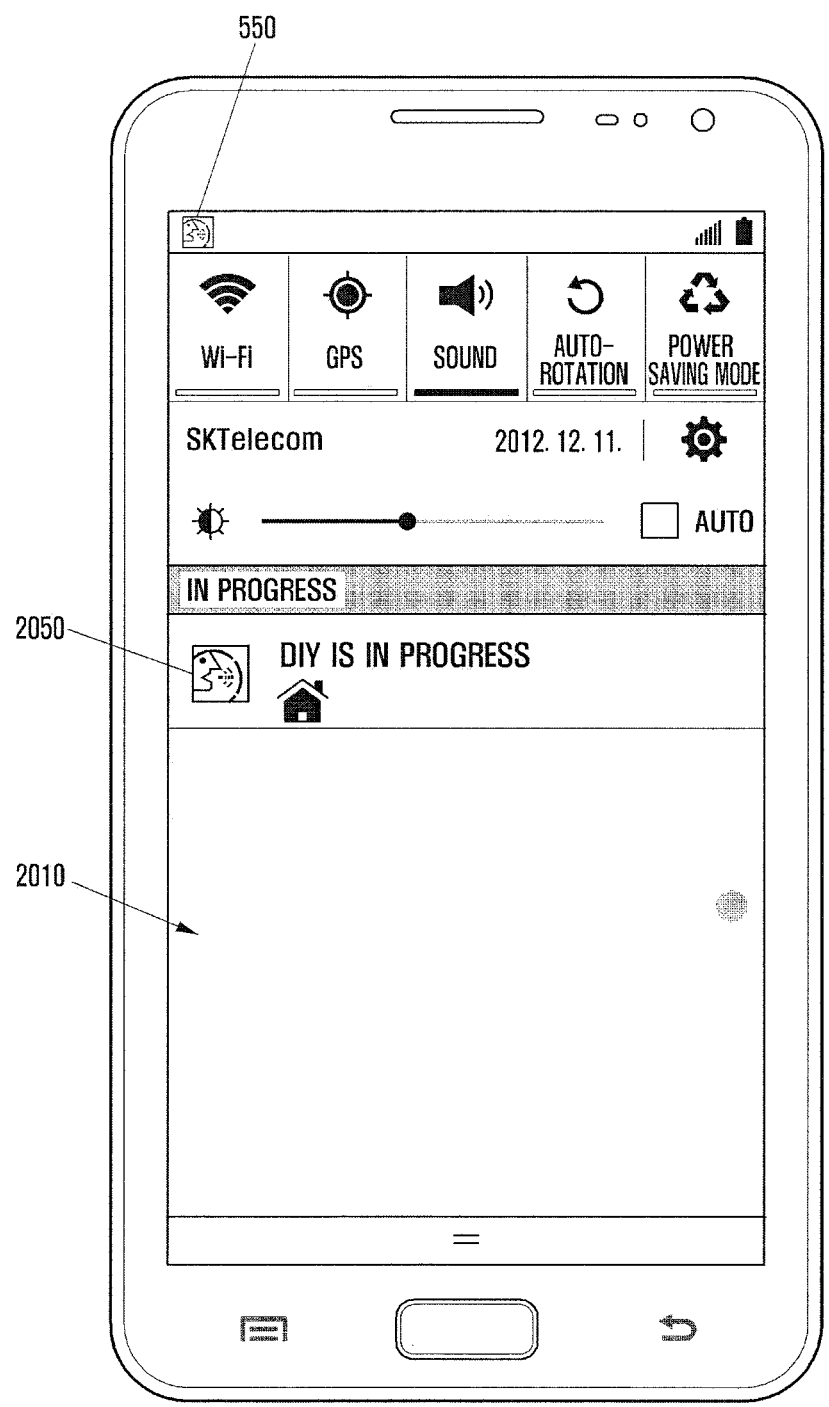
Figure 20C:
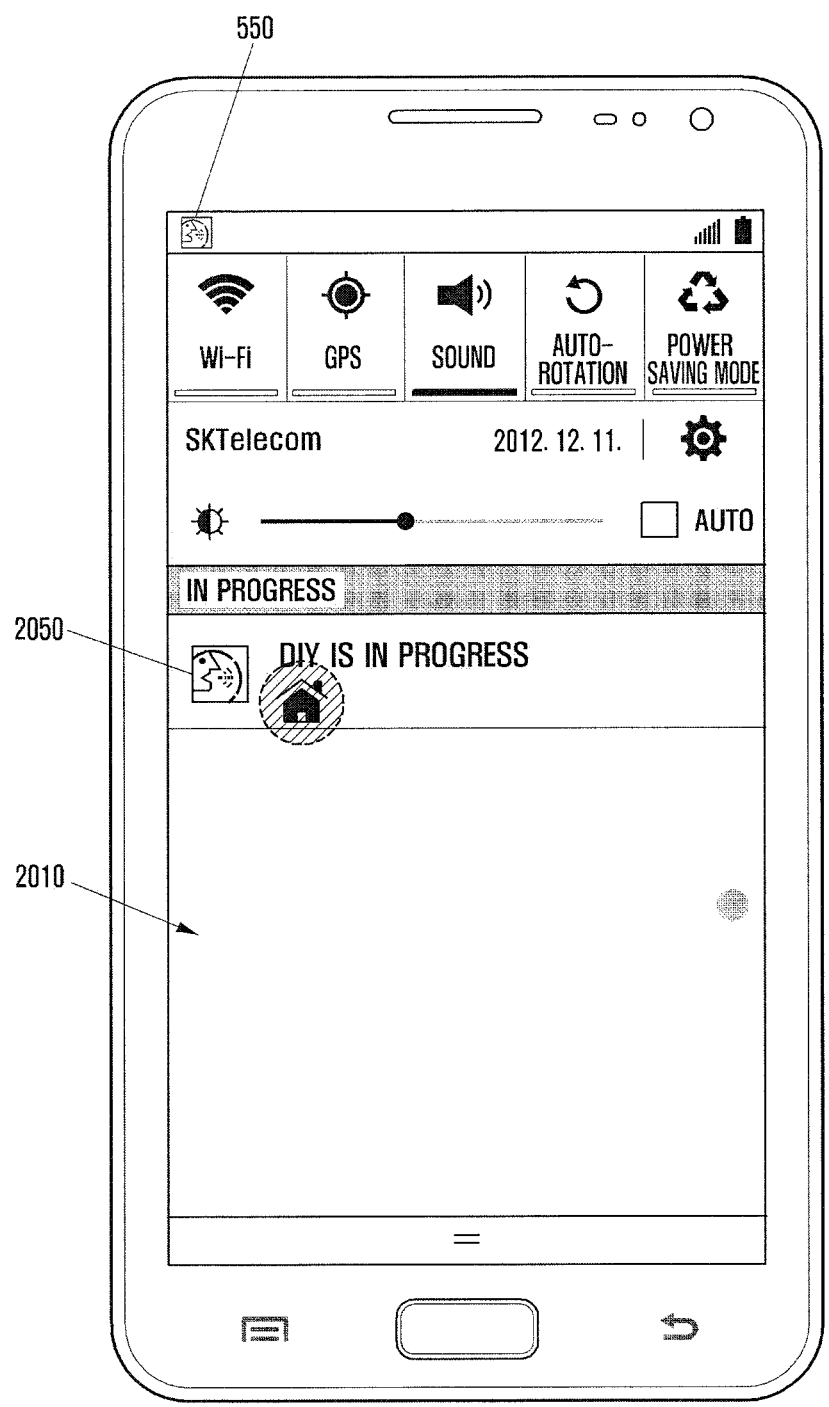

FIGS. 20A to 20C are diagrams illustrating exemplary screens with an item notifying of the rule(s) executed in a user device according to an exemplary embodiment of the present invention.

Referring to FIGS. 20A to 20C, the user device 100 may provide the notification item 550 for at least one execution rule in the indicator region 1850. According to an exemplary embodiment of the present invention, the user may select (e.g., tap, make a touch gesture, and the like) the notification item 550 of the indicator region 1850 or touch and drag the indicator region 1850 downward to display a quick panel 2010.

The quick panel 2010 may be configured to display settings of various functions (e.g., Wi-Fi, GPS, sound, screen rotation, power saving mode, and the like) and configure the settings quickly in the form of a semi-transparent window sliding in response to the user input to overlay the screen of the display entirely or partially. In various exemplary embodiments of the present invention, the quick panel 2010 may be provided with the information item(s) 2050 representing the corresponding rule executed currently as shown in FIG. 20B. Accordingly, the user is capable of checking the condition and action of the at least one rule represented by the notification item 550 presented at the indicator region 1850 intuitively through the quick panel 2010.

In the state of FIG. 20B, the user may select (e.g., tap, make a touch gesture, and the like) an information item 2050 of the quick panel 2010 to check the detailed information on the corresponding rule as shown in FIG. 20C. In response to the selection of the information item 2050, the user device 100 may display the detailed information corresponding to the currently running rule (represented by the information item selected by the user). In various exemplary embodiments of the present invention, the detailed information may be provided in the form of a text popup window presented on the quick panel 2050, a rule list through screen switching as described above, or speech output in the state of maintaining the quick panel 2050.

According to various exemplary embodiments of the present invention, if the notification item 550 of the indicator region 1850 is touched, the user device 100 feeds back the conditions and actions specified in the rule in the form of speech or text output.

According to various exemplary embodiments, if the notification item 550 of the indicator region 1850 is touched or touched and dragged, the quick panel 2010 is displayed to show the information item 2050 representing the corresponding rule. If the information item 205 is touched, the detailed information (e.g., condition and action) on the corresponding rule may be fed back in the form of a speech output. According to an exemplary embodiment of the present invention, if the information item 2050 is selected as shown in FIG. 20C, a speech of "[home] is running" may be output. Of course, various notifications such as "ringtone is a bell sound" and "Wi-Fi ON" may be output in the form of at least one of speech and text.

Figure 21A:
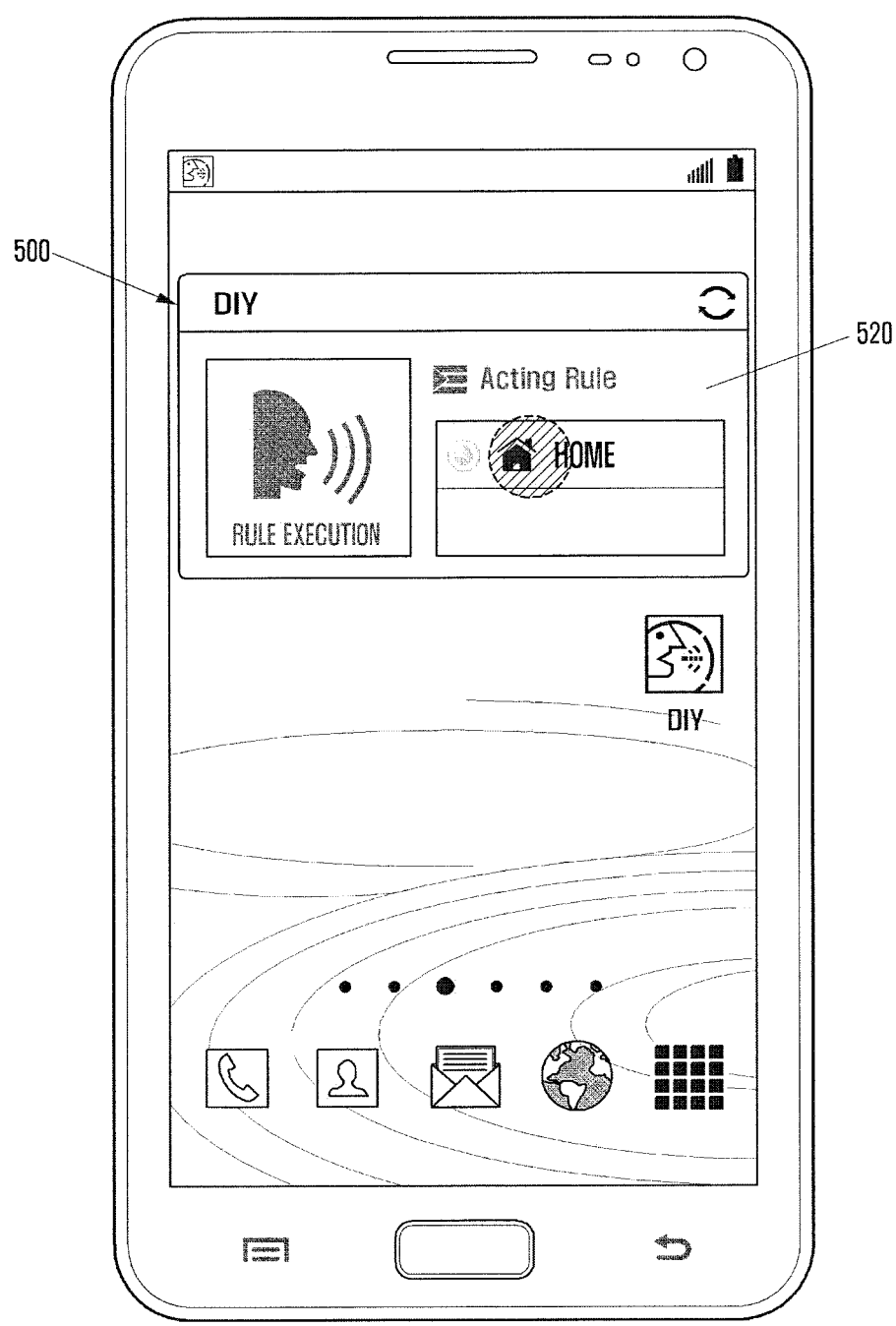
FIGS. 21A and 21B are diagrams illustrating exemplary screens associated with an operation of notifying of an execution rule in a user device according to an exemplary embodiment of the present invention.
Figure 21B:
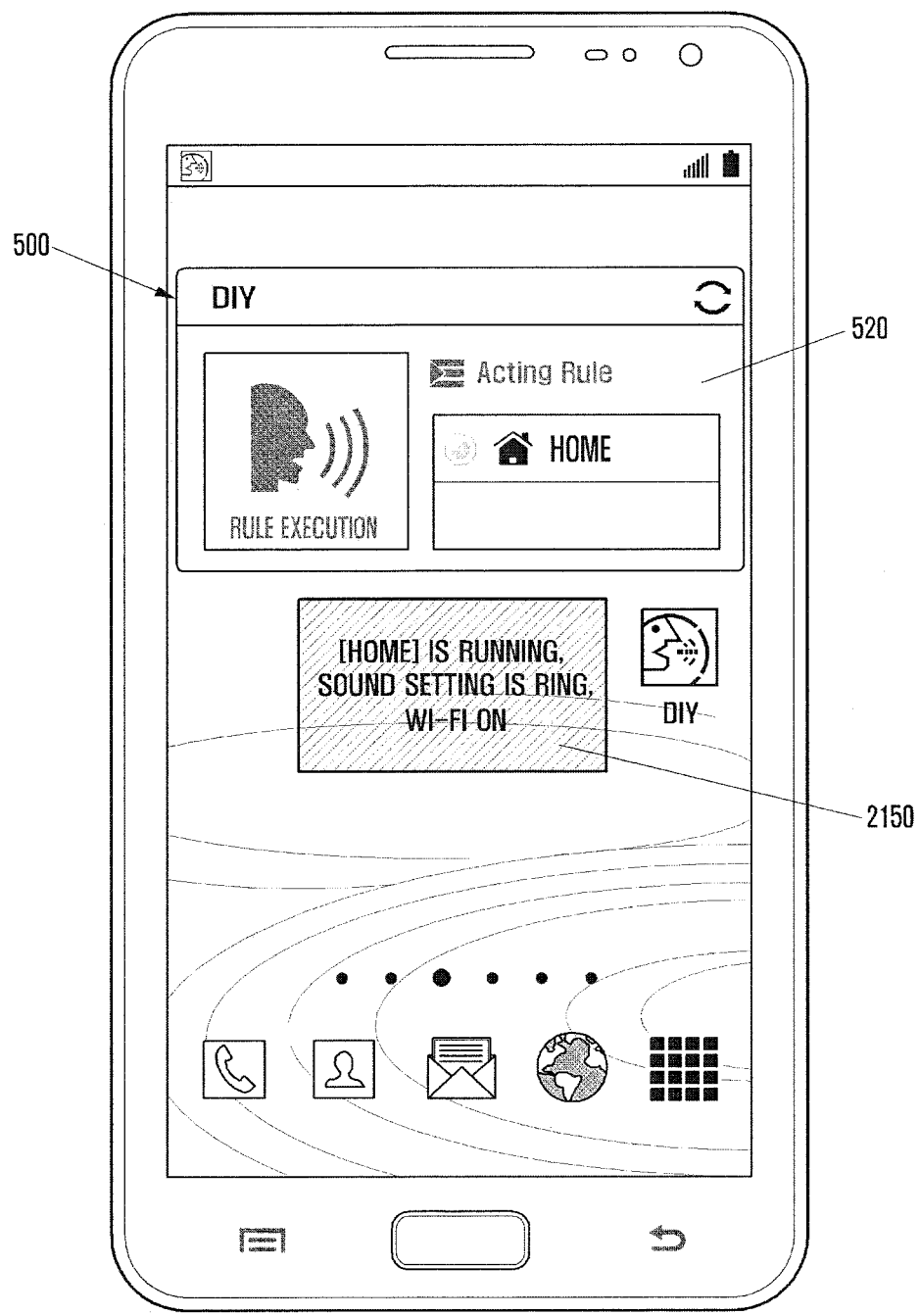

FIGS. 21A and 21B are diagrams illustrating exemplary screens associated with an operation of notifying of an execution rule in a user device according to an exemplary embodiment of the present invention.

FIGS. 21A and 21B show an exemplary operation of notifying the user of the currently running rules using a widget 500 according to an exemplary embodiment of the present invention.

Referring to FIG. 21A, in the state in which the currently running rule (e.g., home) is displayed in the execution information region 520 of the widget 500, the user may select the corresponding rule. Then the user device 100 may feed back the detailed information on the rule selected in the execution information region 520 in the form of a text or speech feedback.

For example, as shown in FIG. 21B, the user device 100 may output the condition and action such as "[home] is running, ringtone is bell sound, Wi-Fi on" configured in association with the rule (e.g. home) selected by the user in the form of a text popup window 2150. The user device 100 also may output the detailed information according to the setting configured by the user in the form of speech feedback or both the speech and text feedbacks.

Figure 22A:
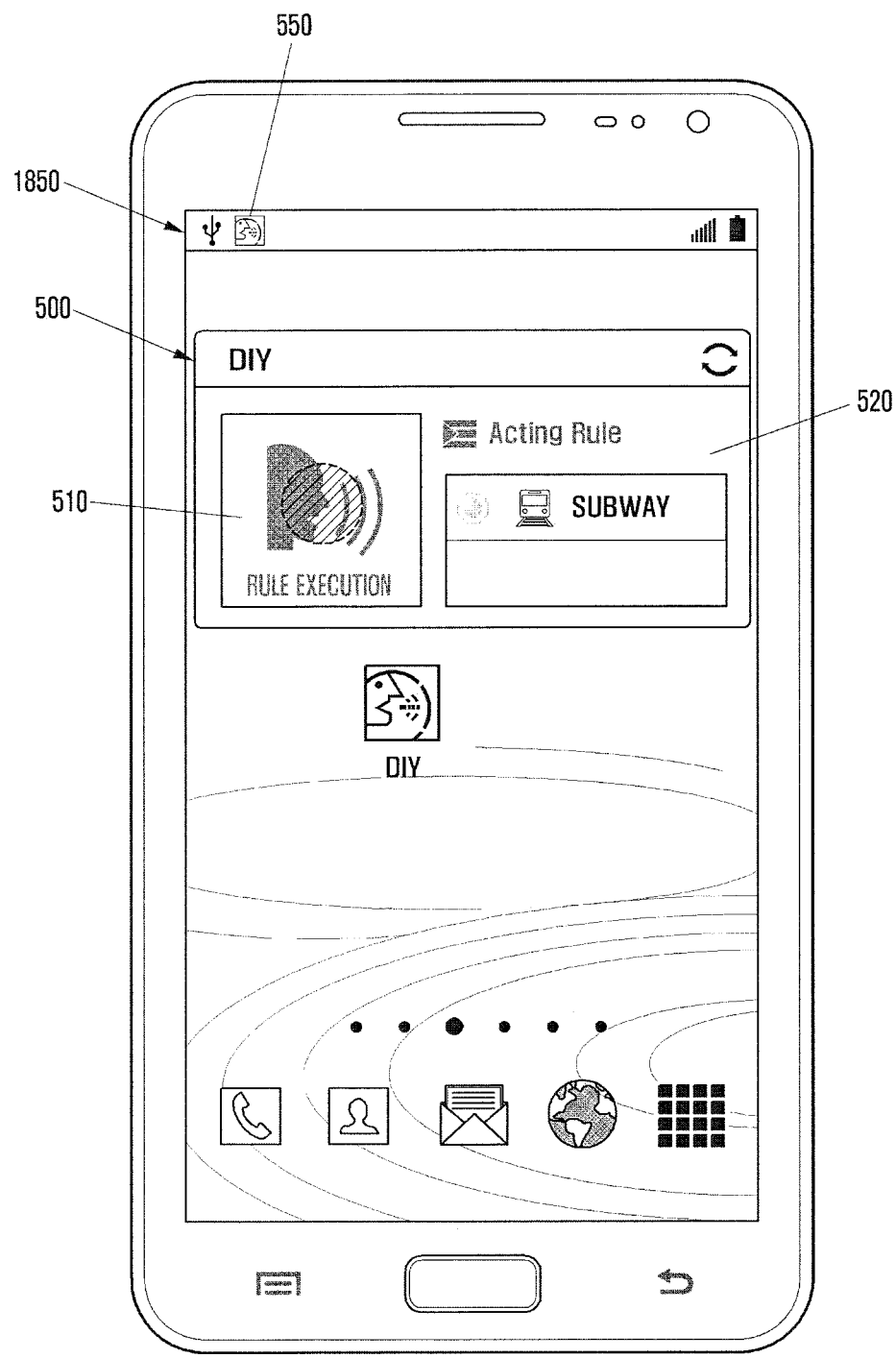
FIGS. 22A to 22C are diagrams illustrating exemplary screens associated with an operation of terminating a currently running rule in a user device according to an exemplary embodiment of the present invention.
Figure 22B:
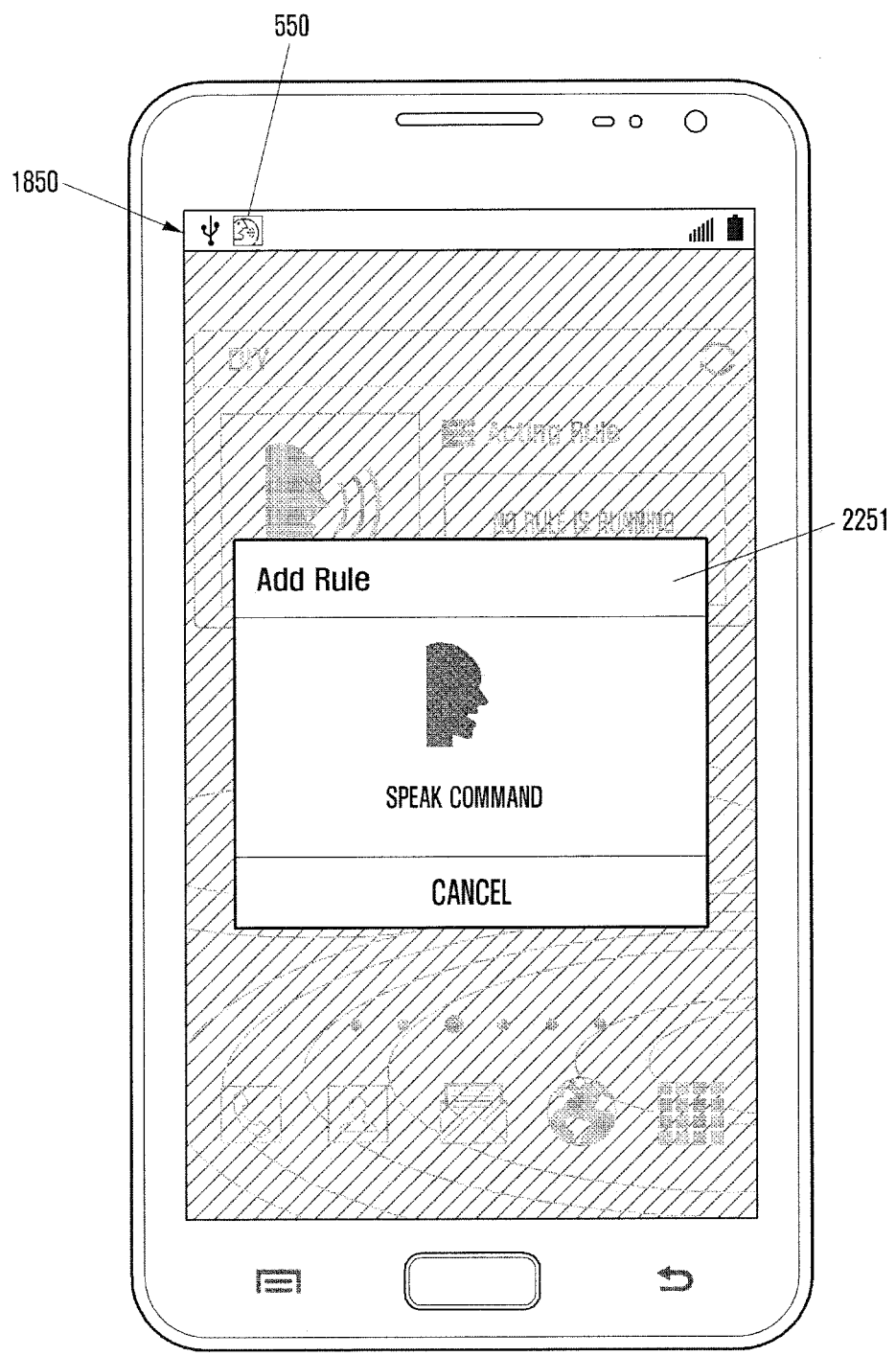
Figure 22C:
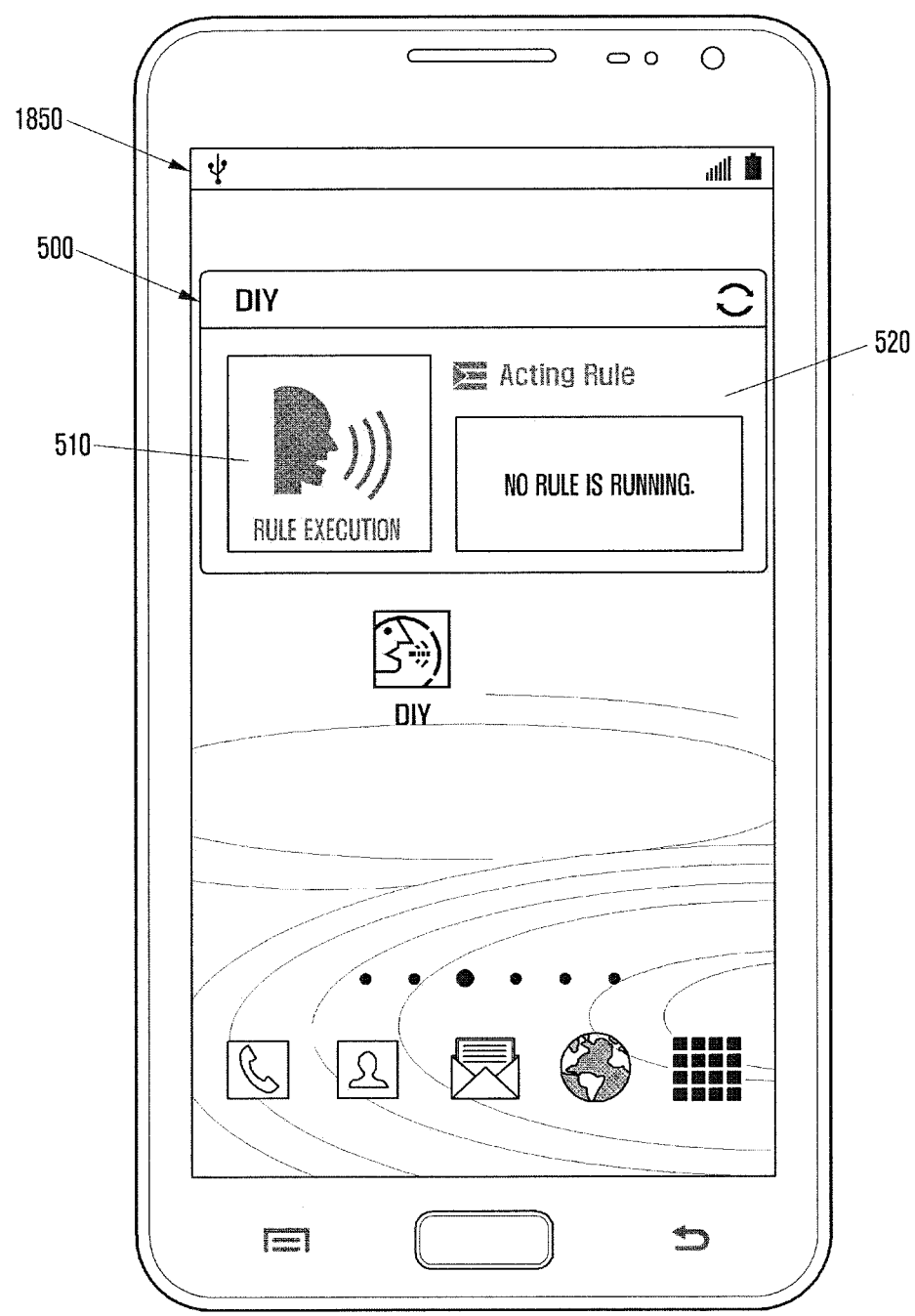

FIGS. 22A to 22C are diagrams illustrating exemplary screens associated with an operation of terminating a currently running rule in a user device according to an exemplary embodiment of the present invention.

FIG. 22A shows an exemplary screen of the user device 100 in the state in which the CAS widget 500 is executed which shows the information on the currently running rules in the execution information region 520 of the widget 500 according to an exemplary embodiment of the present invention.

FIG. 22A is directed to the case in which the currently running rule is of "subway." In this case, the information on the "subway" is displayed in the execution information region of the widget 500 along with the notification item 550 at the indicator region 1580 indicating that the rule "subway" is running currently.

The user may select (e.g., make a touch gesture of tap) the instruction input region (or rule execution button) 510. Then the control unit 170 determines that the selection in the instruction input region 510 corresponds to the initiation of one of the rule execution, the temporary stop of the currently running rule, and the termination of the currently running rule. FIGS. 22A to 22C are directed to an exemplary case of terminating the currently running rule. As shown in FIG. 22B, the user device 100 may display a popup window 2251 prompting the user to input an instruction (e.g., speech input) for terminating the rule with a guidance message (e.g., "please speak command") and waits for user's speech.

In the state of FIG. 22B, the user may make a speech input (e.g. "end subway") for terminating execution of the rule (e.g., subway). Then the control unit 170 may recognize the speech input and may terminate the rule indicated by the speech input (e.g., "subway"). The control unit 170 may change the display of the execution information region 520 of the widget 500 by reflecting the termination of the rule (e.g., "subway") as shown in FIG. 22C. The control unit 170 may control such that the notification item 550 disappears in the indication region 1850 by reflecting the termination of the rule "subway."

According to an exemplary embodiment of the present invention, the control unit 170 may change the display of the state of the rule "subway" from the enabled state to the disabled state in the execution information region 520 as shown in FIG. 22C. FIG. 22C shows the exemplary screen of the user device 100 in which the rule (e.g. subway) has disappeared in the execution information region 520 of the widget 500 according to the user's speech input for termination of the corresponding rule. As the rule "subway" is terminated, the information item related to the rule "subway" is replaced by a notification comment "no running rule." In the case in which one of the currently running rules is terminated, only the information item corresponding to the terminated rule disappears while the information items corresponding to the other currently running rules are maintained in the execution information region 520.

According to various exemplary embodiments of the present invention, a currently rule may be terminated in response to the user's speech input commanding termination of the rule in the form of "terminate 000." In various exemplary embodiments of the present invention, if a specific rule is terminated in response to the user input, at least one setting configured in association with the condition and action of the rule may be recovered to the state before the execution of the corresponding rule automatically.

Figure 23A:
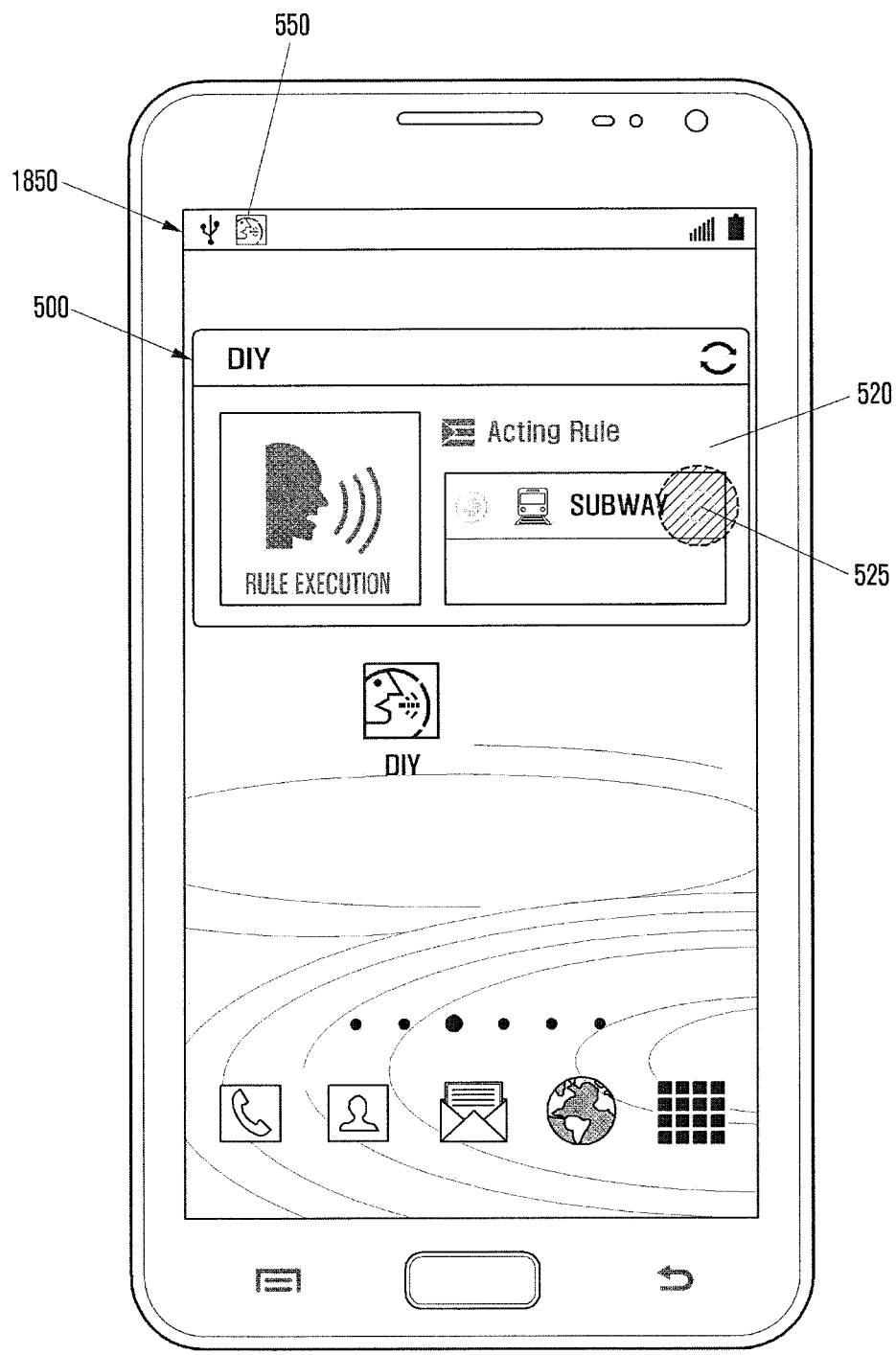
FIGS. 23A and 23B are diagrams illustrating exemplary screens associated with an operation of terminating a currently running rule in a user device according to an exemplary embodiment of the present invention.
Figure 23B:
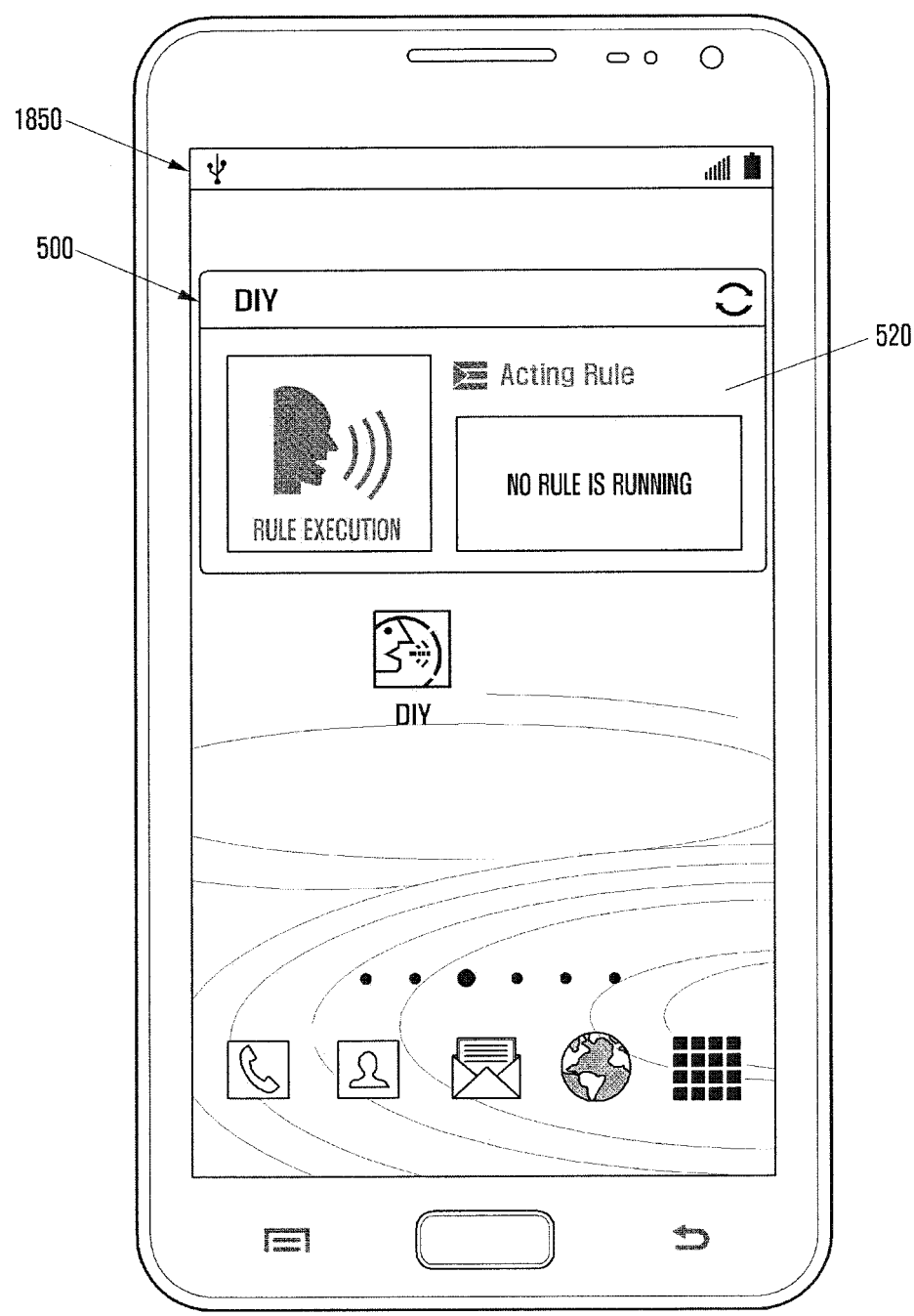

FIGS. 23A and 23B are diagrams illustrating exemplary screens associated with the operation of terminating the currently running rule in the user device according to an exemplary embodiment of the present invention.

FIGS. 23A and 23B show an exemplary operation of providing an end button for terminating a rule represented by an item in a widget 500 or a rule list and terminating the corresponding rule using the end button.

As shown in FIG. 23A, the widget 500 shows that a rule of "subway" is currently running. As shown in FIG. 23A, a notification item 550 is provided at the indicator region 1850 to indicate the existence of any currently running rule.

The user may terminate the operation of the currently running rule using the end button 525 mapped to the corresponding rule prior to the termination of the rule "subway." For example, the user may select (e.g., tap or touch gesture) the information item representing the rule (e.g., "subway") in the execution information region 520 of the widget 500 as shown in FIG. 23A.

Then the control unit 170 recognizes the user input made to the end button 525 and terminates the rule (e.g., "subway") corresponding to the end button 525. As shown in FIG. 23B, the control unit 170 may control such that the item representing the rule (e.g., "subway") terminated by the user disappears in the execution information region 520. The control unit 170 also may control such that the notification item 550 disappears in the indicator region 1850 as a result of the termination of the rule.

According to an exemplary embodiment, the control unit 170 may change the execution state of the rule "subway" from the enabled state to the disabled state in the execution information region 520 as shown in FIG. 23B. FIG. 23B shows the exemplary screen of the user device 100 in the state in which the item indicating the enabled state of the rule (e.g., subway) has disappeared from the execution information region of the widget in response to the selection of the end button 525. In response to the request for terminating the currently running rule "subway", the information item indicating the enabled state of the rule "subway" is replaced by a notification item "not running rule." Assuming that one of the plural running rules is terminated, only the information item of the terminated rule disappears while the information items corresponding to the other currently running rules are maintained in the execution information region 520.

Figure 24:
FIGS. 24 and 25 are diagrams illustrating a situation of terminating CAS service in a user device according to an exemplary embodiment of the present invention.
Figure 25:
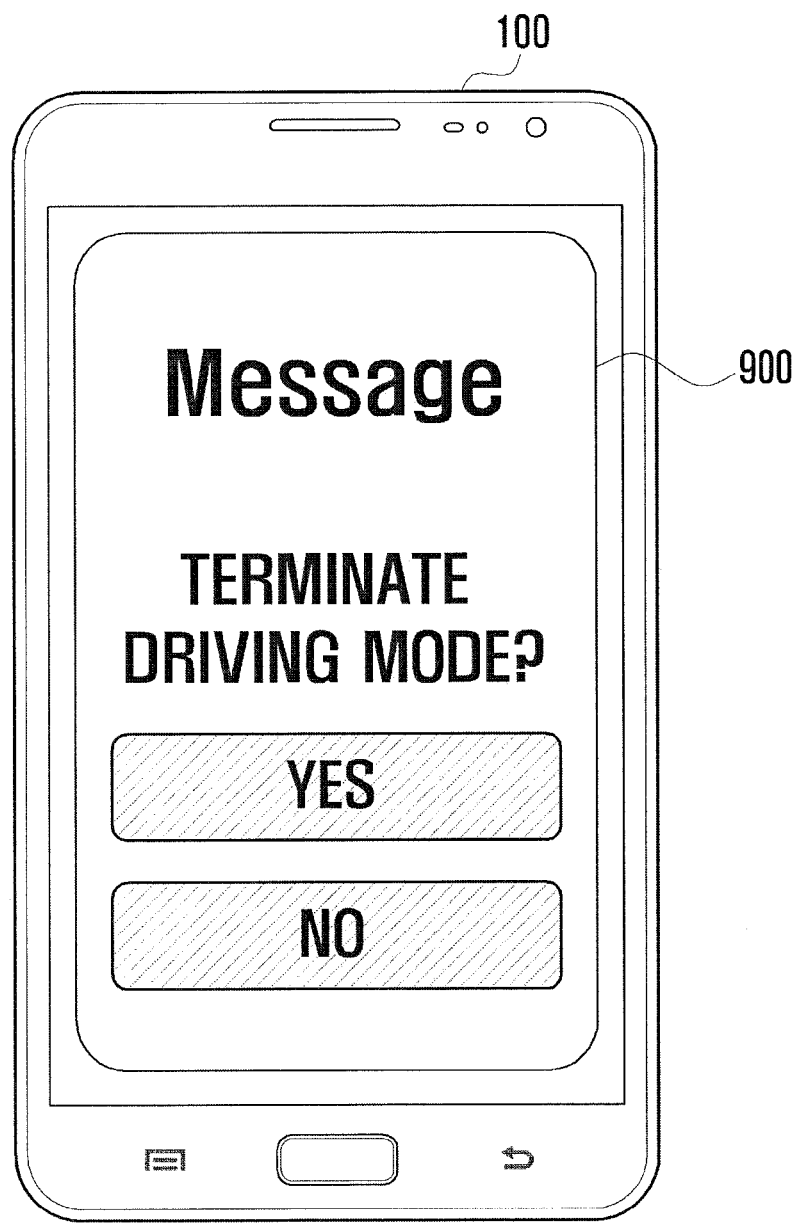

FIGS. 24 and 25 are diagrams illustrating a situation of terminating CAS service in a user device according to an exemplary embodiment of the present invention.

Referring to FIG. 24, the user may make an instruction (e.g., a speech, a text, a selection of an end button of widget, and a gesture) predefined for terminating a rule to end one of the currently running rules. The rule termination instruction may be a speech instruction or a text instruction. The rule may be terminated by means of a pre-designated function key, a button designated pre rule in the widget 500, a text-scribing input, or predefined gesture.

For example, as shown in FIG. 24, the user may make a speech input such as "end 000(command corresponding to the rule)," "arrived home," and "arrived home almost" based on a natural language. Then the user device 100 may recognize and parse the speech input and ends the rule, if the speech input matches the predetermined instruction. In various exemplary embodiments of the present invention, the rule termination instruction may be set per rule. The rule termination instruction may be set as a common instruction for all of the rules. In the case of the common rule, making the termination instruction to end all of the currently running rules at a time is possible.

Referring to FIG. 25, although any instruction for terminating a currently running rule is not input by the user, the user device 100 terminates the rule or prompts the user to terminate the rule when a specific condition is fulfilled.

For example, as shown in FIG. 25, the user device 100 may monitor a situation of the currently running rule and determine whether the situation fulfills the rule termination condition registered with a mapping table. In various exemplary embodiments of the present invention, the rule termination condition may be fulfilled when no change in situation is detected for a predetermined duration or a rule termination condition specified by the user (e.g., speech input, rule terminal function key selection, and maintain a specific condition for terminating a rule) is satisfied.

When the rule termination condition is fulfilled, the user device 100 may display a popup window 900 presenting a message prompting the user to terminate the corresponding rule (e.g., "terminate the driving mode?") and maintain or terminate the corresponding rule depending on the user's interaction to the popup window 900.

Figure 26A:
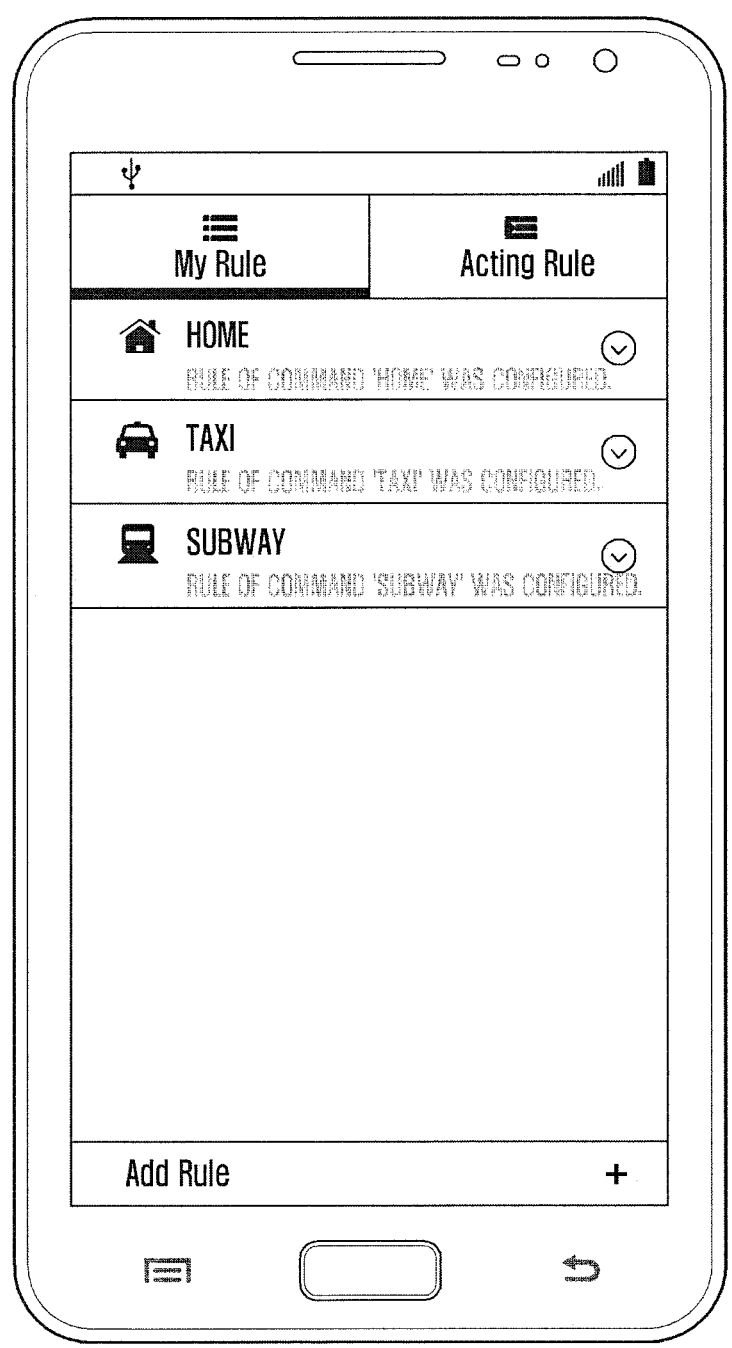
FIGS. 26A and 26B are diagrams illustrating exemplary screens associated with an operation of deleting a rule in a user device according to an exemplary embodiment of the present invention.
Figure 26B:
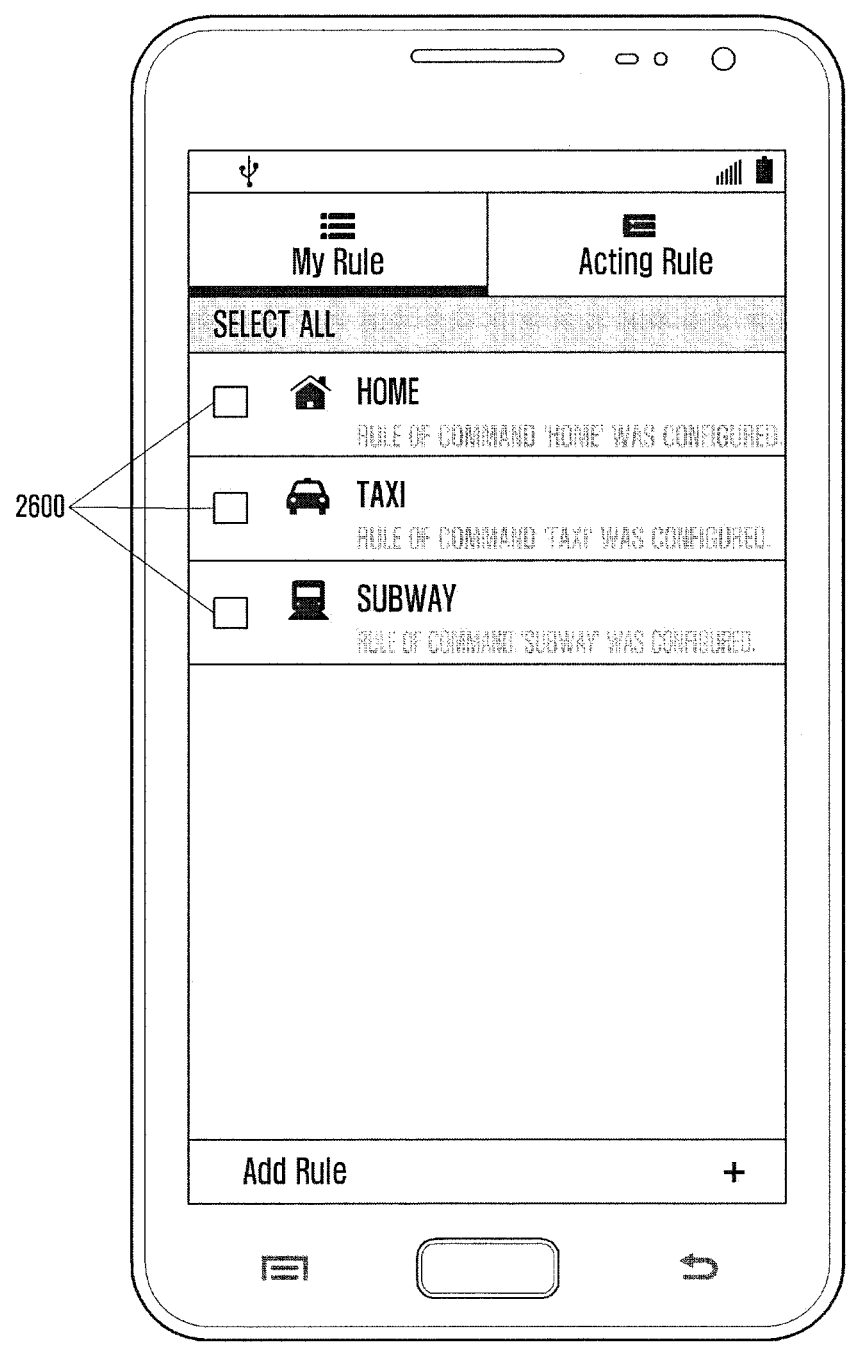

FIGS. 26A and 26B are diagrams illustrating exemplary screens associated with an operation of deleting a rule in a user device according to an exemplary embodiment of the present invention.

FIGS. 26A and 26B show the exemplary screens of the user device 100 when the CAS application (e.g., rule list) is executed.

FIGS. 26A and 26B are directed to an exemplary case in which three rules "home," "taxi," and "subway" defined by the user are stored in the user device 100. In the state in which the three rules are presented in the rule list, the user may make a delete instruction through menu manipulation, speech input, or gesture input.

For example, the user may request for execution of the delete function by manipulating the menu of the user device 100, making a speech or text input of "delete rule", or making a gesture input, in the state of FIG. 26A. Then the control unit 170 activates the rule deletion function in response to the user input with the display of the screen interface capable of deleting the rule as shown in FIG. 26B. According to an exemplary embodiment of the present invention, a list of predetermined rules may be displayed along with selection item 2600 (e.g. check box) per rule as shown in FIG. 26B.

The user may select at least one rule by check the corresponding selection item. At this time, the control unit 170 may check the selection item 2600 with a mark to indicate that the corresponding rule is selected. According to an exemplary embodiment, the unchecked selection item 2600 is presented as an empty box (e.g., a selection box without a checkmark therein) while the checked selection item 2600 is presented as a box with a checkmark therein. The user may delete at least one selected rule through menu manipulation or with a deletion button.

Although FIGS. 26A and 26B are directed to an exemplary case of deleting a rule using the menu and selection item 2600, the user may delete the rule by inputting a speech or text instruction. For example, in the state of FIGS. 26A and 26B, the user may make a speech or scribing input of "delete home" to delete the rule "home."

Figure 27:
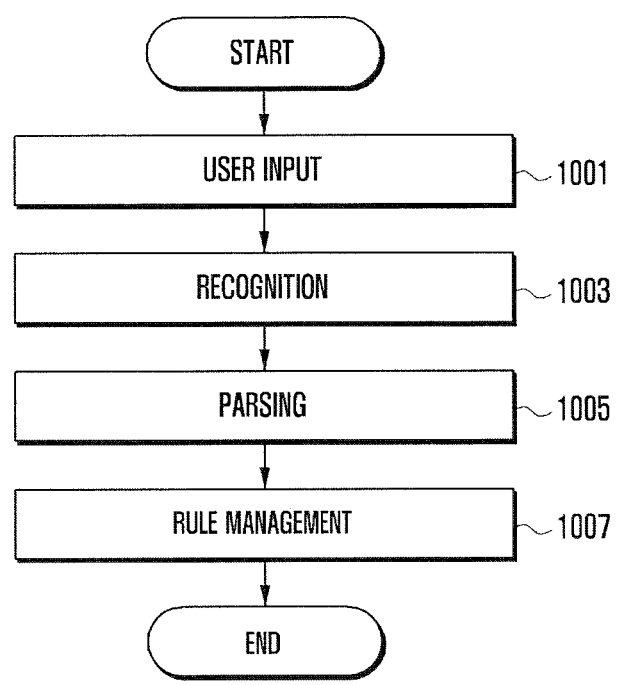
FIG. 27 is a flowchart illustrating a procedure of generating a rule in a user device according to an exemplary embodiment of the present invention.

FIG. 27 is a flowchart illustrating a procedure of generating a rule in a user device according to an exemplary embodiment of the present invention.

Referring to FIG. 27, the control unit 170 (e.g., rule configuration module 173) receives a user input requesting for CAS at step 1001. For example, the user may execute the configuration mode for defining rules of CAS by means of one of the input unit 120, microphone 143, and touchscreen 130. In the configuration mode, the user may make an input for defining a rule in the form of speech input through the microphone or text input through the input unit 120 or touchscreen 130. Then the control unit 170 may recognize the user input for CAS in the configuration mode. The user may input instructions associated with the rule, condition (or situation), and action through one of the aforementioned input means.

For example, the user may define a rule of "send text if getting in taxi," designate at least one target user device (e.g., "to father") to send the text, and define a rule execution instruction of "I got in a taxi." As described in the above exemplary embodiments of the present invention, defining a detailed rule such as "if I get in a taxi, send my location to father and little brother (sister) at every 5 minutes" or "if a text message including 'where' is received from father, send a text message to father" is possible.

The control unit 170 recognizes the user input at step 1003. For example, the control unit 170 may recognize the speech or text input through a corresponding input means in the rule configuration mode. For example, the control unit 170 performs the speech recognition function for recognizing a speech input through the microphone 143 or text recognition function for recognizing a text input through the input unit 120 or the touchscreen 130. It may be preferred that the speech and text instruction is made based on a natural language as described above.

The control unit 170 parses the recognized user input (e.g., natural language-based speech or text) at step 1005. For example, the control unit 170 parses the natural language-based speech instruction to extract and identify the user-intended rule, condition, and rule execution command. The rule, condition (situation), action, and rule execution instruction may be input in series according to guidance. The control unit 170 also may search for the item (e.g., situation to be detected, target, and command) of executing an action according to the recognized situation as a result of parsing the user input to check the missing part. According to an exemplary embodiment of the present invention, the control unit 170 may generate a rule based on the interaction with the user by providing guidance for generating the rule and receiving the information according to the guidance.

For example, when the user defines the rule for situation recognition such as "send text if I get in a taxi" without designation of a target, the control unit 170 may recognize the absence of the destination (e.g., target) of the text message. When the action for the rule defined without designation of the target is executed, the control unit 170 may guide to designate a target. For example, the control unit 170 may perform speech or text interaction with the user through to acquire additional information according to the action. According to an exemplary embodiment of the present invention, the control unit 170 may display a popup text (with speech guidance) such as "please speak recipient" or "send whereto." Then the user may make a speech input such as "designate later," "boyfriend" and "send to father." The target may be designated through natural language-based speech or text input as described above. The rule is complemented with additional information; the control unit 170 may perform recognition and parsing on the speech input and match the corresponding items to one rule according to the above described procedure.

The control unit 170 manages the rules defined for CAS based on the parsed user input at step 1007. For example, the control unit 170 may map the rule, condition (situation), action, and rule execution instruction acquired by parsing the user input among each other and stores the mappings in a mapping table for management.

Although not depicted in FIG. 27, user guidance may be provided in defining the rule according to various exemplary embodiment of the present invention. For example, the user may input the instruction for generating a rule by typing with a virtual key pad or writing on the touchscreen with a specific input tool (e.g., electronic pen and user's finger). Then the control unit 170 may provide a screen interface capable of recognizing the text input through writing or keypad-typing and defining the rule based on the recognized text.

The screen interface may provide the lists (e.g., a condition list and an action list) of the conditions and actions (or functions or applications), and the user may selectively turn on/off the conditions and actions (or functions or applications). For example, if the user intends to define a rule for turning off the GPS function at office, the user may input "office" on the screen of the user device 100 by means of an electronic pen (scribing input or touch keypad-based character selection input).

According to various exemplary embodiments of the present invention, the user device 100 may provide the screen interface (e.g., command pad and touch pad) capable of receiving the scribing input or typing input. The user device 100 may recognize text "office" input through the scribing or typing made on the screen interface such as command pad and touch pad by means of an input tool (electronic pen or user's finger). Then the control unit 170 controls to display a configuration list screen such that the user turns on/off at least one of the conditions and actions (functions or applications) associated with "office" on the configuration list screen.

According to an exemplary embodiment of the present invention, the rule may be defined through one of the speech or text input functions. The text input may be made by writing/typing natural language instruction as described above or entering a keyword (e.g. "office") by means of the command pad or the touch pad and then turning on/off at least one of the actions presented in a list.

Figure 28:
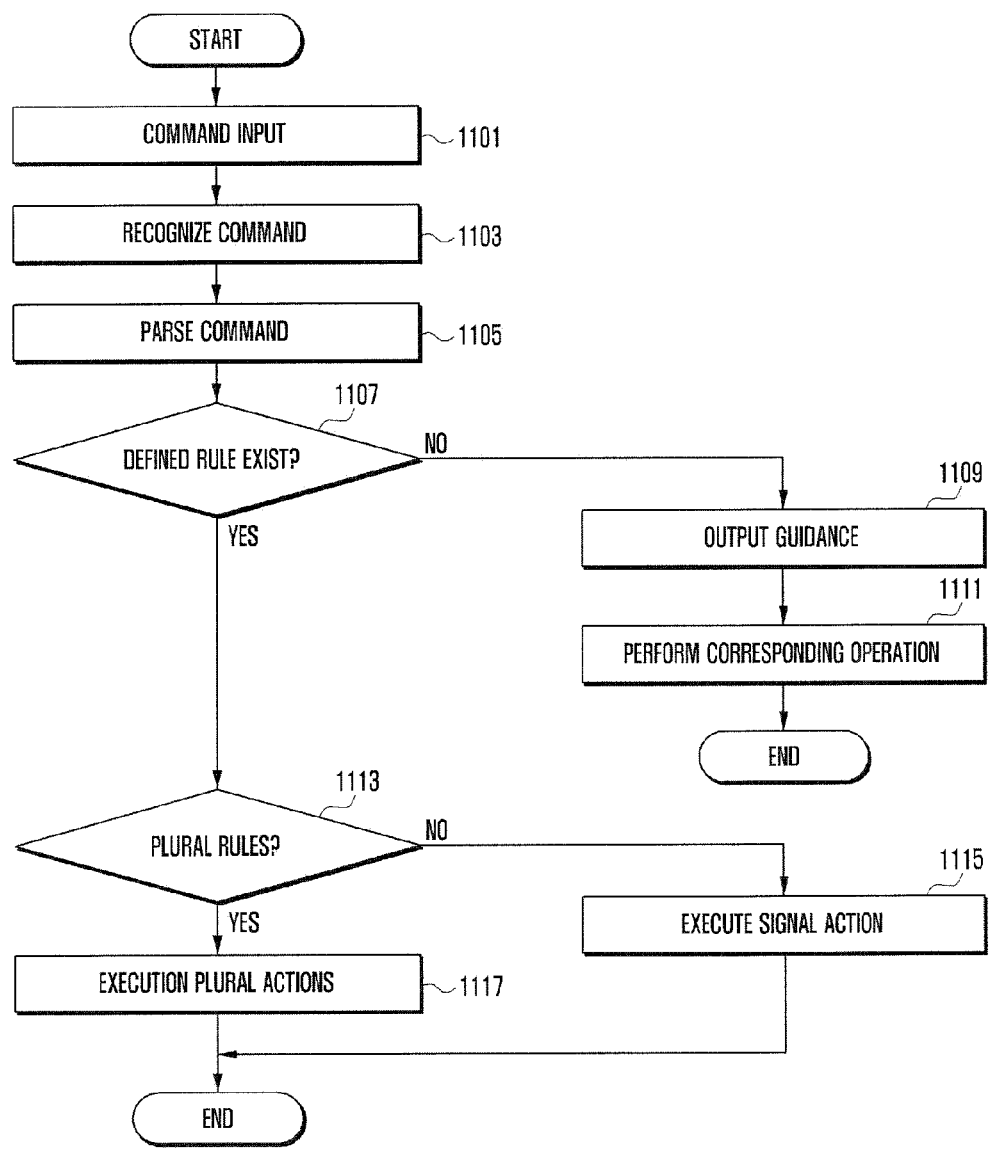
FIG. 28 is a flowchart illustrating a procedure of providing CAS in a user device according to an exemplary embodiment of the present invention.

FIG. 28 is a flowchart illustrating a procedure of providing CAS in a user device according to an exemplary embodiment of the present invention.

FIG. 28 shows the operation procedure of executing a rule, at the user device 100, in response to a user interaction and taking an action when a condition (situation) specified in the rule is fulfilled.

Referring to FIG. 28, the control unit 170 receives a user instruction for CAS at step 1101. For example, the user may make a speech input for executing a rule defined for CAS through the microphone 143. Then the control unit 170 may receive the user's speech instruction through the microphone 143. According to various exemplary embodiments of the present invention, the instruction for executing the rule may be input in the form of speech input through the microphone 143, text input through the input unit 120 or the touchscreen 130, or gesture input.

According to various exemplary embodiments of the present invention, designating one of the functions keys of the user device 100 as an instruction key (e.g., shortcut key or rule execution button of the widget 500) to stand by for speech input of the user may be possible. In this case, when the instruction key is selected, the control unit 170 stands by for a speech input of the user for CAS and attempts speech recognition for the speech input made in the standby state. The standby state may be configured to be maintained after the standby mode command or only while the instruction key is pressed.

The control unit 170 recognizes the instruction input by the user at step 1103. For example, the control unit 170 may extract the command instructing execution of the rule from the user's speech input.

The control unit 170 parses the recognized instruction at step 1105. For example, the control unit 170 may parse the recognized user speech (e.g., "I get in a taxi") to extract the rule execution command (e.g., "taxi").

The control unit 170 determines whether there is any rule matching the extracted execution command among the predetermined rules at step 1107.

If there is no rule matching the execution command at step 1107, the control unit 170 controls to display guidance at step 1109. For example, the control unit 170 may display a popup guidance notifying that there is not rule request by the user. The control unit 170 also may display guidance asking whether to define the rule associated with the corresponding command in the form of guidance popup. The control unit 170 also may provide a list of the rules defined by the user.

The control unit 170 controls to perform the operation according to the user request at step 1111 after the display of the guidance. For example, the control unit 170 may terminate the rule according to the user selection, define a new rule associated with the command according to the user selection, or process the operation for selecting a specific rule from the rule list.

If a rule matches the execution command at step 1107, the control unit 170 determines whether the number of rules matching the execution command is greater than 1 at step 1113. For example, the user may define one or more rules matching one instruction. According to an exemplary embodiment, the user may define a plurality of rules (e.g. a first rule of "if an event is received from a designated external device at the wheel, send current location," a second rule of "if the driving speed is equal to or greater than 100 Km/h, output alarm," and "if the driving speed is equal to or greater than 60 Km/h, increase radio volume"). As an example, the user may define the first rule with the command "driving1," the second rule with the command "driving2," and the third rule with the command "driving3."

If the number of the rules matching the execution command is not greater than 1 (e.g., if only one rule matches the execution command), the control unit 170 may control to execute the action according to the single rule at step 1115. For example, the control unit 170 monitors to detect whether the condition (situation) specified in the corresponding rule is fulfilled and executes, when the condition (situation) is fulfilled, one or more actions.

If the number of the rules matching the execution command is greater than 1 at step 1113, the control unit 170 controls to execute the actions corresponding to the plural rules matching the execution command at step 1117. For example, the control unit 170 may monitor the conditions (situations) specified in the plural rules matching the execution command and execute, whenever at least one condition is fulfilled, the action of every rule of which condition is fulfilled.

Although not depicted in FIG. 28, the control unit 170 may provide an interface prompting to (recommending) one of the plural rules matching one instruction. The control unit 170 may control to execute plural actions according to the plural rules selected by the user (by selection input through speech, text, or gesture instruction) or a single action according to a single-selected rule.

Although not depicted in FIG. 28, the control unit 170 may check the items (e.g., condition (e.g., condition (situation) to be recognized or target)) for execution of an action in the rule according to the user input to check a missing part. The control unit 170 may check the interaction of the user in the process of executing the rule.

For example, when the user defines the rule for situation recognition such as "send text if I get in a taxi" without designation of a target, the control unit 170 may recognize the absence of the destination (e.g., target) of the text message. In this case, the control unit 170 may recognize the absence of the destination when preparing to execution the action of transmitting a text message upon detection of the fulfillment of the corresponding condition. When the action for the rule defined without designation of the target is executed, the control unit 170 may guide to designate a target. According to an exemplary embodiment of the present invention, the control unit 170 may display a popup text (with speech guidance) such as "whom to send the text?" Then the user may designate the target to which the text message is addressed such as "send to father" through natural language-based speech or text input.

Figure 29:
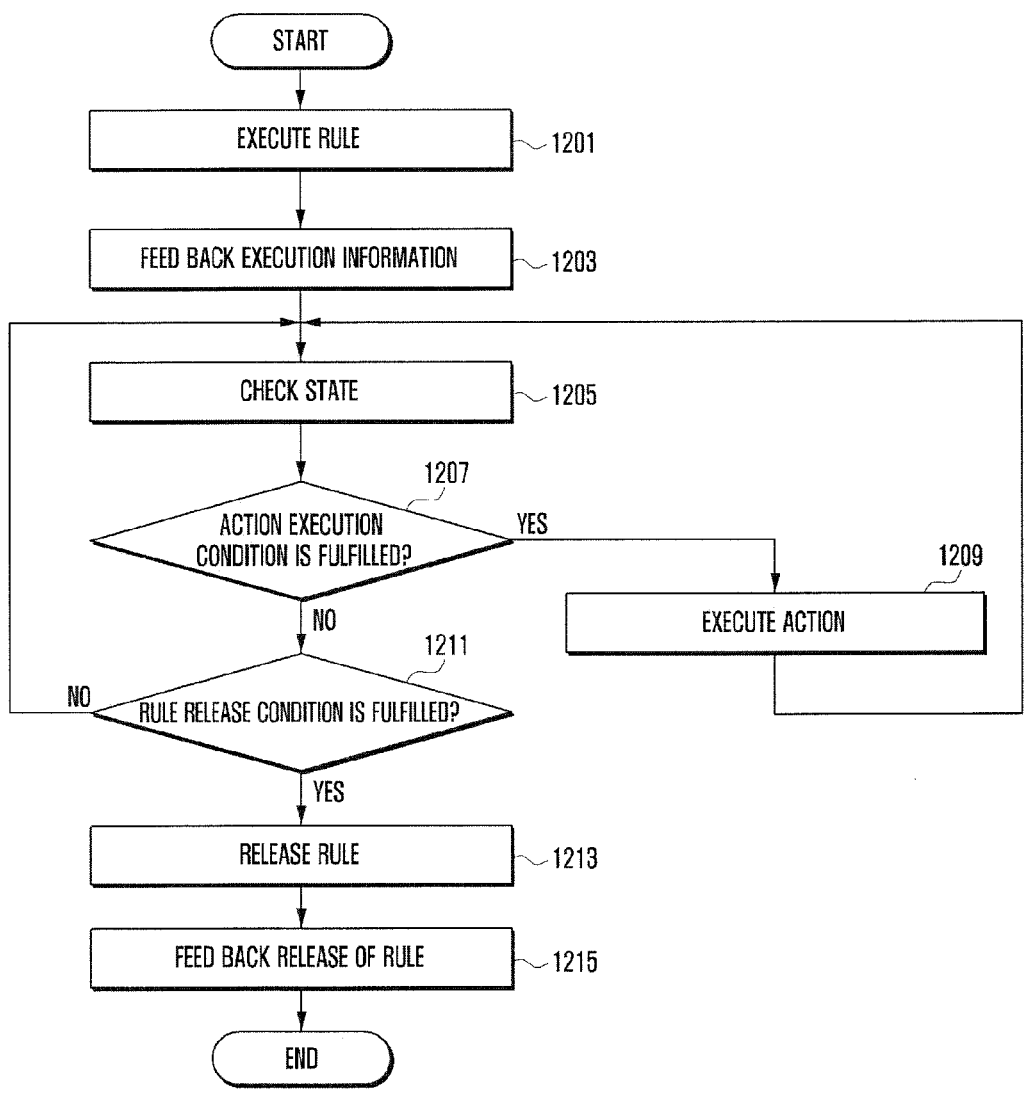
FIG. 29 is a flowchart illustrating a procedure of providing CAS in a user device according to an exemplary embodiment of the present invention.

FIG. 29 is a flowchart illustrating a procedure of providing CAS in a user device according to an exemplary embodiment of the present invention.

Particularly, FIG. 29 shows an exemplary procedure of executing a rule, checking one or more conditions (situations) specified in the rule to execute an action or release the currently running rule.

Referring to FIG. 29, the control unit 170 executes a rule according to the user request at step 1201. Next, the control unit 170 feeds back the execution information (e.g., notification item) as a consequence of the execution of the rule at step 1203. For example, the control unit 170 may control to display the item (icon or text) associated with the rule executed on the screen of the display panel 131 as described above.

The control unit 170 checks the condition specified in the rule at step 1205. For example, the control unit 170 monitors continuously or periodically to detect whether the condition (situation) specified in the currently running rule is fulfilled.

The control unit 170 determines whether the action execution condition is fulfilled based on the check result at step 1207. For example, the control unit 170 monitors at least one condition (situation) specified in the currently running rule to determine whether the currently situation matches the specific condition of execution the action specified in the rule by referencing the mapping table.

If the condition (situation) of the user device 100 matches the action execution condition at step 1207, the control unit 170 controls execution of the action triggered by the fulfillment of the condition at step 1209. For example, the control unit 170 monitors the condition or situation and, if the condition or situation matches an action execution condition, executes the corresponding action. The action may be of executing a function (or application specified in the rule, generating execution result (e.g. context information), and output the execution result to the user or others.

If the condition (situation) of the user device 100 does not match the action execution condition at step 1207, the control unit 170 determines whether the condition (situation) of the user device 100 matches the rule release condition at step 1211. For example, the control unit 170 monitors a certain condition specified in the currently running rule and determines whether the current situation matches the rule release condition specified in the rule by referencing the mapping table. The rule release condition may be fulfilled when there is no change in situation for the duration configured by the user or a user-specified rule release condition (e.g., rule release speech instruction, function key input, text input, gesture input, and continuation of specific condition) is satisfied.

If the condition (situation) of the user device 100 does not the rule release condition at step 1211, the control unit 170 returns the procedure to step 1205 to continue checking the condition of the user device.

If the condition (situation) of the user device 100 matches the rule release condition at step 1211, the control unit 170 release the currently running rule at step 1213 and feeds back the rule release information at step 1215. For example, the control unit 170 may control to output at least one of audio, video, and tactile feedback. According to an exemplary embodiment of the present invention, the control unit 170 may control to output the rule release feedback in the form of at least one of audio alarm (e.g., speech and sound effect), popup window, and vibration.

Although not depicted in FIG. 29, the control unit 170 may present a popup message prompting the user to terminate the executed rule when the rule release condition is fulfilled to maintain or release the currently running rule depending on the user's selection.

Figure 30:
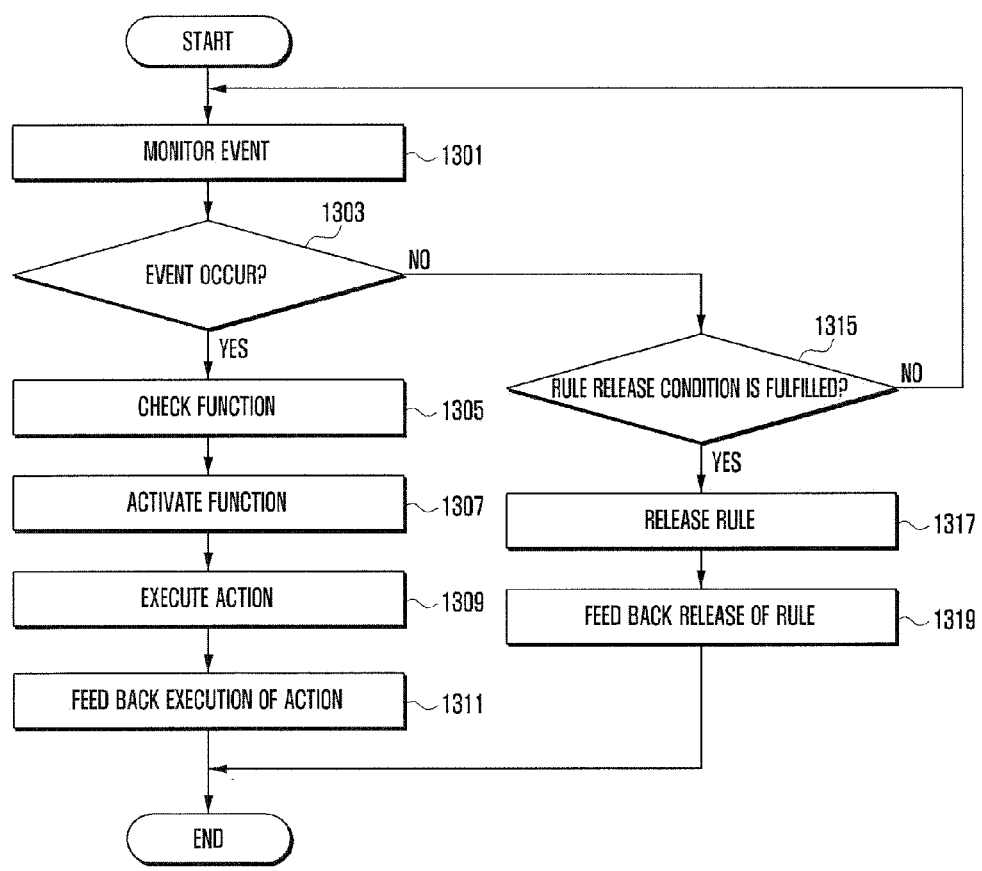
FIG. 30 is a flowchart illustrating a procedure of providing CAS in a user device according to an exemplary embodiment of the present invention.

FIG. 30 is a flowchart illustrating a procedure of providing CAS in a user device according to an exemplary embodiment of the present invention.

Referring to FIG. 30, the control unit 170 monitors to detect an event in the state in which the rule executed in response to a user request is running at step 1301, and determines whether the event is detected at step 1303. For example, the control unit 170 may monitor to detect an internal or external event (condition) specified in association with the currently running rule.

The event (condition) may include an internal event occurring in the user device 100 as a result of a change in internal condition and an external event received from outside. According to an exemplary embodiment of the present invention, the internal event may include an event occurring when the movement speed of the user device 100 is faster than a predetermined threshold, an event occurring periodically at a predetermined interval, an event occurring in response to the user's speech or text input, an event occurring as a consequence of change in operation (e.g., motion and illuminance), and the like. The external event may include an event of receiving a message from outside (particularly, the message received from a target user device designated in the currently running rule).

If the event is detected at step 1303, the control unit 170 checks the function to be executed which is specified in the execution rule at step 1305. For example, the control unit 170 may check the function (or application) specified, in the currently running rule, as an action to be execution in fulfillment of the corresponding event (condition).

The control unit 107 activates the checked function at step 1307 and executes the action by means of the activated function at step 1309. For example, if the action corresponding to the event (condition) specified in the execution rule is of controlling the audio volume of the user device 100, the control unit 170 controls to activate the audio volume control function. If the action corresponding to the event (condition) specified in the execution rule is of sending current location of the user device 100, the control unit 170 activates the location information transmission function (or application) such as GPS function (navigation function) and messaging function such that the user device 100 sends the target device the location information on the user device 100. For example, the control unit 170 may execute a function (application) or at least two interoperable functions (applications) depending on the type of the action to be executed.

The control unit 170 controls to feed back the associative information as a result of the execution of the action (e.g. information resulting from the execution of the action) at step 1311. For example, the control unit 170 may control to display a screen interface presenting audio volume level to the user while adjusting the audio volume in response to the user's manipulation. The control unit 170 also may control to output the screen interface and/or sound (audio effect) notifying of the transmission of the location information of the user device 100 to the designated target device.

If no event (condition) is detected at step 1303, the control unit 170 determines whether the current situation matches the rule release condition at step 1315. For example, the control unit 170 may monitor the condition specified in the currently running rule and determine whether the current situation matches the rule release condition specified in the rule by referencing the mapping table.

If the current situation does not match the rule release condition at step 1315, the control unit 170 returns the procedure to continue monitoring event at step 1301.

If the current situation matches the rule release condition at step 1315, the control unit 170 releases the currently running rule at step 1317 and feeds back the release information as a result of the release of the rule (e.g., information resulting from the release of the rule) at step 1319. For example, if the rule release condition is fulfilled, the control unit 170 may display a popup message prompting the user to terminate the currently running rule so as to maintain or release the currently running rule depending on the user's selection. The control unit 170 may notify the user of the release of the currently running rule in the form of at least one of audio, video, and tactile feedback.

Figure 31A:
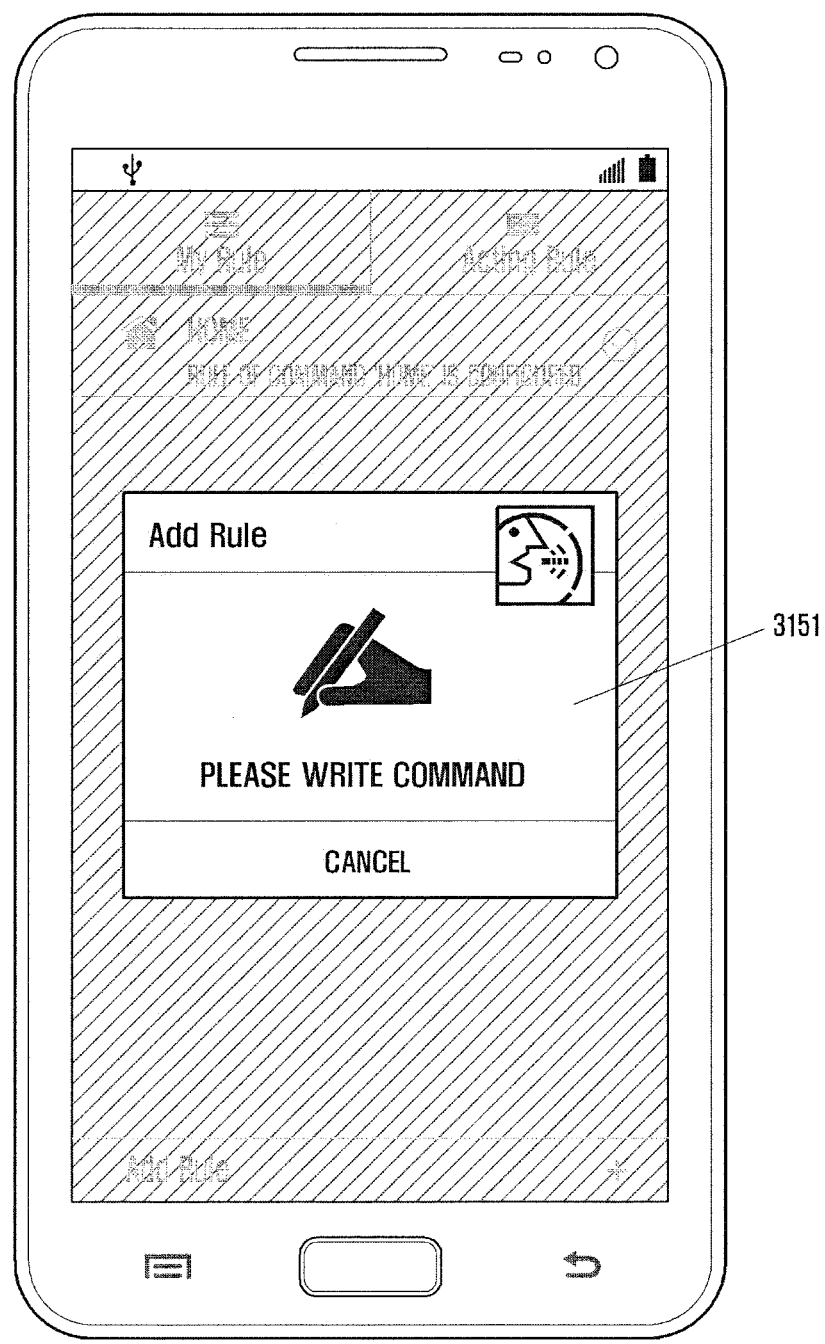
FIGS. 31A to 31N are diagrams illustrating exemplary screens associated with an operation of generating a rule in a user device according to an exemplary embodiment of the present invention.
Figure 31B:
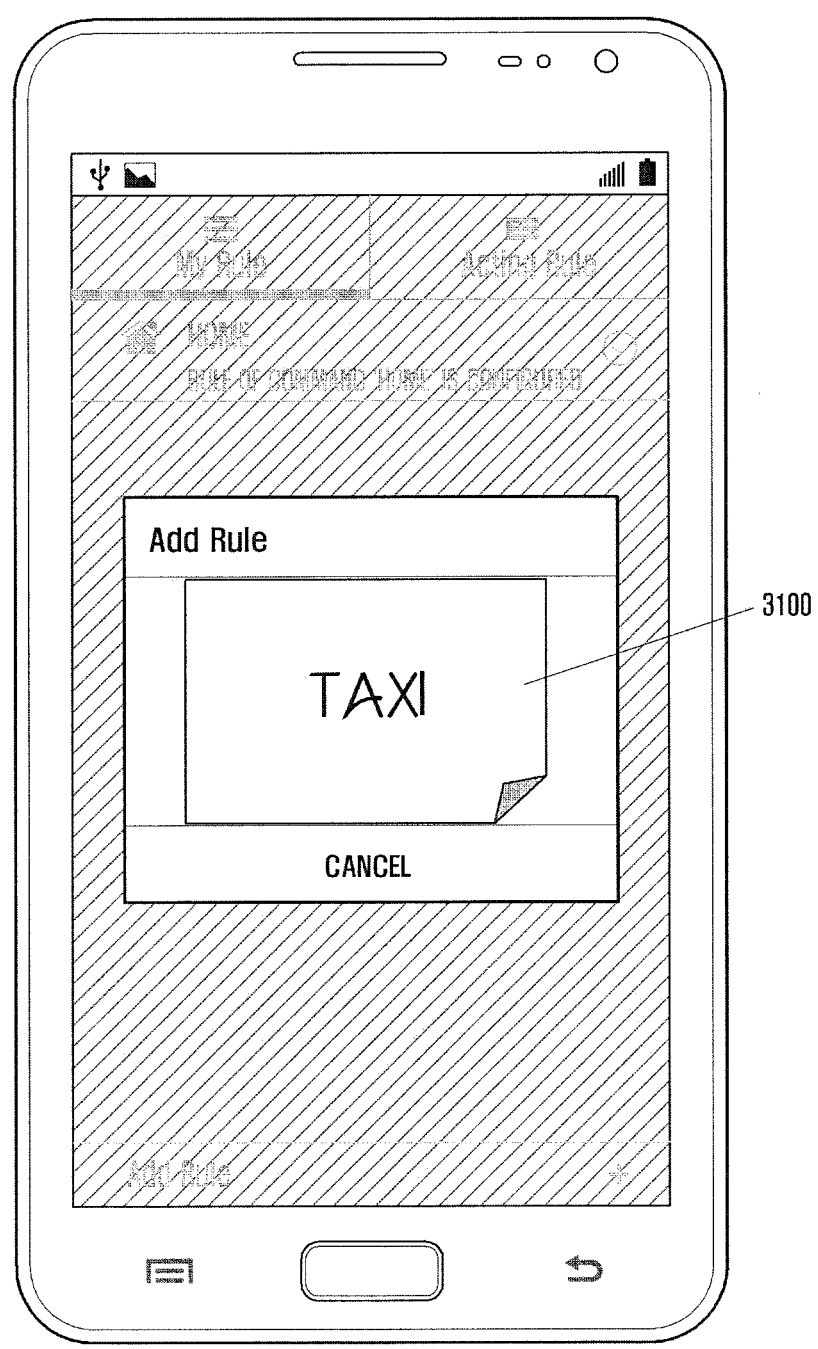
Figure 31C:
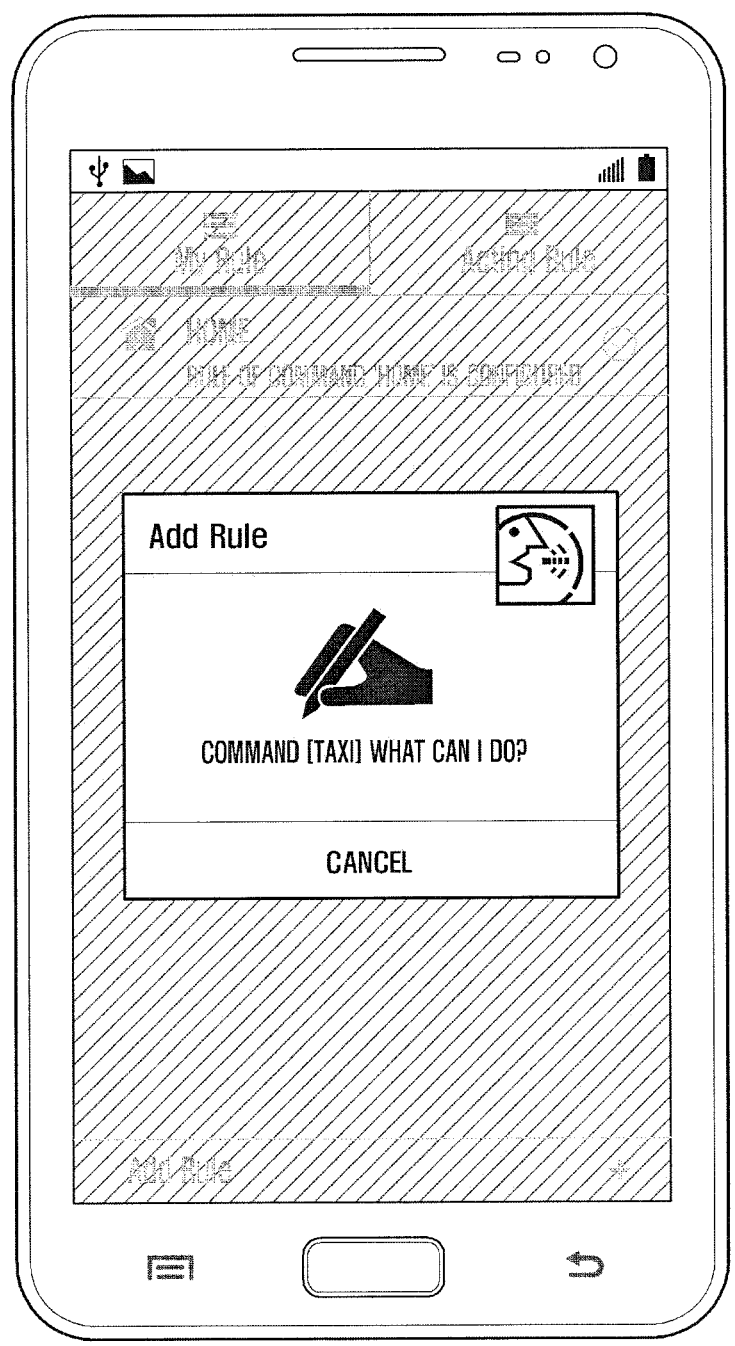
Figure 31D:
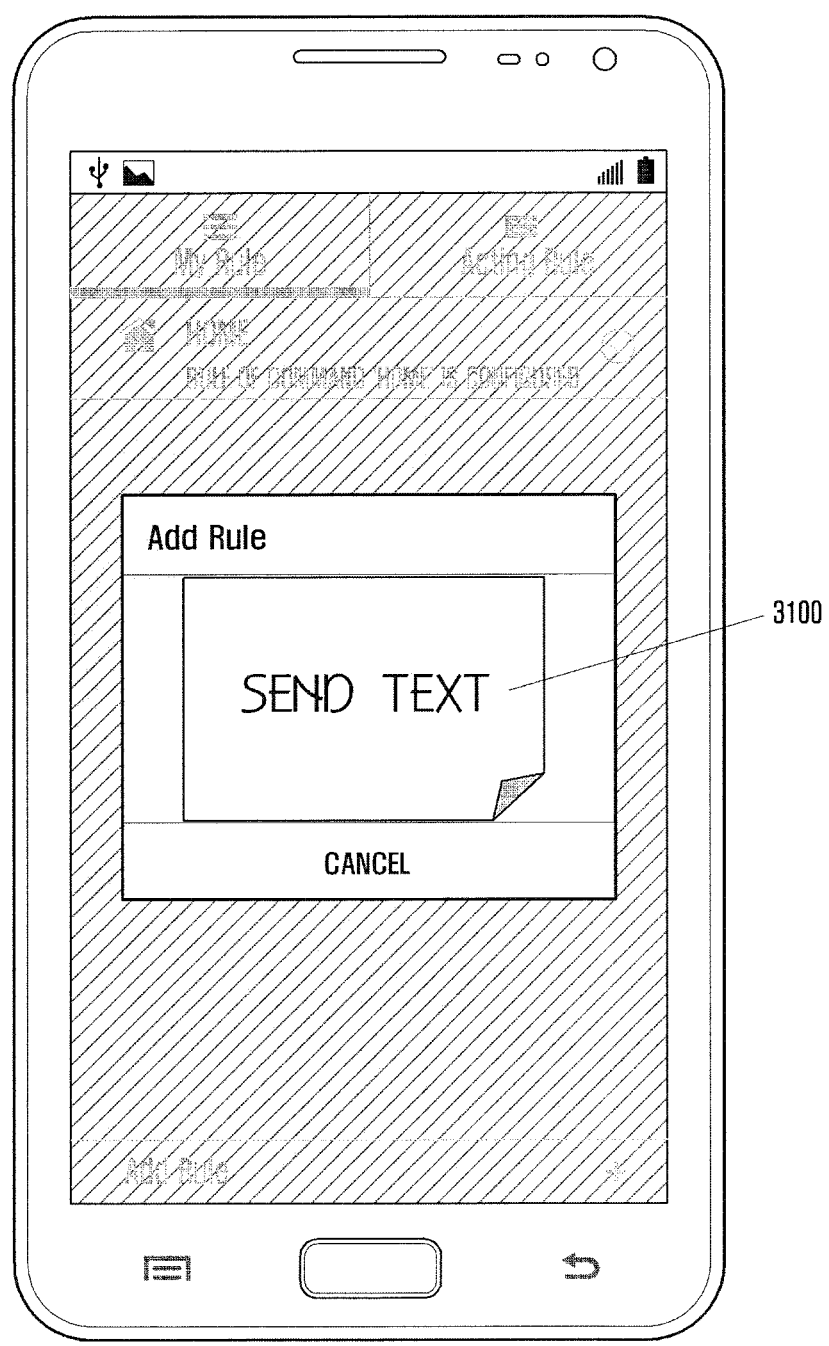
Figure 31E:
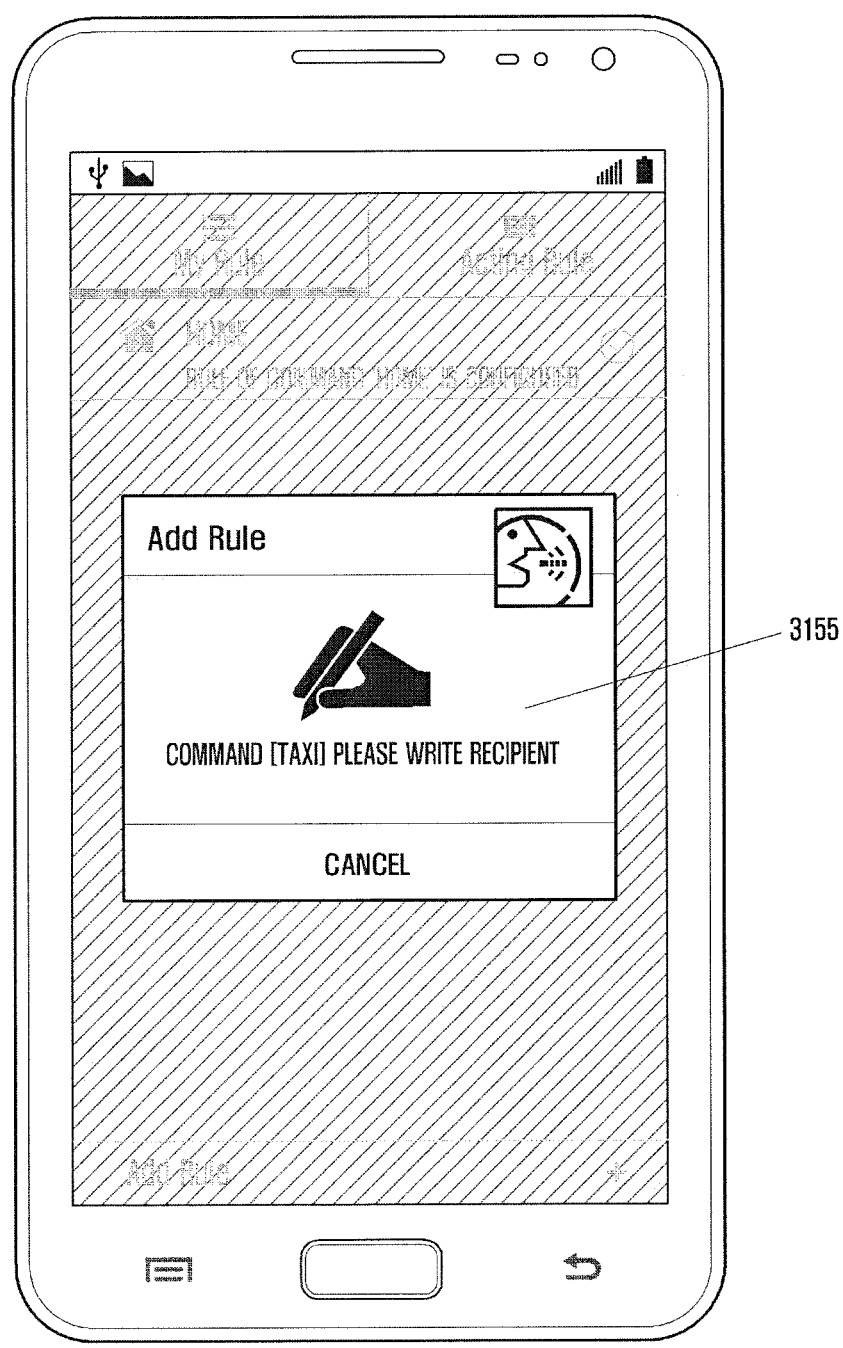
Figure 31F:
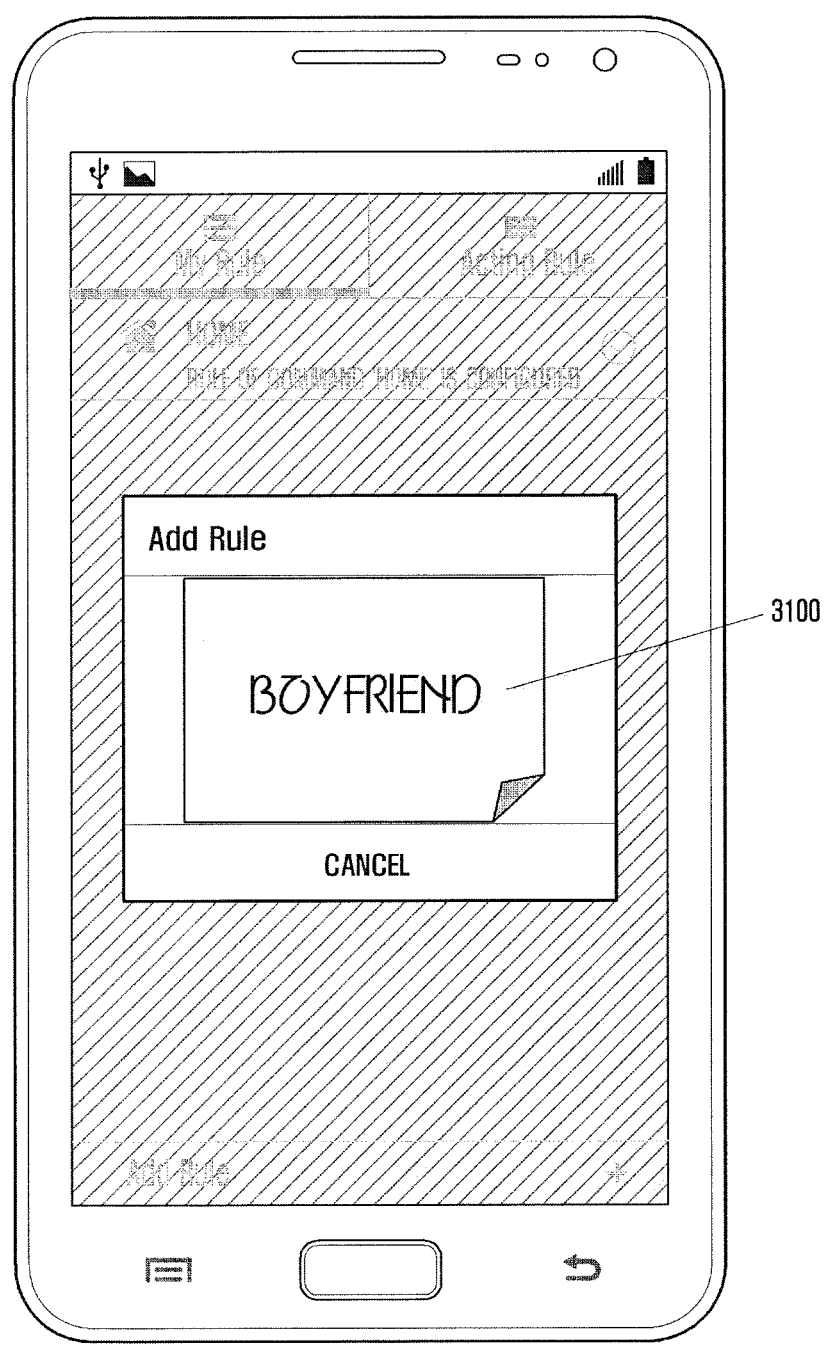
Figure 31G:
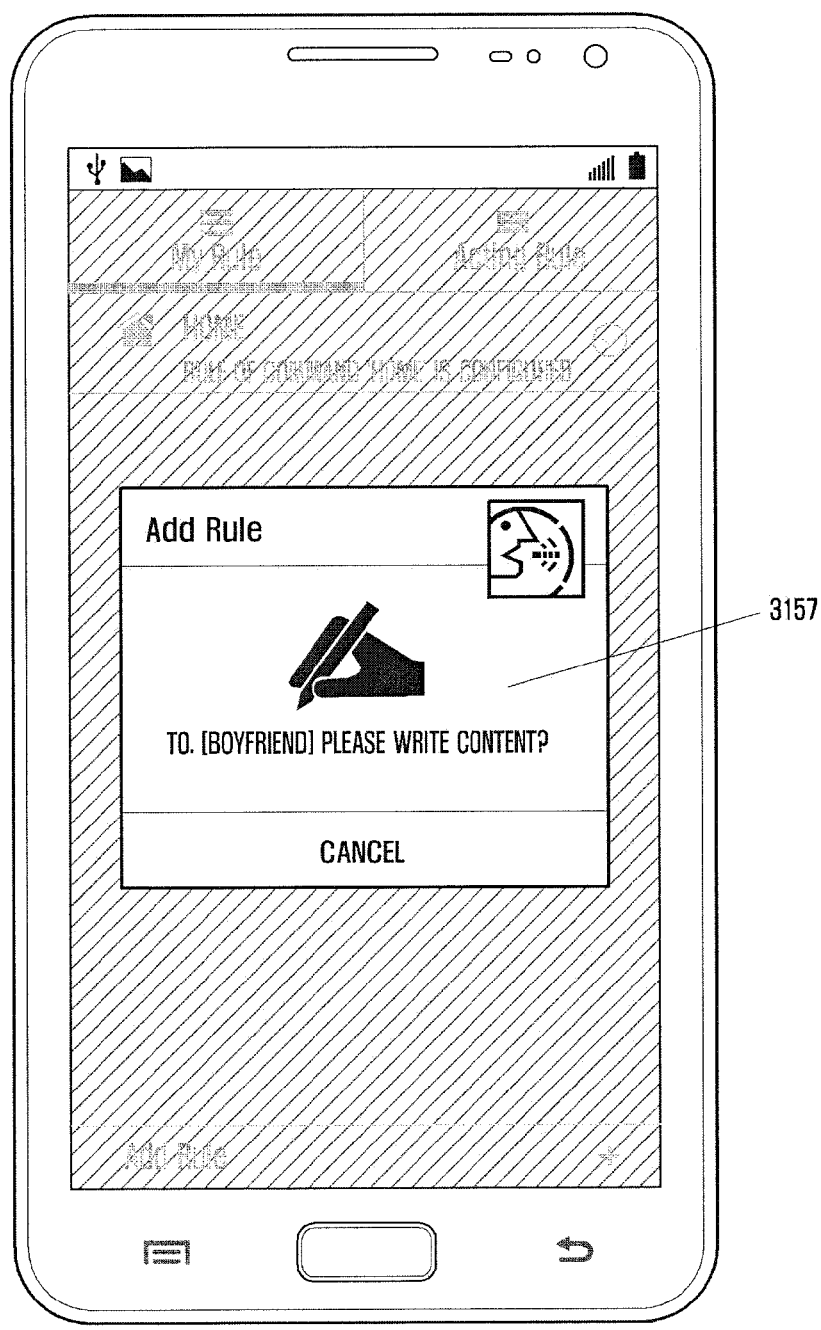
Figure 31H:
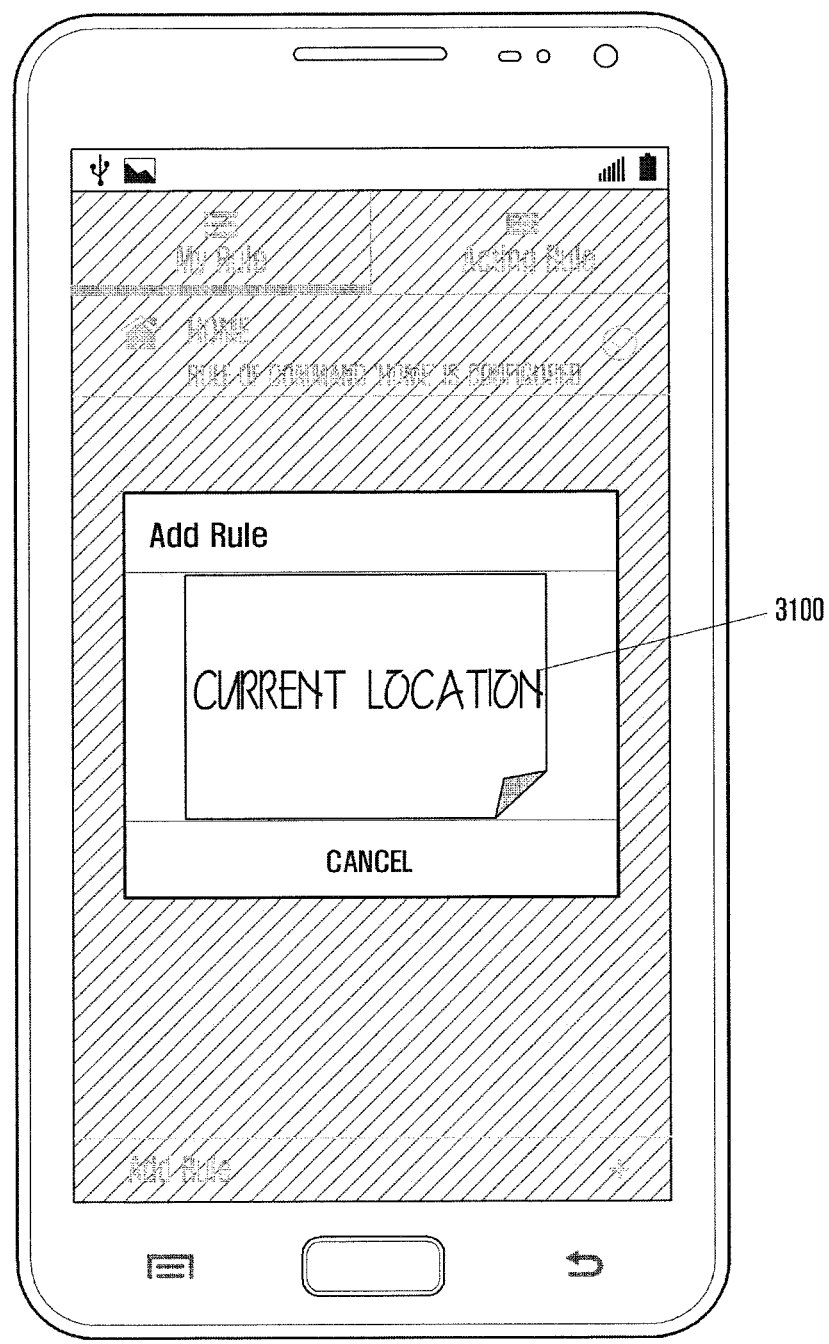
Figure 31I:
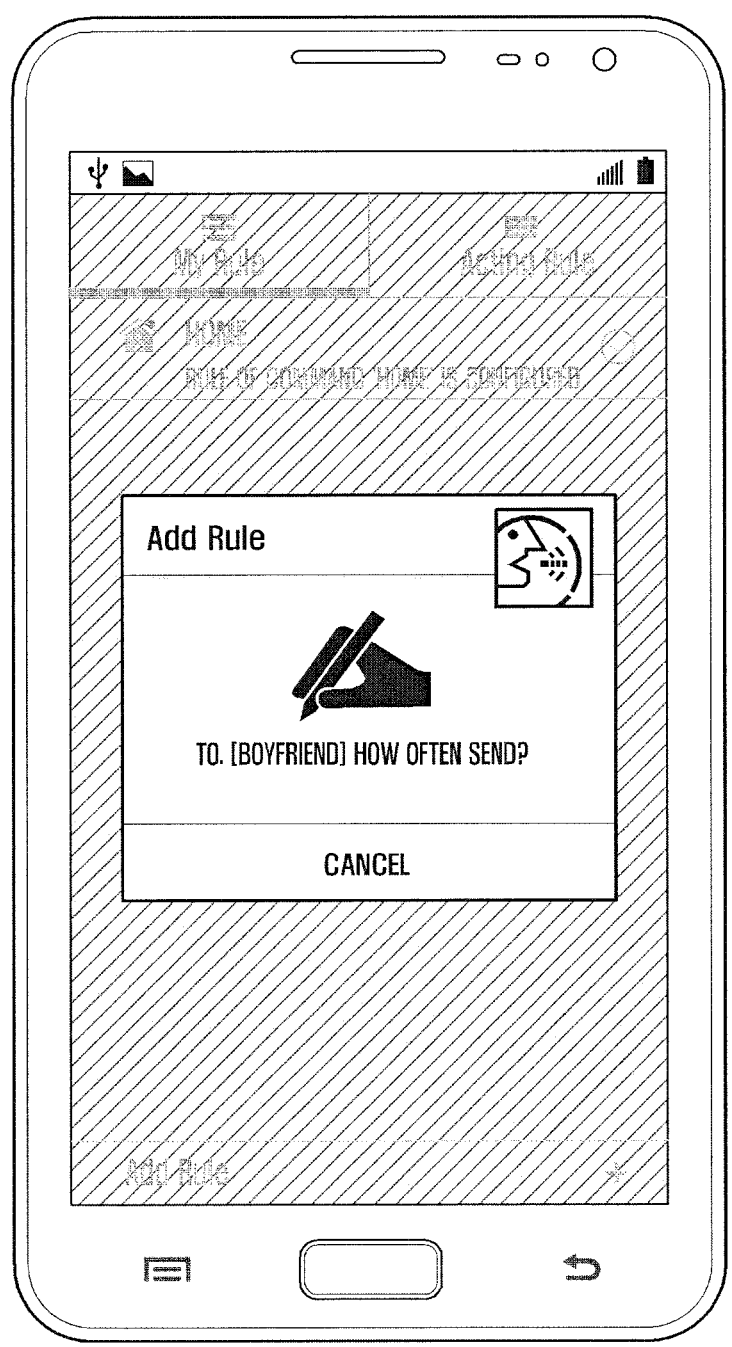
Figure 31J:
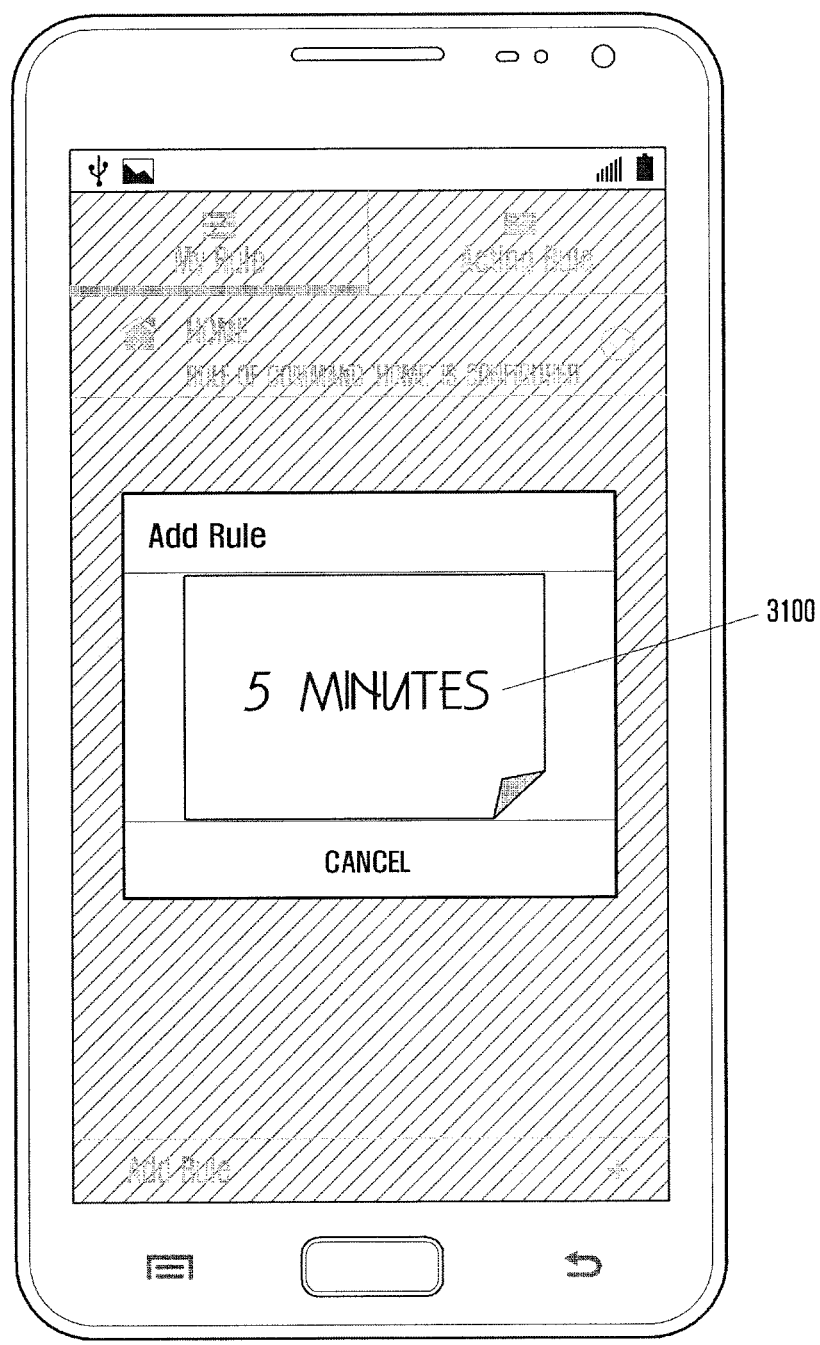
Figure 31K:
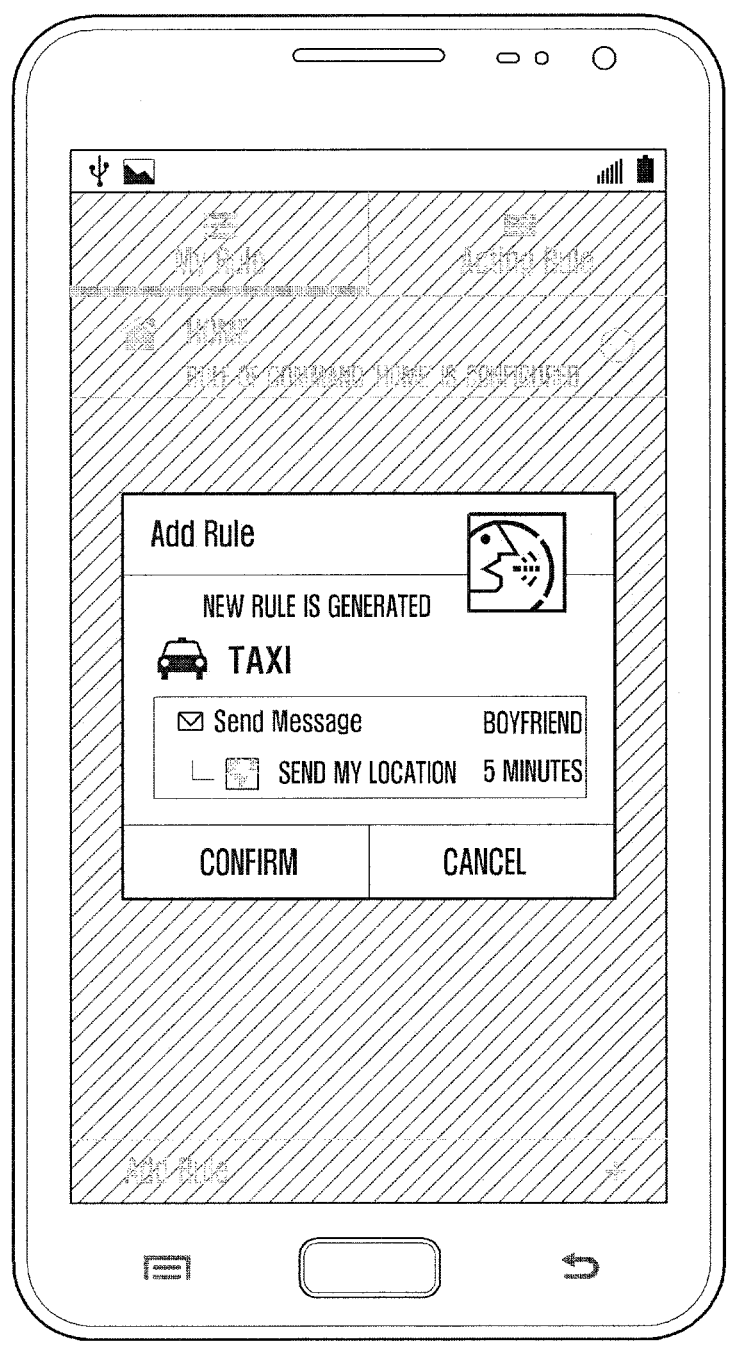
Figure 31L:
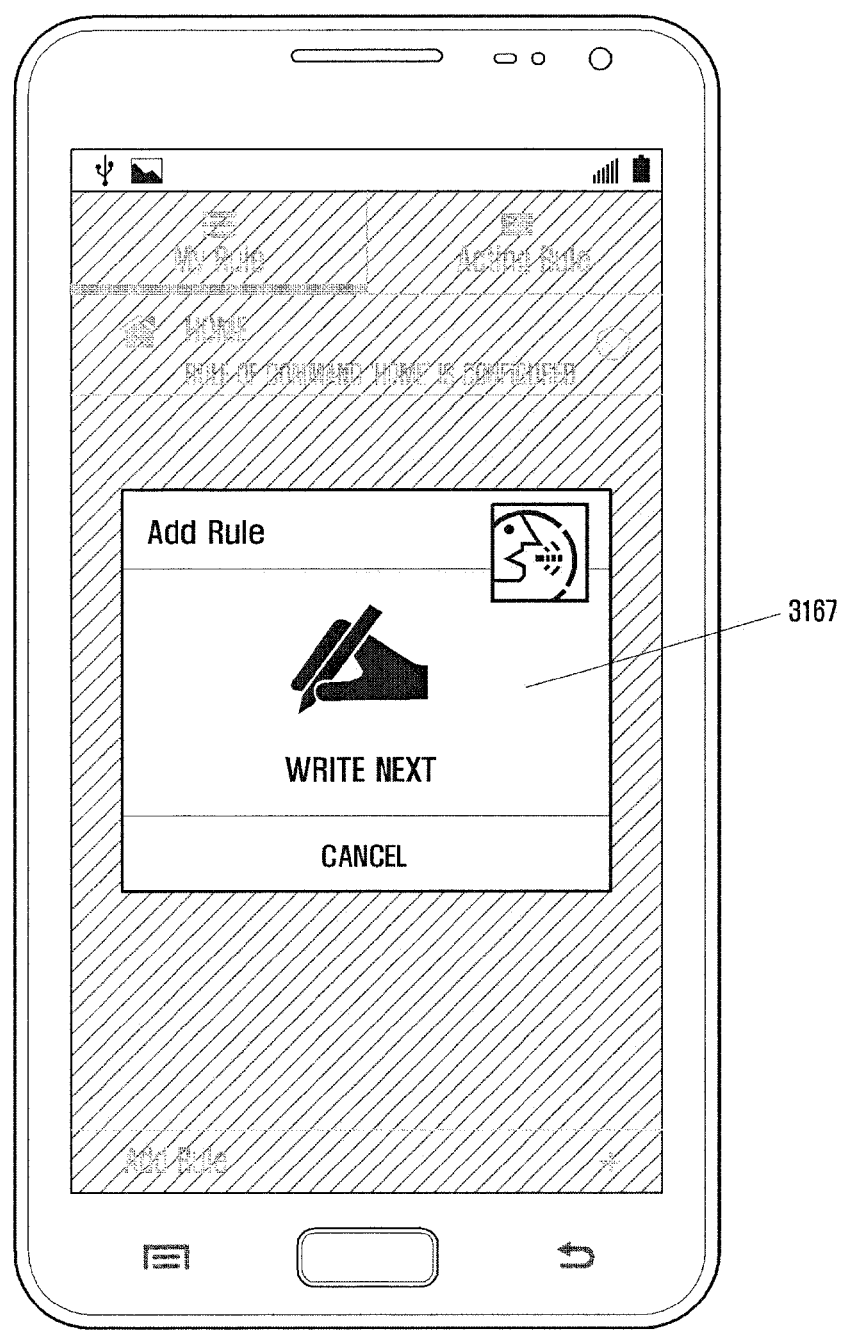
Figure 31M:
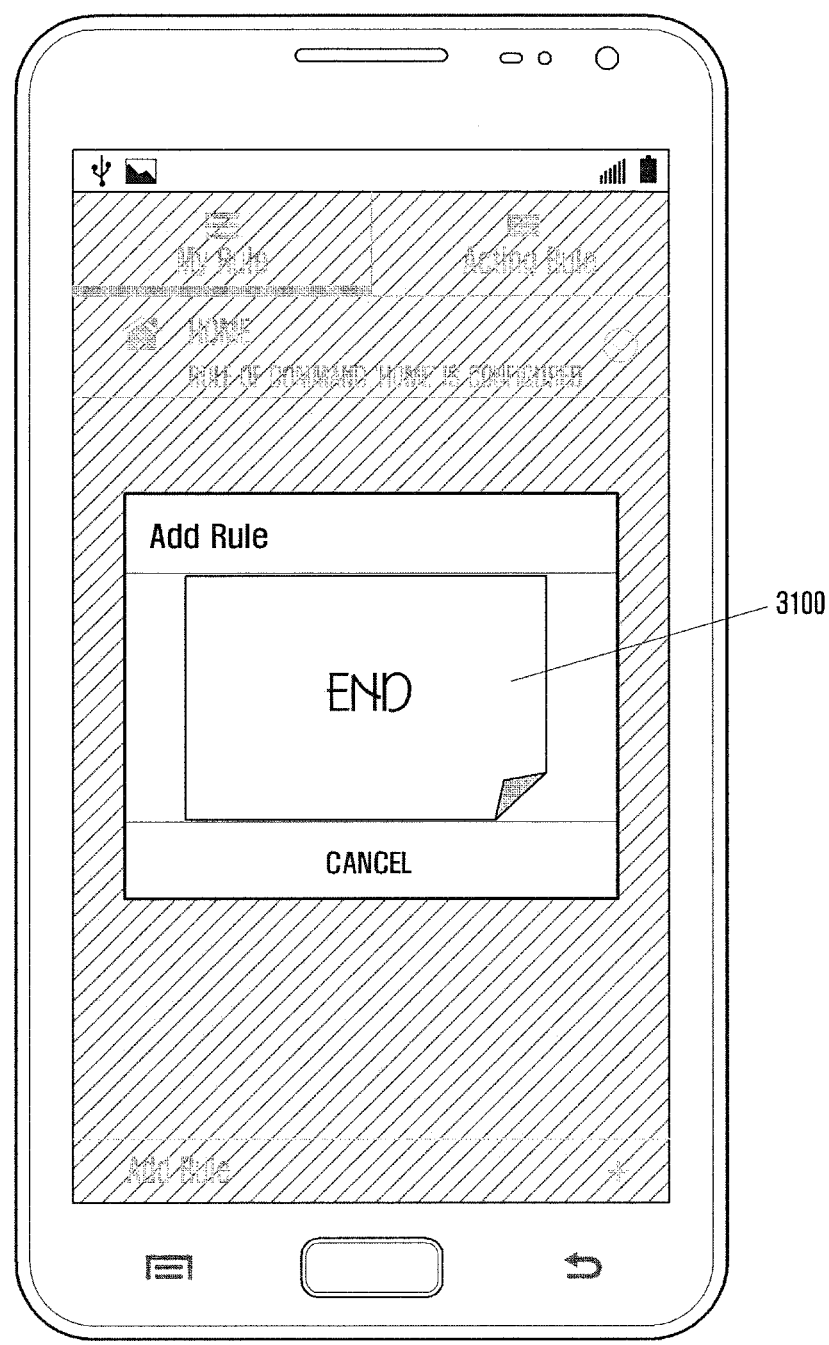
Figure 31N:
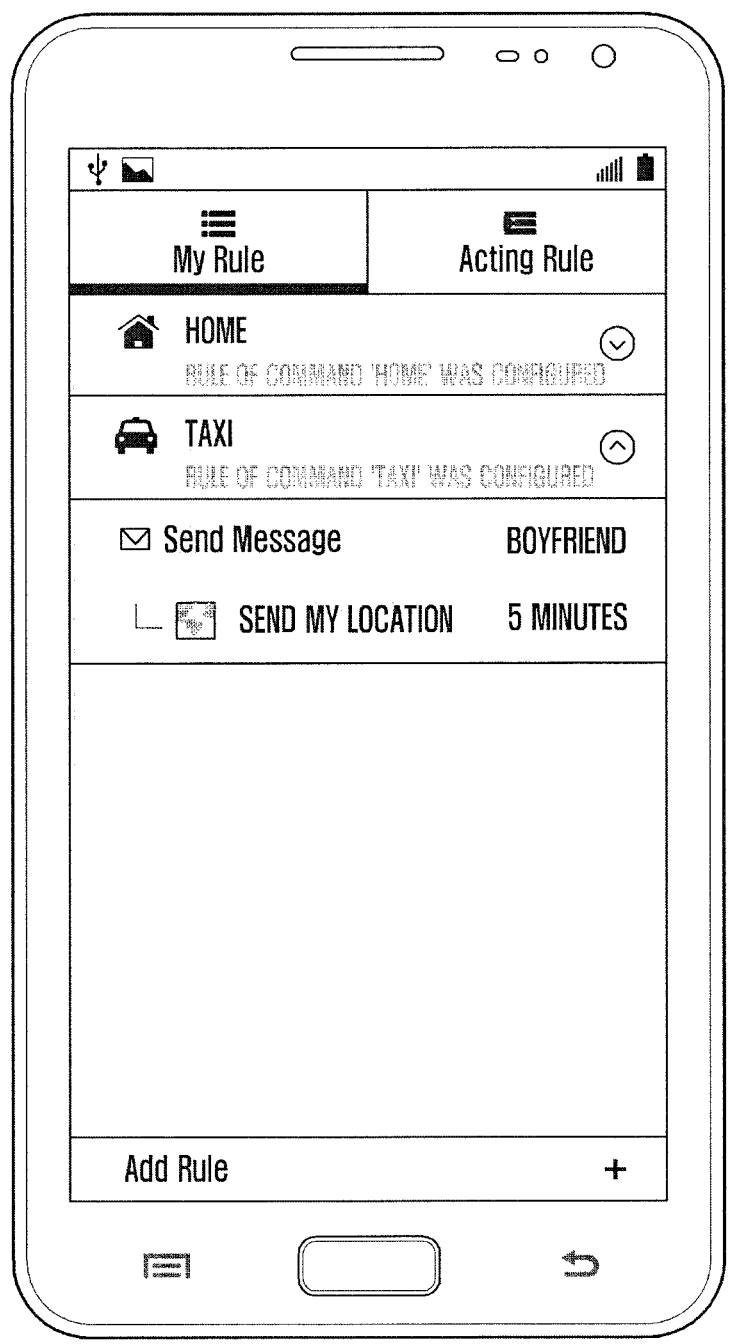

FIGS. 31A to 31N are diagrams illustrating exemplary screens associated with an operation of generating a rule in a user device according to an exemplary embodiment of the present invention.

FIGS. 31A to 31N shows the procedure of defining a rule in such a way that the control unit 170 (e.g., the rule configuration module 173) recognizes natural language-based text input of user scribing and defines the rule (condition and action) in response to the recognized text input.

FIGS. 31A to 31N may correspond to the rule generation procedure described above with reference to FIGS. 3A to 3K or FIGS. 4A to 4J. For example, FIG. 31A may correspond to FIG. 4A, FIG. 31C to FIG. 4B, FIG. 31E to FIG. 4C, FIG. 31G to FIG. 4D, FIG. 31I to FIG. 4E, FIG. 31K to FIG. 4F, FIG. 31L to FIG. 4I, and FIG. 31N to FIG. 4J. In the following description with reference to FIGS. 31A to 31N, the operations identical with or corresponding to those described with reference to FIGS. 4A to 4J are omitted or mentioned briefly.

For example, FIGS. 31A to 31N show the operations of generating a rule in correspondence to the operations of FIGS. 4A to 4J according to an exemplary embodiment of the present invention. However, FIGS. 31A to 31N are directed to the case in which the rule is generated based on the user's text scribing input other than speech input. Unlike the speech input-based rule generation procedure (FIGS. 4A to 4J), FIGS. 31A to 31N show the operations of generating a rule based on the user's text scribing input.

In the exemplary case of FIGS. 31A to 31N, the user input for generating a rule is based on text and thus the user device 100 may provide the popup message of "text input" for interaction with the user other than "speech input." According to an exemplary embodiment of the present invention, the popup window 451 of FIG. 4A prompts the user to make a speech input with a pictogram of speaking person and a text such as "please speak 000." In FIGS. 31A, 31E, 31G, and 31L, however, the popup window 3151, 3155, 3157, and 3167 prompt the user to make a text input with a pictogram of pen-handwriting and a text such as "please write 000."

In the exemplary case of FIGS. 31A to 31N, the user input is made by writing text rather than speaking the text. As shown in FIGS. 31B, 31D, 31F, 31H, 31J, and 31M; the user device 100 may provide a writing window to receive user's response, (e.g., text input) in response to the request for providing information. According to an exemplary embodiment of the present invention, the user device 100 may display a guidance (query) such as "please write command" followed by displaying a writing window 3100 to receive the user's text (e.g., taxi) writing input.

According to various exemplary embodiments of the present invention, the rule generation procedure may be progressed through interaction between the user device 100 and the user, and the user may configure the rule by making natural language-based text input of conditions and actions of the rule according to the guidance of the user device 100. For example, the user device 100 may receive the natural language-based text input made by the user for configuring the conditions and rules constituting the rule and configure the corresponding rule according to the user instruction input through the steps of FIGS. 31A to 31N.

FIGS. 32A to 32E are diagrams illustrating exemplary screens associated with an operation of executing a rule in a user device according to an exemplary embodiment of the present invention.

FIGS. 32A to 32E shows the exemplary screens of the user device 100 when the rule execution module 175 of the control unit 170 receives the user's natural language-based text scribing and executes the rule in response to the user input, the condition check module 177 of the control unit 170 monitors to detect the fulfillment of the condition specified in the rule, and the action execution module 179 executes at least one action corresponding to the fulfilled condition.

FIGS. 32A to 32E may correspond to the rule execution procedure described above with reference to FIGS. 5A to 5E. For example, FIG. 32A may correspond to FIG. 5A, FIG. 32B to FIG. 5B, FIG. 32D to FIG. 5C, and FIG. 32E to FIG. 5D. In the following description with reference to FIGS. 32A to 32E, the operations identical with or corresponding to those described with reference to FIGS. 5A to 5E are omitted or mentioned briefly.

For example, FIGS. 32A to 32E show the operations of executing a rule in correspondence to the operations of FIGS. 5A to 5E according to an exemplary embodiment of the present invention. However, FIGS. 32A to 32E are directed to the case in which the rule is generated based on the user's text scribing input other than speech input. Unlike the speech input-based rule execution procedure (FIGS. 5A to 5E), FIGS. 32A to 32E show the operations of executing a rule based on the user's text scribing input.

Figure 32A:
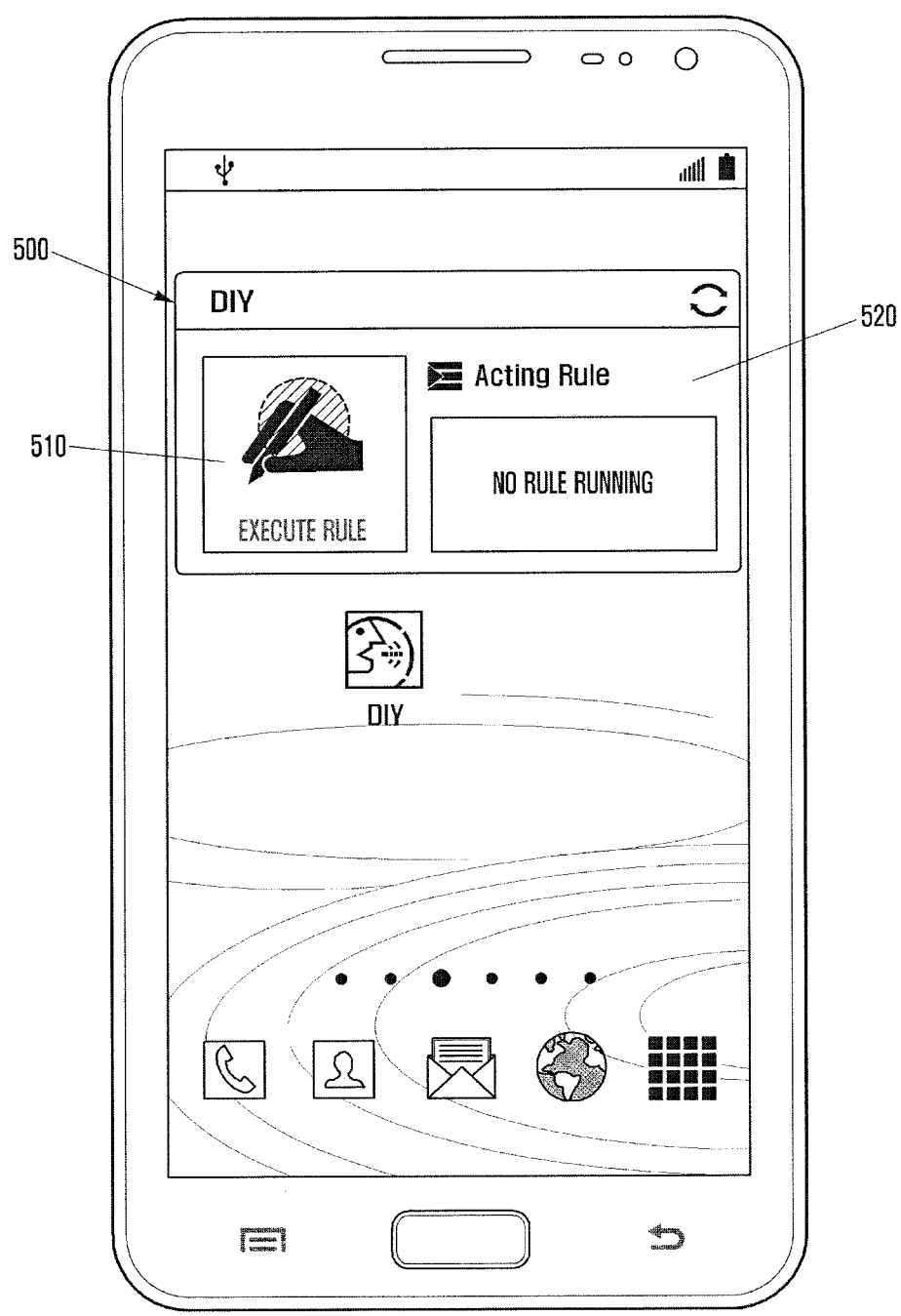
FIGS. 32A to 32E are diagrams illustrating exemplary screens associated with an operation of executing a rule in a user device according to an exemplary embodiment of the present invention.
Figure 32B:
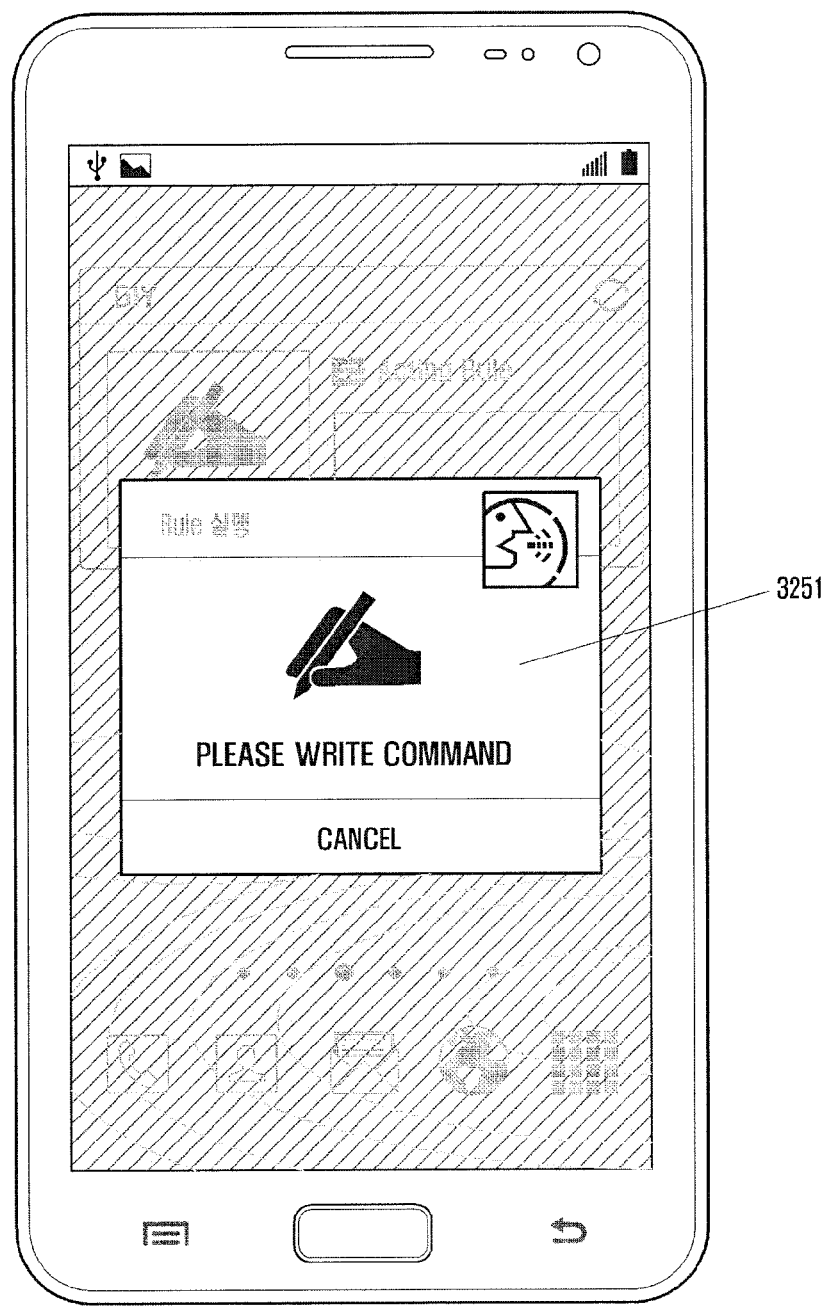

In the exemplary case of FIGS. 32A to 32E, the user input for executing a rule is based on text and thus the user device 100 may provide the popup message of "text input" for interaction with the user other than "speech input." According to an exemplary embodiment of the present invention, the popup window 551 of FIG. 5B prompts the user to make a speech input with a pictogram of speaking person and a text such as "please speak 000." In FIG. 32B, however, the popup window 3251 prompts the user to make a text input with a pictogram of pen-handwriting and a text such as "please write 000."

Figure 32C:
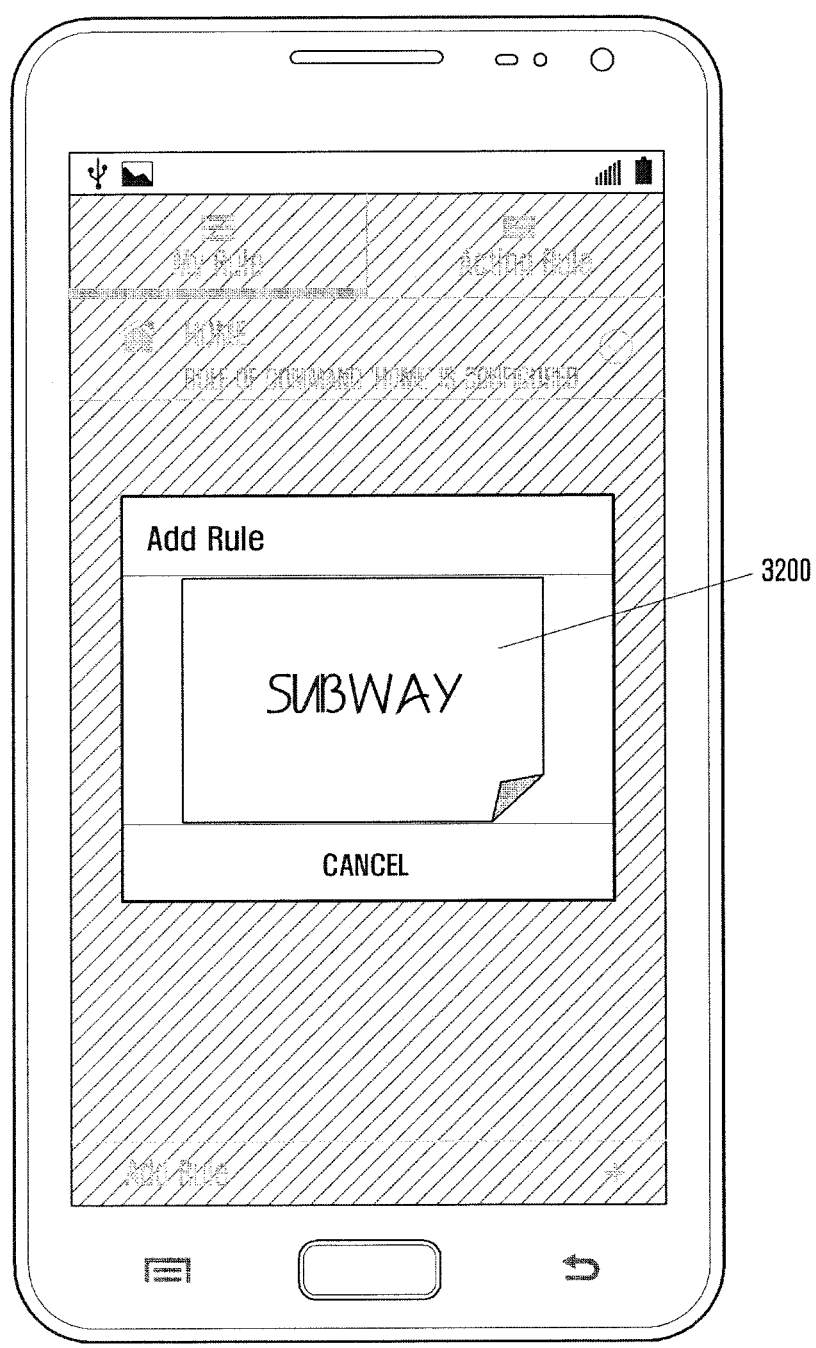
Figure 32D:
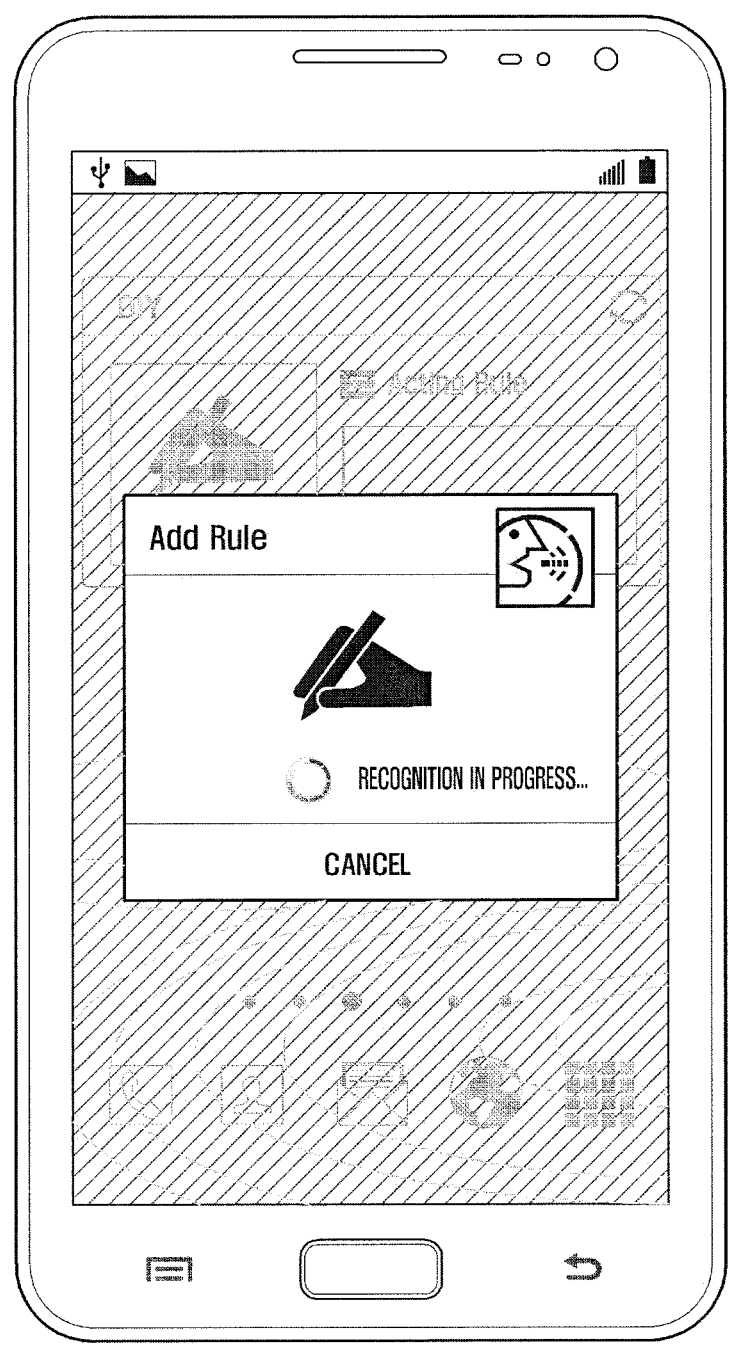
Figure 32E:
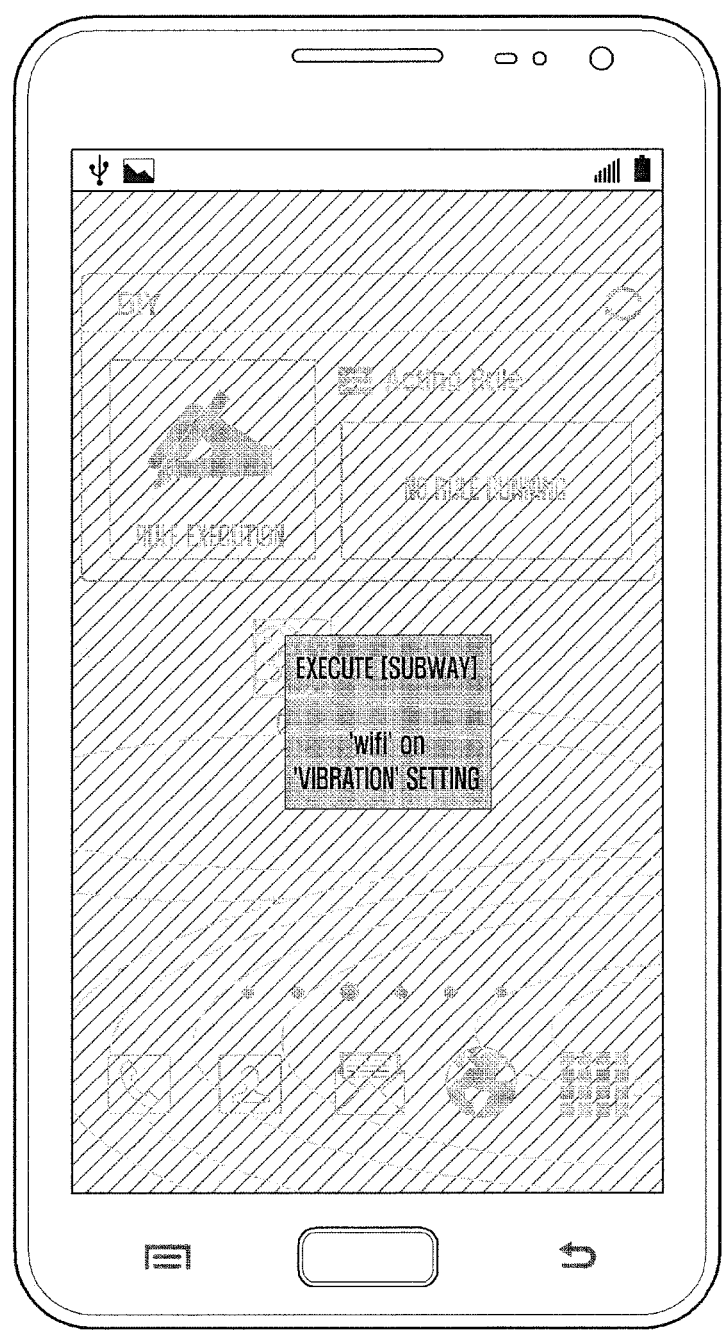

Referring to FIGS. 32A to 32E, the user input is made by writing text rather than speaking the text. As shown in FIG. 32C, the user device 100 may provide a writing window to receive user's response, (e.g., text input) in response to the request for providing information. According to an exemplary embodiment of the present invention, the user device 100 may display a guidance (query) such as "please write command" followed by displaying a writing window 3200 to receive the user's text (e.g., subway) writing input.

According to various exemplary embodiments of the present invention, the rule execution procedure may be progressed through interaction between the user device 100 and the user, and the user may execute the rule by making natural language-based text input according to the guidance of the user device 100. For example, the user device 100 may receive the natural language-based text input made by the user for executing the rule according to the user instruction input through the steps of FIGS. 32A to 32E.

According to various exemplary embodiments of the present invention, the user may execute the rule using the widget 500. According to an exemplary embodiment of the present invention, the user may select an instruction input region (or rule execution button) 510 of the widget 500 to input a text of the configured rule (or command). Then the control unit 170 feeds back the information on the action to be executed to the user in the form of a text popup or speech announcement (e.g., Text-To-Speech (TTS)) along with the notification of the start of the rule. The control unit 170 adds the executed rule to the execution information region 520 and displays a notification item notifying of the existence of currently running rule at the indicator region.

As shown in FIG. 32A, the text input-based widget 500 may be provided in separation from the speech input-based widget 500. According to an exemplary embodiment, the widget 500 of FIG. 5A may be provided with a pictogram of speaking person in the instruction input region (or rule execution button) 510 to indicate that the speech recognition function is running. The widget 500 of FIG. 32A may be provided with a pictogram (e.g., icon) of a pen-writing hand in the instruction input region (or rule execution button) 510 to indicate that the text recognition function is running.

FIGS. 33A to 33D are diagrams illustrating exemplary screens associated with an operation of suspending a currently running rule in a user device according to an exemplary embodiment of the present invention.

Referring to FIGS. 33A to 33D, the control unit 170 recognizes a natural language-based text scribing input made by the user and stops the currently running rule temporarily in response to the text input.

FIGS. 33A to 33D may correspond to the rule suspension procedure described above with reference to FIGS. 16A to 16C. For example, FIG. 33A may correspond to FIG. 16A, FIG. 33B to FIG. 16B, and FIG. 33D to FIG. 16C. In the following description with reference to FIGS. 33A to 33D, the operations identical with or corresponding to those described with reference to FIGS. 16A to 16C are omitted or mentioned briefly.

For example, FIGS. 33A to 33D show the operations of suspending a rule in correspondence to the operations of FIGS. 16A to 16D according to an exemplary embodiment of the present invention. However, FIGS. 33A to 33D are directed to the case in which the rule is generated based on the user's text scribing input other than speech input. Unlike the speech input-based rule execution procedure (FIGS. 16A to 16C), FIGS. 33A to 33D show the operations of suspending a rule based on the user's text input.

Figure 33A:
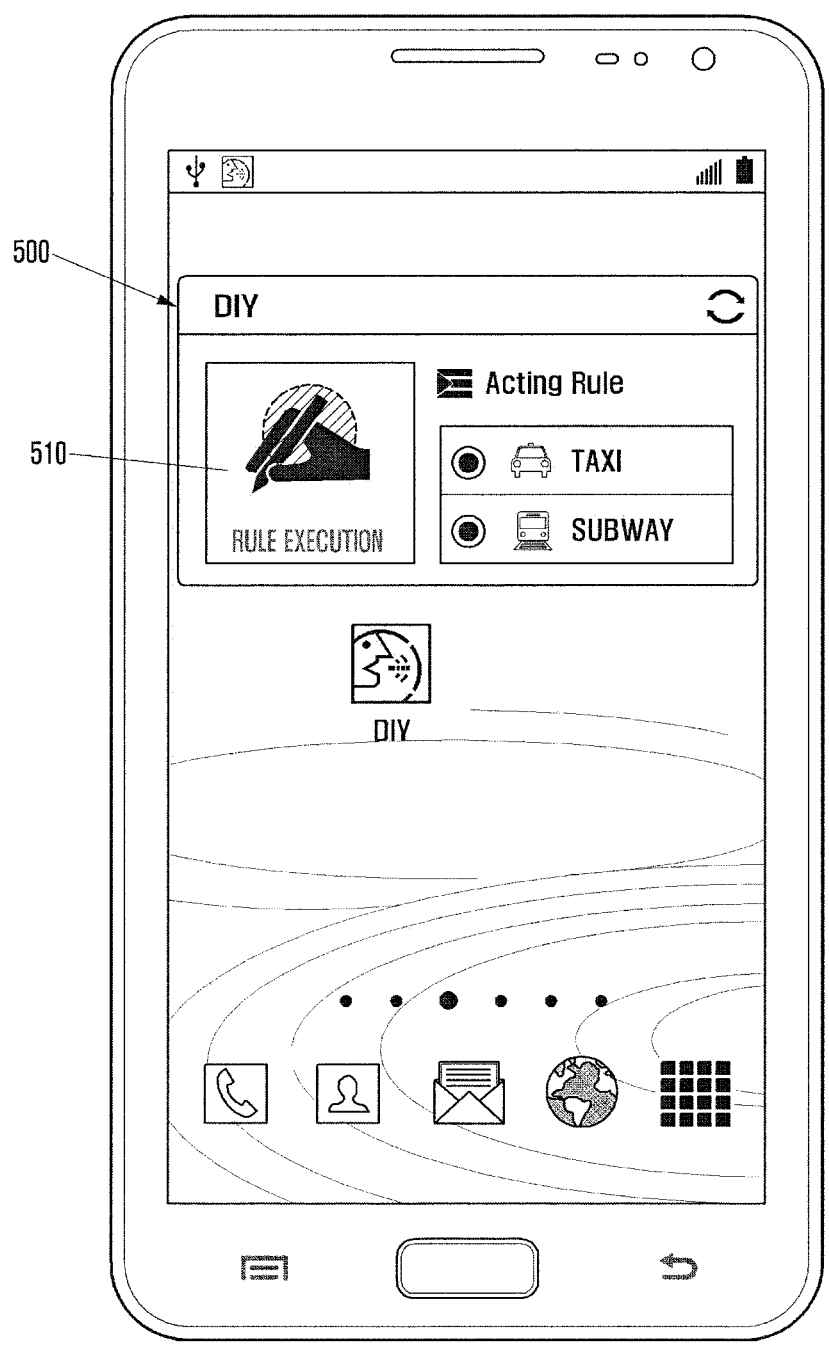
FIGS. 33A to 33D are diagrams illustrating exemplary screens associated with an operation of suspending a currently running rule in a user device according to an exemplary embodiment of the present invention.
Figure 33B:
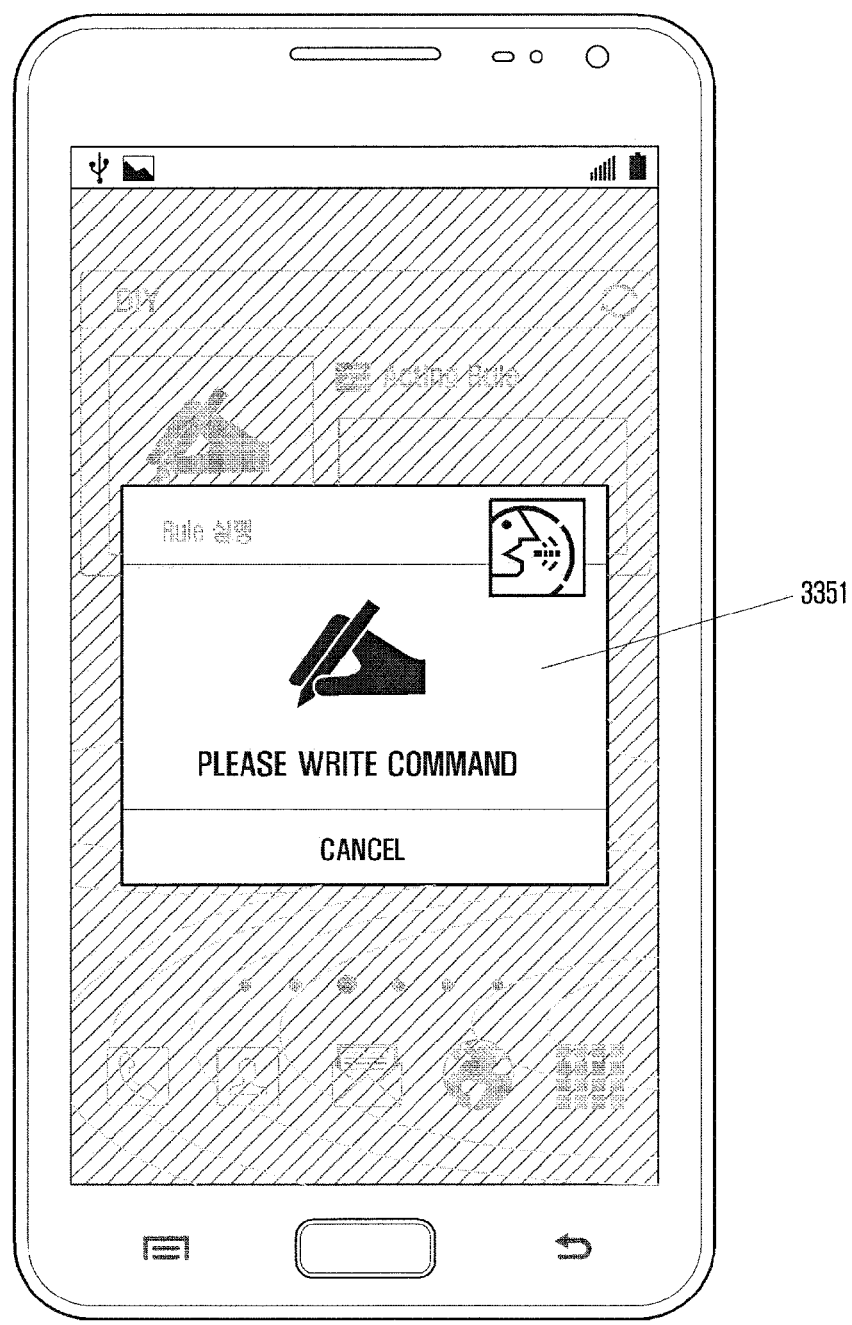

In the exemplary case of FIGS. 33A to 33D, the user input for suspending a rule is based on text and thus the user device 100 may provide the popup message of "text input" for interaction with the user other than "speech input." According to an exemplary embodiment of the present invention, the popup window 3351 of FIG. 33B prompts the user to make a text input with a pictogram (e.g., icon) of pen-handwriting and a text such as "please write 000."

Figure 33C:
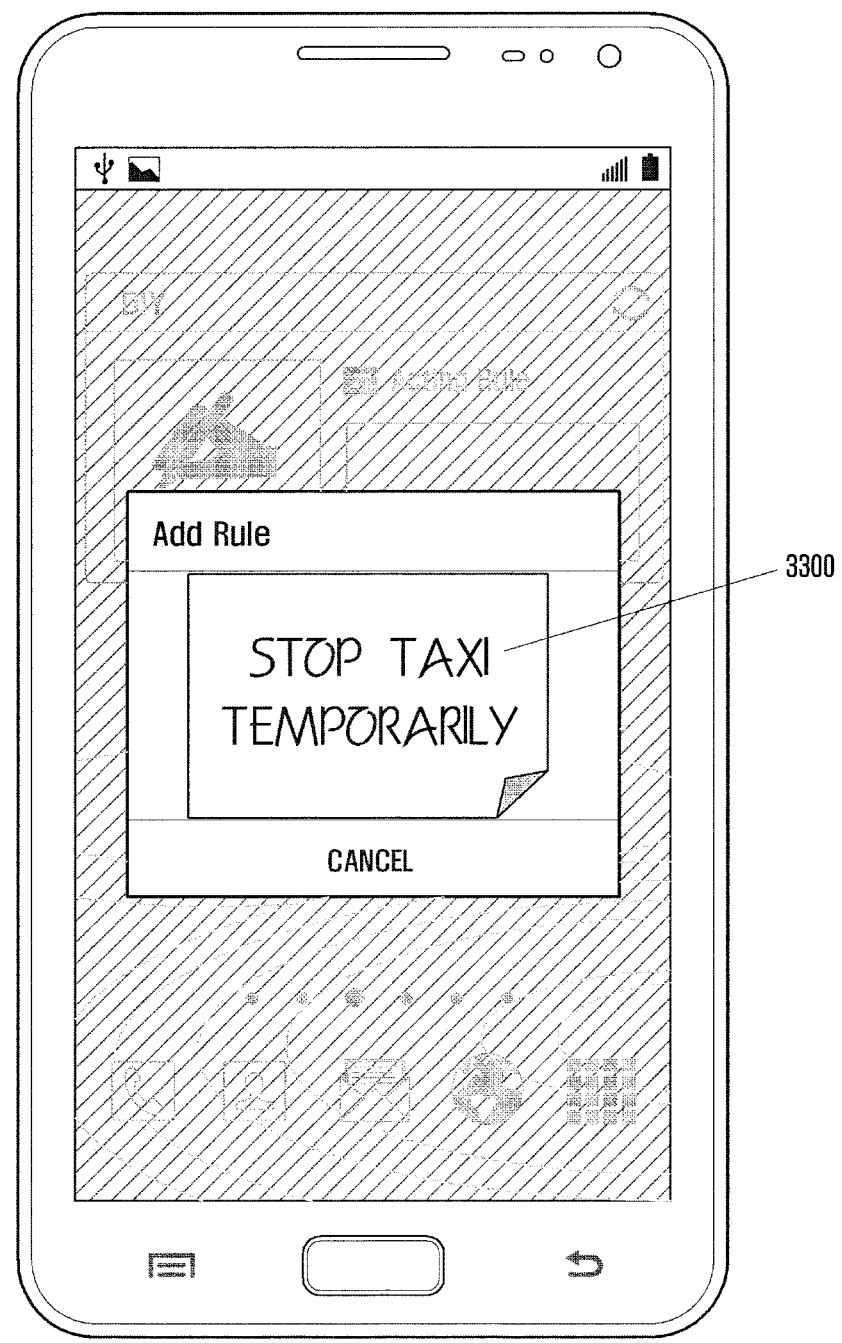
Figure 33D:
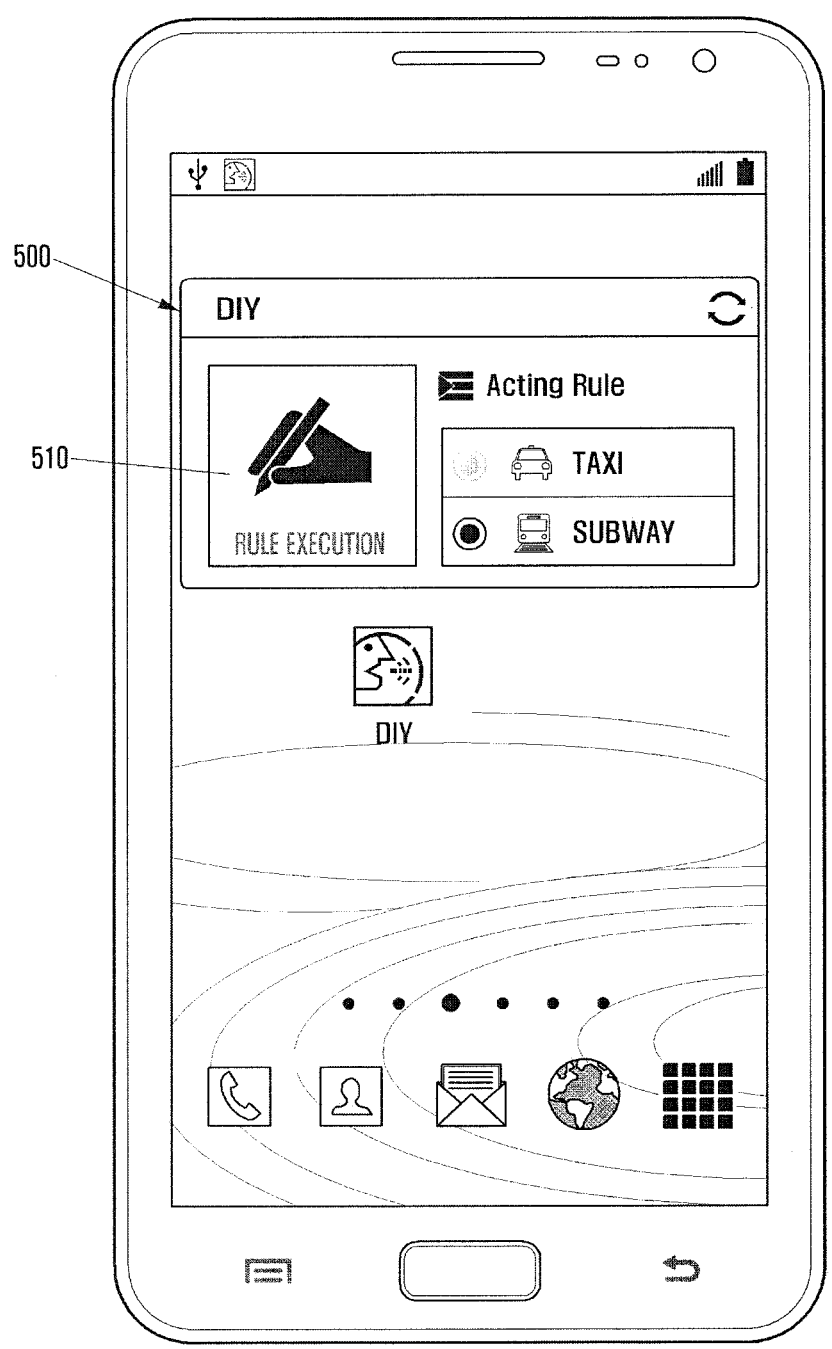

In the exemplary case of FIGS. 33A to 33D, the user input is made by scribing a text other than speaking the text. As shown in FIG. 33C, the user device 100 may provide a writing window 3300 to receive user's response, (e.g., scribing input) in response to the request for providing information. According to an exemplary embodiment of the present invention, the user device 100 may display a guidance (query) such as "please write command" followed by displaying a writing window 3300 to receive the user's text (e.g., suspend taxi) writing input.

According to various exemplary embodiments of the present invention, the rule suspension procedure may be progressed through interaction between the user device 100 and the user, and the user may suspend the rule by making natural language-based text input according to the guidance of the user device 100. For example, the user device 100 may receive the natural language-based text input made by the user for suspending the rule according to the user instruction input through the steps of FIGS. 33A to 33D.

According to various exemplary embodiments of the present invention, the user may execute the rule using the widget 500. According to an exemplary embodiment of the present invention, the user may select an instruction input region (or rule execution button) 510 of the widget 500 to input a text instruction for suspending the currently running rule. In this way, the user may stop the periodic operation of at least one rule temporarily. For example, the control unit 170 may suspend the corresponding rule in response to the user's text input such as "please stop 000 temporarily."

FIGS. 34A to 34D are diagrams illustrating exemplary screens associated with an operation of terminating a currently running rule in a user device according to an exemplary embodiment of the present invention.

FIGS. 34A to 34D may correspond to the rule termination procedure described above with reference to FIGS. 22A to 22C. For example, FIG. 34A may correspond to FIG. 22A, FIG. 34B to FIG. 22B, and FIG. 34D to FIG. 34C. In the following description with reference to FIGS. 34A to 34D, the operations identical with or corresponding to those described with reference to FIGS. 22A to 22C are omitted or mentioned briefly.

For example, FIGS. 34A to 34D show the operations of terminating a rule in correspondence to the operations of FIGS. 22A to 22D according to an exemplary embodiment of the present invention. However, FIGS. 34A to 34D are directed to the case in which the rule is terminated based on the user's text input other than speech input. Unlike the speech input-based rule termination procedure (FIGS. 22A to 22C), FIGS. 34A to 34D show the operations of terminating a rule based on the user's text scribing input.

Figure 34A:
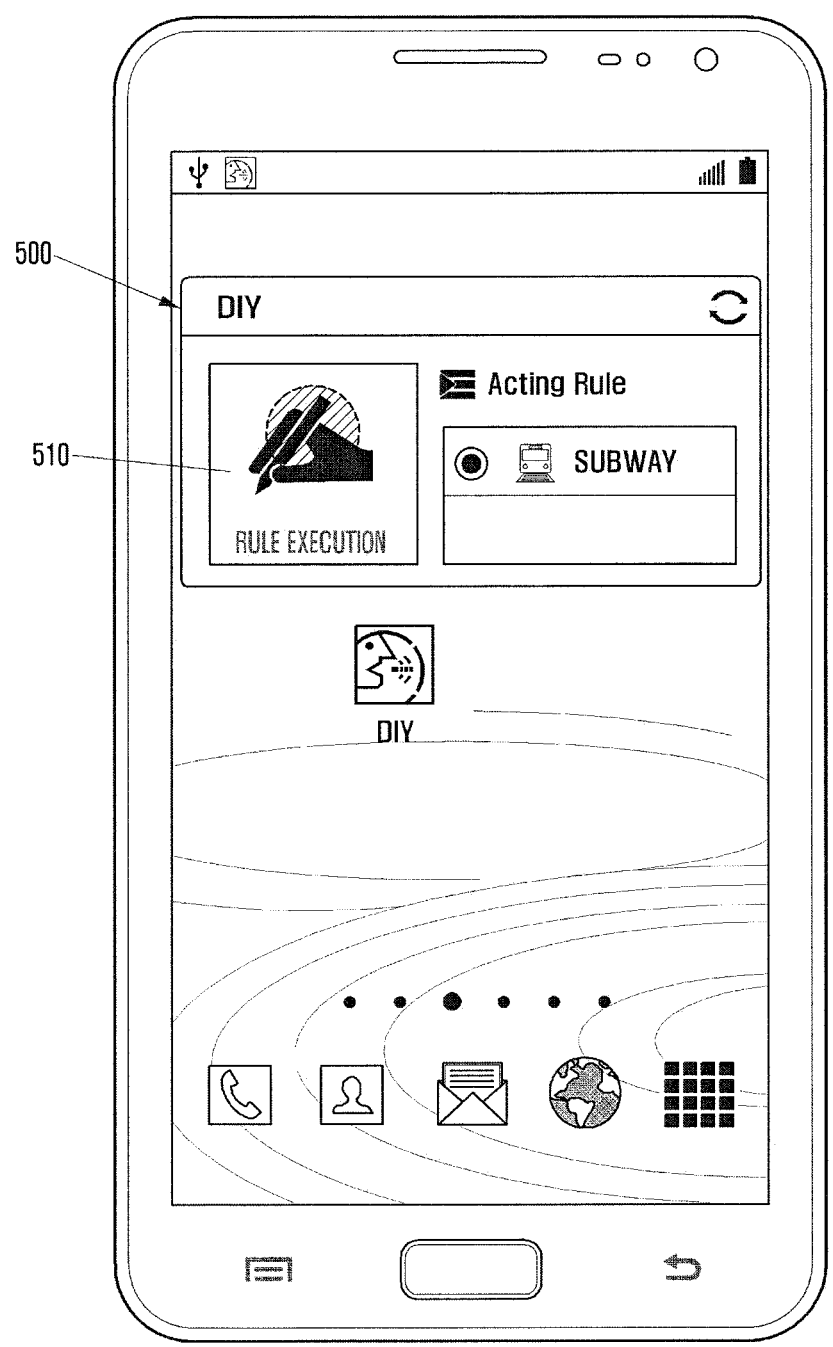
FIGS. 34A to 34D are diagrams illustrating exemplary screens associated with an operation of terminating a currently running rule in a user device according to an exemplary embodiment of the present invention.
Figure 34B:
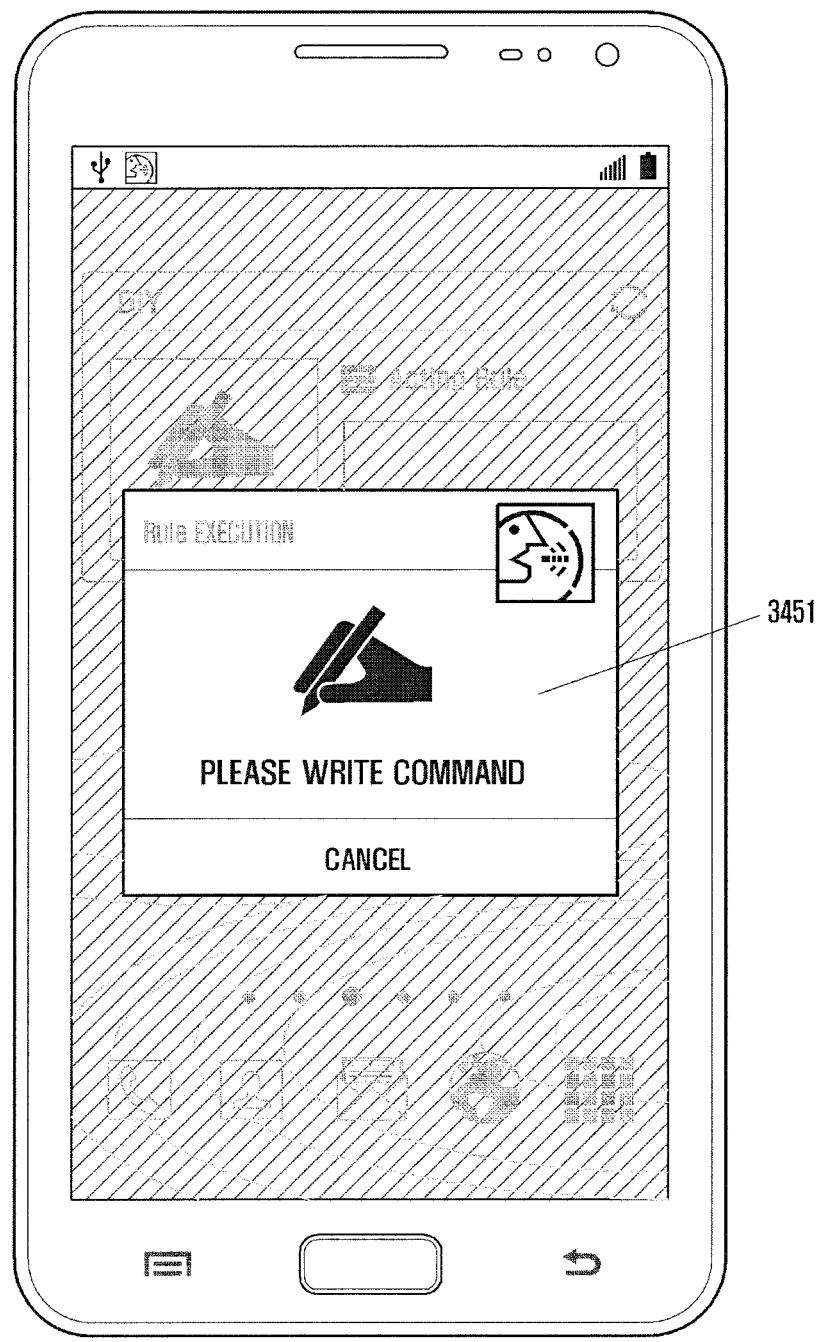

In the exemplary case of FIGS. 34A to 34D, the user input for terminating a rule is based on text and thus the user device 100 may provide the popup message of "text input" for interaction with the user other than "speech input." According to an exemplary embodiment of the present invention, the popup window 3451 of FIG. 34B prompts the user to make a text input with a pictogram of pen-handwriting and a text such as "please write 000."

Figure 34C:
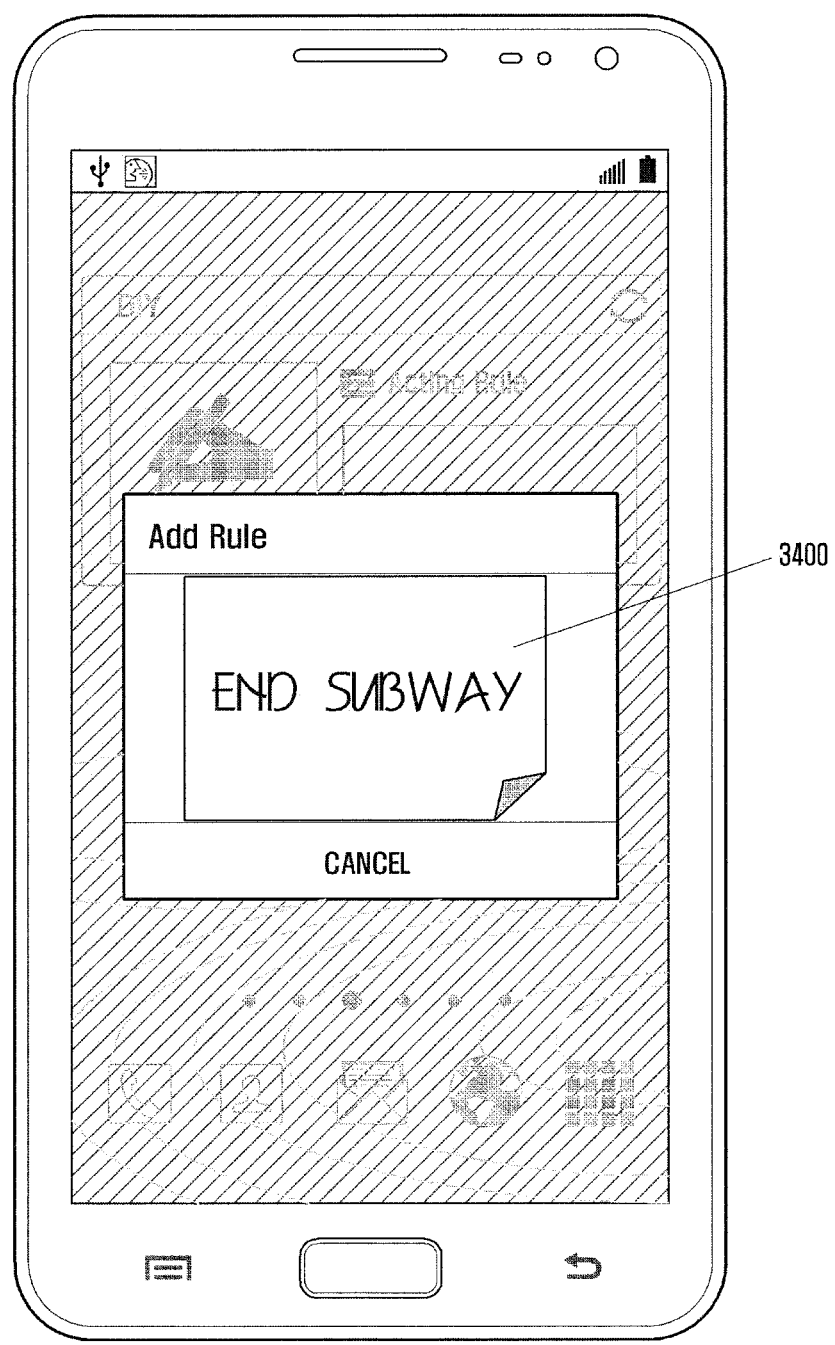
Figure 34D:
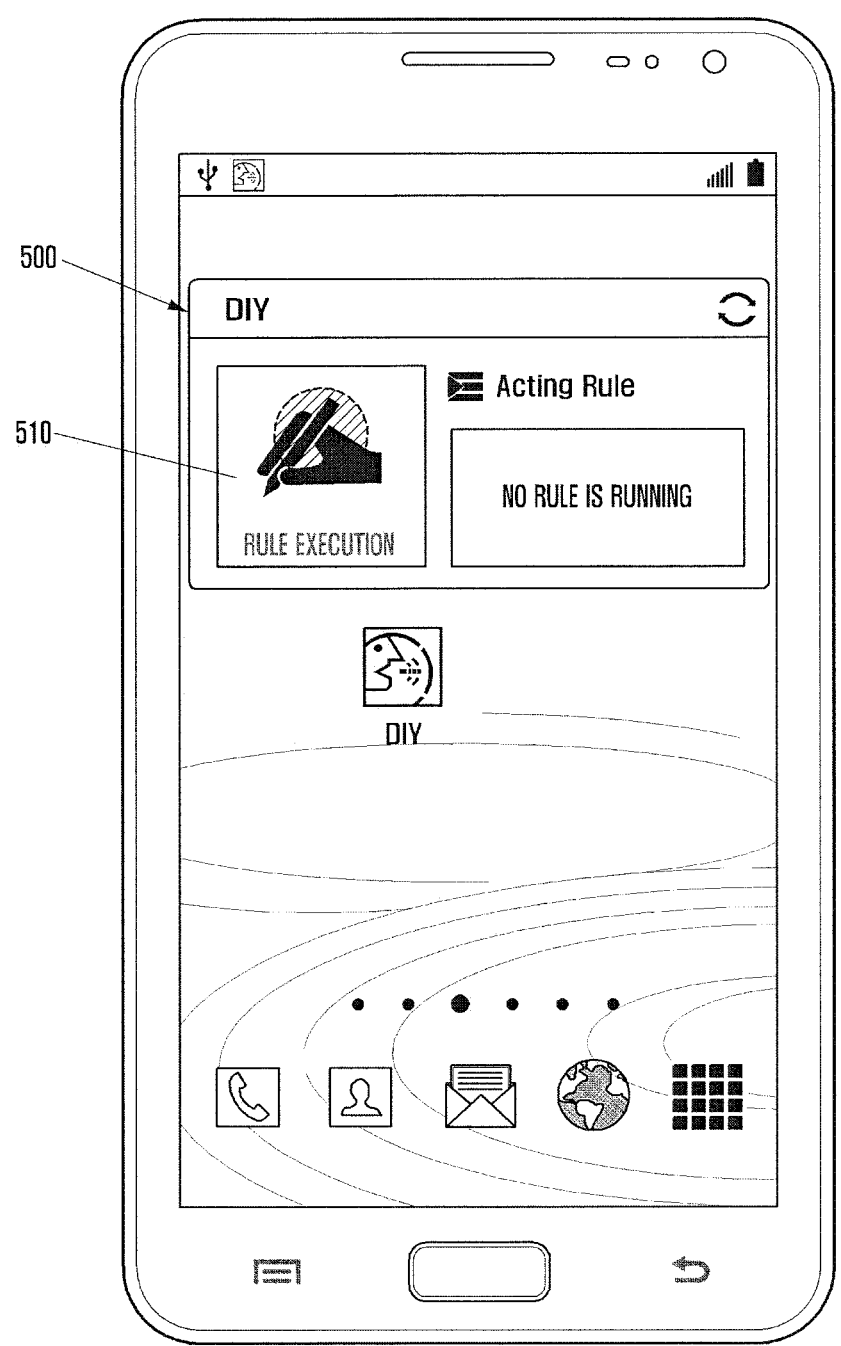

In the exemplary case of FIGS. 34A to 34D, the user input is made by writing a text rather than speaking the text. As shown in FIG. 34C, the user device 100 may provide a writing window 3400 to receive a user's response, (e.g., text input) in response to the request for providing information. According to an exemplary embodiment of the present invention, the user device 100 may display a guidance (query) such as "please write command" followed by displaying a writing window 3400 to receive the user's text (e.g., terminate subway) writing input as shown in FIG. 34C.

According to various exemplary embodiments of the present invention, the rule termination procedure may be progressed through interaction between the user device 100 and the user, and the user may terminate the rule by making natural language-based text input according to the guidance of the user device 100. For example, the user device 100 may receive the natural language-based text input made by the user for terminating the rule according to the user instruction input through the steps of FIGS. 34A to 34D.

According to various exemplary embodiments of the present invention, the user may execute the rule using the widget 500. According to an exemplary embodiment of the present invention, the user may select an instruction input region (or rule execution button) 510 of the widget 500 to input a text instruction for terminating the currently running rule. Also, according to various exemplary embodiments of the present invention, the control unit may control such that when the corresponding rule is terminated according to the user's text input, the user device 100 recovers the user device's configuration to the state before the execution of the corresponding rule automatically.

The CAS provision method and apparatus according to exemplary embodiments of the present invention is capable of configuring the rules (or conditions) of CAS diversely according to user's definition. The user device 100 recognizes the conditions specified in at lease on rule defined by the user and executes at least one action in fulfillment of the corresponding conditions. The CAS provision method and apparatus according to exemplary embodiments of the present invention is capable of feeding back the internal and/or external context information to the user as a result of the execution of the action.

The CAS provision method and apparatus according to exemplary embodiments of the present invention is capable of defining the rules (or situation), instructions for executing the corresponding rules, and actions to be executed according to the rule through natural language-based text or speech input using the user device 100. Accordingly, the CAS provision method and apparatus of the present invention allows the user to define various rules with user-specified conditions and action as well as the rules defined in the manufacturing stage of the user device 100. The CAS provision method and apparatus according to exemplary embodiments of the present invention is capable of defining the rules and instructions through natural language-based text or speech input and executing the rules in response to the natural-language-based text or speech instruction or detection of the movement of the user device 100. Accordingly, exemplary embodiments of the present invention are capable of extending the range of CAS and improve the user-specific usability.

The CAS provision method and apparatus according to exemplary embodiments of the present invention of the present invention is capable of configuring plural conditions per rule and support multi-context awareness scenarios corresponding to the plural conditions. Accordingly, the CAS provision method and apparatus according to exemplary embodiments of the present invention is capable of configuring various conditions according to the user preference and performing plural actions simultaneously in correspondence to the multi-context awareness scenarios. The CAS provision method and apparatus according to exemplary embodiments of the present invention is capable of improving the context awareness functionality by adopting the recommendation function as well as context awareness, resulting in improvement of context recognition accuracy, as compared to the statistics-based context awareness technology according to the related art.

The CAS provision method and apparatus according to exemplary embodiments of the present invention is capable of optimizing the CAS environment, resulting in improvement of user convenience and device usability, utilization, and competitiveness. The CAS provision method and apparatus according to exemplary embodiments of the present invention is applicable to various types of CAS-capable devices including cellular communication terminal, smartphone, tablet PC, PDA, and the like.

According to exemplary embodiments of the present invention, the modules may be implemented as any or combination of software, firmware, hardware, and/or any combination thereof. Some or all of the modules may be implemented as an entity capable of executing the functions of the individual modules identically. According to various exemplary embodiments of the present invention, plural operations may be performed sequentially, repeatedly, or in parallel. Some of the operations may be omitted or replaced by others.

The above-described exemplary embodiments of the present invention can be implemented in the form of computer-executable program commands and stored in a non-transient computer-readable storage medium. The non-transient computer-readable storage medium may store the program commands, data files, and data structures in individual or combined forms. The program commands recorded in the storage medium may be designed and implemented for various exemplary embodiments of the present invention or used by those skilled in the computer software field.

The non-transient computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a context-aware service of a user device, the method comprising:
receiving, by an input unit of the user device, a first user input according to a guidance provided by the user device, the first user input being at least one of a natural language-based text input or a natural language-based speech input;
in response to receiving the first user input, parsing the received first user input to extract and identifying a condition, an action corresponding to the condition, and a command, wherein the action is a function executable by one or more applications of the user device;

defining a rule including the condition and the action corresponding to the condition based on the parsed first user input;

mapping the command to the rule in response to the defining of the rule;

storing the rule and the mapped command in at least one of the user device or a server;

receiving, by the input unit, a second user input, wherein the second user input is one of a natural language-based text input or a natural language based speech input; and in response to receiving the second user input:
  determining whether the second user input corresponds to the command;
  activating, if the second user input corresponds to the command, the rule to detect, by a sensor of the user device, a context of the user device; and
  executing, if the detected context corresponds to the condition of the rule, the action corresponding to the condition.

2. The method of claim 1,
  wherein the context comprises a change in the user device, and
  wherein the change in the user device corresponds to at least one of a posture change or a location change of the user device.

3. The method of claim 1, wherein the context comprises receiving at least one of an inbound message or an inbound sound.

4. The method of claim 1, wherein the action comprises an operation performed by the user device when the context is detected.

5. The method of claim 4, wherein the action comprises at least one of feeding back context information corresponding to the rule through the user device by controlling internal components of the user device, or feeding back the context information through an external device by controlling the external device.

6. The method of claim 1, wherein one or more rules are defined based on the received first user input.

7. The method of claim 1,
  wherein the rule is defined as a singular structure rule when one action is identified from the received first user input, and
  wherein the rule is defined as a plural structure rule when a plurality of actions are identified from the received first user input.

8. The method of claim 1, further comprising:
  displaying at least one of a user interface allowing the user to designate at least one of an action supported by the user device, or a guidance on the action supported by the user device.

9. The method of claim 1, further comprising:
  determining whether supplementary information is necessary for identifying the condition, the action corresponding to the condition, or the command;
  displaying, when it is determined that supplementary information is necessary for identifying the condition, the action corresponding to the condition, or the command, a query to prompt the user to provide supplementary information necessary for identifying the condition, the action corresponding to the condition, or the command; and
  receiving the second user input in response to the query,
  wherein the query is not displayed when it is determined that supplementary information is not necessary for identifying the condition, the action corresponding to the condition, or the command.

10. A method for providing a context-aware service of a user device, the method comprising:
  operating the user device in a rule configuration mode, a user interface for configuring a rule being displayed during the rule configuration mode;
  receiving, by an input unit of the user device, a first user input according to a guidance provided by the user device if the user device is operating in the rule configuration mode, the first user input being at least one of a natural language-based speech input or a natural language-based text input;
  in response to receiving the first user input, parsing the received first user input to extract and identifying a condition, an action, and a command, wherein the action is a function executable by one or more applications of the user device;
  configuring a rule with the condition and the action based on the parsed first user input;
  mapping the command to the rule in response to the configuring of the rule;
  storing the rule and the mapped command at the user device;
  switching the user device to a second mode different from the rule configuration mode;
  receiving, by the input unit, a second user input, wherein the second user input is one of a natural language-based text input or a natural language based speech input; and
  in response to receiving the second user input:
    determining whether the second user input corresponds to the command;
    activating, if the second user input corresponds to the command while the user device is in the second mode, the rule to detect, by a sensor of the user device, an event at the user device, which corresponds to the condition of the rule; and
    executing, if the detected event corresponds to the condition of the rule while the user device is in the second mode, the action corresponding to the condition.

11. The method of claim 10, wherein at least one of the condition or the command further comprises at least one of a motion detection event of the user device, a receipt of an inbound sound, or a receipt of an inbound message.

12. The method of claim 10, wherein the activating of the rule comprises:
  determining, when the command is received, whether a rule matching the command exists,
  outputting, when no rule matches the command, a guidance,
  determining, when a rule matching the command exists, whether a number of matched rules is greater than 1, and
  activating at least one rule according to the number of matched rules.

13. The method of claim 12, wherein the activating of the rule further comprises:
  prompting, when the number of matched rules is greater than 1, to select one of the matched rules.

14. The method of claim 10, wherein the activating of the rule further comprises:
  releasing, when a rule release condition is satisfied in a state in which the rule is activated, the activated rule, and
  providing feedback associated with release information, the feedback including information notifying of the release of the rule.

15. The method of claim 14, wherein the feedback associated with the release information comprises at least one of audio feedback, video feedback, or tactile feedback.

16. A user device comprising:
an input device;
a random access memory;
a display; and
at least one microprocessor configured to:
receive, by the input device, an indication associated with a first user input according to a guidance provided by the user device, the first user input being at least one of a natural language-based text input or a natural language-based speech input,
in response to receiving the first user input, parse the received first user input to extract and identify a condition, an action corresponding to the condition, and a command, wherein the action is a function executable by one or more applications of the user device,
define a rule including the condition and the action corresponding to the condition based on the parsed first user input,
map the command to the rule in response to the defining of the rule,
store the rule and the mapped command to the random access memory,
receive, by the input device, an indication associated with a second user input,
wherein the second user input is one of a natural language-based text input or a natural language-based speech input, and
in response to receiving the second user input:
determine whether the second user input corresponds to the command,
activate, if the second user input corresponds to the command, the rule to detect, by a sensor of the user device, a context,
control the display to display execution information if the rule is activated, and
execute, if the detected context corresponds to the condition of the rule, the action corresponding to the condition,
wherein the second user input is one of a natural language-based text input or a natural language-based speech input.

17. The user device of claim 16,
wherein the second user input further comprises at least one of a motion detection event of the user device, a receipt of an inbound sound, or a receipt of an inbound message.

18. The user device of claim 16, wherein the at least one microprocessor is further configured to:
execute, when an event detected in the user device satisfies the condition specified in the activated rule, at least one action corresponding to the condition, and
control the user device to provide feedback as an execution result.

19. The user device of claim 16, wherein the at least one microprocessor is further configured to:
release, when a rule release condition is fulfilled in a state in which at least one rule is activated, the activated rule, and
control the user device to provide feedback as notification of the release of the at least one rule.

20. A user device comprising:
a display configured to display information; and
at least one microprocessor configured to:
receive, by an input unit of the user device, a first user input according to a guidance provided by the user device, the first user input being at least one of a natural language-based text input or a natural language-based speech input,
in response to receiving the first user input, parse the received first user input to extract and identify a condition, an action corresponding to the condition, and a command, wherein the action is a function executable by one or more applications on the user device,
define a rule including the condition and the action corresponding to the condition based on the parsed first user input,
map the command to the rule in response to the defining of the rule,
store the rule and the mapped command in at least one of the user device or a server,
receive, by the input unit, an indication associated with a second user input, wherein the second user input comprises one of a natural language-based speech input, a natural language-based text input, a motion detection event of the user device, a receipt of inbound sound, or a receipt of inbound message, and
in response to receiving the second user input:
determine whether the second user input corresponds to the command,
activate, if the second user input corresponds to the command, the rule after the rule is stored in at least one of the user device or the server,
detect, by a sensor of the user device, a context of the user device which corresponds the condition as specified in the rule, and
execute, if the context is detected, the action corresponding to the condition.

21. A non-transitory computer-readable storage medium storing a program that, when executed, causes at least one processor to perform a method comprising:
receiving a first user input by an input unit of a user device, by providing to a guidance, wherein the first user input is at least one of a natural language-based text input or a natural language-based speech input;
parsing the received first user input to extract and identifying a condition, an action corresponding to the condition, and a command;
defining a rule including the condition and the action corresponding to the condition based on the parsed first user input;
mapping the command to the rule in response to the defining of the rule;
storing the rule and the mapped command;
receiving, by the input unit, a second user input, wherein the second user input is one of a natural language-based text input or a natural language- based speech input; and
in response to receiving the second user input:
determining whether the second user input corresponds to the command;
activating, if the second user input corresponds to the command, the rule to detect, by a sensor of the user device, a context of the user device after the rule is stored; and
executing, if the detected context corresponds to the condition of the rule, the action corresponding to the condition.

* * * * *